(12) United States Patent
Yourlo et al.

(10) Patent No.: US 7,567,279 B2
(45) Date of Patent: Jul. 28, 2009

(54) IMAGE SENSOR TIMING CIRCUIT

(75) Inventors: Zhenya Alexander Yourlo, Balmain (AU); Paul Lapstun, Balmain (AU); Kia Silverbrook, Balmain (AU); Peter Charles Boyd Henderson, Balmain (AU); Alireza Moini, Balmain (AU); Matthew John Underwood, Balmain (AU); Nicholas Damon Ridley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 1133 days.

(21) Appl. No.: 10/778,063

(22) Filed: Feb. 17, 2004

(65) Prior Publication Data

US 2005/0046718 A1   Mar. 3, 2005

(30) Foreign Application Priority Data

Feb. 17, 2003 (AU) .............................. 2003900746

(51) Int. Cl.
*H04N 3/14* (2006.01)
*H04N 5/335* (2006.01)

(52) U.S. Cl. ...................................... 348/294; 348/302
(58) Field of Classification Search .......... 348/302–310
See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,477,012 A | 12/1995 | Sekendur | |
| 5,652,412 A | 7/1997 | Lazzouni | |
| 5,661,506 A | 8/1997 | Lazzouni et al. | |
| 5,692,073 A | 11/1997 | Cass | |
| 5,852,434 A | 12/1998 | Sekendur | |
| 5,896,403 A * | 4/1999 | Nagasaki et al. | ............ 714/752 |
| 6,076,734 A | 6/2000 | Dougherty | |
| 6,567,571 B1 * | 5/2003 | Kochi et al. | ................. 382/312 |
| 6,606,122 B1 * | 8/2003 | Shaw et al. | ................. 348/302 |
| 6,964,374 B1 | 11/2005 | Djuknic et al. | |

FOREIGN PATENT DOCUMENTS

| | | |
|---|---|---|
| GB | 2306669 | 5/1997 |
| WO | WO 99/18487 | 4/1999 |
| WO | WO 99/50787 | 10/1999 |
| WO | WO02/098112 A1 * | 12/2002 |

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

* cited by examiner

*Primary Examiner*—David L Ometz
*Assistant Examiner*—Pritham Prabhakher

(57) ABSTRACT

A monolithic image sensing device, including an image sensor for sensing image data; timing circuitry for generating at least one internal timing signal, the image sensor being responsive to at least one of the internal timing signals to at least commence sensing of the image data; and at least one external timing signal; at least one external pin for supplying the at least one external timing signal to at least one peripheral device.

18 Claims, 74 Drawing Sheets

Note: the number of clock pulses between events is indicative only. The actual values will depend on the particular implementation.

Note: the number of clock pulses between events is indicative only.

Note: the number of clock pulses between events is indicative only. The actual values will depend on the particular implementation.

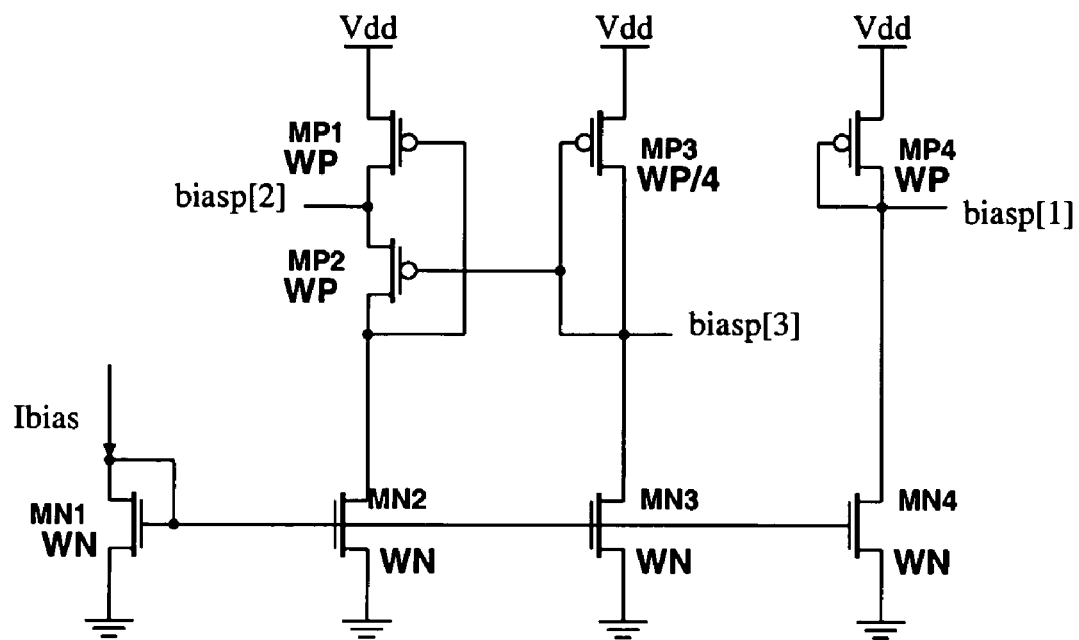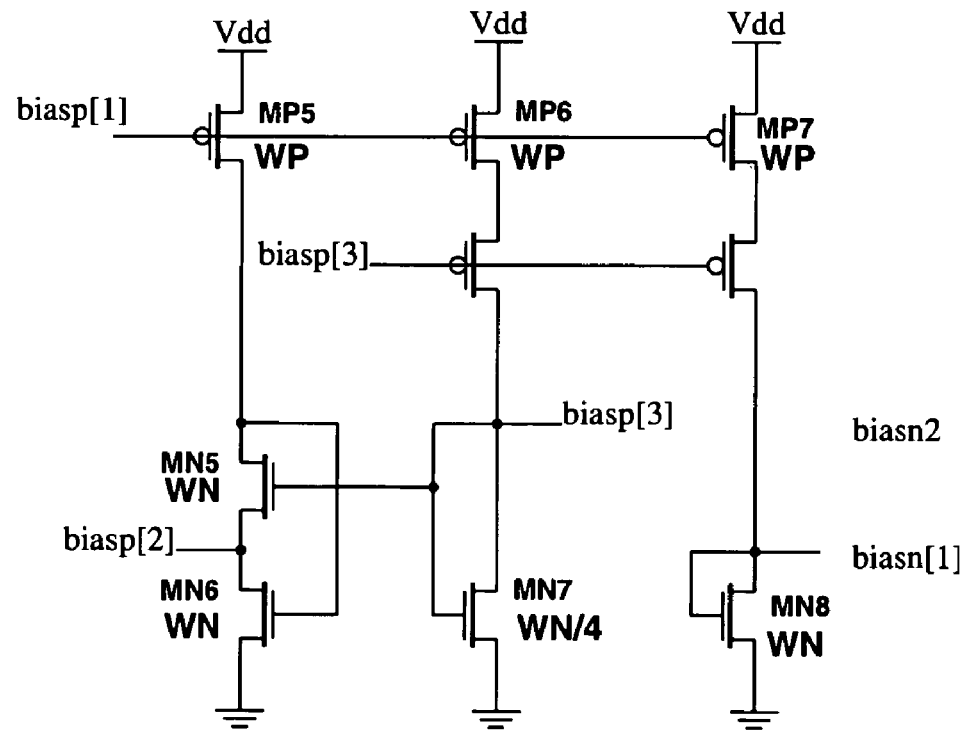
FIG. 25

| 0x7E | control byte "00100001" | TopLeftX | TopLeftY |
|---|---|---|---|

Unprocessed image read command

FIG. 58

| 0x7E | control byte "00111001" | TopLeftX | TopLeftY | SizeX-1 | SizeY-1 |
|---|---|---|---|---|---| processed image read command with arguments

FIG. 59a

| 0x7E | control byte "00011001" |
|---|---| processed image read command without arguments

FIG. 59b

| 0x7E | control byte "00110001" | TopLeftX | TopLeftY | SizeX-1 | SizeY-1 |

Sub-sampled image read command with arguments

| 0x7E | control byte "00010001" |

Sub-sampled image read command without arguments

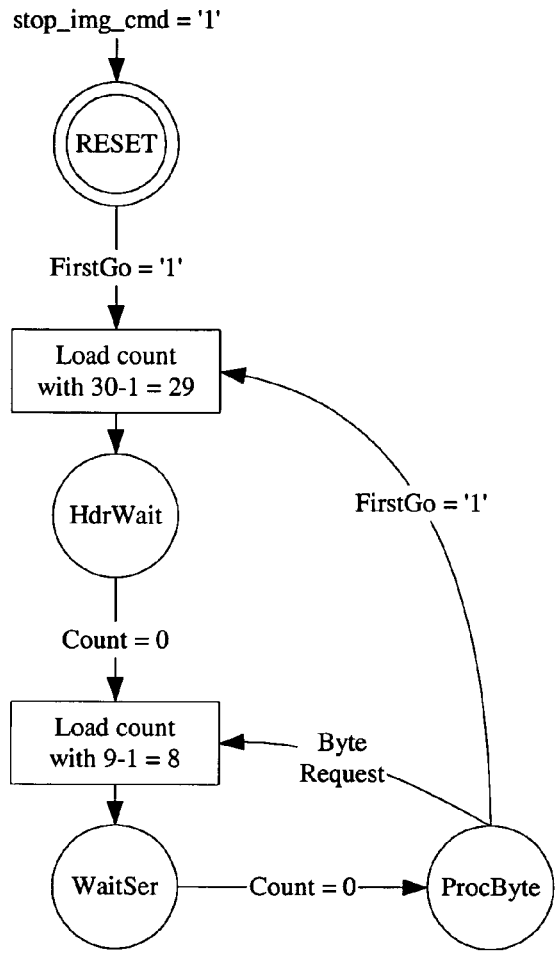

Notes:
1. FirstGo
  This is the 'fgo' field of the image command from the serial_if. This basically says - "Wait for the serial_if to send out a command header before you start."

2. When stop_img_cmd = '1', this acts as a global reset and overrides all other transitions.

3. The ser_avail output is '1' only during the ProcByte state. The ByteRequest may come immediately (in the same cycle), so this state may only last for one cycle.

4. The HdrWait state will last for 30 cycles. The WaitSer state will last for 9 cycles, and when added to the minimum one ProcByte state, we get the required 10 cycles for every byte.

FIG. 96

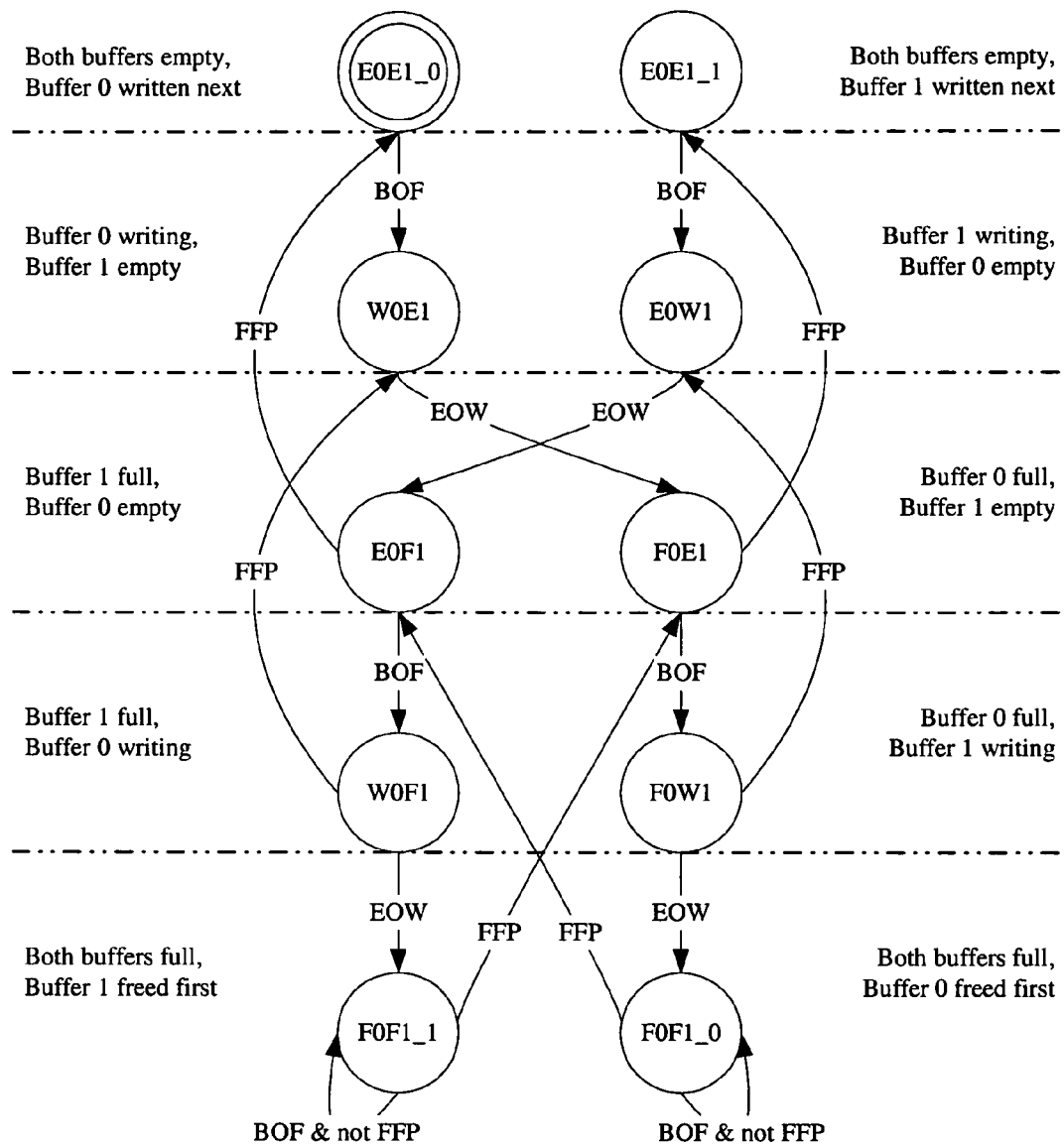

Notes:
1. BOF - Beginning Of Frame. isync1 pulse from sens_mux
2. EOW - End Of Window from sens_ss
3. FFP - Finished Frame Processing event from the serialif 4. State names are coded to show the state of both buffers:
   E - empty
   F - full
   W - writing When both are empty or full, the extra number on the end shows which will be written to next.

5. Transitions from one side to the other generate NewFrame events to the serialif. The NewFrame event includes the number of the buffer just filled.

6. Where the head of a FFP transition meets the tail of a BOF or EOW transition, the tail transition will be followed (if true) before entering the state.

For example:
From state EOF1, if FFP is true but BOF is false, EOE1 is the next state. If FFP is true and BOF is true, W0E1 is the destination.

FIG. 98

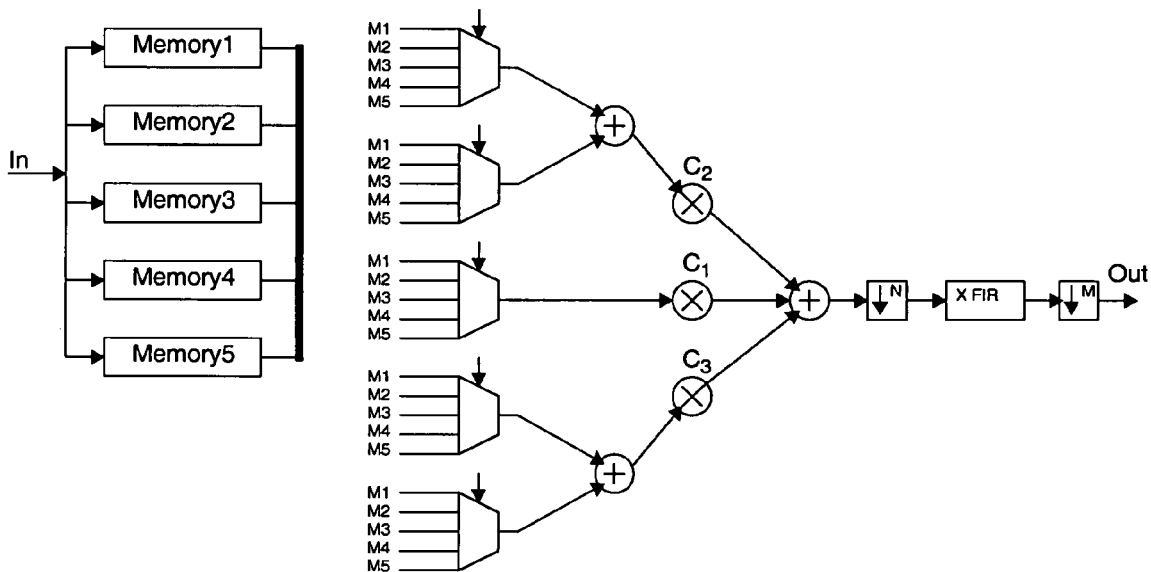
FIG. 116
FIG. 117
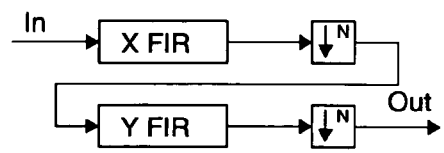
FIG. 118

IMAGE SENSOR TIMING CIRCUIT

FIELD OF THE INVENTION

The present invention relates to the field of monolithic integrated circuits, and, more particularly, to image capture and image processing.

The invention has been developed for use in a hand-held stylus configured to capture coded data disposed on a substrate, and will be described hereinafter with reference to that application. However, it will be appreciated that the invention can be applied to other devices.

CO-PENDING APPLICATIONS

Various methods, systems and apparatus relating to the present invention are disclosed in the following co-pending applications filed by the applicant or assignee of the present invention simultaneously with the present application:

Ser. No. 10/778,056, Ser. No. 10/778,058, Ser. No. 10/778,060, Ser. No. 10/778,059, Ser. No. 10/778,062, Ser. No. 10/778,061, Ser. No. 10/778,057.

The disclosures of these co-pending applications are incorporated herein by cross-reference. Each application is temporarily identified by its docket number. This will be replaced by the corresponding USSN when available.

CROSS-REFERENCES

Various methods, systems and apparatus relating to the present invention are disclosed in the following co-pending applications filed by the applicant or assignee of the present invention. The disclosures of all of these co-pending applications are incorporated herein by cross-reference:

| | | | | | |
|---|---|---|---|---|---|
| 7156289 | 7178718 | 7225979 | 09/575197 | 7079712 | 6825945 |
| 7330974 | 6813039 | 7190474 | 6987506 | 6824044 | 6980318 |
| 6816274 | 7102772 | 7350236 | 6681045 | 6678499 | 6679420 |
| 6963845 | 6976220 | 6728000 | 7110126 | 7173722 | 6976035 |
| 6813558 | 6766942 | 6965454 | 6995859 | 7088459 | 6720985 |
| 7286113 | 6922779 | 6978019 | 6847883 | 7131058 | 7295839 |
| 09/607843 | 09/693690 | 6959298 | 6973450 | 7150404 | 6965882 |
| 7233924 | 09/575181 | 09/722174 | 7175079 | 7162259 | 6718061 |
| 10/291523 | 10/291471 | 7012710 | 6825956 | 10/291481 | 7222098 |
| 10/291825 | 7263508 | 7031010 | 6972864 | 6862105 | 7009738 |
| 6989911 | 6982807 | 10/291576 | 6829387 | 6714678 | 6644545 |
| 6609653 | 6651879 | 10/291555 | 7293240 | 10/291592 | 10/291542 |
| 7044363 | 7004390 | 6867880 | 7034953 | 6987581 | 7216224 |
| 10/291821 | 7162269 | 7162222 | 7290210 | 7293233 | 7293234 |
| 6850931 | 6865570 | 6847961 | 10/685523 | 10/685583 | 7162442 |
| 10/645584 | 7159784 | 7068382 | 7007851 | 6957921 | 6457883 |
| 7094910 | 7091344 | 7122685 | 7038066 | 7099019 | 7062651 |
| 6789194 | 6789191 | 6644642 | 6502614 | 6622999 | 6669385 |
| 6827116 | 6549935 | 6987573 | 6727996 | 6591884 | 6439706 |
| 6760119 | 7295332 | 7064851 | 6826547 | 6290349 | 6428155 |
| 6785016 | 6831682 | 6741871 | 6927871 | 6980306 | 6965439 |
| 6840606 | 7036918 | 6977746 | 6970264 | 7068389 | 7093991 |
| 7190491 | 6982798 | 6870966 | 6822639 | 6474888 | 6627870 |
| 6724374 | 6788982 | 7263270 | 6788293 | 6946672 | 6737591 |
| 7091960 | 7369265 | 6792165 | 7105753 | 6795593 | 6980704 |
| 6768821 | 7132612 | 7041916 | 6797895 | 7015901 | 7055739 |
| 7233320 | 6830196 | 6832717 | 7182247 | 7082562 | 6843420 |
| 10/291718 | 6789731 | 7057608 | 6766944 | 6766945 | 7289103 |
| 10/291559 | 7299969 | 10/409864 | 7108192 | 7111791 | 10/683040 |
| 6957768 | 09/575172 | 7170499 | 7106888 | 7123239 | 6982701 |
| 6982703 | 7227527 | 6786397 | 6947027 | 6975299 | 7139431 |
| 7048178 | 7118025 | 6839053 | 7015900 | 7010147 | 7133557 |
| 6914593 | 10/291546 | 6454482 | 6808330 | 6527365 | 6474773 |
| 6550997 | 7093923 | 6957923 | 7131724 | | |

GLOSSARY

This section lists the acronyms, abbreviations and similar information used in this specification.
BIST: Built-in self test
DNL: Differential non-linearity
ESD: Electro-static discharge
FPN: Fixed pattern noise
INL: Integral non-linearity
PGA: Programmable gain amplifier
PVT: Process-Voltage-Temperature

BACKGROUND OF INVENTION

Monolithic integrated circuit image sensors are known in the art. Examples include Charge-Coupled Devices (CCDs) and CMOS image sensors. Refer, for example, to Janesick, J. R., *Scientific Charge-Coupled Devices* (SPIE Press 2001); Holst, G. C., *CCD Arrays, Cameras and Displays* (SPIE Press 1996); and Moini, A., *Vision Chips* (Kluwer Academic Publishers 1999). Digital image processing algorithms are known in the art. Refer, for example, to Gonzales, R. C. and R. E. Woods, *Digital Image Processing* (Addison Wesley 1992).

Image sensors such as CMOS and CCD image capture devices are known. Such devices are typically designed to work in conjunction with an external framestore and a host processor.

One of the issues that arises when such image sensors are used in systems with a host processor is that the link between the image sensor and the host processor must support the relatively high read-out data rate of the image sensor.

It is an object of the invention to provide alternative architectures that overcome some of the problems associated with direct coupling between the image sensor and the host processor.

Active pixel cells have a storage node which stores a charge. During an integration period, the stored charge is modified from an initial level. Once the integration is completed, the amount of charge determines an output voltage, which can be used to drive an output circuit. The output of the output circuit is controlled by the voltage, and hence the charge, of the storage node.

In conventional pixel cells, switching into and out of the integration period causes one or more voltage drops at the storage node due to various capacitances in the circuit. This reduces the potential dynamic range of the pixel cell.

It would be desirable to provide a pixel cell that overcomes or at least reduces the impact of these voltage drops without requiring complicated additional circuitry. It would be even more desirable if a fill factor of such a pixel cell was not substantially different to that of prior art pixel cells.

SUMMARY OF THE INVENTION

In a first aspect the present invention provides a monolithic integrated circuit including an image sensor for capturing image information; at least one analog to digital converter for converting analog signals corresponding to the image information into digital image data; and a first framestore for storing frames of the digital image data.

In a second aspect the present invention provides a monolithic integrated circuit including an image sensor for capturing image information; at least one analog to digital convertor for converting analog signals corresponding to the image information into digital image data; and an image processor, the image processor including a low-pass filter for filtering the image data, thereby to generate filtered image data.

In a further aspect the present invention provides a monolithic integrated circuit including an image processor, the image processor including a low-pass filter for filtering digital image data received from an image sensor, thereby to generate filtered image data; and a subsampler for subsampling the filtered image data, thereby to generate subsampled image data; and a subsampled framestore, the monolithic integrated circuit being configured to store the subsampled image data in the subsampled frame store.

In a third aspect the present invention provides a monolithic integrated circuit comprising an image sensor for sensing image information; at least one analog to digital convertor for converting analog signals corresponding to the image information into digital image data; and an image processor, the image processor including a range expansion circuit for range expanding the digital image data.

In a fourth aspect the present invention provides a photodetecting circuit comprising a photodetector for generating a signal in response to incident light; a storage node having first and second node terminals, the first node terminal being connected to the photodetector to receive the signal such that charge stored in the node changes during an integration period of the photodetecting circuit; and an output circuit for generating an output signal during a read period of the photodetecting circuit, the output signal being at least partially based on a voltage at the first terminal; the photodetecting circuit being configured to receive a reset signal; integrate charge in the storage node during an integration period following receipt of the reset signal; and receive a compensation signal at the second terminal of the storage node at least during the read period, the compensation signal increasing the voltage at the first terminal whilst the output circuit generates the output signal.

In a further aspect the present invention provides a method of sensing a pixel value comprising the steps of, in a photodetector circuit:
  resetting the circuit;
  generating a photocurrent in a photodetector in response to light falling on the photodetector;
  modifying a charge in a storage node over an integration period in accordance with the photocurrent;
  at the end of the integration period, reading the charge in the storage node to determine the pixel value, the step of reading including the substep of applying a compensatory voltage to a terminal to at least partially compensate for one or more voltage drops associated with the commencement and/or termination of the integration period.

In a fifth aspect the present invention provides a monolithic image sensing device, including an image sensor for sensing image data; timing circuitry for generating at least one internal timing signal, the image sensor being responsive to at least one of the internal timing signals to at least commence sensing of the image data; and at least one external timing signal; at least one external pin for supplying the at least one external timing signal to at least one peripheral device.

In a sixth aspect the present invention provides a monolithic integrated circuit comprising an image processor configured to make each of a series of frames of image data available to a host processor, the image processor being configured to receive a first message from the host processor indicative of the host processor not requiring further access to the image data prior to a subsequent frame synchronisation signal; in response to the first message, causing at least part of the integrated circuit to enter a low power mode; and in response to a frame synchronisation signal, cause the part of the integrated circuit in the low power mode to exit the low power mode.

In a seventh aspect the present invention provides a monolithic image sensing device including an image processor, the integrated circuit being configured to operate in a system having a host processor, the image processor being configured to receive, from the host processor, a request for access to a next available frame of image data from a framestore; in the event the frame of image data is available, sending a message to the host processor indicative of the image data's availability; and in the event the frame of image data is not available, waiting until it is available and then sending a message to the host processor indicative of the image data's availability.

In a further aspect the present invention provides A monolithic integrated circuit including an image processor, the integrated circuit being configured to operate in a system having a host processor and a framestore, the image processor being configured to receive a message from the host processor confirming that image data in the framestore is no longer required; and in the event that new image data is received to be stored in the framestore prior to the message being received, discarding the new image data.

In an eighth aspect the present invention provides A monolithic integrated circuit for use in a system having a host processor, the integrated circuit including at least one input pin for receiving command data from the host processor; at least one output pin for transmitting processed image data to the host processor in response to the command data; and an image processor configured to generate the processed image data by performing an image-processing function on image data captured by an image sensor.

DETAILED DESCRIPTION OF PREFERRED AND OTHER EMBODIMENTS

Figure 1:
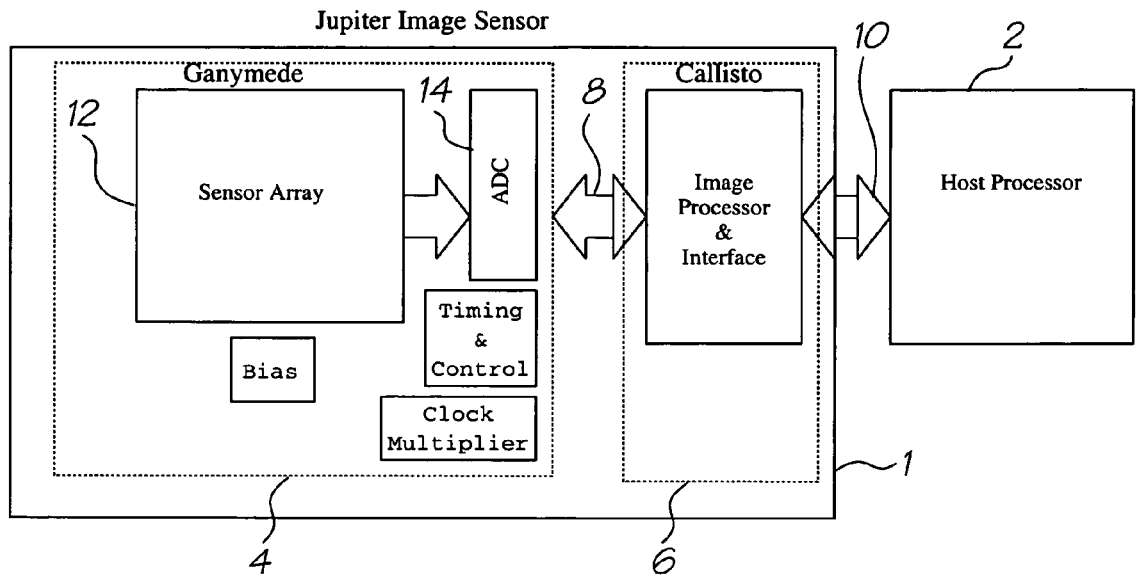
FIG. 1. Jupiter system diagram
FIG. 2. Detailed architecture of Jupiter
FIG. 3. Timing diagram of the image sensor event signals in Freeze-Frame mode
FIG. 4. Timing diagram of image sensor data interface
FIG. 5. Timing diagram of the ADC during a conversion cycle
FIG. 6. Timing diagram of the ADC during a calibration cycle
FIG. 7. Timing diagram of the clock multiplier
FIG. 8a. First embodiment of a shuttered pixel circuits
FIG. 8b. Second embodiment of a shuttered pixel circuits
FIG. 9. Typical timing diagram of a shuttered pixel during the integration cycle
FIG. 9a. Timing diagram of a shuttered pixel during the integration cycle of the present invention.

The detailed description is broken down into sections for convenience.

Section A describes a preferred embodiment of the present invention in the form of the Jupiter image sensor chip with on-board image processing.

Section B describes the functions of the Ganymede image sensor component of Jupiter.

Section C describes the design of the Ganymede image sensor.

Section D describes the design of an 8-bit analog-to-digital converter (ADC) used by Ganymede.

Section E describes the functions and design of the Callisto image processor component of Jupiter.

Section F describes alternative filtering and subsampling circuits which may be utilised by Callisto.

Section G describes netpage tag sensing algorithms adapted to utilise the Callisto image processor for tag image processing and tag decoding in the context of the netpage networked computer system outlined in the cross-referenced patent applications listed above.

In a preferred embodiment of the invention, the Jupiter image sensor is designed to be embedded in a netpage sensing device such as a netpage pen (as described in co-pending PCT application WO 00/72230 entitled "Sensing Device, filed 24 May 2000; and co-pending U.S. application Ser. No. 09/721,893 entitled "Sensing Device", filed 25 Nov. 2000), or a Netpage viewer (as described in co-pending PCT application WO 01/41046 entitled "Viewer with Code Sensor", filed 27 Nov. 2000).

In a preferred embodiment of the invention, the Jupiter image sensor is also designed to be used in conjunction with surfaces tagged with identity-coding and/or position-coding patterns (such as described in co-pending PCT application WO 00/72249 entitled "Identity-Coded Surface with Reference Points", filed 24 May 2000; co-pending PCT application WO 02/84473 entitled "Cyclic Position Codes", filed 11 Oct. 2001; co-pending U.S. application Ser. No. 10/309358 entitled "Rotationally Symmetric Tags", (docket number NPT020US) filed 4 Dec. 2002; and Australian Provisional Application 2002952259 entitled "Methods and Apparatus (NPT019)", filed 25 Oct. 2002).

Various alternative pixel designs suitable for incorporation in the Jupiter image sensor are described in co-pending PCT application PCT/AU/02/01573 entitled "Active Pixel Sensor", filed 22 Nov. 2002; and co-pending PCT application PCT/AU02/01572 entitled "Sensing Device with Ambient Light Minimisation", filed 22 Nov. 2002.

The preferred form of the invention is a monolithic image sensor, analog to digital converter (ADC), image processor and interface, which are configured to operate within a system including a host processor. The applicants have codenamed the monolithic integrated circuit "Jupiter". The image sensor and ADC are codenamed "Ganymede" and the image processor and interface are codenamed "Callisto".

It should appreciated that the aggregation of particular components into functional or codenamed blocks is not necessarily an indication that such physical or even logical aggregation in hardware is necessary for the functioning of the present invention. Rather, the grouping of particular units into functional blocks is a matter of design convenience in the particular preferred embodiment that is described. The intended scope of the present invention embodied in the detailed description should be read as broadly as a reasonable interpretation of the appended claims allows.

Jupiter

Function and Environment

The Jupiter image sensor has been designed for high-speed low-cost machine vision applications, such as code sensing in devices such as the Netpage pen and Netpage viewer. Jupiter comprises an image sensor array, ADC function, timing and control logic, digital interface to an external microcontroller, and implementation of some of the computational steps of machine vision algorithms.

FIG. 1 shows a system-level diagram of the Jupiter monolithic integrated circuit 1 and its relationship with a host processor 2. Jupiter 1 has two main functional blocks: Ganymede 4 and Callisto 6 blocks. Ganymede comprises the sensor array, ADC, timing and control logic, clock multiplier PLL, and bias. Callisto comprises the image processing, image buffer memory, and serial interface to a host processor. A parallel interface 8 links Ganymede 4 with Callisto 6, and a serial interface 10 links Callisto 6 with the host processor 2

Interfaces

Jupiter has several internal and external interfaces. External interface include the host processor interface and a flash (exposure) and capture interface. Both of these interfaces belong to Callisto and are described in more detail in the Callisto section below.

The internal interfaces in Jupiter are used for communication among the different internal modules. The internal interfaces in Jupiter are described in more detail below.

Power Modes

Each module in Jupiter has two power modes: SLEEP and ON. In the SLEEP mode, the modules are shut down, and in the ON mode the modules are activated for normal operation. The power is controlled via an internal 8-bit register. Each bit of this register is used to control one separate module. A bit value of 0 means that the associated module is turned off while a bit value of 1 means that the associated module is turned on.

Mechanical Characteristics

The packaging of Jupiter is performed using a wafer-level packaging technique to reduce the overall manufacturing cost. The physical placement of the pads and their dimensions, and the wafer-level die specifications, accommodate the wafer-level packaging process.

Ganymede Image Sensor

Ganymede features:
- sensor array
- 8-bit digitisation of the sensor array output
- digital image output to Callisto.
- a clock multiplying PLL.

Ganymede Functional Characteristics

Figure 2:
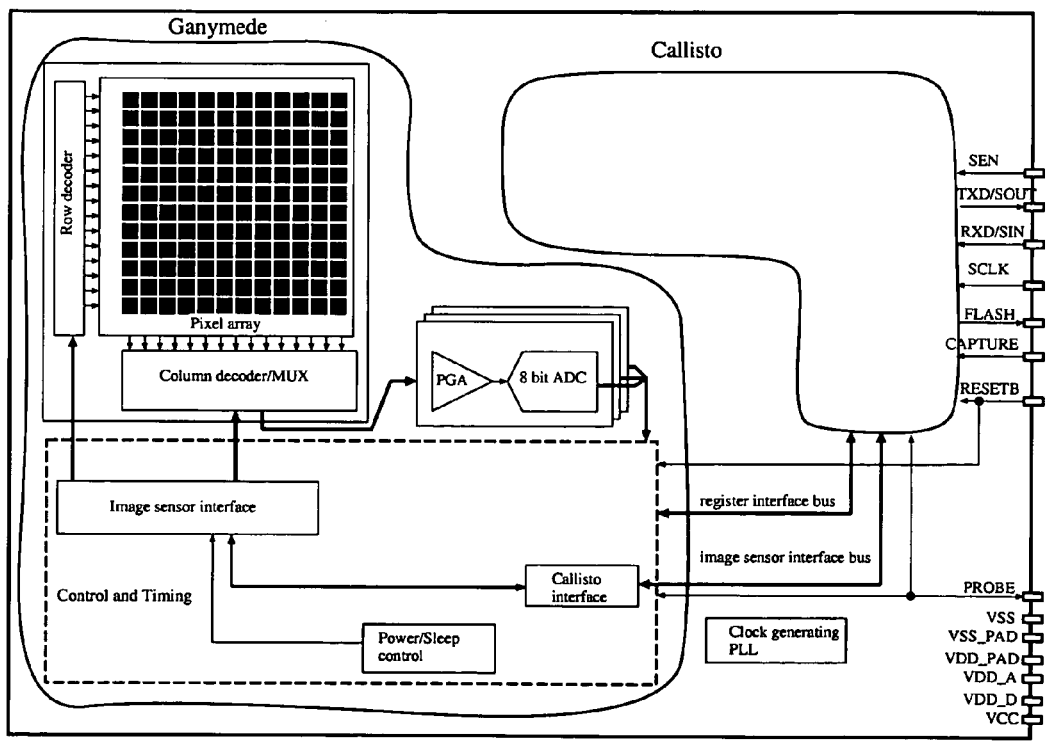

As best shown in FIG. 2, Ganymede 4 comprises a sensor array 12, an ADC block 14, a control and timing block 16 and a phase lock loop (PLL) 18 for providing an internal clock signal. The sensor array comprises pixels 20, a row decoder 22, a column decoder and MUX 24. The ADC block 14 includes an ADC 26 and a programmable gain amplifier (PGA) 28. The control and timing block 16 controls the sensor array 12, the ADC 26, and the PLL 18, and provides an interface to Callisto 6.

The following table shows characteristics of the sensor array 12:

| Parameter | Characteristic | Comment |
|---|---|---|
| Resolution | 8 bits | |
| Sampling frequency | — | For an N × N sensor array the sampling frequency is greater than $0.002/(N \times N)$ Hz. |

-continued

| Parameter | Characteristic | Comment |
|---|---|---|
| Integral non-linearity (INL) | <1 bit | |
| Differential non-linearity (DNL) | <0.5 bit | |
| Input voltage range | +/−1.0 | Differential input |
| Gain | 1 to 16 | The gain of the ADC is linearly set by a 4-bit register. |
| Offset | <0.5 bit | A calibration mechanism is implemented to reduce the offset. |
| Missing codes | NONE | |

ADC

The ADC block is used to digitise the analog output of the sensor array. The following table shows characteristics of the ADC:

| Parameter | Characteristic | Comment |
|---|---|---|
| Resolution | 8 bits | |
| Sampling frequency | — | For an N × N sensor array the sampling frequency is greater than 0.002/(N × N) Hz. |
| Integral non-linearity (INL) | <1 bit | |
| Differential non-linearity (DNL) | <0.5 bit | |
| Input voltage range | +/−1.0 | Differential input |
| Gain | 1 to 16 | The gain of the ADC is linearly set by a 4-bit register. |
| Offset | <0.5 bit | A calibration mechanism is implemented to reduce the offset. |
| Missing codes | NONE | |

Clock Multiplying PLL

A clock multiplier within the PLL 18 provides a lock_detect output which indicates the PLL's lock status. The following table shows characteristics of the PLL:

| Parameter | Characteristic |
|---|---|
| Input clock frequency | 1 MHz < fin < 40 MHz |
| Output clock frequency | 10 MHz < fout < 200 MHz |
| Clock jitter | <200 ps |
| Lock time | <1 ms |

Image Sensor Interface

The image sensor interface is used internally in Ganymede to read the image sensor data. The interface between Ganymede and Callisto (represented by signals iclk, isync, ivalid, idata) is described below in more detail.

The following table shows the image sensor interface pins:

| Name | Function | Type |
|---|---|---|
| icapture | This signal triggers a frame capture sequence. | Digital input |
| sleep | This signal puts the image sensor to sleep. | Digital input |
| frame_reset | This signal resets the pixel voltage in FF mode. | Digital input |
| frame_capture | This signal captures the pixel voltage in FF mode. | Digital input |
| read_row | This signal triggers the download of a row of data and subsequently a series of ADC conversions for the data of that row. | Digital input |
| ar[7:0] | This is the row address bus. | 8-bit digital input |
| ac[7:0] | This is the column address bus. | 8-bit digital input |
| data_ready | This signal indicates that the analog output is ready. (This signal may be used to start a conversion in the ADC). | Digital output |
| aout | This is the analog output data from the sensor which is input to the ADC. | analog outputs |
| iclk | This is the clock signal. | digital input |

Figure 3:
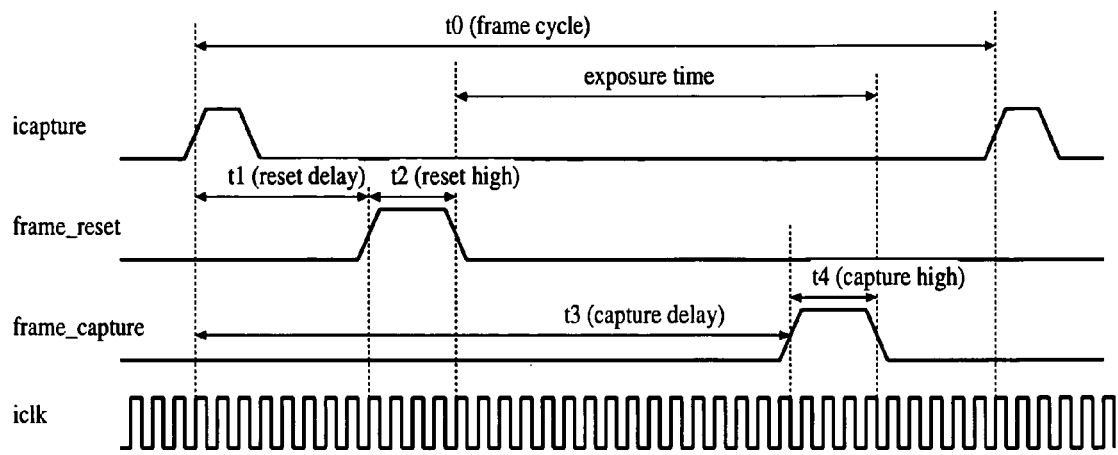
Figure 4:
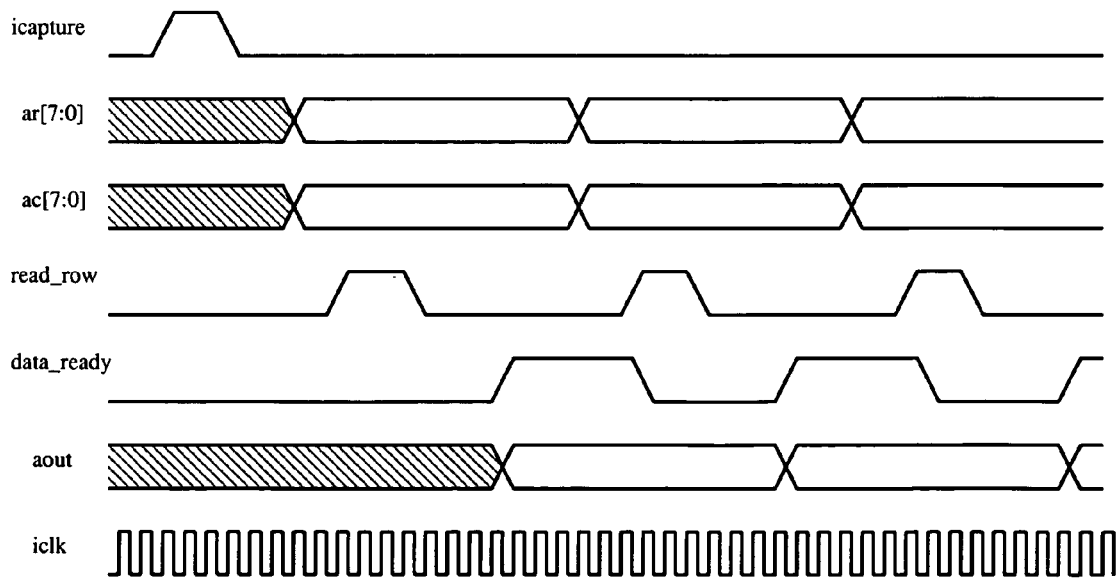

FIG. 3 shows a timing diagram of image sensor event signals in a "Freeze-Frame" mode of the sensor array 12, whilst FIG. 4 shows a typical timing diagram of the image sensor interface during a read cycle. It should be noted that the number of clock pulses between events in all timing diagrams is for the purposes of illustration only. The actual number of clock cycles will vary depending upon the specific implementation.

ADC Interface

The control and timing block 16 provides timing and control signals to the ADC 26. The following table shows the ADC 26 pins.

| Signal | Function | Type |
|---|---|---|
| sleep | This puts the ADC to sleep | Digital input |
| iclk | The clock | Digital input |
| start_conv | A transition from low to high on this signal starts the conversion process. | Digital input |
| end_conv | A transition from low to high indicates that the conversion has ended. | Digital output |
| start_calibrate | A transition from low to high on this signal starts the calibration process in the next clock cycle. | Digital input |
| end_calibrate | A transition from low to high indicates that the calibration process has ended. | Digital output |
| pga_gain | The gain of the PGA amplifiers used at the input of the ADC. | 3-bit digital input |
| ain | The analog input to the ADC. | Analog input |
| dout[7:0] | The digital output of the ADC. | 8-bit digital output. |

Figure 5:
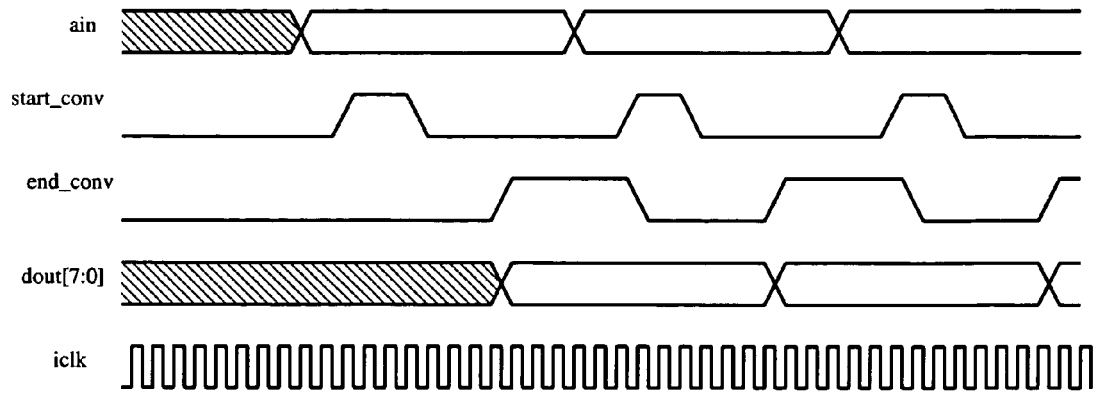

A typical timing diagram of the ADC interface during a conversion cycle is shown in FIG. 5. The conversion is triggered by the start_conv signal. During this period the analog inputs are also valid. The end_conv signal indicates the end of conversion, and the output digital data dout is then valid. The end_conv signal is set to low when the start_conv goes from low to high.

Figure 6:
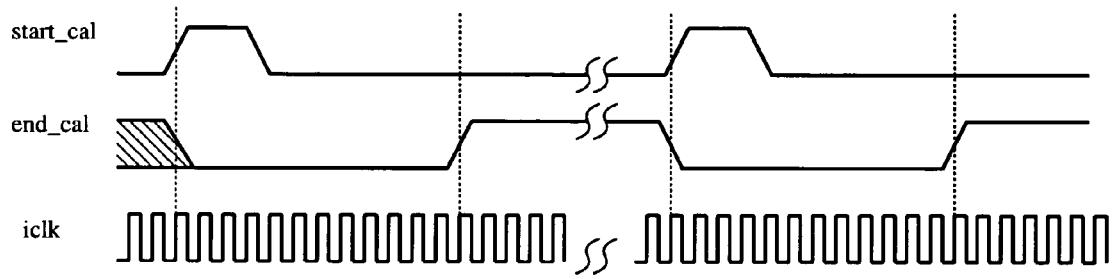

A typical timing diagram of the ADC interface during a calibration cycle is shown in FIG. 6. The start_cal signal triggers the calibration cycle. The period that it takes for the calibration to take place will depend on the particular architecture.

Clock Multiplying PLL Interface

The clock multiplier provides multiplication factors of the form M/N, where M and N are positive integer values. The following table shows the pins of the clock multiplier.

| Signal | Function | Type |
|---|---|---|
| sleep | This puts the ADC to sleep | Digital input |
| iclk | The clock | Digital input |
| start_conv | A transition from low to high on this signal starts the conversion process. | Digital input |
| end_conv | A transition from low to high indicates that the conversion has ended. | Digital output |
| start_calibrate | A transition from low to high on this signal starts the calibration process in the next clock cycle. | Digital input |
| end_calibrate | A transition from low to high indicates that the calibration process has ended. | Digital output |
| pga_gain | The gain of the PGA amplifiers used at the input of the ADC. | 3-bit digital input |
| ain | The analog input to the ADC. | Analog input |
| dout[7:0] | The digital output of the ADC. | 8-bit digital output. |

Figure 7:
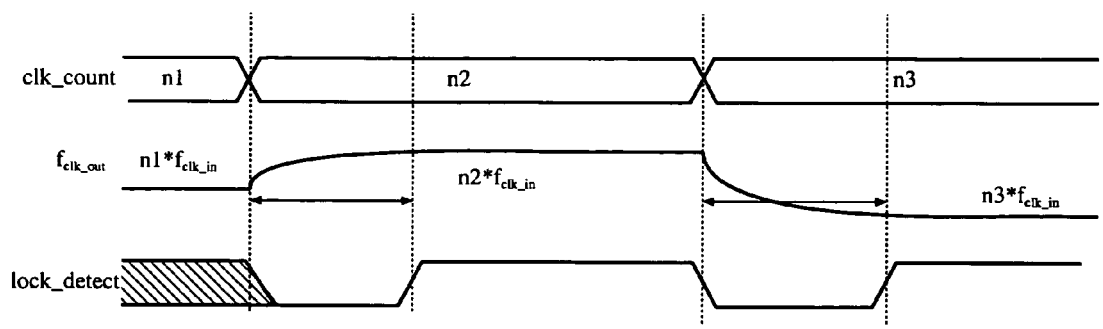

The timing of the clock multiplier is shown in FIG. 7. The time that it takes for the output clock frequency to settle is determined by the settling/lock characteristics of the clock multiplier as specified above.

Power/Sleep Interface

This interface controls the power state of the modules in Ganymede. Each module in Ganymede has a digital input pin, which turns the module on or off.

Operation

Registers

This section describes the registers that are used in Ganymede. Note that Callisto's registers are described in Appendix E.

The address gaps between registers is intentional, to allow possible expansion during the design process, and also to facilitate the classification of registers and their functions.

Image sensor frame_reset timing register

The reset value for the frame_reset_high corresponds to 1.6 us using a 20 MHz clock.

TABLE 7

Frame_reset timing register 32-bit

| Field | Width | Bits | Reset value | Description |
|---|---|---|---|---|
| frame_reset_delay | 16 | 15:0 | 0x0000 | This is the delay, in number of clock pulses, between the rising edge of the frame_reset and the capture signals. (t1 in FIG. 3) |
| frame_reset_high | 16 | 31:16 | 0x0020 | This is the period, in number of clock pulses, when frame_reset is high. (t2 in FIG. 3) |

Image sensor frame_capture timing register

The reset values correspond to 140 us and 1.6 us, respectively, using a 20 MHz clock.

TABLE 8 frame_capture timing register 32-bit

| Field | Width | Bits | Reset value | Description |
|---|---|---|---|---|
| frame_capture_delay | 16 | 15:0 | 0x0B00 | This is the delay, in number of clock pulses, between the rising edge of the frame_capture and the capture signals. (t3 in FIG. 3) |
| frame_capture_high | 16 | 31:16 | 0x0020 | This is the period, in number of clock pulses, when frame_capture is high. (t4 in FIG. 3) |

ADC Calibration Output Register

This register contains the offset error value obtained after a calibration cycle.

TABLE 9

ADC offset register 8-bit

| Field | Width | Bits | Reset value | Description |
|---|---|---|---|---|
| ADC_offset | 8 | 7:0 | 0x00 | The offset of the ADC |

Clock Multiplier Counter Register

TABLE 10

Clock multiplier counter register 8-bit

| Field | Width | Bits | Reset value | Description |
|---|---|---|---|---|
| PLL_count_M | 4 | 3:0 | 0x0 | The feedback divider ratio for the clock multiplier. |
| PLL_count_N | 4 | 7:4 | 0x0 | The forward divider ratio value for the clock multiplier. |

Configuration Register

TABLE 11

Configuration register 8-bit

| Field | Width | Bits | Reset value | Description |
|---|---|---|---|---|
| ADC PGA gain | 4 | 3:0 | 0x0 | The gain of the PGA used in the ADC. |
| Calibrate | 1 | 4 | 0x0 | 0 to 1 = Perform internal calibration. |
| TBD | 3 | 7:5 | 0x0 | TBD |

Status Register

This is a read-write register.

TABLE 12

Status register 8-bit

| Field | Width | Bits | Reset value | Description |
|---|---|---|---|---|
| Calibration Status | 1 | 0 | b'0 | Flags the completion of the internal calibration |
| Capture overflow | 1 | 1 | b'0 | Indicates that a new capture signal has arrived before the previous capture cycle has ended. Upon read, this register is reset to 0. |
| PLL Lock status | 1 | 2 | b'0 | 0 = Not in lock<br>1 = In lock |
| TBD | 6 | 7:2 | 0x00 | TBD |

4.1.7 Sleep Control Register

This register contains the sleep status for the associated modules/circuits. A value of 1 means that the circuit is off (in sleep mode), and a value of 0 means that the circuit is on (active mode).

TABLE 13

Sleep control register 8-bit

| Field | Width | Bits | Reset value | Description |
|---|---|---|---|---|
| Sensor | 1 | 0 | 0 | Image sensor sleep signal |
| ADC | 1 | 1 | 0 | ADC sleep signal |
| AUTO | 1 | 2 | 0 | Automatically turn-off relevant image sensor circuits during the non-capture mode. |
| TBD | 5 | 7:3 | 0 | TBD |

Test Control Register

This register controls which signal is being connected to the PROBE pad, and also controls the test mode of Callisto. Notice that the PROBE pad is a direct analog pad which only has the protection circuits.

Each signal may be appropriately buffered before being connected to the PROBE pad. At any given time only one bit of this register shall be high.

TABLE 14

Test control register 16-bit

| Field | Width | Bits | Reset value | Description |
|---|---|---|---|---|
| Column circuit output/ADC input | 1 | 0 | b'0 | Connect the column circuit output and ADC input to PROBE |
| VBG | 1 | 1 | b'0 | Connect the bandgap generator output to PROBE |
| PLL input | 1 | 2 | b'0 | Connect the input clock to the PLL to PROBE |
| PLL feedback | 1 | 3 | b'0 | Connect the feedback clock (after the divider) to PROBE |
| PLL charge pump | 1 | 4 | b'0 | Connect the charge pump output to PROBE |
| PLL output | 1 | 5 | b'0 | Connect the PLL output clock to PROBE |
| PLL lock detect | 1 | 6 | b'0 | Connect the PLL lock detect output to PROBE |
| Bias 1 | 1 | 7 | b'0 | Connect the bias1 signal to PROBE |
| Bias 2 | 1 | 8 | b'0 | Connect the bias2 signal to PROBE |
| TBD | 6 | 14:9 | 0x00 | TBD |
| Callisto Test enable (ten) | 1 | 15 | 0x0 | Control the test mode of Callisto. |

Operation Modes

Normal Operation

In this mode the start of the capture cycle is determined by the icapture signal.

The period of a capture cycle is determined by the period of the icapture signal. However, if a new capture signal arrives before the previous capture cycle has ended, the capture signal is ignored and the "Capture overflow" status flag is set high and remains high until it is explicitly cleared. The normal operation, however, resumes if a new capture signal arrives after the current capture cycle.

Reset Mode

When RESETB is set low, and iclk is toggling, Ganymede and all its components are reset, and all registers are reset to predefined values. The reset cycle takes only one clock cycle of iclk. The reset cycle is repeated as long as the RESETB pin is low.

Section C—Ganymede Design

A CMOS process offers several different photodetector structures, almost all present as parasitic devices. The main devices are photogate, vertical and lateral bipolar structures, and vertical and lateral diodes.

The preferred structure was chosen mainly on the estimated sensitivity of that structure in the 800-850 nm range. Sensitivity is a function of several parameters:

Quantum efficiency (dependent on junction profile)

Effective detector area (the effective area can be improved by using microlenses)

Pixel capacitance (which depends on the structure as well as the pixel circuits)

Among these, quantum efficiency plays a more important role in the selection of the structure, as the other two parameters are less dependent on the junction profile.

Pixel Circuits

Figure 8A:
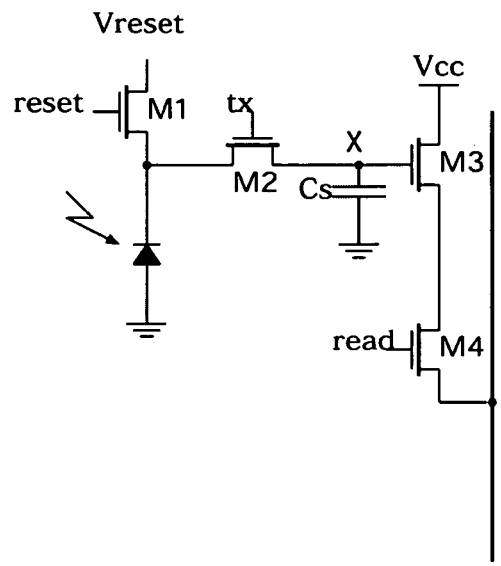
Figure 8B:
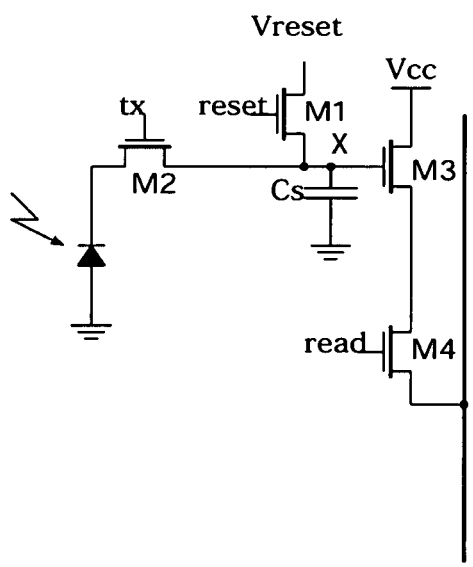

This section describes the circuits used at each pixel. Here we only discuss the shuttered (or freeze-frame) pixel circuits, although unshuttered pixels can also be used Two circuits commonly used for a shutter pixel are shown in FIGS. 8a and 8b. The difference between the two circuits is the location of the reset transistor M1 with respect to the storage node X. In both circuits M1 is the reset transistor, M2 is the transfer transistor, M3 is the output transistor, and M4 is the row-select transistor. The capacitor Cs is the storage capacitance, which may implicitly exist as parasitic capacitances at the storage node X. Alternatively, additional capacitance can be added to improve the charge retention capability of the pixel.

Figure 9:
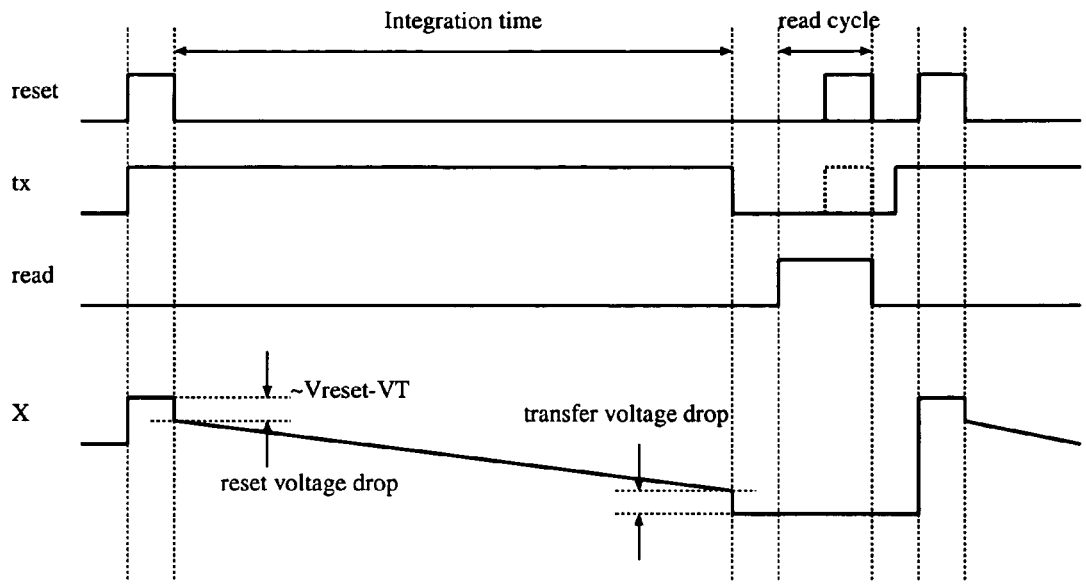
Figure 9A:
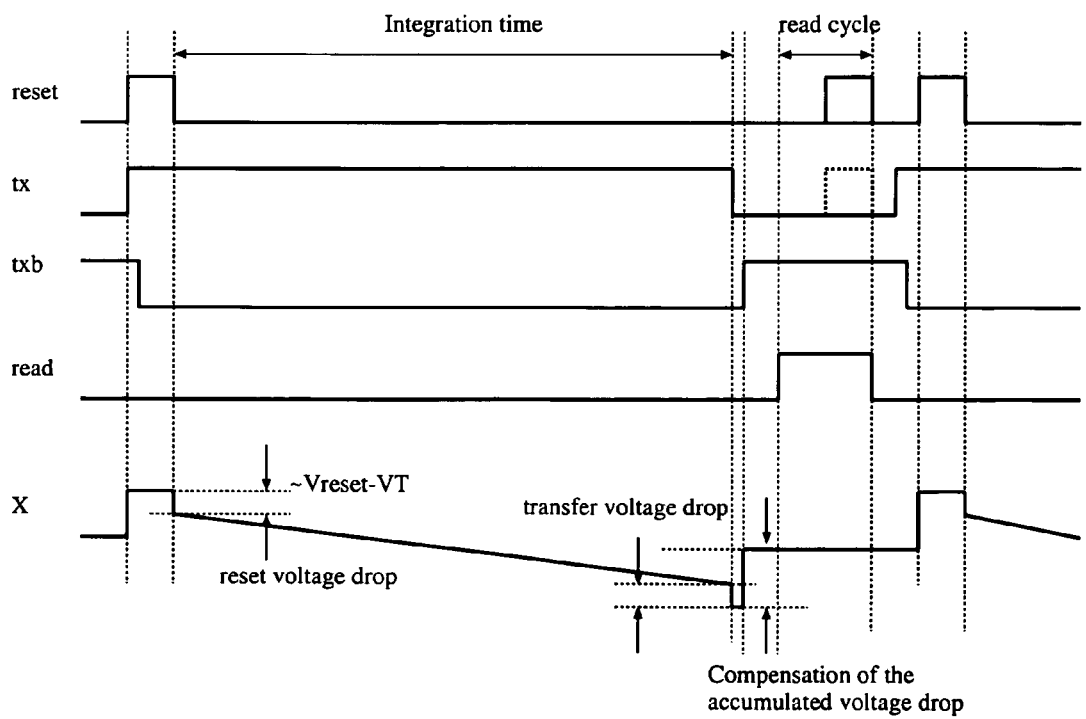

FIG. 9 shows a typical timing of the signals and voltages.

Notwithstanding their differences, the circuits of FIGS. 8a and 8b are almost identical with respect to sensitivity and dark current. This is because during the active period of the pixel (integration time) shown in FIG. 9, when M2 is on, the storage node X sees the same amount of capacitance and junction diodes. The main difference between operation of the two circuits is during the reset period of the read cycle. For the circuit of FIG. 8a, the tx signal should also be on to allow the storage node to be reset, while the circuit of FIG. 8b does not require this. Also in the circuit of FIG. 8a, the photodetector current will lower the reset voltage at node X, and will induce an image dependent reset noise. However, during the reset period of the circuit of FIG. 8b, M2 can be turned off.

Reset Voltage Drop

A major problem faced by all active pixel circuits is the voltage drop when the reset voltage is lowered. In shuttered pixels there is also the voltage drop induced by the transfer transistor. It should be noticed that this voltage drop reduces the dynamic range of the pixel, and therefore is an undesirable effect. The voltage drop is caused because of capacitive coupling between the gate of these transistors and the storage node.

Many alternatives have been suggested to remedy this problem, including increasing the reset voltage Vreset to account for the voltage drop, or using more complex read-out circuits. All of these alternatives bring their own set of undesirable side-effects.

Figure 10:
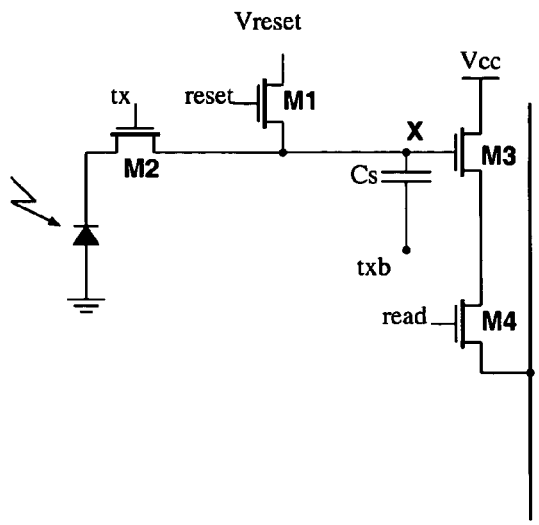
FIG. 10. The new pixel design to compensate for reset voltage drop
FIG. 11. Schematic diagram of the column circuit
FIG. 11a. Timing of the signals controlling the pixel and column circuits that are separated into alternating integration and read-out cycles.

FIG. 10 shows a preferred embodiment of a pixel design which reduces this problem. As shown, the storage node includes a capacitor, the other side of which is connected to txb, the logically negated version of tx. It will be appreciated that txb is a particularly convenient signal, in terms of timing and voltage, to use. However, any other suitable signal can be used to partially or wholly compensate for the voltage drop.

The value of the capacitor is determined such that it compensates for substantially all of the voltage drop effects. Physically the capacitor can be implemented such that it covers the active circuits, such that it does not affect the fill factor of the pixel. For a typical 10 um×10 um pixel, the amount of capacitance needed to compensate for the voltage drop is about 0.2 fF. Compared to the total capacitance of 30-40 fF, this is negligible, and therefore it does not affect the sensitivity of the pixel.

Sensitivity

Before starting any discussions we define the "sensitivity" to avoid confusion with other implied meanings of this term. The term "sensitivity" used here is the conversion factor from input light power in Watts to output pixel voltage in Volts.

The main parameters determining sensitivity are the QE, pixel area, and effective pixel capacitance. In order to simulate the sensitivity we use the circuit shown in Figure. The input current sources are ratioed to reflect their respective QE at a wavelength of 850 nm. For a 1 Watt/m^2 input light at 850 nm the photon flux per unit area is:

$$N = \frac{\lambda}{hc} = \frac{850 \times 10^{-9}}{6.63 \times 10^{-34} \times 3 \times 10^8} = 4.27 \times 10^{18} \frac{1}{s.m^2}$$

Using the simulated QE numbers for the Nwell-Psub and Pdiff-Nwell-Psub structures, we can conclude that for a 10 u pixel, with approximately 80% fill factor, the photocurrent for a 1-Watt/m^2 input light will be $$I_{NWell-Psub} = \frac{QE \times A \times FF \times A \times q}{t} =$$
$$0.123 \times 4.27 \times 10^{18} \times 0.8 \times 10^{-10} \times 1.6 \times 10^{-19} = 0.672 \times 10^{-11}$$

$$I_{Pdiff-NWell-Psub} = \frac{QE \times A \times FF \times A \times q}{t} =$$
$$2.28 \times 4.27 \times 10^{18} \times 0.8 \times 10^{-10} \times 1.6 \times 10^{-19} = 13.5 \times 10^{-11}$$

In order to estimate the sensitivity we can use these values in a transient simulation. However, as most spice simulators are not tailored for low current simulations to give accurate "current" outputs, and the available simulators could not converge, we will use a different method to estimate the effective capacitance at the storage node, and then deduce the sensitivity. We use AC simulations. By applying an AC voltage at the storage node, and then measuring the drawn current, we can find an estimate for the total capacitance.

From the simulations the total capacitance at the storage node is 31 fF and 40 fF for the Nwell-Psub, and Pdiff-Nwell-Psub structures, respectively. The sensitivity of the devices can be calculated to be 21.6 and 337.5 V.s/W for the respective structures.

Area Dependence

We have found that sensitivity improves only as a function of fill factor, and is relatively constant for pixel dimensions larger than 10 um.

Column Circuit

Figure 11:
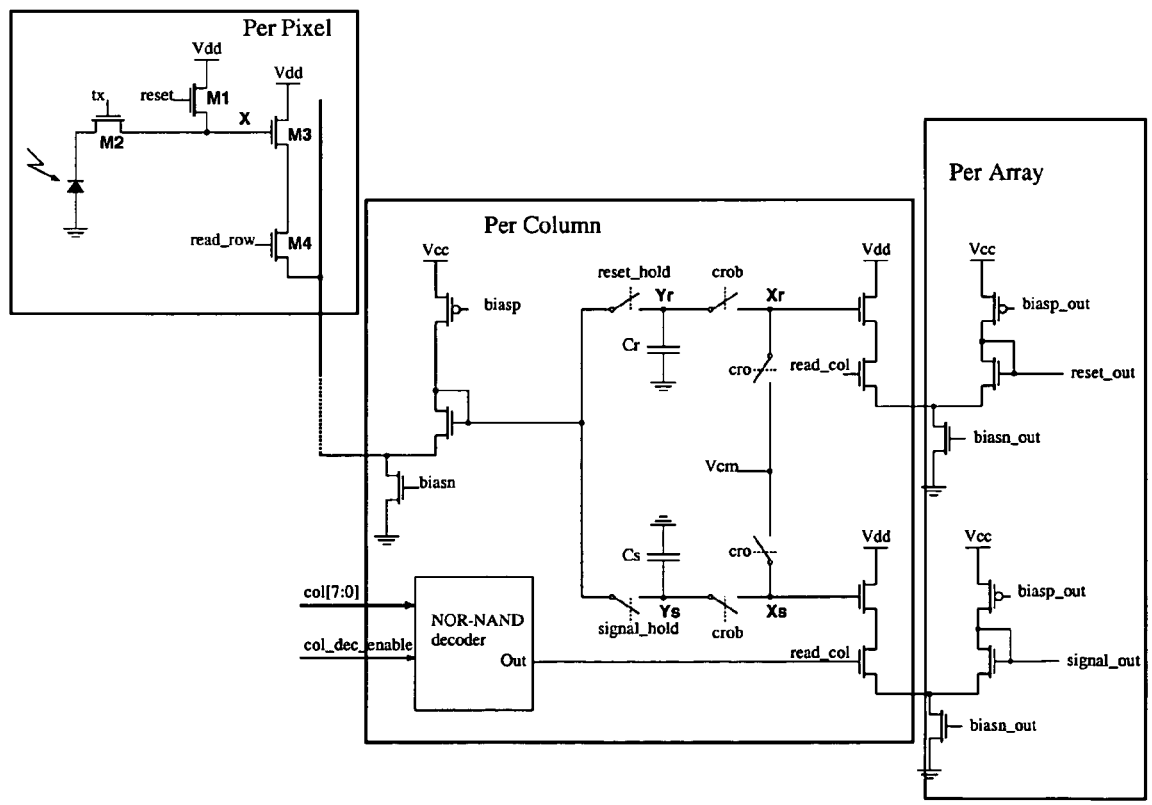
Figure 11A:
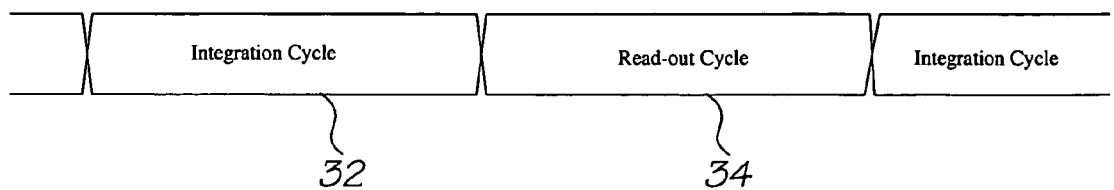

A column circuit 30, as shown in FIG. 11, is present at each column of the sensor array 12. At the end of an integration cycle, the column circuit 30 is activated. The rows are sequentially multiplexed to the input of this circuit. The illustrated circuit performs buffering in addition to pixel level and column level correlated double sampling (CDS).

In the column circuit 30, the source-follower transistor and the read_row transistor are connected to three other transistors in such a way to form a basic unity-gain buffer. This circuit is advantageous over the traditional source-follower structure, as it provides a gain closer to one, and therefore reduces the dynamic range loss from the pixel. The output of the first buffer is sampled twice, using two identical sample-and-hold structures. The sampling is first done by activating the signal_hold, and storing the value on Cr. Then all pixels in the row are reset, and the reset value is sampled, this time onto the Cs capacitor. This operation performs the pixel level CDS.

During the period when the sampling is performed, the cro signal is set high, and in effect resets the output buffer circuits following the nodes Xr and Xs. Once sampling has finished, the cro signal is set low and the sampled signals are transferred to Xr and Xs, and buffered to the outputs. This operation performs column level CDS.

It should be mentioned that the circuit following the sensor (either a PGA or ADC), should be designed such that it can benefit from the column level CDS mechanism, i.e. it can process the outputs from the two different phases of cro.

Column Decoder

The column decoder is part of the column circuit 30. It implements a N-2 N decoder, and as such it can be used in a random access mode.

Timing

The timing of the signals controlling the pixel and column circuits can be separated into alternating integration and read-out cycles.

During each integration cycle 32, the entire sensor array 12 is first reset and then the electronic shutter is left open to integrate the photocurrent. At the end of this cycle the shutter is closed and the integrated charge is stored in the pixel. In the read-out cycle 24 the stored charge is read out row by row and the pixel-level and column-level CDS is performed, and the output is read out pixel by pixel.

Figure 12:
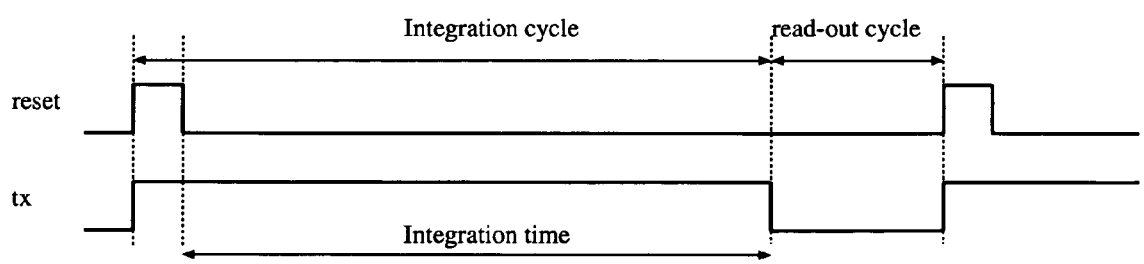
FIG. 12. Timing diagram during integration cycle
FIG. 13. The timing diagram of the read-out cycle
FIG. 14. Schematic diagram of the row decoder circuit
FIG. 15. Schematic diagram of level shifter
FIG. 16. Bias generator circuit
FIG. 17. Layout of the 10 um pixel using a photodiode and the capacitor
FIG. 18. Layout of the 10 um pixel using a photodiode and without the capacitor
FIG. 19. Layout of the 10 um pixel using a BJT
FIG. 20. Block diagram of the sensor
FIG. 21. The structure of a pipelined ADC FIG. 22. A bit-slice of the switched capacitor based ADC
FIG. 23. The structure of three bit slices of the ADC in one phase of the clock
FIG. 24. The structure of the differential folded cascode circuit used in the ADC
FIG. 25. The bias generator circuit for the PGA and ADC
FIG. 26. The common mode feedback circuit
FIG. 27. The gain booting amplifiers
FIG. 28. The clock generator
FIG. 29. The reference current generator
FIG. 30. Resistive ladder used in the bias current generator
FIG. 31. The schematic diagram of the comparator
FIG. 32. Common mode and reference voltage generator
FIG. 33. The wide-range OTA used in the reference voltage generators
FIG. 34. The structure of the bandgap generator
FIG. 35. The multistage opamp used in the bandgap generator
FIG. 36. The structure of the PGA
FIG. 37. The selectable capacitor structure used in the PGA
FIG. 38. The compensation structure used in the PGA opamp
FIG. 39. The floorplan of the ADC
FIG. 40. The block diagram of the ADC
FIG. 41. Timing diagram of the ADC in the normal mode
FIG. 42. Callisto system diagram
FIG. 43. Coordinate system
FIG. 44. Sub-sampling
FIG. 45. Sub-sampling pixel replication
FIG. 46. Dynamic range expansion window
FIG. 47. Incomplete dynamic range expansion window
FIG. 48. Sub-pixel value
FIG. 49. General Callisto message format
FIG. 50. Register access message format
FIG. 51. Callisto command message format
FIG. 52. Register data message format
FIG. 53. Command data message format
FIG. 54. Command data format for processed image read command
FIG. 55. Frame sync message format
FIG. 56. Frame store write message format
FIG. 57. Frame store write message format
FIG. 58. Unprocessed image read command message
FIG. 59a. Processed image read command with arguments
FIG. 59b. Processed image read command without arguments
FIG. 60a. Sub-sampled image read command with arguments
FIG. 60b. Sub-sampled image read command without arguments
FIG. 61. Sub-pixel read command message
FIG. 62. Command execution and frame store write states
FIG. 63. Frame store buffer locking
FIG. 64. Error recovery cycle
FIG. 65. Reset timing
FIG. 66. Image sensor data interface timing
FIG. 67. Image sensor timing signals
FIG. 68. Image sensor timing—external capture
FIG. 69. Serial interface synchronous timing: 2 bytes back-to-back from Callisto to microprocessor
FIG. 70. Serial interface synchronous timing single bite transfer from microprocessor to Callisto
FIG. 71. Error recovery timing using break
FIG. 72. External register interface read timing
FIG. 73. External register interface write timing
FIG. 74. Callisto top-level partitioning
FIG. 75. clk_driver logic
FIG. 76. register_read State Machine
FIG. 76a. Four-byte Register Read Access
FIG. 77. serialif structure
FIG. 78. ser2par State Machine
FIG. 79. msg_sync State Machine
FIG. 80. msg_hand State Machine
FIG. 81. Register Write and Read Accesses
FIG. 82. Unprocessed-Processed-Subsampled Image Read Sequence
FIG. 83. Subpixel Read Command
FIG. 84. Direct Frame Store Write Sequence
FIG. 85. frame_handshaking State Machine
FIG. 86. header_generation State Machine
FIG. 87. sif_par2ser functional timing
FIG. 88. par2ser State Machine
FIG. 89. error_handler State Machine
FIG. 90. imgproc structure
FIG. 91. imgproc_fs State Machine
FIG. 92. Sub-functions of the Processed Image Read Function
FIG. 93. "Column Min-max" Generation
FIG. 94. "Column Min-Max" Pipeline and Range-Expand and Threshold
FIG. 95. Serial Output during Processed Image Region Read
FIG. 96. imgproc_sertim state machine
FIG. 97. imgsensif structure
FIG. 98. sens_ctrl state machine (fsm—double buffered)
FIG. 99. sens_ctrl state machine(onebuf—single buffered)
FIG. 100. synchronizer design
FIG. 101. reset_sync design
FIG. 102. sig_pulse_sync design
FIG. 103. New Fram events—Double buffering
FIG. 104. Single Buffer—Basic cadence
FIG. 105. Single Buffer—Normal operation
FIG. 106. Single Buffer—One missed frame
FIG. 107. Double Buffering—Same cadence as normal operation for single buffer
FIG. 108. Double Buffering—No missed frames, simultaneous read and write
FIG. 109. Double Buffering—One missed frame
FIG. 110. Generalized RAM Accesses
FIG. 111. Sub-sample Buffer RAM architecture
FIG. 112. Scan Test Operation
FIG. 113. Symmetric FIR parallel implementation
FIG. 114. Reuse of multiplier and adder tree
FIG. 115. 2-tap 2D FIR
FIG. 116. Symmetric 2D FIR's
FIG. 117. Block memory scheme decoupling decimation factors and filter order
FIG. 118. Reduced linestore 2D FIR
FIG. 119. Tag image processing chain
FIG. 120. First sample tag structure, showing symbol arrangement
FIG. 121. First sample tag structure, showing macrodot arrangement, (fully populated with macrodots)
FIG. 122. Second sample tag structure, showing symbol arrangement
FIG. 123. Second sample tag structure, showing macrodot arrangement (fully populated with macrodots)

The timing diagram for the integration cycle 32 is shown in more detail in FIG. 12. The main signals during this cycle are the reset and tx signals. These signals act on all pixels in the sensor array.

Figure 13:
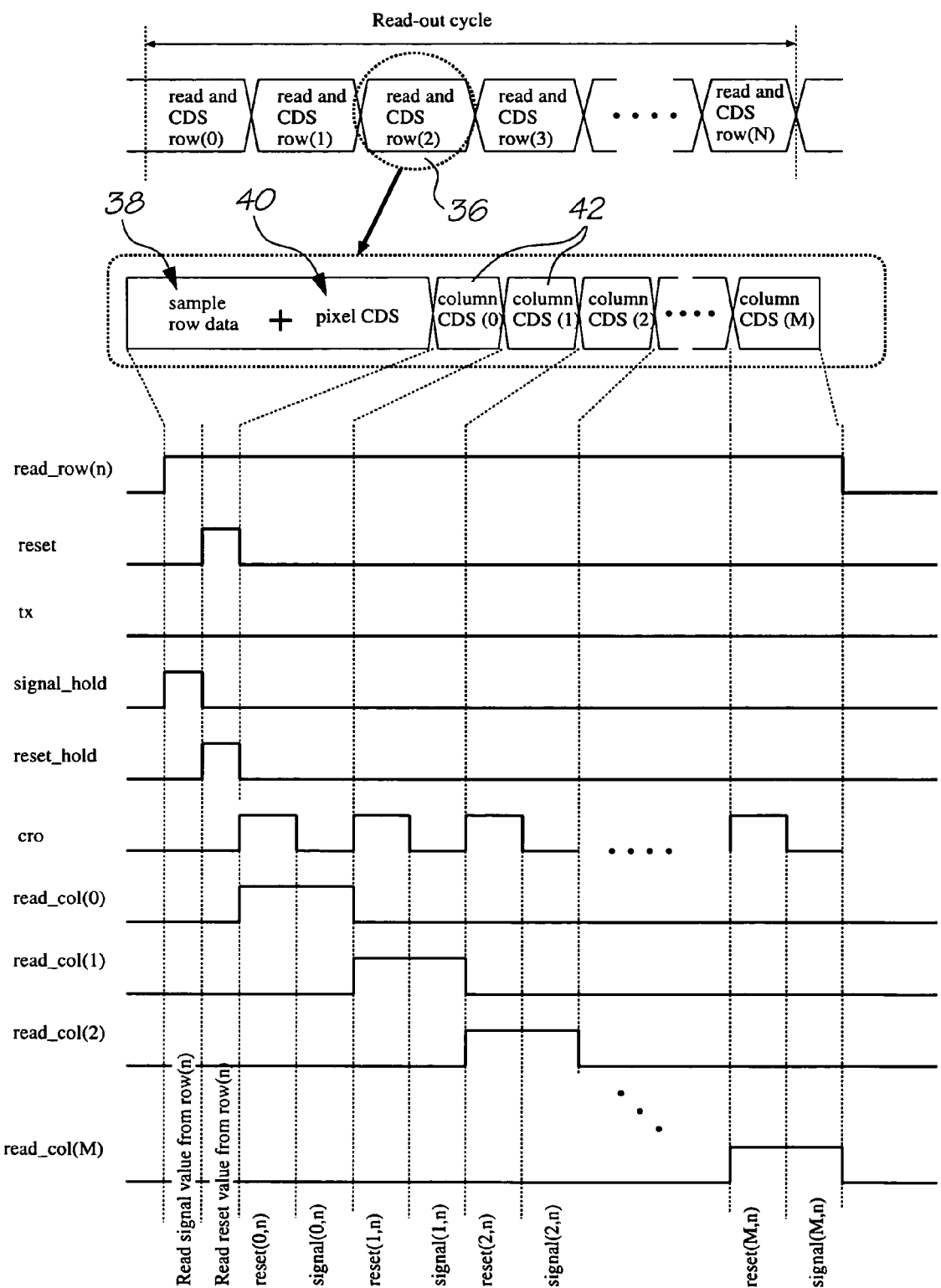

The read-out cycle is more complex as it involves several different operations. FIG. 13 shows the sequence of events and the timing diagram during the read-out cycle. The read-out cycle essentially consists of a series of "read and CDS row(n)" cycles 36, for all rows of the sensor array 12. Each "read and CDS row(n)" cycle 36 in turn consists of a "sample row data", a "pixel CDS" 40, and a series of "column CDS" cycles 42. During the "sample row data" period 38, first signal_hold is set high, and the data is sampled and held by its corresponding capacitor. In the next phase, the entire row of pixels is reset and the reset value is sampled and held by its associated capacitor. The row decoder circuit is designed such that it supports the resetting of only one row of pixels during the read-out cycle, while it globally resets the pixel array during the integration cycle. The pixel CDS 40 is inherently done during this same cycle.

During each of the "column CDS" cycles 42, first the signal cro is set high to provide the off-set component of the column circuits, and then cro is set low to transfer the sampled signal and reset values to the output. This operation is repeated for all the columns in the sensor array 12.

Row Decoder

Figure 14:
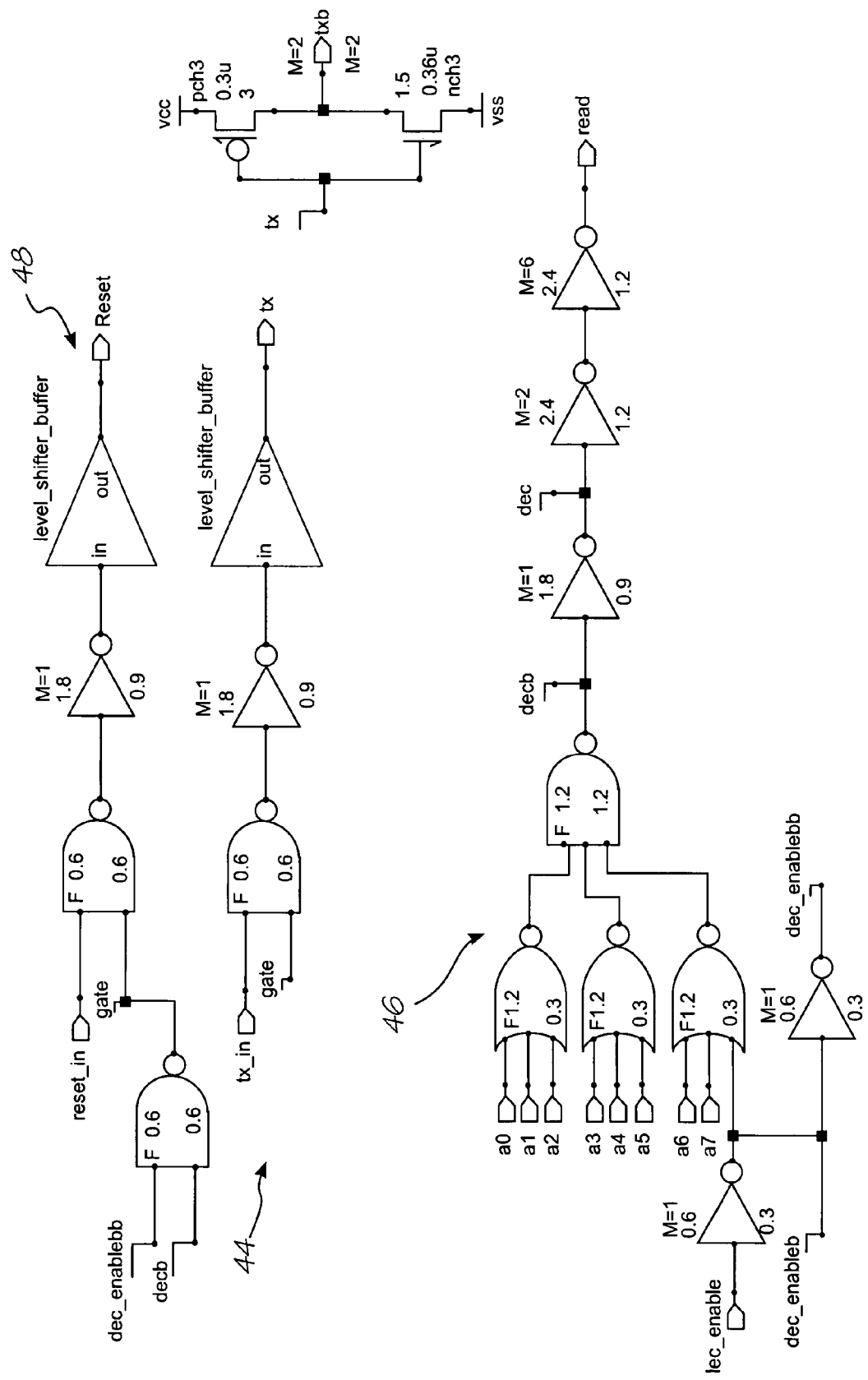

Turning to FIG. 14, a row decoder 44 is responsible for providing multiplexing signals for the rows, and also controlling the behaviour of the reset and tx signals. The decoding is performed by a NOR-NAND structure 46.

The dec_enable signal controls the behaviour of the reset and tx signals. When dec_enable is low, the entire row decoder is disabled and none of the rows are activated. At the same time, the reset and tx signals will take a global role and can be active on all rows.

As the row decoder 44 implements a N-2N decoder, it can be used in a random access mode.

Figure 15:
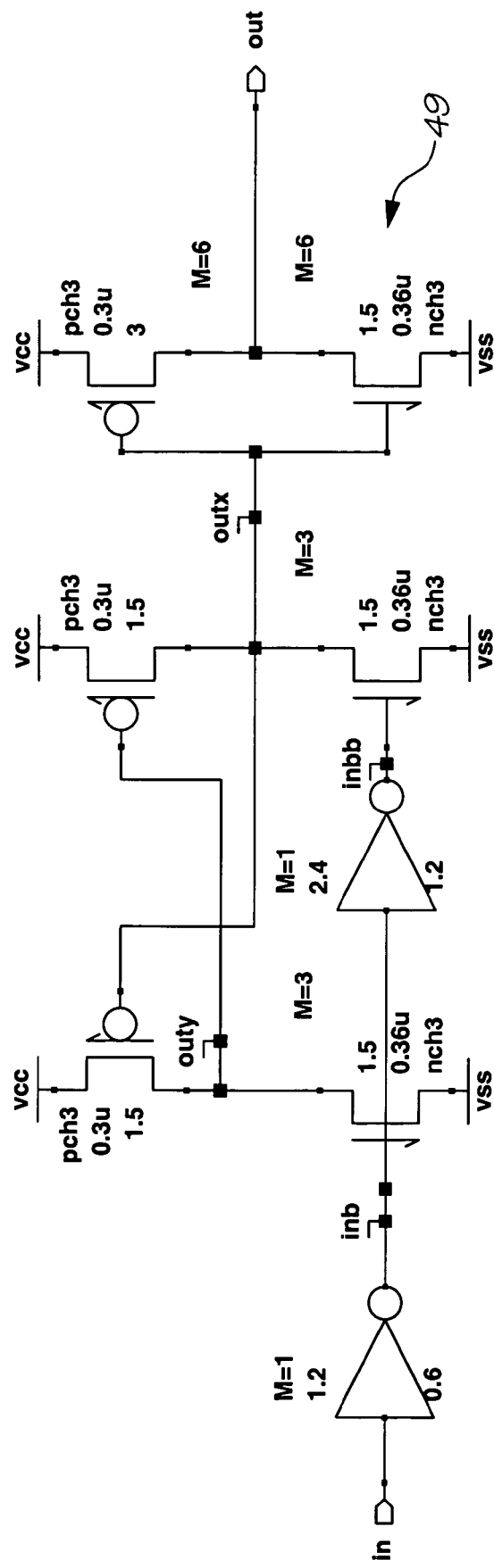

Level shifter buffers 48 are used to translate the logic levels from VDD to VCC (in this design from 1.8 V to 3.0V). FIG. 15 shows one of the level shift buffers 48. The level shift buffer uses a basic feedback level shifter, which is properly ratioed to avoid any potential latch-up during fast transitions. In this circuit except for the two inverters, all other transistors are designed with the high voltage option. Notice that output PMOS transistor 50 has been intentionally made weaker than NMOS 52, to remove any possible overlap between the outputs from two consecutive rows when switching from one row to the next.

Biasing

The only circuits that require biasing are the column circuits 30. There are four biasing voltages that need to be generated: two for the input buffer (biasn and biasp), and two for the output buffer (biasn_out and biasp_out) (see FIG. 11).

Figure 16:
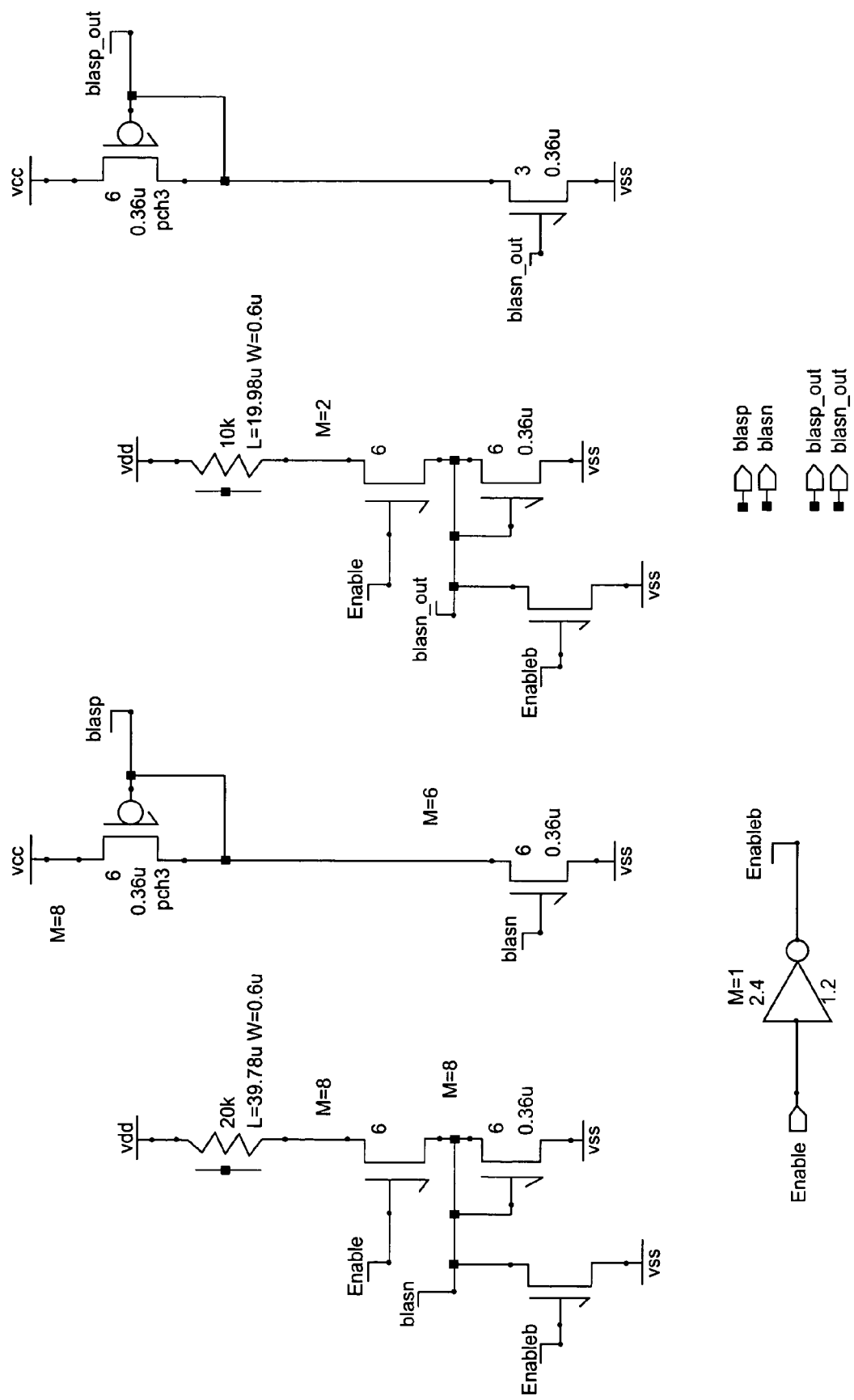

FIG. 16 shows the generator circuitry, comprising basic resistor-based bias generators.

Layout Design

The layout design of the sensor is described in this section. The most important part of the layout design is the pixel design, and the interacting layouts surrounding the pixel array.

A VSS ring, which also has the Psubstrate tap, surrounds the pixel array. This is to ensure that the NMOS transistors within the pixel array receive the best possible substrate biasing, as there is no Psubstrate tap inside the pixels to conserve area.

Pixel Layout

The layout of the pixel should be such that the effective photodetector area is maximised. In the following section we present the layout design of the four different pixel structures that have been selected as alternative candidates for use in the Jupiter design.

Photodiode with Capacitor

Figure 17:
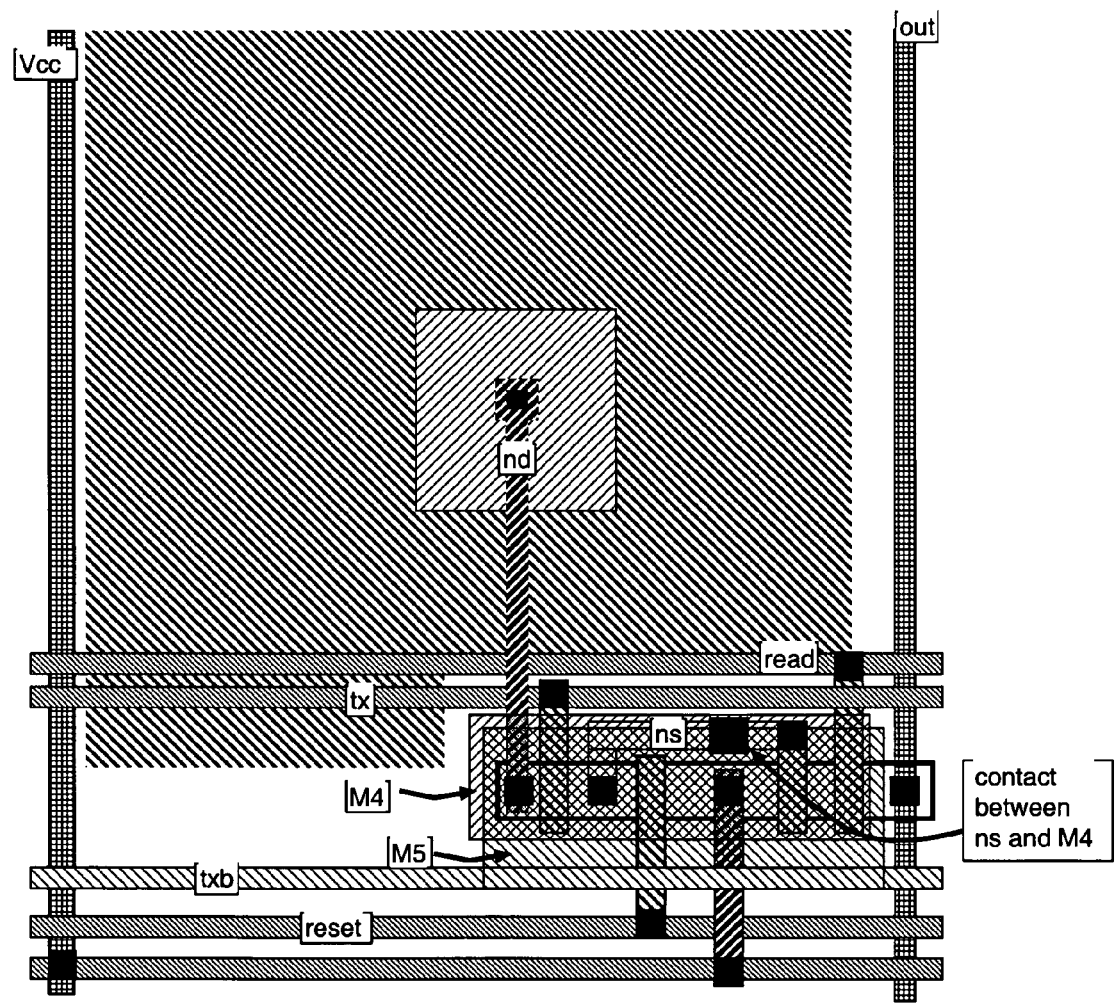

FIG. 17 shows a layout of a 10 um pixel using a photodiode and also having the capacitor for compensating the reset voltage drop as described above.

The photodiode is an NWell-Psub structure, including a central NWell connection, from which the silicide layer is removed (except where the contact to M1 is formed). The VCC supply voltage runs both horizontally and vertically to produce a mesh power structure, which reduces the impedance of the supply planes significantly.

The read, reset, tx and txb signals run horizontally. The out signal runs vertically. The capacitor has been highlighted in the figure. It is formed by the parasitic capacitance between M4 and M5. "txb" runs on M5, and has been widened where the capacitor is formed. The bottom plate which is on M4 is connected to the storage node through a set of stacked vias. For the specific value required for the capacitor, it turns out that the implemented capacitor covers all the active area of the transistors, and therefore it also provides a natural shield for these circuits.

For the illustrated 10 um pixel, the fill factor is approximately 87%.

Photodiode without Capacitor

Figure 18:
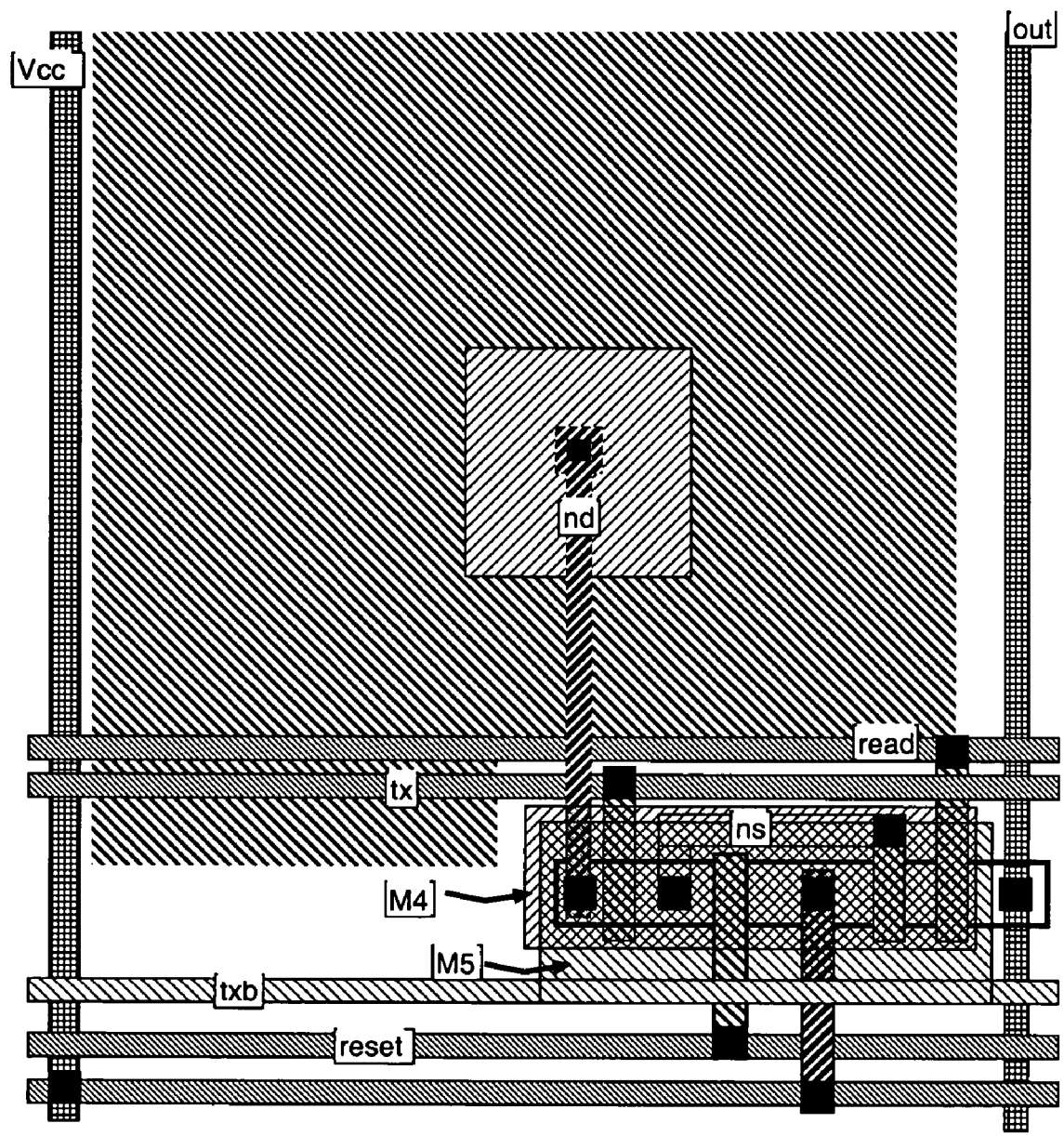

FIG. 18 shows a layout of a 10 um pixel using a photodiode. The pixel is almost identical to that shown in FIG. 17, without the capacitor. There is no M4 below the area where txb has been widened, and therefore no capacitance is formed.

Photo-BJT with/without Capacitor

Figure 19:
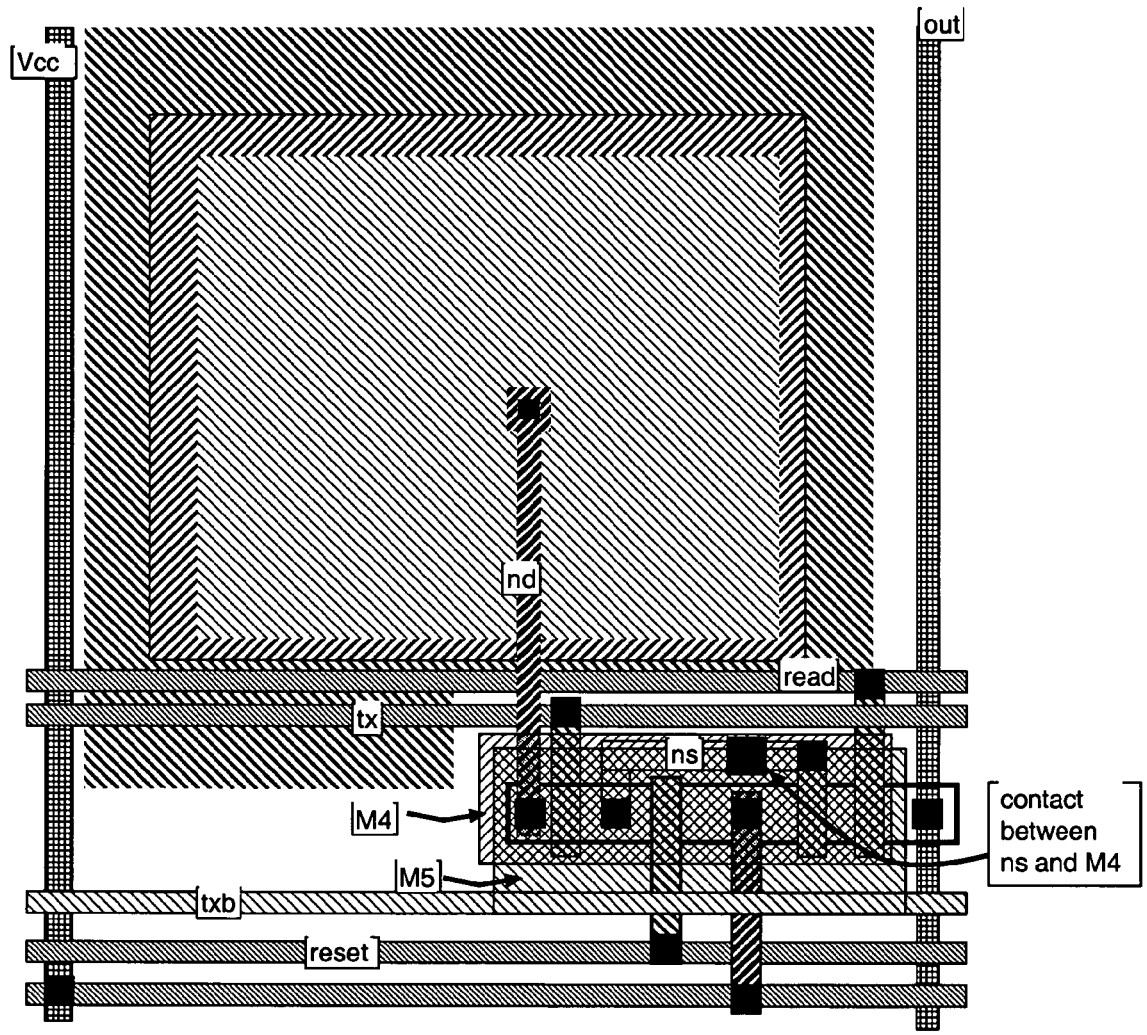

FIG. 19 shows a layout of a 10 um pixel using a Pdiff-NWell-Psub BJT as the photodetector. The layout is very similar to those using a photodiode. The pixel circuit is identical to that used in the photodiode based pixels, and therefore it will not be described here again.

The Pdiff area in this case has been maximized to increase the emitter area. The silicide has been removed from the Pdiff area, except where the emitter contact is made.

Power Routing

A VSS ring which also has the Psubstrate taps surrounds the pixel array. This is to ensure that the NMOS transistors within the pixel array receive the best possible substrate biasing, as there is no Psubstrate tap inside the pixels. A VCC ring also surrounds the array, mainly to ensure that VCC is supplied from all sides of the array to the pixels.

The VCC supply in the pixels runs both horizontally and vertically, to produce a low impedance supply mesh. The power routing to the row and column decoders are provided using the top metal layers from M3 to M6.

Light Shielding

The most critical circuits in any image sensor that may be affected by the incoming light are the row and column driving circuits, simply because they are physically close to the pixel array and therefore will be exposed to light. In order to avoid any potential problems, all the circuits in the current design are covered by metal layers. Notice that the design rules do not allow the use of a single continuous layer of metal, and therefore multiple overlapping metal layers have been used to cover the circuits in the preferred embodiment.

It is also worth mentioning that in the 800 nm+ range of input wavelength, only NMOS transistors can potentially be affected by the light, as the PMOS transistors are inside an NWell and have an intrinsic barrier for the photo-generated carriers, which are generated deep in the silicon bulk. Nevertheless, all circuits have been shielded in the preferred embodiment.

Interface

Figure 20:
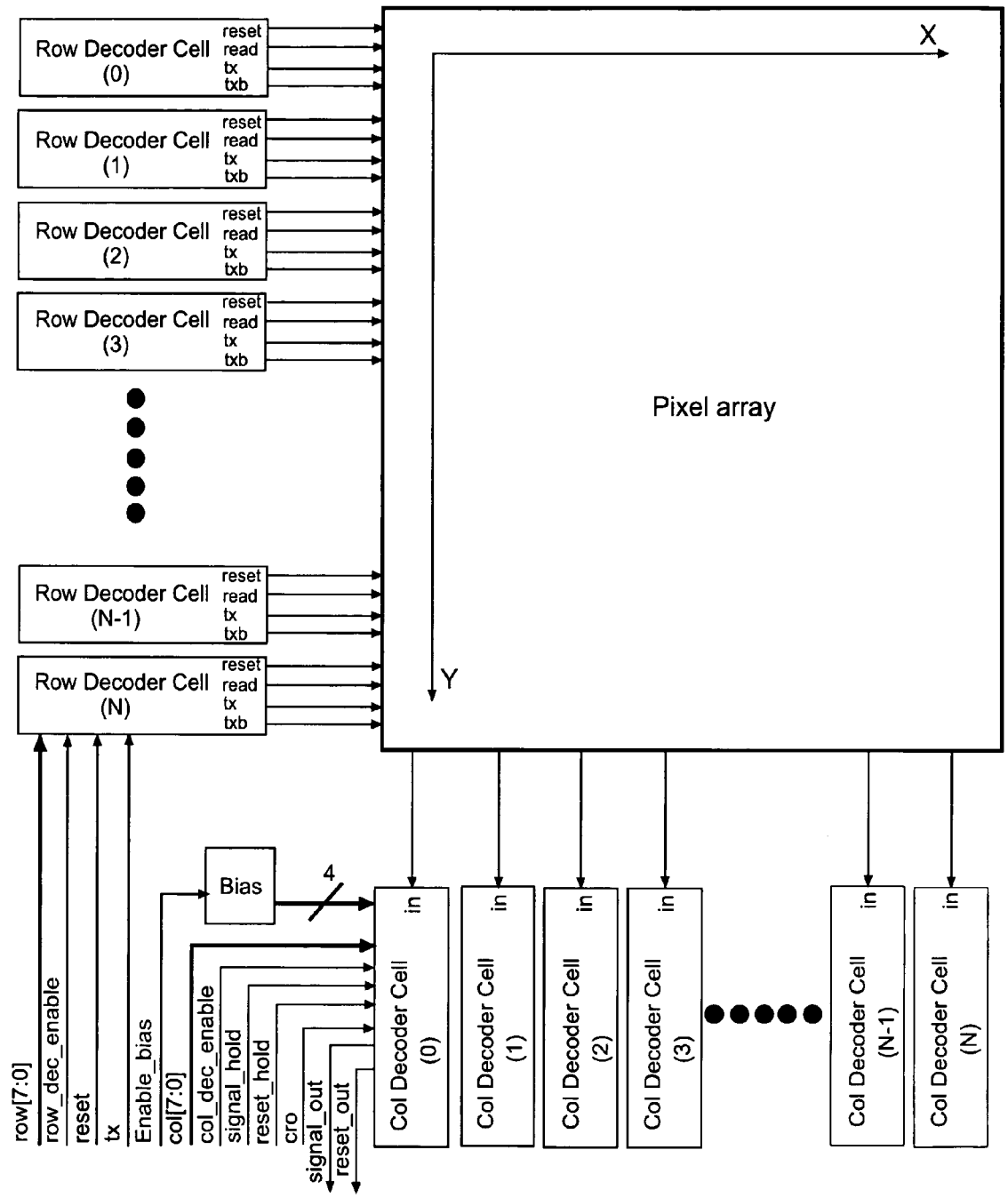

FIG. 20 shows the block diagram of the image sensor. The sensor consists of an M×N pixel array 54, an array of N row decoder circuits 56, an array of M column decoder circuits 58, and a bias circuit 60.

The size and the number of pixels can be designed according to the required specification.

1.6.2 Operation

This section describes basic steps to operate the sensor. The image sensor only supports one operation mode, which is the normal mode.

In order to operate the sensor in the normal mode the following steps are be followed:
1. Set all the digital input signals to low.
2. Apply the appropriate VDD, VCC, and VSS supply voltages
3. Set the Enable_bias input to high, and wait for at least 1 us. This step may be bypassed if the Enable_bias has already been set high.
4. Set the tx input to high.
5. Set the reset input to high. This will reset all pixels in the array.
6. Wait for the desired integration time.
7. Set the tx input to low. This will close the shutter and store the image at the storage node.
8. Set the "row" address bus to the desired starting address.
9. Set the "col" input address bus to the desired starting address.
10. Set the row_dec_enable and col_dec_enable both to high.
11. Set the signal_hold to high.
12. Set the signal_hold to low.
13. Set reset to high.
14. Set reset_hold to high.
15. Set reset_hold to low.
16. Set the cro to high. At this time the two output signals, signal_out and reset_out, will have the column offset value.
17. Set cro to low. At this time the two output signals will have the pixel signal and reset values.
18. Change the "col" address bus to the next desired value, and repeat the steps from Step 16 to Step 18, up to the last desired column address.
19. Change the "row" address bus to the next desired value, and repeat the steps from Step 11 to Step 19, up to the last desired column address.
20. If the sensor is to be disabled, set all the digital inputs to low. However, if the sensor is to remain enabled, set all digital inputs except Enable_bias to low.

Disabling the Sensor

In order to disable the sensor at any time, the Enable_bias, col_dec_enable, and row_dec_enable signals are set to low. The reset and tx signals should also be set to low, otherwise, the sensor may dissipate power.

8-Bit ADC Design

ADC Architecture

The selection of appropriate architecture for the ADC is a critical step in achieving reliable design, and silicon performance. A fully differential pipelined ADC design is used in the preferred embodiment. A redundant signed digit (RSD) structure is used because it presents an inherent self-correcting function due to the redundant nature of the operation, and because it is relatively tolerant to offset error in comparators, which is the major source of error in other ADC structures.

Figure 21:
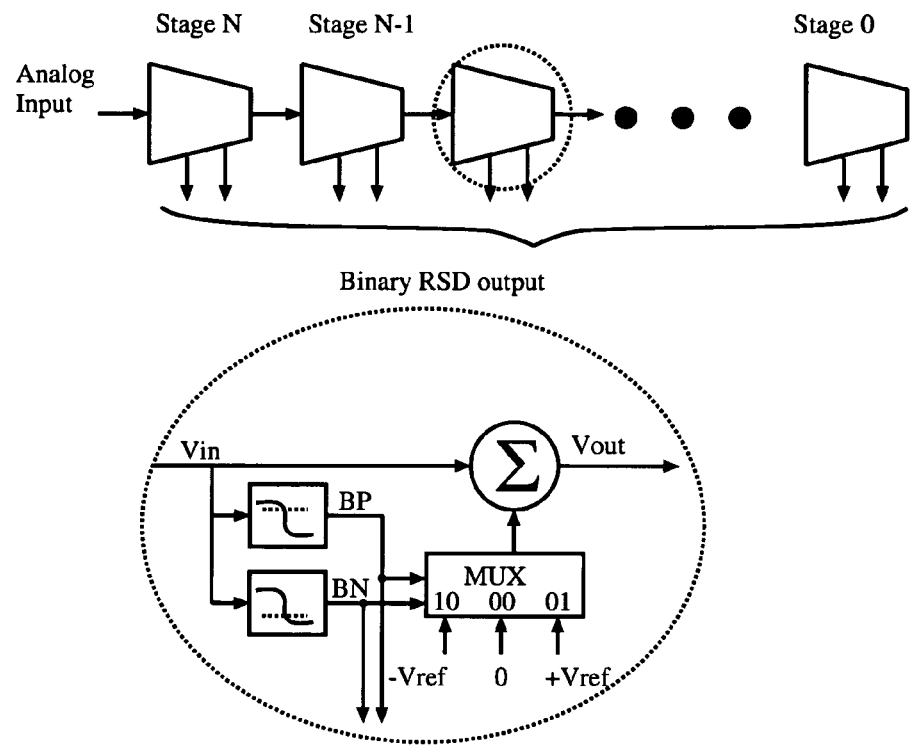

FIG. 21 shows the structure of a pipelined RSD ADC 62. It consists of identical stages, each of which has an analog input, an analog residue output and two digital outputs.

In an RSD based pipeline ADC, in the first step the input is compared against two levels. These two levels are often chosen at +Vref/4 and −Vref/4. If the input is above both levels the input is reduced by Vref/2 and then amplified by a factor of 2. If the input is between the two levels, the input is directly amplified. And finally, if the input is below both levels, the input is increased by Vref/2 and then amplified by a factor of 2. The input-output equations for one stage of the pipeline are $$\text{if}\left(Vin > \frac{Vref}{4}\right) \quad BP = 1, BN = 0 \quad Vout = 2\left(Vin - \frac{Vref}{2}\right)$$

$$\text{if}\left(-\frac{Vref}{4} < Vin < \frac{Vref}{4}\right) \quad BP = 0, BN = 0 \quad Vout = 2\left(Vin - \frac{Vref}{2}\right)$$

$$\text{if}\left(Vin < -\frac{Vref}{4}\right) \quad BP = 0, BN = 1 \quad Vout = 2\left(Vin - \frac{Vref}{2}\right)$$

Vin is the analog input, BP and BN are the digital outputs, and Vout is the analog residue output.

In order to convert the digital outputs of each stage we should remember that an output of BP=1, BN=0 means that this digit has a value of +1, BP=0, BN=0 has a value of 0, and BP=0, BN=1 has a value of −1. For example the four-bit RSD number (+1)(−1)(0)(−1) is equal to (1×8)+(−1×4)+(0×2)+(−1×1)=3

Notice that we can represent 3 as (0)(0)(1)(1), hence we have a redundant representation.

The RSD digital outputs from all stages are then converted to a two's complement number system.

Implementation

The ADC bit-slice can be implemented using switched capacitor circuits. In this approach the input to each stage is first sampled on two capacitors Cs (sampling capacitor) and Cf (feedback capacitor). At the same time the input is compared against two levels and the digital bits are extracted. In the second phase, the capacitors are connected to an opamp to form an amplifier with a gain of 2.

For higher resolution ADCs (more than 8 bits) or for mixed signal designs, a differential approach is used, to reduce the effects of charge injection and substrate coupling.

Figure 22:
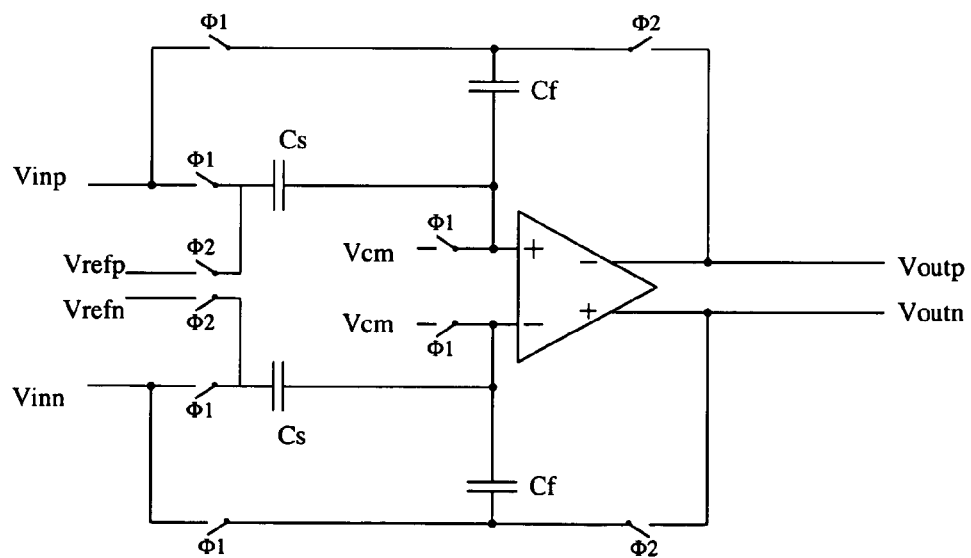
Figure 23:
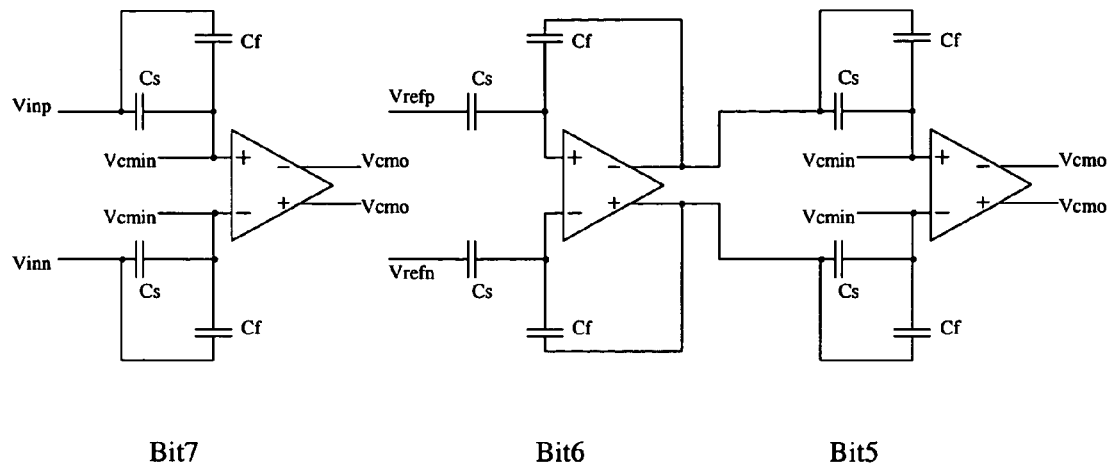

FIG. 22 shows the structure of one bit slice, and FIG. 23 shows the capacitor connections in three bit slices of the ADC in one cycle.

A critical component of the bit-slice is the operational amplifier 64. The gain, speed, and power dissipation of the opamp determines the overall performance of the ADC. A fully-differential folded-cascode structure was chosen for this design for the following reasons.

Folded-cascode often does not require compensation.
The gain of a folded-cascode opamp can be improved using gain-boosting techniques.
The optimization of the opamp is simpler due to the smaller number of transistors in the circuit.
The biasing of the opamp can be varied without affecting the stability. Therefore, if a lower speed ADC is required the bias current can simply be reduced to lower the power dissipation.

Figure 24:
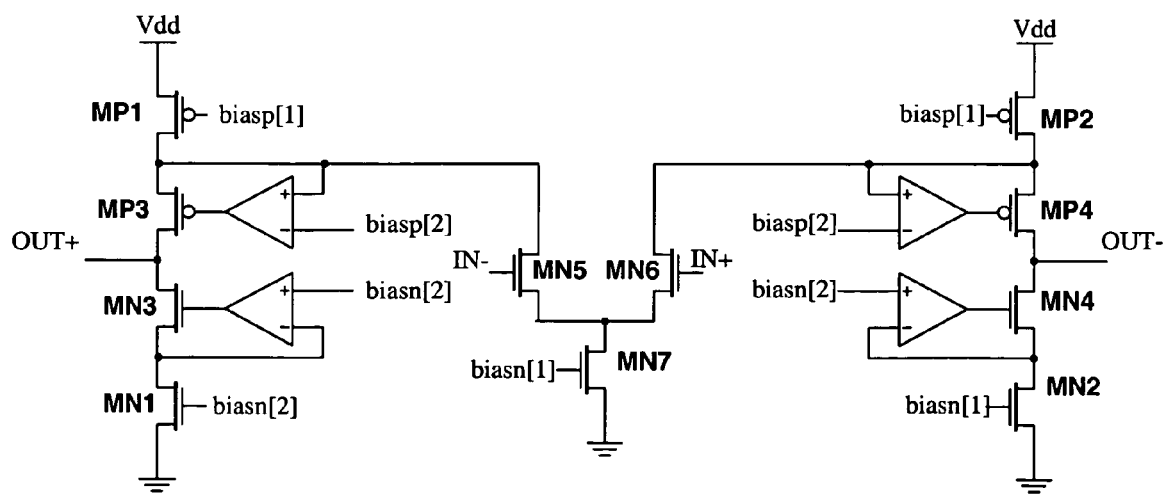

FIG. 24 shows a simplified circuit diagram of the folded cascode opamp 64. Not shown in this Figure is the common-mode feedback circuit, which forces the common-mode voltage at the output nodes to a predefined value.

This circuit is simplified for illustrative purposes and does not represent the overall complexity involved in the design. In the following sections the design of each major component is described and the justifications for using a particular circuit are explained.

Biasing

The biasing circuit provides biasing voltages that are used throughout the ADC bit-slices, and also in the PGA. The choice of the biasing voltages is very crucial. In general a trade-off between area (size of bias transistors), and the power dissipation (the bias currents) should be made. FIG. 25 shows the biasing circuit. The role of the bias voltages in the opamp are as follows:

biasn[1] This voltage is used to determine the bias current in the input branch and the NMOS transistors, MN1 and MN2.
biasn[2] This voltage is used for the folded cascode opamp, and determines the effective DC bias voltage across MN1 and MN2.
biasp[1] This voltage is used to determine the bias current in PMOS transistors MP1 and MP2.
biasp[2] This voltage is used for the folded cascode opamp, and determines the effective DC bias voltage across the PMOS transistors MP1 and MP2

In the actual implementation the sizes of the transistors have been optimized such that the VDS voltages are always at least 0.1 volts above the VDS, sat of the bias transistors in the folded structure. This is to ensure that these transistors are always in the saturation region.

The input current to the bias generator is provided by the reference current generator described below.

Common Mode Circuit

Figure 26:
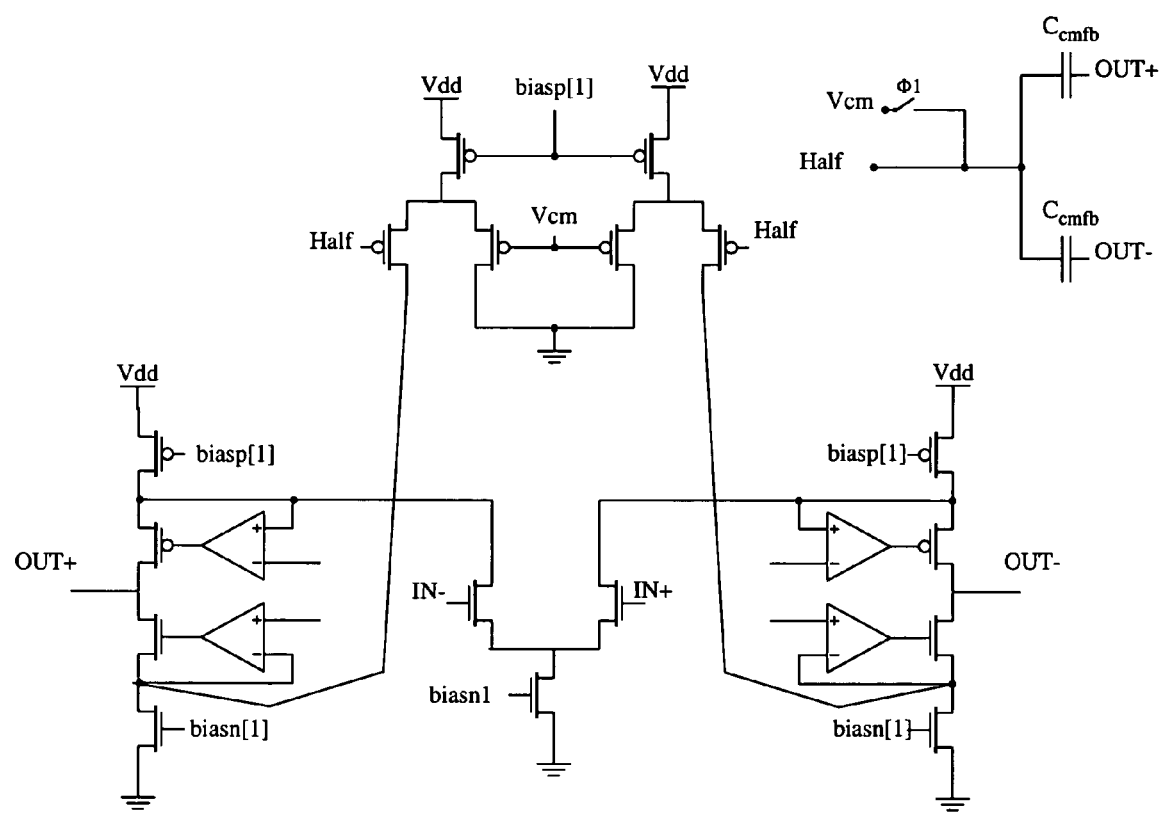

The common mode feedback circuit (CMFB) forces the outputs of the folded opamp to have a predefined common-mode voltage. This circuit effectively tries to change the biasing conditions through a feedback loop. FIG. 26 shows the implemented CMFB circuit.

The differential output of the opamp is used in a capacitive divider to find the common mode voltage of the output. This voltage is then fed back into two differential pairs, which control a current that is injected into the NMOS branch. The other input of the differential pairs is connected to the common mode voltage VCM. This feedback mechanism effectively sets the common mode voltage at the output to VCM. The size of the capacitors Ccmfb in this circuit is only about 50 fF.

The dynamics of the CMFB directly affects the dynamics of the opamp, and therefore during circuit optimization special attention should be paid to the CMFB circuit. Also notice that the CMFB circuit has a different feedback loop, and therefore its dynamics are almost isolated from the dynamics of the opamp.

Gain Boosting Amplifiers

Figure 27:
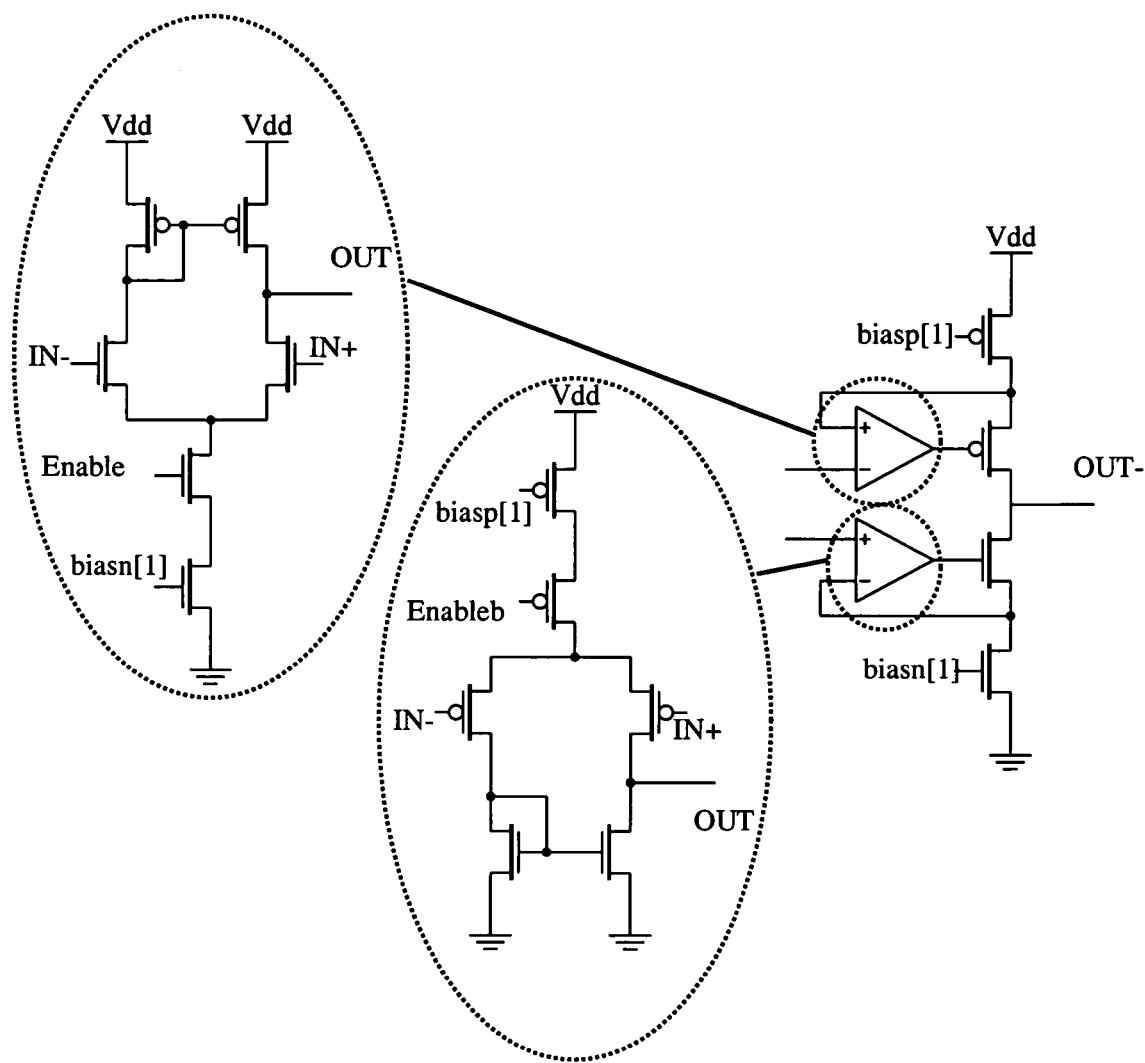

In order to increase the gain of the folded cascode opamp, gain boosting stages are required. The overall gain of the folded cascode stage without gain boosting is less than 100. This is because the cascode transistors have minimum length (0.18 um) to achieve a high bandwidth for the opamp. To increase the gain of the opamp beyond the minimum requirement (which is at least $2^N=2^8=256$) the gain boosting stages should have a gain of at least 10. This amount of gain can easily be obtained from basic OTAs, as shown in FIG. 27.

These amplifiers have been implemented such that they can be turned off. In addition to the power savings achieved by doing this, the output voltage when the circuit is disabled will be set to a value that turns off the transistor that it is connected to. For example, during the off period the output of the top opamp in the figure will be pulled high to Vdd, and therefore the PMOS transistor driven by the output will be turned off.

This turning off mechanism reduces the pressure on the voltage source used to set the common mode voltage at the output of the opamp. In fact when the gain boosting amplifiers are turned off, the output of the opamp will be floating, and the output can be set to any desired value.

An important point in the design of these stages is that their bandwidth should be much more than the overall bandwidth of the main opamp, as otherwise they will form additional poles in the circuit and reduce the phase margin. The bandwidth of the opamp has been designed to exceed 300 MHz. For an N-bit pipeline ADC the required bandwidth is approximately Therefore, a bandwidth of about 1 GHz is required for these amplifiers. This in turn translated into a large biasing current. A relatively large proportion of the power in the ADC is consumed by these amplifiers.

Clock Generator

The clock generator 66 produces all the clock phases necessary for the operation of the ADC 26. The circuit is essentially a two-phase clock generator, and extra clock phases are also generated.

Figure 28:
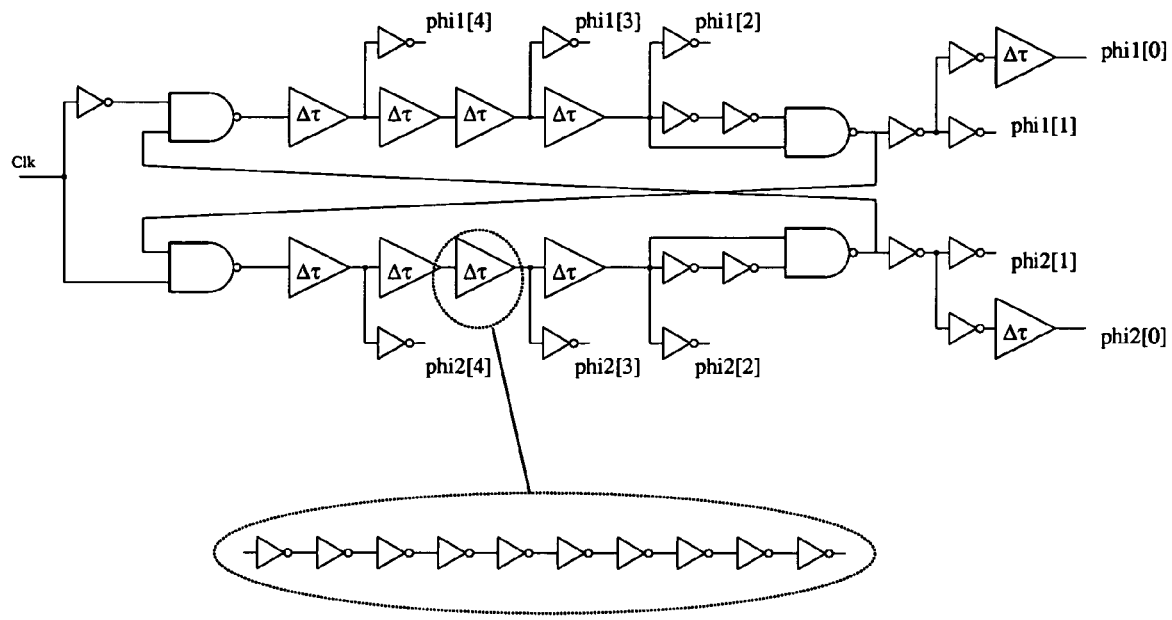

FIG. 28 shows the clock generator 66, each branch of which generates a series of delayed clock phases. Each of these clock phases is used to control the sequence of events in the pipelined ADC. Notice that the clock phases alternate between the stages of the ADC.

Reference Current Generator

Figure 29:
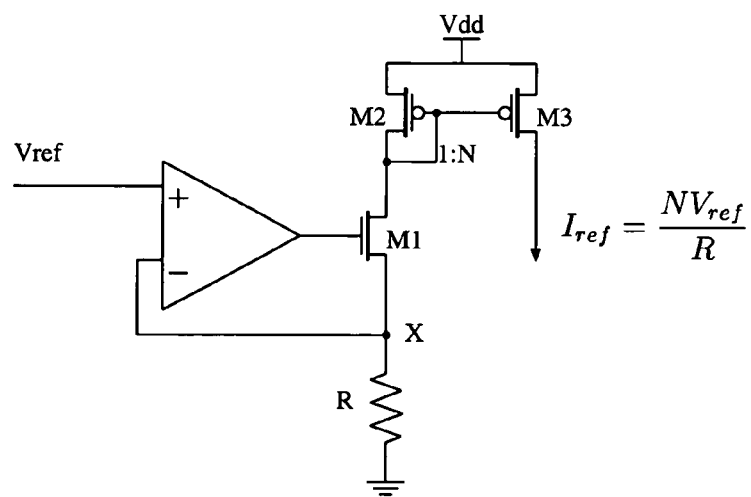
Figure 30:
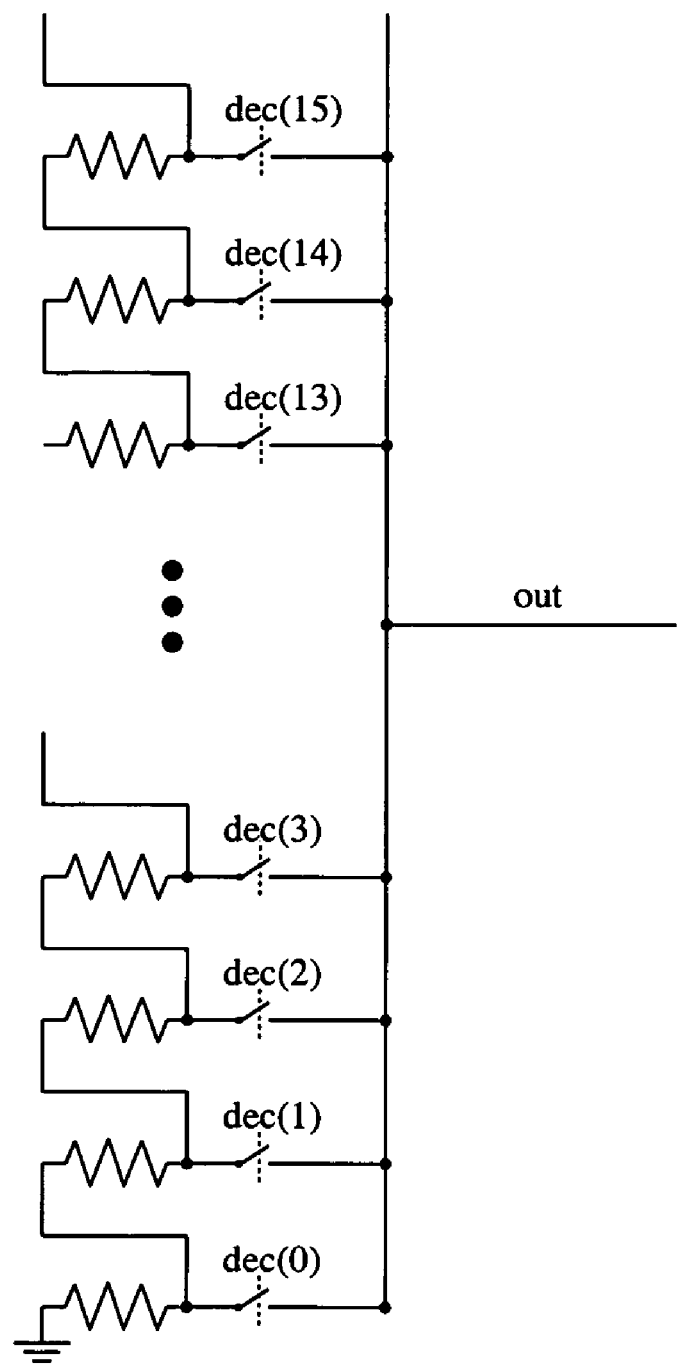

As shown in FIG. 29, the reference current generator 68 uses a resistor R with a known value, and a reference voltage. This circuit requires a well controlled resistor. In order to maintain good control over the bias current against resistor tolerance the resistor in the preferred embodiment has been implemented as a digitally switched resistor ladder, as shown in FIG. 30. Each ladder consists of 16 equal resistors. The value of these resistors is chosen such that the total resistance in the middle of the ladder is equal to the required resistance.

Differential Comparators

Figure 31:
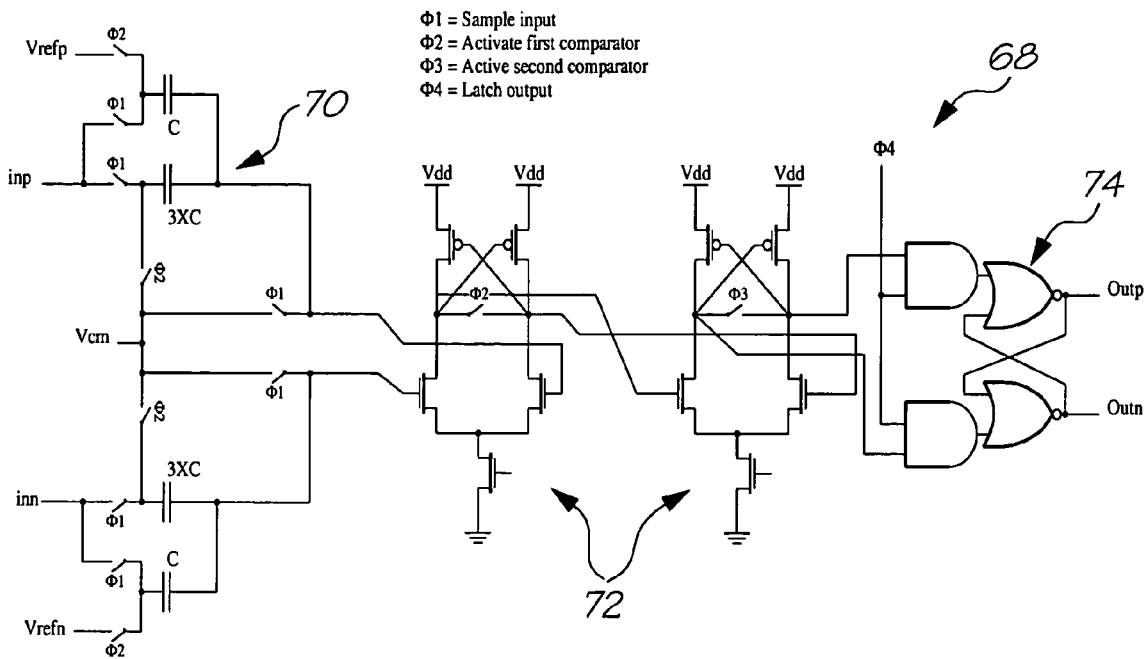

For each stage of the ADC two comparators are required. FIG. 31 shows one of these differential comparators 68. Each comparator 68 compares the differential input against a differential reference voltage (Vrefp/4 and Vrefn/4). A switched capacitor structure 70 has been used in this design, which removes the need for generating the Vrefp/4 and Vrefn/4 signals.

The switched capacitor structure 70 is followed by two cross coupled differential pairs 72, which act as the main comparator stages.

The reason for using two stages is that the input capacitors are relatively small to reduce the loading on the opamps in the bit slice. This in turn dictates the use of smaller input transistors for the first stage, and therefore, the available gain from only one stage would be low. The second stage ensures that the overall gain is high enough to avoid meta-stable states.

The output of output from differential pairs is passed to a latched RS flip-flop 74, which ensures that the output does not change before and after the decision has been made, and also to make sure that the two outputs are always inverted, which may not be the case if a meta-stable state occurs.

Common Mode Generator

In order to generate the common mode and reference voltages necessary for the operation of the ADC a common-mode generator is designed.

The common mode voltage is derived from an inverter with self feedback. The advantages of this circuit are its simplicity, and automatic tracking of the supply voltage and process corners. The switch is used to cut off the feedback during the sleep mode, to avoid power dissipation (see FIG. 32).

Reference Voltage Generator

Figure 32:
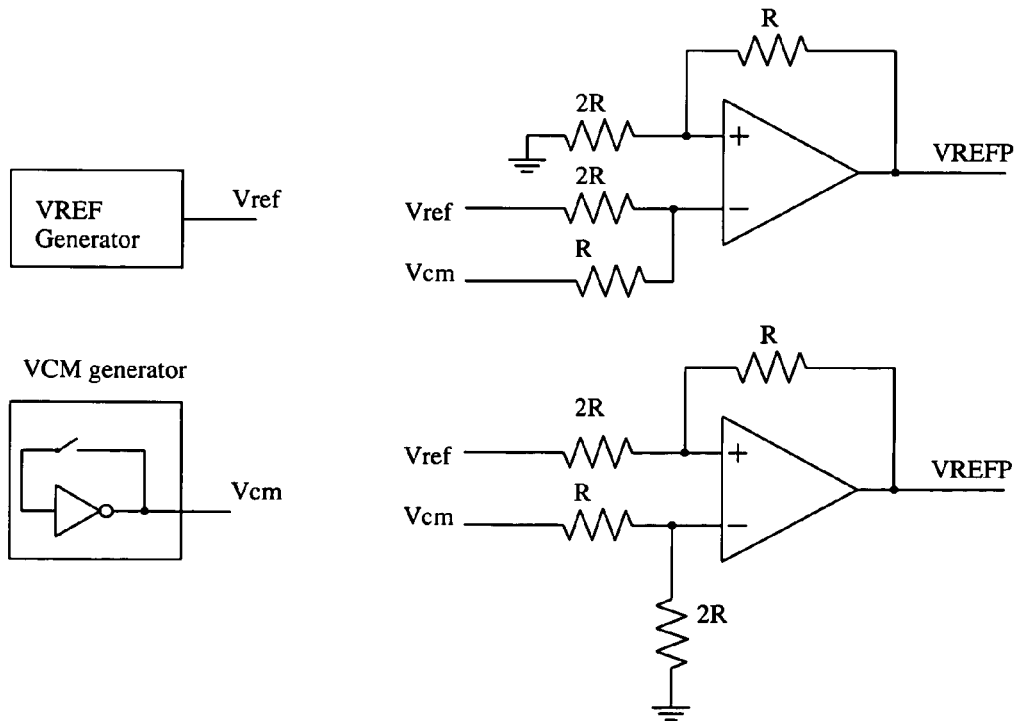

An opamp-based circuit using resistors in the feedback loop is used to derive the Vrefp and Vrefn, as shown in FIG. 32. The reference voltages Vrefp and Vrefn can be obtained as:

$$Vrefp = Vcm + \frac{Vref}{2}$$

$$Vrefn = Vcm - \frac{Vref}{2}$$

For a reference voltage of 1.0 volt, we will have Vrefp=Vcm+0.50, and Vrefn=Vcm−0.50.

The Vref reference voltage is generated by a bandgap generator set to output 1.0 volt (see below for more detail).

Figure 33:
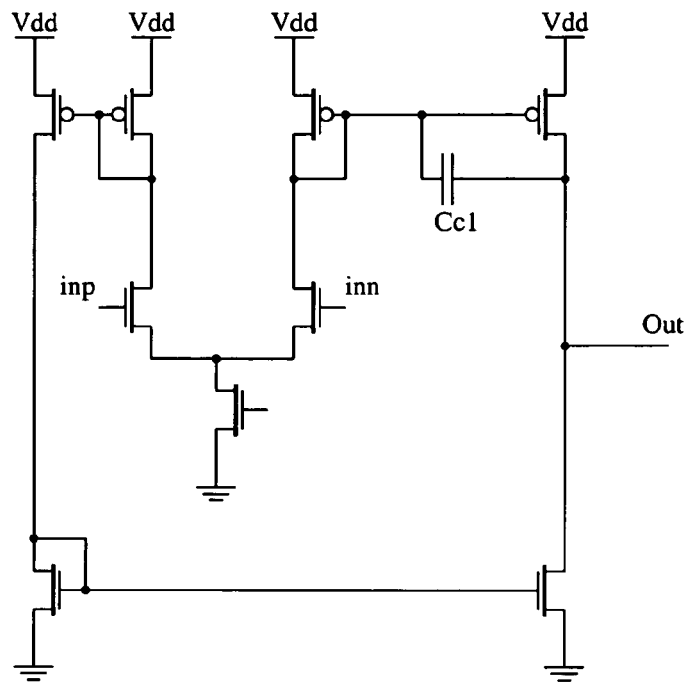

The opamps used in this circuit are based on a wide-range OTA design, to achieve medium gain and high stability in the presence of large capacitive loading. Note that the Vrefp and Vrefn are used to as input to the opamp in the second phase of conversion. They are also heavily decoupled using large MOS capacitors to reduce the bouncing on these voltages. The circuit is shown in FIG. 33. Miller compensation has been used to ensure stability. The current design is stable with capacitive loads of more than 30 pF.

Bandgap Voltage Generator

The bandgap generator produces the main reference voltage from which the Vrefp and Vrefn voltages are derived. It is also used for generating the reference current used in the bias circuit.

Figure 34:
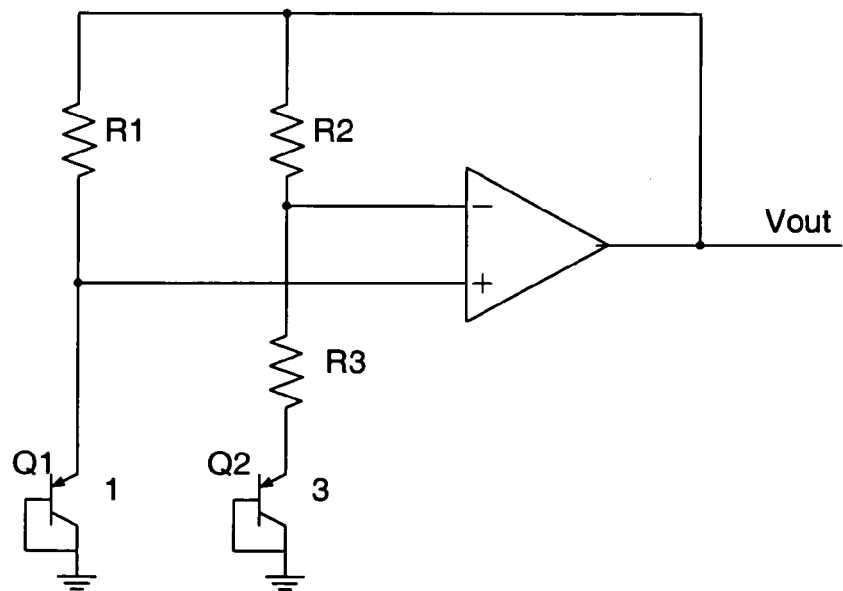
Figure 35:
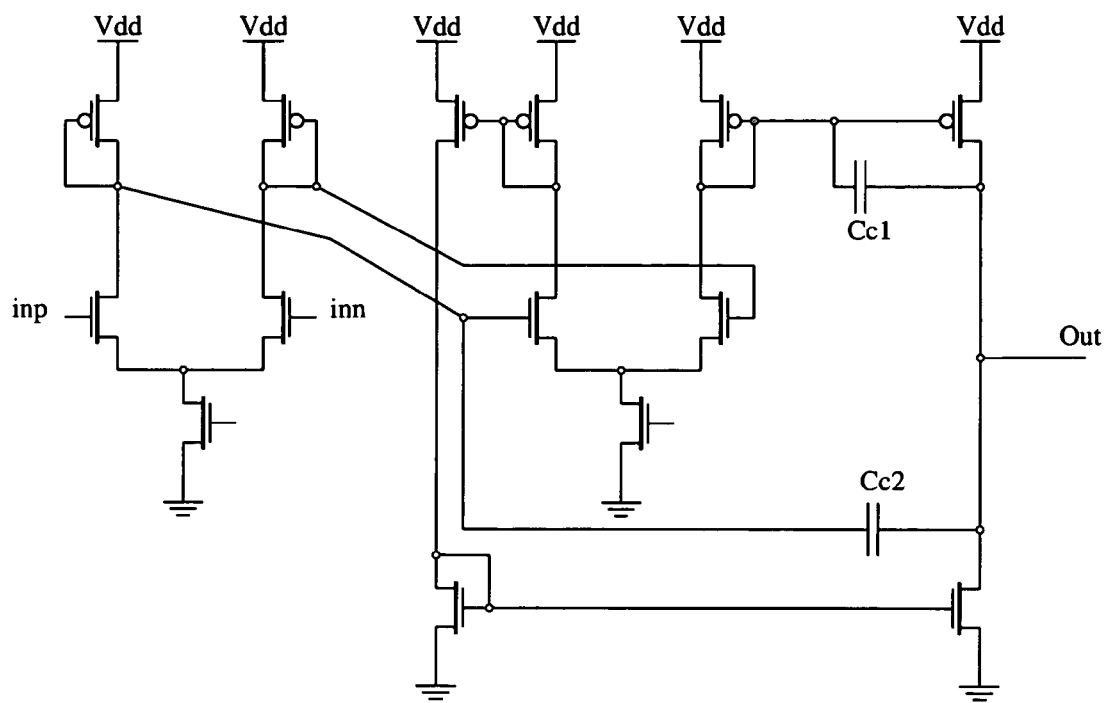

FIG. 34 shows the structure of the bandgap generator. The resistor values have been chosen to produce an output voltage of approximately 1.0 volt. This means that the bandgap generator is in fact out of balance and the output voltage will be temperature dependent. This is in fact a desirable feature for this design. At higher temperatures the dynamic range (or voltage swing) of all circuits in the chip will reduce.

Therefore, if the reference voltage is constant, the required dynamic range of circuits will be higher than what they can achieve. For example, the dynamic range at the output of the image sensor will be lowered at higher temperatures. With a constant reference voltage, the reference levels for the ADC will be constant, and therefore, the ADC will be forced to provide more dynamic range than required.

However, if the reference voltage has a negative temperature coefficient, then the biased circuits will be automatically adjusted to lower biasing currents and voltages, and the amount of dynamic range discrepancy will be reduced.

The opamp used in the bandgap generator is a three stage wide-range OTA, as shown in FIG. 34. This choice is to increase the gain of the opamp and increase the supply rejection. Compensation is necessary in this opamp. A nested miller compensation has been used, to reduce the size of the compensation capacitors.

Programmable Gain Amplifier

Figure 36:
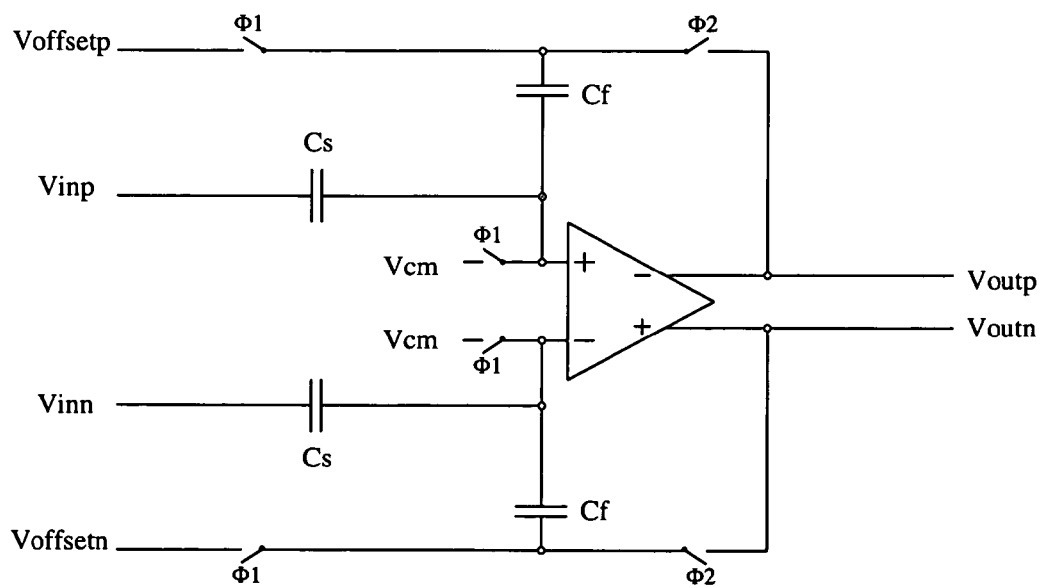

At the input of the ADC a digitally programmable amplifier has been implemented. This PGA can have gain values from 0.5 to 8 in steps of 0.5. The structure uses a switched capacitor design. The simplified schematic diagram is shown in FIG. 36. In the first phase the input is sampled onto capacitors Cs. Also other capacitors are precharged to known values. In the second phase the capacitors are connected to the opamp and form an amplifying stage. In the first phase of the clock the switches connected to $\Phi 1$ are closed, and in the second phase those connected to $\Phi 2$.

Using charge conservation equations we can find $$Voutp - Voutn = (Voffsetp - Voffsetn) + \frac{Cs}{Cf}(Vinp(1) - Vinn(1)) - \frac{Cs}{Cf}(Vinp(2) - Vinn(2))$$

where Vinp(1) and Vinn(1) are the input values during $\Phi 1$, and Vinp(2) and Vinn(2) are the input values during $\Phi 2$.

This particular structure has been chosen to facilitate correlated double sampling (CDS) in the image sensor. During CDS, in the first phase of the clock the signal value is present, and in the second phase the reset value. The values are subsequently subtracted.

Figure 37:
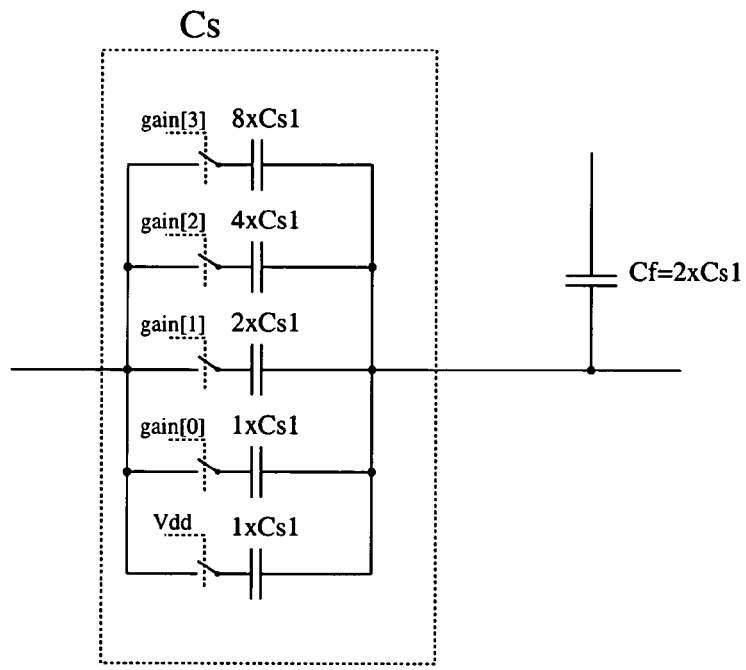

The capacitor Cf in this design is 100 fF. Capacitor Cs is a linearly selectable capacitor as shown in FIG. 37. In this figure Cs1 represents a unit capacitance of 50 fF.

PGA Opamp

Figure 38:
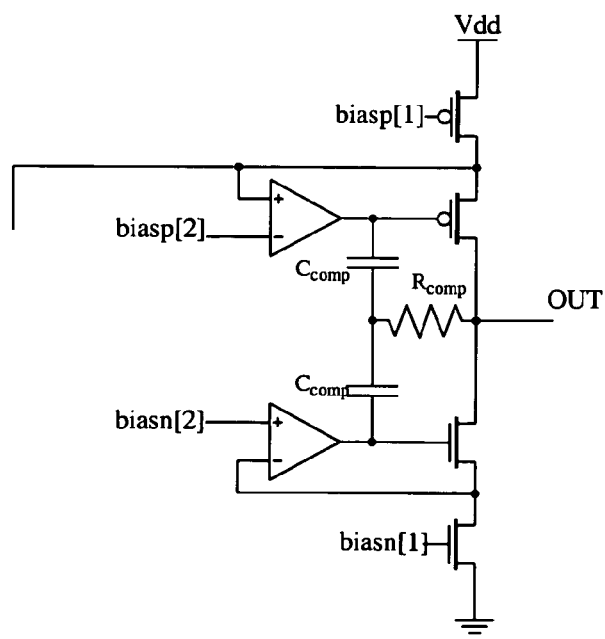
Figure 39:
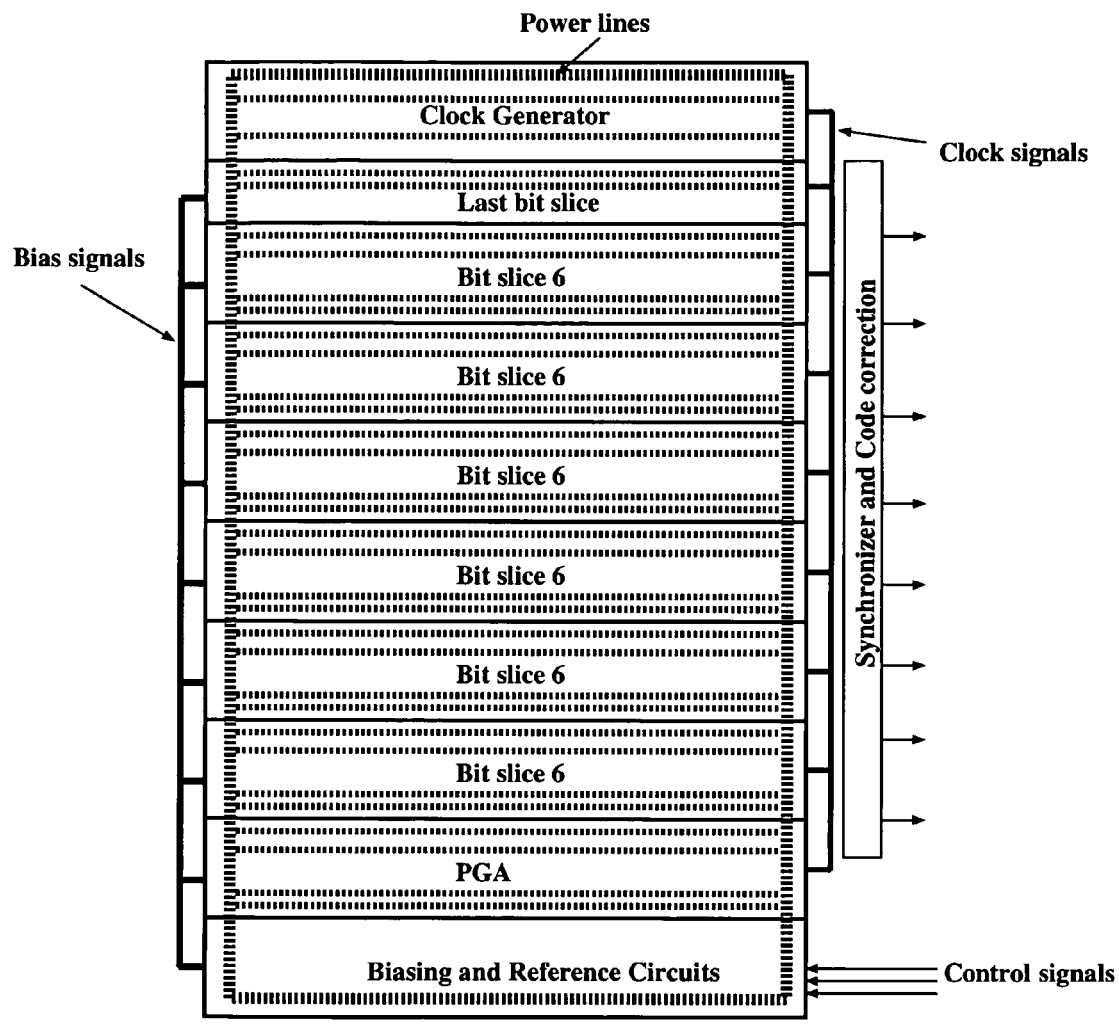

The opamp used in the PGA is very similar to that used in ADC bit slices. There are however, two main changes in this opamp. One is the use of larger transistors, mainly to increase the bandwidth of the opamp, and the other is the use of a basic miller compensation structure at the output branch, as shown in FIG. 38. The source of instability in the PGA is from several factors. The first is the larger gain-bandwidth product required in the opamp. This brings the poles at the output branch close to other poles in the circuit, such as those at the output of the gain boosting OTAs. Also the size of the feedback capacitors is relatively small, to limit the total input capacitance when the gain is to its maximum. The compensation structure tries to bring the poles at the output of the gain boosting OTAs down, and also adds a zero (by adding the series Rcomp resistor), to cancel one of the poles.

Synchronizer

The outputs from the bit slices are generated in a pipeline. During each phase of the clock one bit slice generates an output. In order to synchronize the outputs, synchronizing latches are used. These latches are in fact half of a D-flip flop, and are driven by Phi1[0] and Phi2[0] clock phases (see FIG. 38). The final latches are clocked by Phi2[0]. This means that the output will be valid after the negative edge of Phi2[0], and it can be sampled safely on the negative edge of the input clock.

Before the last latch there is a code correction logic, which is described in the next section.

Output Code Correction

The RSD output of the pipeline ADC is often needed to be converted to more conventional binary representations, such as two's complement or signed representations.

As RSD is a redundant representation, and in a pipeline ADC different representations of the same value may occur because of errors in the comparator, the process of converting the RSD to a binary number is referred to as code correction.

The RSD to binary conversion is relatively simple. If we represent a 7-digit RSD number as $C_6C_5C_4C_3C_2C_1C_0 = (B_{p6}B_{n6})(B_{p5}B_{n5})(B_{p4}B_{n4})(B_{p3}B_{n3})(B_{p2}B_{n2})(B_{p1}B_{n1})(B_{p0}B_{n0})$ where each digit is represented by two binary values $(B_p, B_n)$, in which $-1=(01)$, $0=(00)$, and $+1=(10)$. Then a two's complement number can be obtained by subtracting a binary number formed by $B_n$, from $B_p$ $$N_{p6}N_{p5}N_{p4}N_{p3}N_{p2}N_{p1}N_{p0} = B_{p6}B_{p5}B_{p4}B_{p3}B_{p2}B_{p1}B_{p0} - B_{n6}B_{n5}B_{n4}B_{n3}B_{n2}B_{n1}B_{n0}$$

The resulting number will range from $-127$ (10000001) to $+127$ (01111111).

Therefore, the RSD to binary conversion requires only a subtractor. This subtractor has been implemented as part of the synchronizer, and is inserted before the last latch in the synchronizer.

Calibration

The calibration of the ADC can be performed using different algorithms. The preferred design has support for either a digital offset calibration, an analog offset calibration, or a multi-stage digital gain and offset calibration.

Before describing the different calibration methods, we should mention that for an 8-bit ADC the gain errors, which mainly result from the capacitors, can be less than 1/256. This can be achieved by using a basic common centroid structure for the capacitors. Therefore, gain error will not be a contributing factor in the overall ADC errors.

Also if an application requires only one ADC and an offset of 1% can be tolerated, then offset calibration will not be necessary.

Digital Offset Calibration

This algorithm simply measures the offset of the whole ADC. This is done by shorting the differential inputs of the ADC together and measuring the digital value. In order to reduce the quantization effects the measurement is done on multiple samples (for example, 128 samples).

The offset value is then digitally subtracted from the output of the ADC during normal conversion cycles.

Notice that this method of calibration is sufficient for an 8-bit ADC; as mentioned before the gain error can be controlled well below the required 1/256.

Analog Offset Calibration

This algorithm relies on using a calibration DAC. This time the PGA is also involved in the calibration process (this is a feature of the current design), and therefore this algorithm will present a better solution, specially if the PGA is set to high gain values.

In this algorithm, the differential inputs of the PGA are shorted together and the output of the ADC is recorded. A DAC is connected to the offset bias inputs of the PGA. The value of the DAC is changed in a feedback loop such that the output of the ADC becomes zero.

The input applied to the DAC is then recorded as the offset correction value.

Multistage Digital Gain and Offset Calibration

This more elaborate algorithm will remove the gain and offset errors from all stages, through a successive algorithm. This algorithm is often suitable for ADC resolutions of more than 8 and less than 12 bits.

The algorithm works as follows:
1. The input to the last stage (LSB) of the ADC is set to zero, and the digital values are measured. This is repeated for several cycles (typically 128). The measured value represents the offset for this stage.
2. The input to the last stage is set to the mid reference range ((Vrefp−Vrefn)/2). The output is then measured for several cycles. The offset measurement values from Step 1 are included during this phase. The gain error can be found from the measurements.
3. Step 1 and Step 2 are recursively repeated for the next bit slices until the MSB. The offset and gain errors from the previous LSB bit-slices will be used in the calculation of offset and gain errors of each stage.

During a normal operation, the gain and offset values obtained during the calibration process will be used to correct the digital outputs of the ADC.

Layout Design

The layout design of the ADC will directly affect the performance of the ADC. Considering the ADC is a mixed-signal design by nature, it is important to take into account the interaction between the digital and analog circuits and try to minimize any possible crosstalk affecting the analog circuits. While during the circuit design we addressed this issue by using a fully differential architecture, here we describe techniques used to complement the circuit design.

Floorplan

The placement of the blocks in the ADC is such that the most critical circuits, which are the PGA and the first stage(s) of the ADC are further away from the main source of digital noise, i.e. the clock generator. The last stages of the ADC are least sensitive to digital noise. The biasing and reference generator are the farthest block to the clock generator. In fact most of the short range substrate coupling noise will be absorbed by the ADC stages before reaching the biasing circuits.

Signal Routing

The signal routing is also designed to minimize the interaction between the bias and clock signals. The bias signals are routed on one side of the ADC blocks, and the clock signals on the other. Also inside each block the bias and clock signals run through separate channels, further minimizing the interaction between signals.

In areas where the bias and clock signals cross over each other, appropriate shielding has been used to remove any potential crosstalk.

Power Routing

The VDD and VSS supply voltages surround the ADC. They run on two separate metal layers, which form a parallel plate capacitor to enhance supply decoupling. Inside each bitslice the power lines from the two sides are joined together to form a mesh. In most blocks there are MOS capacitors used to locally decouple the supply voltage.

Bandgap Generator

The compensation capacitor of the bandgap generator is formed using MiM structure. The resistors are formed using poly without silicide. The input of the opamp has a common centroid structure to reduce mismatch, although mismatch is not a critical parameter for this bandgap generator.

Biasing and Reference Circuits

This layout is located at the bottom end of the ADC floorplan, and as such it contains the two wide metal lines for the supply voltages. The width of these lines is 18 um.

ADC Bit Slice

The main capacitors in each bitslice of the ADC are formed in a common centroid. All bias and reference voltages are decoupled using large MOS capacitors. Supply decoupling capacitors are also used close to the logic circuits.

PGA

The gain setting capacitors of the PGA are formed in a semi-centroid structure to improve matching. Bias lines, including Vrefp and Vrefn are decoupled using large MOS transistors.

Section D—ADC Design

Interface

Figure 40:
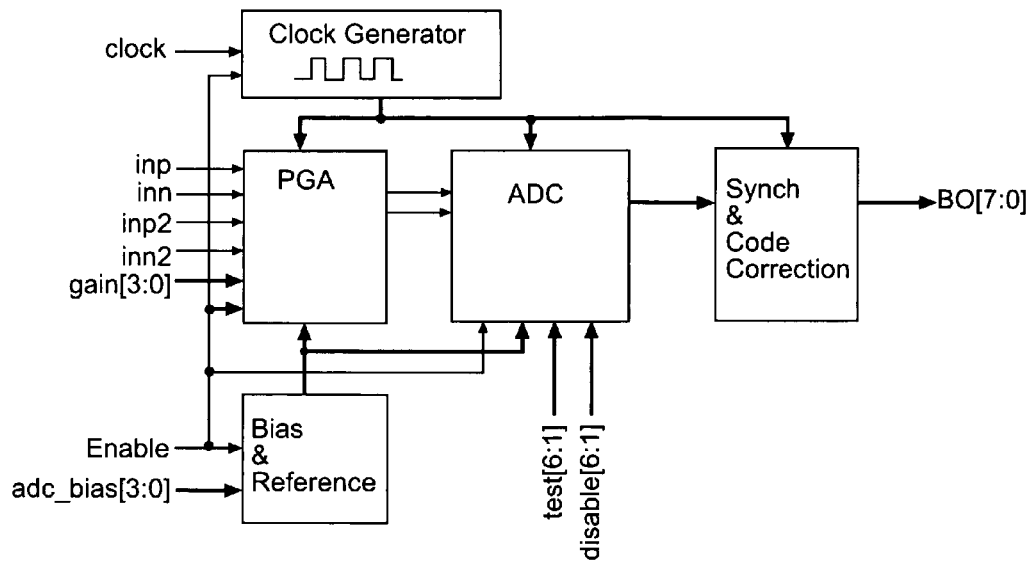

The block diagram of the ADC 14 is shown in FIG. 40. The ADC 14 consists of a PGA 28, seven stages of pipeline RSD ADC 70, a clock generator 72, a bias generator 74 and a synchronization and code correction block 76.

The following table sets out the function of the pins of the ADC 14.

| Name | Type | Function |
| --- | --- | --- |
| Enable | Digital Input | Active-high enable input. When this input is high, all blocks will be enabled. When this input is low all blocks will go into the sleep mode. The clock input is also gated to avoid any power dissipation. |
| clock | Digital Input | The input clock. |
| inp | Analog input | The positive input to the PGA. |
| inn | Analog input | The negative input to the PGA. |
| inp2 | Analog input | The positive offset input to the PGA. |
| inn2 | Analog input | The negative offset input to the PGA. |
| gain[3:0] | Digital Input | Four bits controlling the gain of the PGA, from 0.5 to 8, in steps of 0.5. A value of "0000" sets the gain to 0.5, and a value of "1111" sets the gain to 8. |
| adc_bias[3:0] | Digital Input | Four bits setting the bias resistor for the ADC. A value of "0000" sets the bias resistor to 876 Ohm, and a value of "1111" sets the bias resistor to 14 KOhm. The default value should be "1000". |
| disable[6:1] | Digital Input | These signals disconnect one bit slice of the ADC from the previous stage and prepare it for digital calibration. The LSB bit slice does not have such a feature. |
| test[6:1] | Digital Input | Set the value used during calibration for a bit slice which has been disconnected from previous stage. |

-continued

| Name | Type | Function |
| --- | --- | --- |
| b[7:0] | Digital Output | 8-bit ADC output. |
| VDD | Supply | VDD voltage nominally set at 1.8 V |
| VSS | Ground | Ground voltage set at 0 V. |

Normal Operation

In normal operation the following conditions should be met:
Enable input should be set high.
"test" and "disable" signals should be all set to low
"gain" is set to the desired value
Clock is running up to a maximum frequency of 20 MHz.

Timing in Normal Operation

Figure 41:
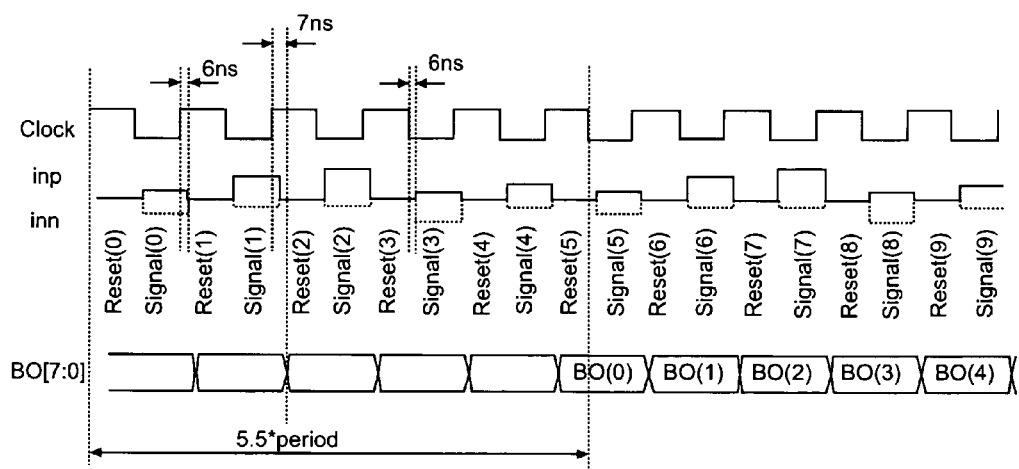
Figure 42:
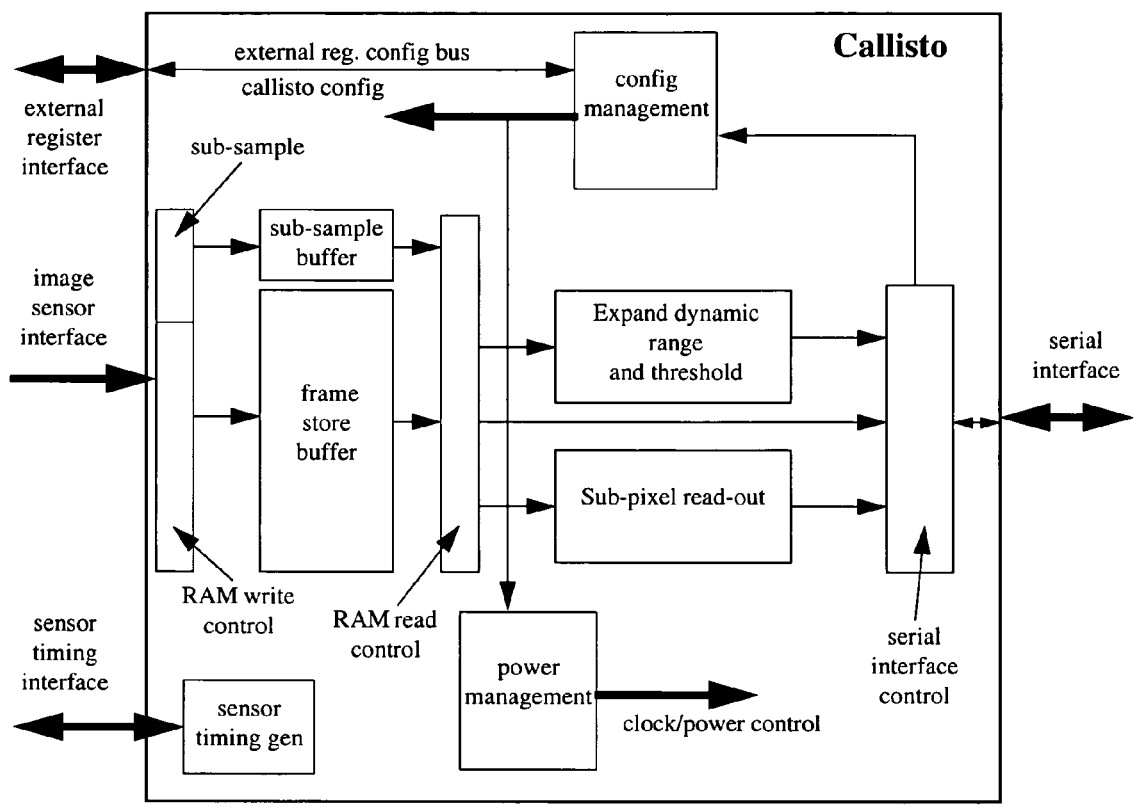

The timing diagram of the signals during the normal operation is shown in FIG. 41. The input will be presented in two phases of the clock. In the first phase, when clock is high, the input is sampled. Typically during this phase the inputs carry the offsets from the previous circuit, and therefore they are almost the same. In the second phase of the operation, when clock is low, the input is sampled again. This time the inputs carry the actual signal values. Notice that the inputs do not necessarily need to be differential.

The output will be generated four clock cycles later. The latency between the time that Reset(x) has been introduced to the time that the output can be safely read is five and a half clock cycles. Notice that as this ADC is pipelined, it does not have any end-of-conversion indicator.

Sleep Mode

In sleep mode, the enable input is set to low. In this mode all blocks will be disabled.

Calibration Modes

Notice that the calibration modes are not controlled by the ADC, and as such any design that uses this ADC shall implement the relevant control logic to perform any of the desired calibration techniques.

Digital Offset Calibration

In order to perform digital offset calibration the following steps should be taken
1. Enable input is set to high
2. test[6:1] is set to "000000"
3. disable[6:1] is set to "100000"
4. Clock is running up to a maximum frequency of 20 MHz
5. The inp and inn inputs of the PGA should be constant
6. During the first 8 clock cycles no operation is performed
7. For the next 64 clock cycles the digital outputs are added together
8. The final output is then averaged, by a right shift operation by 6 bits.
9. The resulting value can be stored and subtracted from subsequent ADC output during normal operation.

Analog Offset Calibration

In order to perform analog offset calibration the following steps should be taken:
1. Enable input is set to high
2. test[6:1] is set to "000000"
3. disable[6:1] is set to "000000"
4. Clock is running up to a maximum frequency of 20 MHz
5. The inp and inn inputs of the PGA should be constant.
6. During the first 8 clock cycles no operation is performed 7. For the next 64 clock cycles the digital outputs are added together
8. If the result is not zero then the an appropriate input is applied to the "inp2" and "inn2" offset inputs of the PGA. For this purpose a DAC is required, which should be provided by the calibration control mechanism.
9. The steps are repeated until the digital output is zero.
10. The resulting value can be stored and applied to the "inp2" and "inn2" input of the PGA during the normal operation.

Digital Multistage Gain and Offset Calibration

In order to perform digital offset calibration the following steps should be taken:
1. Enable input is set to high
2. The PGA gain is set to "0000", and the differential inputs to the PGA shall remain constant during the calibration process.
3. Clock is running up to a maximum frequency of 20 MHz
4. test[6:1] is set to "000000"
5. disable[6:1] is set to "111111"
6. During the first 8 clock cycles no operation is performed
7. For the next 64 clock cycles the digital outputs are accumulated and stored. This value represents the offset value.
8. test[6:1] is set to "000001".
9. During the first 8 clock cycles no operation is performed.
10. For the next 64 clock cycles the digital outputs are accumulated and stored. Subsequently the offset value measured in Step 7 is subtracted from this. The gain error is then calculated from the resulting value.
11. Step 4 to Step 10 are repeated for the next bit slices, while the values of test and disable are shifted by one bit.

The gain and offset values will be used during the normal operation to digitally correct the output code from the ADC.

Section E—Callisto Image Processor

Callisto is an image processor designed to interface directly to a monochrome image sensor via a parallel data interface, optionally perform some image processing and pass captured images to an external device via a serial data interface.

Features

Parallel interface to image sensor;
Frame store buffer to decouple parallel image sensor interface and external serial interface;
Double buffering of frame store data to eliminate buffer loading overhead;
Low pass filtering and sub-sampling of captured image;
Local dynamic range expansion of sub-sampled image;
Thresholding of the sub-sampled, range-expanded image;
Read-out of pixels within a defined region of the captured image, for both processed and unprocessed images;
Calculation of sub-pixel values;
Configurable image sensor timing interface;
Configurable image sensor size;
Configurable image sensor window;
Power management: auto sleep and wakeup modes;
External serial interface for image output and device management;
External register interface for register management on external devices.

Environment

Callisto interfaces to both an image sensor, via a parallel interface, and to an external device, such as a microprocessor, via a serial data interface. Captured image data is passed to Callisto across the parallel data interface from the image sensor. Processed image data is passed to the external device via the serial interface. Callisto's registers are also set via the external serial interface.

Function

Black-Box Description

The Callisto image processing core accepts image data from an image sensor and passes that data, either processed or unprocessed, to an external device using a serial data interface. The rate at which data is passed to that external device is decoupled from whatever data read-out rates are imposed by the image sensor.

The image sensor data rate and the image data rate over the serial interface are decoupled by using an internal RAM-based frame store. Image data from the sensor is written into the frame store at a rate to satisfy image sensor read-out requirements. Once in the frame store, data can be read out and transmitted over the serial interface at whatever rate is required by the device at the other end of that interface.

Callisto can optionally perform some image processing on the image stored in its frame store, as dictated by user configuration. The user may choose to bypass image processing and obtain access to the unprocessed image. Sub-sampled images are stored in a buffer but fully processed images are not persistently stored in Callisto; fully processed images are immediately transmitted across the serial interface. Callisto provides several image process related functions:

Sub-sampling;
Local dynamic range expansion;
Thresholding;
Calculation of sub-pixel values;
Read-out of a defined rectangle from the processed and unprocessed image.

Sub-sampling, local dynamic range expansion and thresholding are typically used in conjunction, with dynamic range expansion performed on sub-sampled images, and thresholding performed on sub-sampled, range-expanded images. Dynamic range expansion and thresholding are performed together, as a single operation, and can only be performed on sub-sampled images. Sub-sampling, however, may be performed without dynamic range expansion and thresholding. Retrieval of sub-pixel values and image region read-out are standalone functions.

The details of these functions are provided below.

Functions

Image Coordinate System

Figure 43:
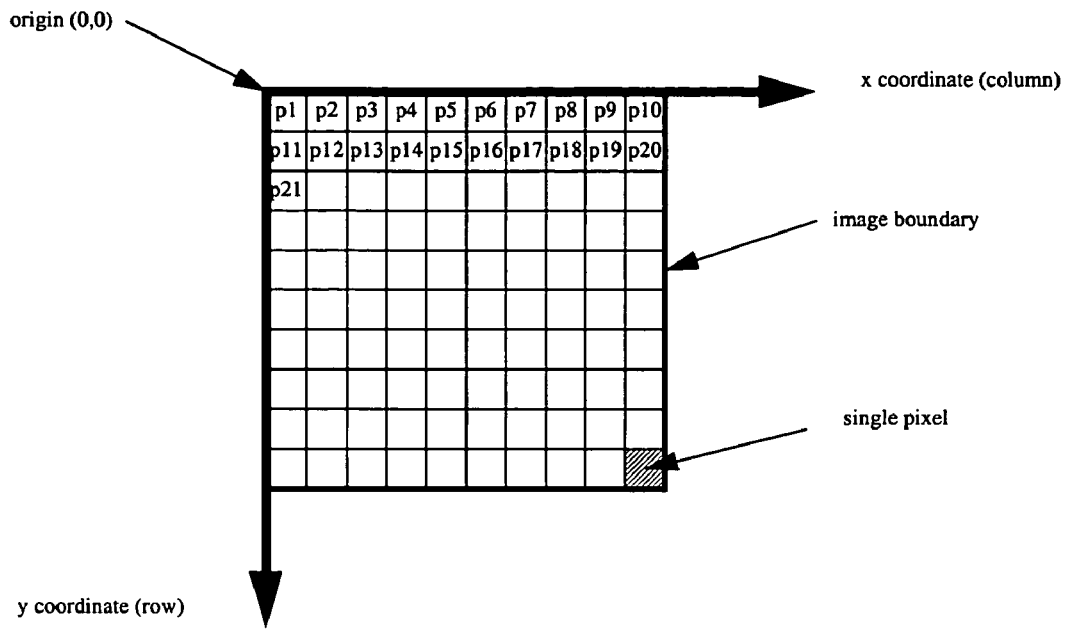

This document refers to pixel locations within an image using an x-y coordinate system where the x coordinate increases from left to right across the image, and the y coordinate increases down the image from top to bottom. It is also common to refer to pixel locations using row and column numbers. Using the x-y coordinate system used in this document, a pixel's row location refers to its y coordinate, and a pixel's column location refers to its x coordinate. The origin (0,0) of the x-y coordinate system used is located at the top left corner of the image. See FIG. 43. Pixel coordinates define the centre of a pixel.

The term "raster order" is also used in this document and refers to an ordering of pixels beginning at the top left corner of the image, moving left to right, and top to bottom. Callisto assumes that pixels from the image sensor are received in this order: pixel at location (0,0) is received first, then the next pixel to the right, continuing across the line. All lines are processed in this order from top to bottom. This assumption means that there is no coordinate translation between input and output. According to the example shown in FIG. 43, raster order would be p1, p2, p3, p4, p5, p6, p7, p8, p9, p10, p11, p12, p13, p14, p15, p16, p17, p18, p19, p20, p21, etc. . . .

All image coordinates are relative to the image sensor window and not the image sensor itself.

Image Sub-sampling

The captured image is sub-sampled by passing a 3×3 window over the entire image. The "motion" of the window over the image is simply left-to-right, top-to-bottom.

Figure 44:
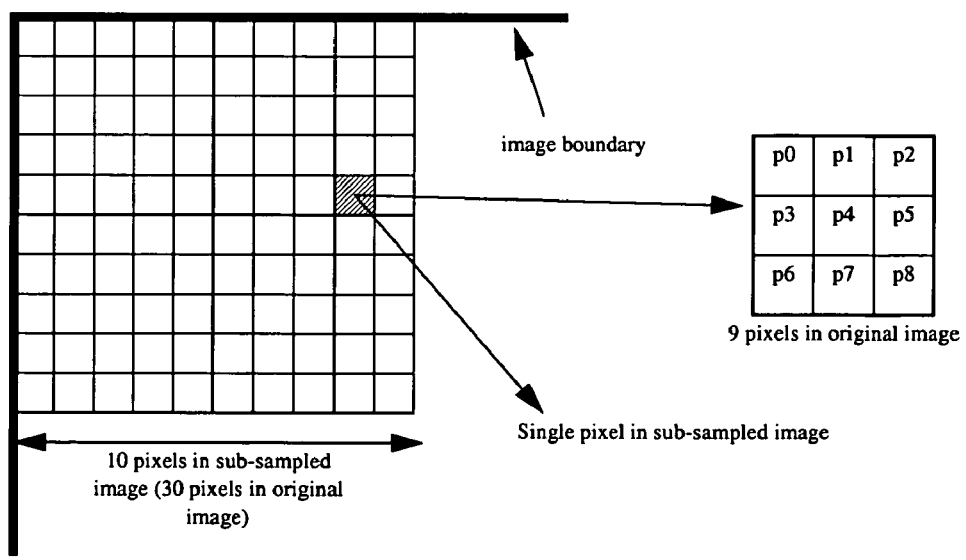

Each 3×3 window produces a single pixel in the output image, thus producing an image that has nine times fewer pixels than the original image (see FIG. 44). The nine pixels in the window are averaged to obtain the output pixel:

$$outputPixel=1/9*(p0+p1+p2+p3+p4+p5+p6+p7+p8);$$

The algorithm for producing the sub-sampled image is:

```
foreach 3×3 window loop
    outputPixel = 0;
    foreach pixel in the window loop
        outputPixel += pixel;
    end loop;
    write (1/9) * outputPixel;
end loop;
```

In the case where there is insufficient pixel data to form a complete 3×3 window, along the right and bottom edges of the original image if its width and height are not multiples of 3, then pixels along the edges of the image will be replicated to fill the 3×3 window.

Figure 45:
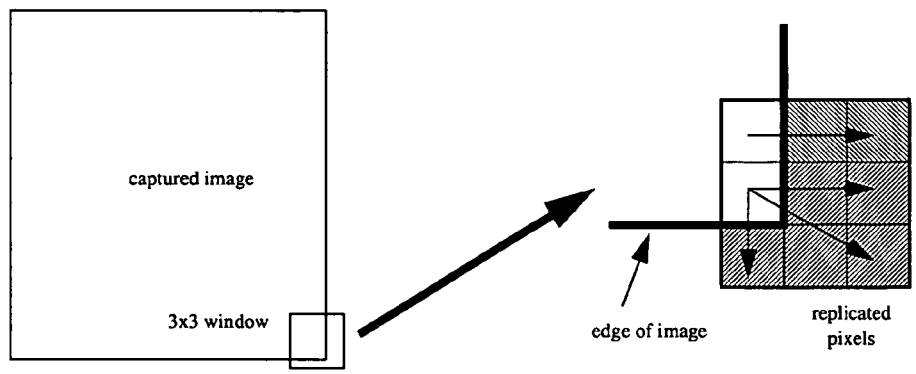

FIG. 45 shows how pixels are replicated during sub-sampling when the sub-sampling window goes beyond the edges of the image.

Local Dynamic Range Expansion

The local dynamic range expansion function is intended to be used to remove the effects of variation in illumination. In particular, it allows thresholding to be performed using a fixed threshold.

The general algorithm for dynamic range expansion is: for each pixel, a histogram of the pixels in a window of specified radius about the current pixel is constructed. Then the value which a specified fraction of the pixels in the window are less than is determined. This becomes the black level. The value which a specified fraction of the pixels are greater than is also determined, and this becomes the white level. Finally, the current pixel is mapped to a new value as follows: if its original value is less than the black level it is mapped to 0. If its value is greater than the white level it is mapped to 255. Values between black and white a mapped linearly into the range 0-255.

Figure 46:
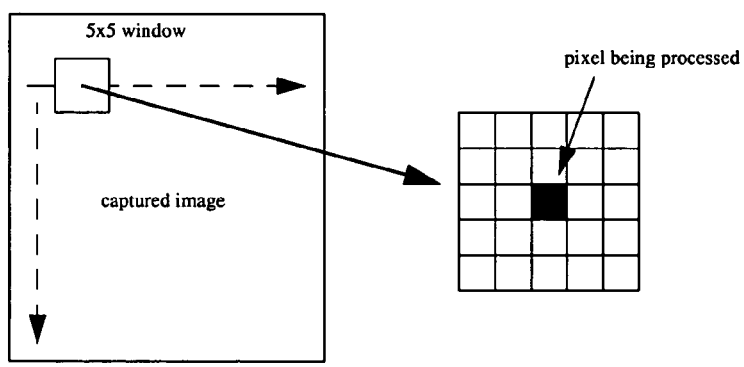
Figure 47:
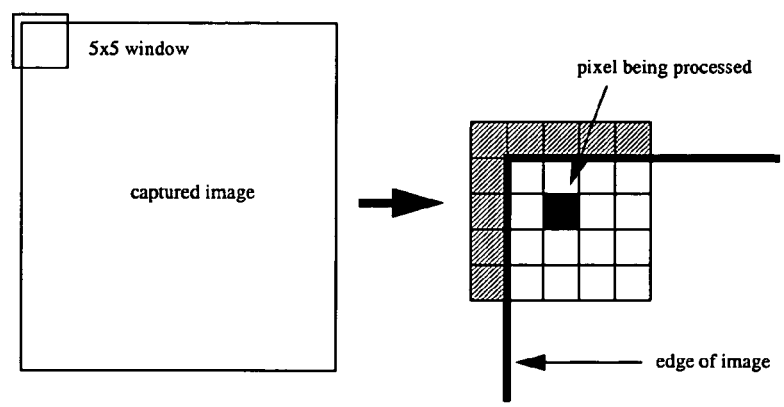

In Callisto, the radius of the window is fixed at 2, which approximates to a 5×5 rectangle. The fractions used are 2% for both the black and white levels. Since 2% of 25 (5*5 pixels) is 0.5, it suffices to determine the minimum and maximum pixel values in a window when determining black and white levels. Callisto's algorithm works by passing a 5×5 window over the image, with the pixel being processed situated in the centre of the image (see FIG. 46). When the pixel being processed is no closer that 2 pixels from the top or bottom, and 2 pixels from the left or right of the image, there are sufficient neighbouring pixels to construct a full 5×5 window. When this condition does not hold there are not enough pixels to construct a 5×5 window, and in this case dynamic range expansion is performed on the available pixels; in FIG. 47 there are only 16 of 25 pixels available in the window for the pixel being processed, so only these 16 are considered in calculating the dynamic-range-expanded value for the pixel being considered.

For each pixel being processed, a window around that pixel is constructed as described above. For all the pixels in that window, including the pixel being processed, both the minimum and maximum pixel values are recorded. The new pixel value is calculated by mapping linearly into the range 0 to 255 according to the max and min values in the current window. That is:

$$newPixelValue=255*(pixelValue-min)/(max-min)$$

Unless the max and min values are the same, in which case the new pixel value is set to 255. The algorithm described in pseudo code:

```
foreach pixel in image loop
    construct 5×5 window;
    min = 255;
    max = 0;
    foreach pixel in 5×5 window loop
        if pixel > max then
            max = pixel;
        end if;
        if pixel < min then
            min = pixel;
        end if;
    end loop;
    if max = min then
        pixel = 255;
    else
        pixel = 255*(pixel-min)/(max-min);
    end if;
end loop;
```

Thresholding

Thresholding is a simple function that converts an 8-bit pixel value into a 1-bit pixel value based on the comparison of the 8-bit pixel value with a pre-defined threshold value, stored in a Callisto register. This is the pseudo-code that describes the algorithm:

```
foreach pixel in image loop
    if pixel >= threshold then
        pixel = 1;
    else
        pixel = 0;
    end if;
end loop;
```

Combining Thresholding and Dynamic Range Expansion

Let's assume that t is the threshold value, and that v is the pixel value being dynamic-range-expanded, and that a is the dynamic-range-expanded pixel value. Thresholding requires the following comparison:

$$a>=t$$

Substituting the dynamic range expansion equation yields:

$$255*(v-min)/(max-min)>=t$$

And by re-arranging:

$$255*(v-min)>=t*(max-min)$$

$$v-min>=(t/255)*(max-min)$$

$$v>=((t/255)*(max-min))+min$$

By combining dynamic range expansion and thresholding a complicated divide (a divide by max-min) is replaced with a simple constant divide. The divide may be eliminated altogether by requiring the user to specify t/255 rather than just t. This equation holds true when min=max.

Sub-pixel Read

Sub-pixel read allows the user to ascertain the grey level value at an arbitrary location which lies between pixels in the captured image, i.e sub-pixels.

Figure 48:
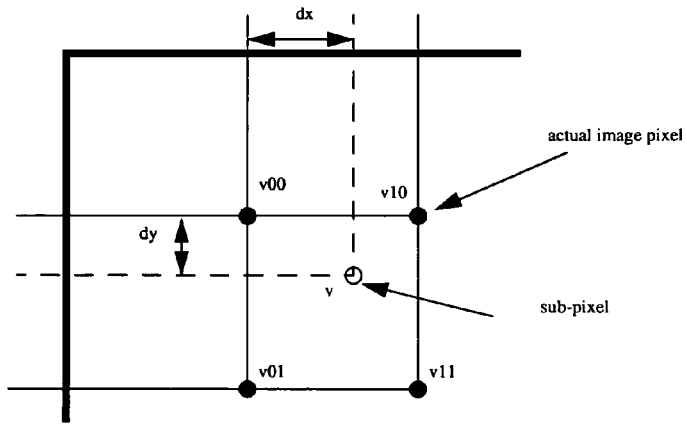

FIG. 48 shows the location of the desired sub-pixel with respect to actual image pixels. Sub-pixel coordinates are expressed as 8.4 fixed point values. The values dx and dy in FIG. 48 simply refer to the fractional portion of the sub-pixel coordinates. The grey scale value v for the pixel shown, which lies between pixels v00, v10, v01, v11 is calculated as follows:

$$v0=v00+dx*(v10-v00);$$

$$v1=v01+dx*(v11-v01);$$

$$v=v0+dy*(v1-v0);$$

To reduce the interrupt processing overhead on the processor, Callisto supports calculating many sub-pixel values in a single command. When Callisto begins a sub-pixel read operation it is told how many sub-pixel values to calculate, placing all the interpolated pixel values into a single message on the serial interface back to the processor.

Unprocessed Image Region Read Function

The image region read function of Callisto allows the user to read all the pixel values out of a defined rectangular region of the unprocessed image in a single operation. The region size and location may be arbitrarily set. Image data is returned in raster order.

The unprocessed image read function operates on the data in the image frame store, i.e the unprocessed image. Because the image region to be read may be at an arbitrary location, and of arbitrary size, it is possible to define a region that exactly fits the image. That is, using this function it is possible to read back the entire image in the frame store, unprocessed, thus providing a bypass path of the image processing functions. It would also be possible to read the entire image in various ways using this function:

A set of tiles;
A set of bands;
Line by line;
etc.

Processed Image Region Read Functions

Like the unprocessed image read, the processed image, or a part of it, may be read by the user. Image data is returned in raster order.

The user may specify what part of the processed image they want to read by defining a rectangular region. The coordinates used to specify this region lie in the processed image so that the region defined is aligned to a 3×3 boundary in the unprocessed image. The user has two choices as to the type of image processing to be performed. Either:

Sub-sample only; or
Sub-sample+expand dynamic range+threshold.

Out of Image Bounds

For image region read functions Callisto allows the user to arbitrarily specify the position and size of the region independently of the size of the image. This creates the possibility that the some or all of the specified region may lie outside of the image. Callisto does not perform any bounds checking in this regard. If the user does specify a region where all or parts of it lie outside the region, pixel values returned for those parts of the regions outside the image will have undefined values.

There are no side effects or consequences of specifying regions that are not wholly within an image other than that the pixel values returned cannot be predicted.

Direct Writing to Frame Store Buffer

Callisto writes valid pixel data on the image sensor interface to the frame store buffer; this data normally comes from an image sensor. Callisto provides a mode of operation which allows the user to directly write pixel data into the frame store buffer by sending Callisto a "write to frame store" message. By putting Callisto into the appropriate mode—setting the FrameWrite bit in the configuration register—the user is able to write data, four pixels at a time, directly into the frame store buffer by sending Callisto a FrameStoreWrite message. For the first write of a frame the user must set the S bit in the message to '1'. Once a message is sent the user must wait for a FrameStoreWriteAcknowledge message before sending the next FrameStoreWrite message.

Callisto uses the ImageSensorWindow setting to determine when a complete frame has been written into the frame store buffer.

Serial Interface

The serial interface to Callisto is used for several purposes:
Processor issuing Callisto commands.
Processor issuing register access commands (read and write).
Callisto returning register data as a result of a register read command.
Callisto returning image data.
Error signalling and recovery.
High level image sensor frame synchronisation.
Frame store write.

Message Types and Formats

There are six Callisto message types, as set out in the following table:

| Message Type | Message Type Code | Message Source | Comment |
|---|---|---|---|
| Register access | b'000 | Processor | Used to access Callisto's registers. Can either specify a read or a write. |
| Callisto command | b'001 | Processor | Used to tell Callisto to perform an image processing function. Can be either: Unprocessed image region read Processed image region read Sub-sampled image region read Sub-pixel read |
| Register data | b'010 | Callisto | Message containing the data requested by a register read request from the Processor. |
| Command data | b'011 | Callisto | Message containing data produced as a result of executing a command. |
| Frame synchronisation | b'100 | Processor & Callisto | Messages used for high level software frame processing synchronisation. |

-continued

| Message Type | Message Type Code | Message Source | Comment |
|---|---|---|---|
| Frame store write | b'101 | Processor | Allows the user to write data directly into the frame store buffer via the serial interface. |
| Frame store write acknowledge | b'110 | Callisto | Acknowledges the frame store write message indicating to the user that another frame store write message may be issued. |

All messages consist of a constant message marker byte, common to all messages (used for message synchronisation), followed by a control byte, specific to each message type, followed by a varying number of data byes depending on the message type. The message marker byte is set at 0x7E.

Note that all unused bits in the control byte should always be set to '0'.

Figure 49:
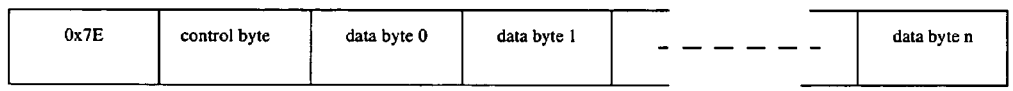

FIG. 49 shows the general format for Callisto messages.

The following table shows a summary of the control byte arrangements for each of the message type:

| Message Type | Control Byte |||||||| 
|---|---|---|---|---|---|---|---|---|
| | Bit 7 | Bit 6 | Bit 5 | Bit 4 | Bit 3 | Bit 2 | Bit 1 | Bit 0 |
| Register access | b'0 | E | W | N1 | N0 | T2 | T1 | T0 |
| Callisto command | b'0 | b'0 | P | C1 | C0 | T2 | T1 | T0 |
| Register data | b'0 | E | I | N1 | N0 | T2 | T1 | T0 |
| Command data | b'0 | b'0 | I | C1 | C0 | T2 | T1 | T0 |
| Frame synchronisation | b'0 | b'0 | b'0 | S1 | S0 | T2 | T1 | T0 |
| Frame store write | b'0 | b'0 | b'0 | b'0 | S | T2 | T1 | T0 |
| Frame store write acknowledge | b'0 | b'0 | I | b'0 | ER | T2 | T1 | T0 |

The following table shows control byte field descriptions:

| Field | Description |
|---|---|
| T[2:0] | Message Type<br>b'000 - Register Access<br>b'001 - Callisto Command<br>b'010 - Register Data<br>b'011 - Command Data<br>b'100 - Frame Synchronisation<br>b'101 - Frame Store Write<br>b'110 - Frame Store Write Acknowledge |
| C[1:0] | Command Type<br>b'00 - Unprocessed Image Read<br>b'01 - Sub-pixel Read<br>b'10 - Sub-sampled Image Read<br>b'11 - Processed Image Read |

-continued

| Field | Description |
|---|---|
| N[1:0] | Number of Bytes<br>Defines the number of data bytes (minus one) contained in the message:<br>b'00 - 1 byte<br>b'01 - 2 bytes<br>b'10 - 3 bytes<br>b'11 - 4 bytes<br>b'00 - For a register read |
| E | External<br>Used to indicate that a register access command is for an external device connected to Callisto's external register bus. |
| W | Write<br>When set to '1' in a register access message, indicates a register write. |
| P | Parameters<br>When set to '1' indicates that a Callisto Command message contains command parameters also. |
| I | Interrupt<br>When set to '1' in a message from Callisto, indicates that the state of one of the COR bits in the status register has changed. |
| S[1:0] | Synchronisation Message Type<br>b'00 - Ready For New Frame (from processor)<br>b'01 - Finished Frame Processing (from processor)<br>b'10 - Received New Frame (from Callisto) |
| S | Start Of Frame<br>In a Frame Store Write message indicates first write of a frame. |
| ER | Frame Store Write Error<br>In a Frame Store Write Acknowledge message indicates that the previous Frame Store Write could not be performed because the FrameWrite bit in the configuration register was not set. |

Callisto Interrupts

All messages from Callisto contain an interrupt (I) bit in the control byte to indicate that the state of one of the COR (clear on read) bits in the status register has been set and that the user should examine the status register. Once this condition has occurred and Callisto has set an I bit in a message, it will continue to set the I bit in subsequent messages until the status register has been read.

Register Access Message Type

Figure 50:
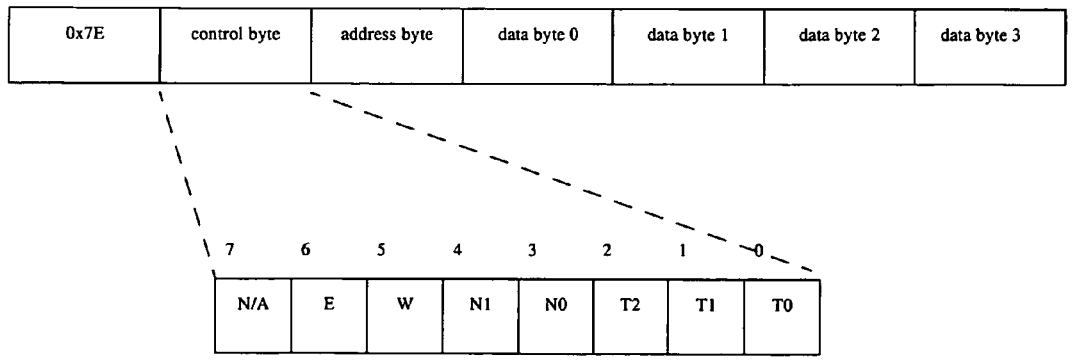

Callisto's registers are accessed by messages sent to it on its serial interface. The message consists of a control byte, an address byte and 0 to 4 data bytes. FIG. 50 shows the format of register access messages. For registers whose width is greater than a single byte, least significant bytes will appear in the message first. Using the example message in FIG. 50 as an example of writing to a 32 bit register, data byte 0 would be written to bits 7:0 of the register, data byte 1 to bits 15:8, data byte 2 to bits 23:16 and data byte 3 to bits 31:24.

The following table shows the the control byte format for register access messages:

| Field | Bits | Width | Description |
|---|---|---|---|
| T[2:0] | 2:0 | 3 | Type. Type of message. Set to "000" for register access. |
| N[1:0] | 4:3 | 2 | Number Write Bytes. Indicates the number of bytes of data to be written during a register write, less one, where "00" indicates 1 byte and "11" indicates 4 bytes. Set to "00" for read. |

| Field | Bits | Width | Description |
|---|---|---|---|
| W | 5 | 1 | Write. If this bit is set to '1' indicates a register write. Setting to '0' indicates a read. |
| E | 6 | 1 | External. If set to '1' indicates the register operation is for an external device, otherwise a Callisto register access. |
| N/A | 7 | 1 | Not Used. Should be set to '0'. |

Callisto Command Message Type

Figure 51:
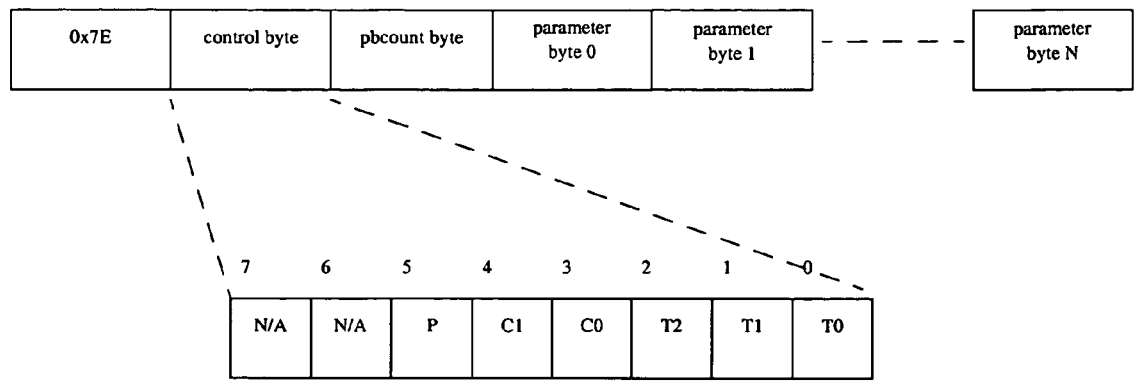

The user asks Callisto to perform its tasks by sending it messages which specify which operation to perform. These command messages consist of a control byte, followed by zero or one parameter byte-count bytes (pbcount), followed by a number of parameter bytes as specified by pbcount, or as implied by the command type. FIG. 51 shows the format for the command message. pbcount is set to the number of parameter bytes less one, so a value of zero signifies that there will be one parameter byte.

The following table shows the control byte format for Callisto command messages:

| Field | Bits | Width | Description |
|---|---|---|---|
| T[2:0] | 2:0 | 3 | Type. Type of message. Set to "001" for Callisto command. |
| C[1:0] | 4:3 | 2 | Command Type. Specifies the type command:<br>"00" Unprocessed image read<br>"01" Sub-pixel read<br>"10" Sub-sampled image read<br>"11" Processed image read |
| P | 5 | 1 | Parameter. When set to '1' indicates that this command has its parameters included in the message. Otherwise use parameters defined by Callisto register settings. |
| N/A | 7:6 | 2 | Not Used. Should be set to "00". |

Number of pbcount bytes per command:

| Command Type | Number of pbcount bytes |
|---|---|
| Unprocessed image read | 0 |
| Processed image read | 0 |
| Sub-sampled image read | 0 |
| Sub-pixel read | 1 |

Register Data Message Type

Figure 52:
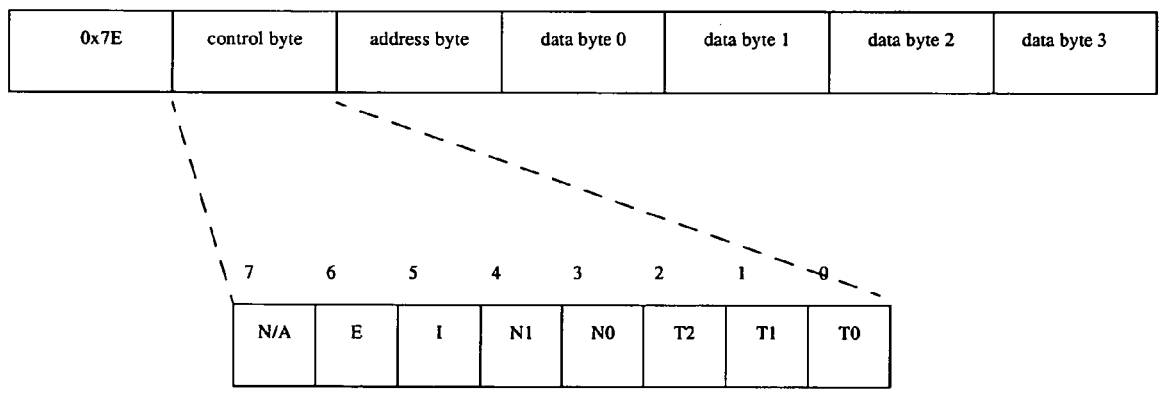

These messages are sent from Callisto back to the processor, as a result of a register read message being received by Callisto. The message consists of a control byte, a register address byte and up to four bytes of data. See FIG. 52. Using the example message in FIG. 52 as an example of reading from a 32 bit register, data byte 0 would be taken from bits 7:0 of the register, data byte 1 from bits 15:8, data byte 2 from bits 23:16 and data byte 3 from bits 31:24.

The following table shows the control byte format for register data messages:

| Field | Bits | Width | Description |
|---|---|---|---|
| T[2:0] | 2:0 | 3 | Type. Type of message. Set to "010" for register data. |
| N[1:0] | 4:3 | 2 | Number Data Bytes. Indicates the number of bytes of data, less one, where "00" means 1 byte and "11" means 4 bytes. |
| I | 5 | 1 | Interrupt. Indicates that some event has occurred which has changed the status register. An indicator that software should examine the status register contents. |
| E | 6 | 1 | External. If set to '1' indicates the original register read for an external device, otherwise a Callisto register access and set to '0'. |
| N/A | 7 | 1 | Not Used. Should be set to '0'. |

Command Data Message Type

Figure 53:
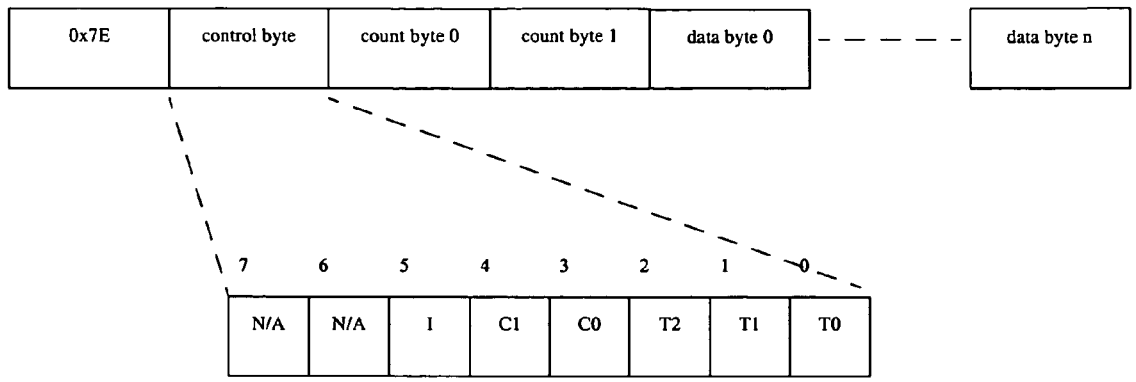

I. These messages return data back to the processor as a result of processing a command. The message comprises a control byte, two data count bytes, followed by a number of data bytes as specified by the data count bytes. See FIG. 53. The data count bytes specify how many bytes of data are in the message, less one, so that a value of 0x0000 means that the message contains a single byte of data. Count byte 0 is the least significant byte of the two bytes.

II.

III. The following table shows the control byte format for command data messages:

IV.

| Field | Bits | Width | Description |
|---|---|---|---|
| T[2:0] | 2:0 | 3 | Type. Type of message. Set to "011" for image data message. |
| C[1:0] | 4:3 | 2 | Command Type. Specifies the type command for which this is the data being returned:<br>"00" Unprocessed image read<br>"01" Sub-pixel read<br>"10" Sub-sampled image read<br>"11" Processed Image Read |
| I | 5 | 1 | Interrupt. Indicates that some event has occurred which has changed the status register. An indicator that software should examine the status register contents. |
| N/A | 7:6 | 2 | Not used. Should be set to "00". |

The command type field C indicates the type of command that was executed to produce the result data in the image data message. The interrupt I field indicates that some event has occurred during processing and that the contents of the status register should be examined.

Format of Command Data

Data returned in command data messages is always pixel data, i.e. pixel values. In the case of image region read commands, that pixel data is returned in raster order. In the case of the sub-pixel read command the pixels are returned in the order in which their corresponding coordinates were supplied. Except for the processed image region read command, all pixel data is 8 bit. In the case of the processed image region read command the pixel data returned is 1 bit and padded so that start of lines occur on byte boundaries.

Figure 54:
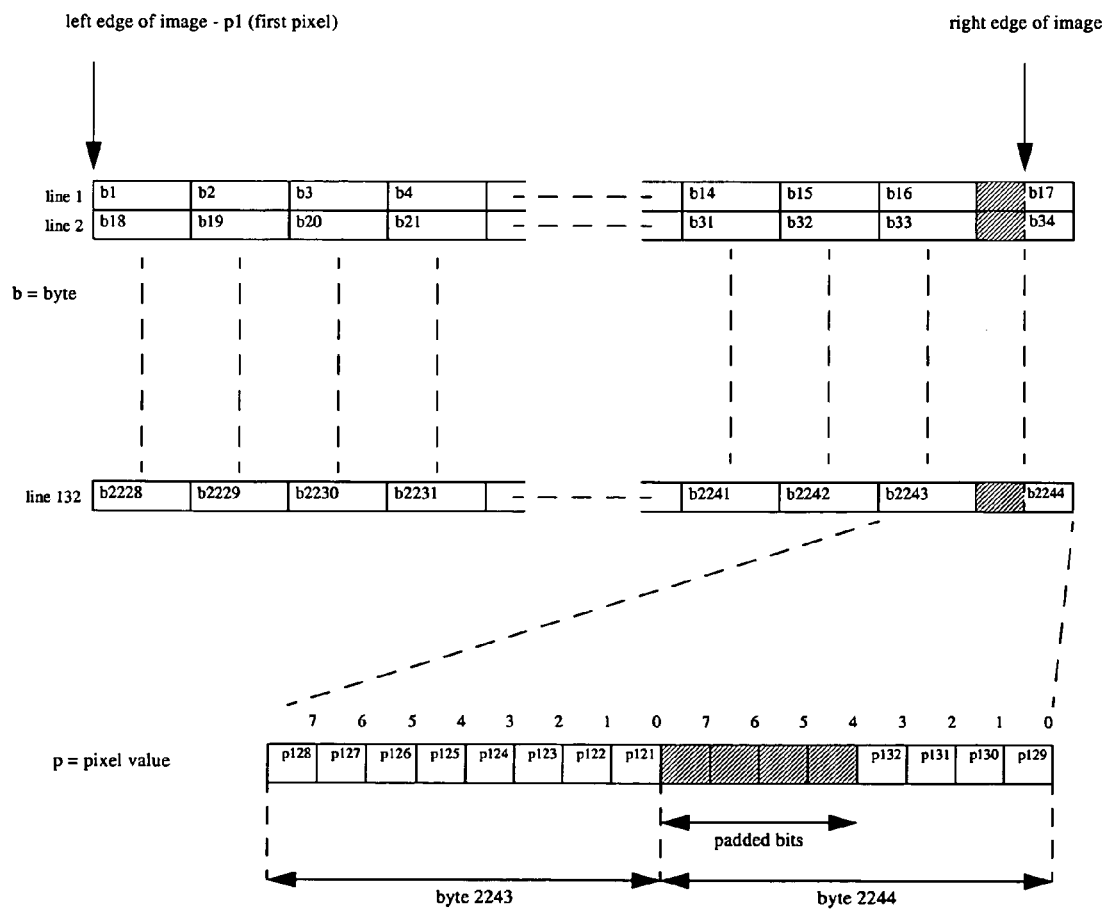
Figure 55:
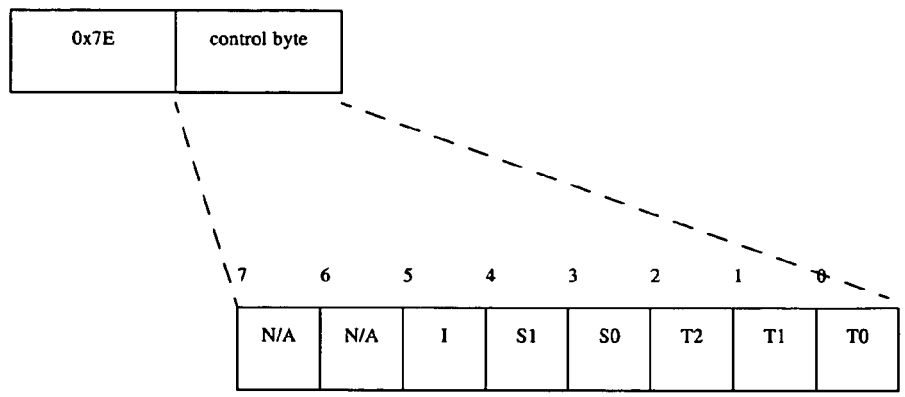
Figure 56:
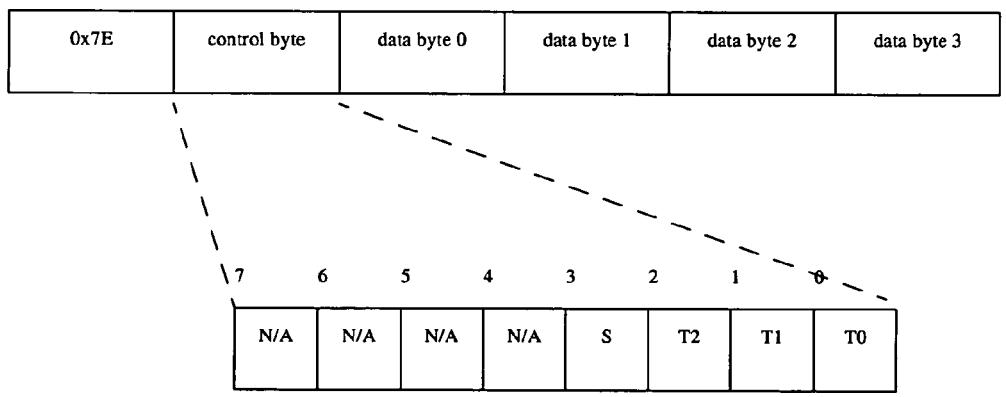
Figure 57:
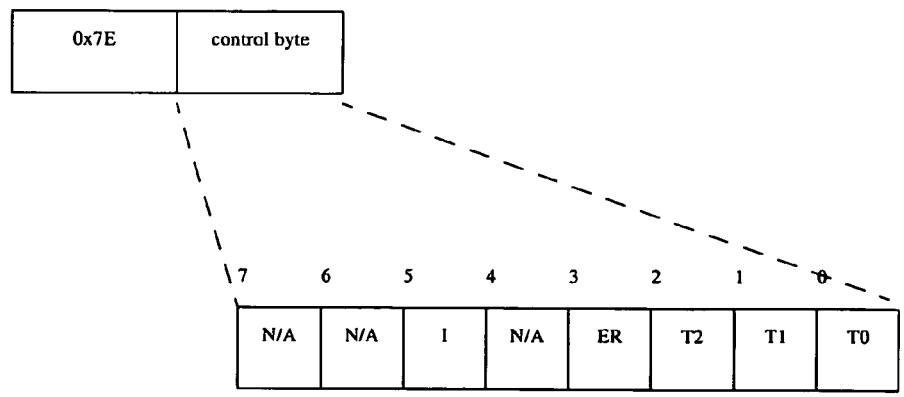

The pixel values returned as a result of executing a processed image read command are single bit values. These values are packed into bytes so that each byte contains 8 pixel values. Image line boundaries always correspond to byte boundaries, and in the case where the image width is not a multiple of 8, the last byte of a line will be padded with a defined bit value so that the next line begins on a byte boundary. The value of the padding bit is defined in the Callisto configuration register. FIG. 54 shows how single bit pixel values are packed for an image that is 132×132 pixels wide. 132 bits requires 16 full bytes, and 4 bits of a 17th byte. The diagram shows that the full image requires 2244 bytes and that each of the 132 lines consists of 17 bytes. Pixels are packed in raster order using the least significant bit first.

Frame Synchronisation Message Type

These messages are intended to be used for software frame processing synchronisation. There are three different forms of this message, as shown in the following table:

| Frame Sync Message Type | Frame Sync Type Code | Message Source | Comment |
| --- | --- | --- | --- |
| Ready for new frame | b'00 | Processor | Indicates to Callisto that the processor is ready to process a new frame. Callisto will send a "received new frame" message in response. |
| Finished frame processing | b'01 | Processor | Indicates to Callisto that the processor has finished processing the current frame when the current command has finished execution. This unlocks the frame buffer and allows new image sensor frames to be written. |
| Received new frame | b'10 | Callisto | This is the response to the "ready for new frame" message and indicates that Callisto has a new frame ready for processing. |

Frame sync message - control byte format

| Field | Bits | Width | Description |
| --- | --- | --- | --- |
| T[2:0] | 2:0 | 3 | Type. Type of message. Set to "100" for frame sync message. |
| S[1:0] | 4:3 | 2 | Frame Sync Type. Indicates the type of frame sync message:<br>"00" - Ready for new frame<br>"01" - Finished frame processing<br>"10" - Received new frame |
| I | 5 | 1 | Interrupt. Indicates that some event has occurred which has changed the status register. An indicator that software should examine the status register contents. This bit only appears in messages from Callisto. i.e. when Frame Sync Type is "10". |
| N/A | 7:6 | 2 | Not used. Should be set to "00". |

Frame Store Write Message Type

This message type enables the user to write pixel data directly into the frame store buffer. To be able to perform this function the 'WriteFrame' bit in the configuration register must be set first. This message consists of the 0x7E byte, a control byte and four bytes of pixel data, supplied in raster order.

Frame store write message - control byte format

| Field | Bits | Width | Description |
| --- | --- | --- | --- |
| T[2:0] | 2:0 | 3 | Type. Type of message. Set to "101" for frame store writes. |
| S | 3 | 1 | Start of Frame. Setting this bit indicates that the message contains the first byte of a new frame. |
| N/A | 7:4 | 4 | Not Used. Set to b'000. |

Frame Store Write Acknowledge Message Type

This message acknowledges a frame store write message, notifying the user that another frame store write message may be issued. The message consists of a 0x7E byte and a control byte.

Frame store write message - control byte format

| Field | Bits | Width | Description |
| --- | --- | --- | --- |
| T[2:0] | 2:0 | 3 | Type. Type of message. Set to "110" for frame store writes. |
| ER | 3 | 1 | Error. This bit is set by Callisto when a FrameStoreWrite message was received but the configuration register bit WriteFrame was not set. |
| N/A | 4 | 1 | Not Used. Set to b'0. |
| I | 5 | 1 | Interrupt. indicates that some event has occurred which has changed the status register. An indicator that software should examine the status register contents. |
| N/A | 7:6 | 2 | Not Used. Set to b'00. |

13. Callisto Commands

Callisto is able to perform four operations: unprocessed image read, processed image read, sub-sampled image read and sub-pixel read.

Commands are issued to Callisto by sending it command messages. Arguments or parameters for commands may be specified in one of two ways. The first is to set command-specific settings in the appropriate register, as defined in the "Operation" chapter. The second method is to supply the parameters with the command itself. In this case a slightly different form of the command is used to indicate to Callisto that it should use parameters supplied with the command and not from a register setting.

Telling Callisto to use arguments supplied with the command rather than those specified in its registers is done by setting the P bit in the command message control byte to '1'. Overlapping command execution with command transmission is not supported; while Callisto is busy executing a command it cannot receive any new commands. The user should be careful not to issue a new command until the previous command has finished execution, indicated by the processor receiving the corresponding command data message. If commands are received while Callisto is busy executing a command it will enter an error state and indicate this to the processor via the serial interface. See Section for details.

The following sections describe the individual commands and how to construct the command message to perform them.

Unprocessed Image Read

This command tells Callisto to return all of the pixel data within a defined region of the unprocessed image. This command doesn't require any parameter count bytes following the control byte as it has a fixed number of arguments. This command expects two arguments (expressed as two bytes): TopLeftX, TopLeftY. An example message for this command is shown in FIG. 58.

The actual execution of this command relies on an additional two parameters: SizeX and SizeY. These two parameters must be specified in the appropriate register. Note that this command always expects two arguments, and it is illegal not to have the P bit set.

Different forms of unprocessed image read command:

| Has Parameters | Control Byte Value | Comments |
| --- | --- | --- |
| No | b'00000001 | Illegal form of this command. P bit must always be set and arguments supplied. |
| Yes | b'00100001 | Valid form of this command. |

Processed Image Read

This command tells Callisto to return all the pixel values in the defined region of the processed image. This command requires four arguments (expressed in four bytes) if supplied: TopLeftX, TopLeftY, SizeX and SizeY. The size parameters are in processed image units, and TopLeftX and TopLeftY are expressed in processed image coordinates. This command returns pixel values from the processed image after sub-sampling, dynamic range expansion and thresholding, so all pixels are single bit values. FIGS. 59*a* and 59*b* show two example formats of this command.

Different forms of processed image read command

| Has Parameters | Control Byte Value | Comments |
| --- | --- | --- |
| No | b'00011001 | Size and TopLeft arguments taken from Callisto register. |
| Yes | b'00111001 | Size and TopLeft arguments supplied with command. |

Sub-sampled Image Read

Figures 60A, 60B, 61:
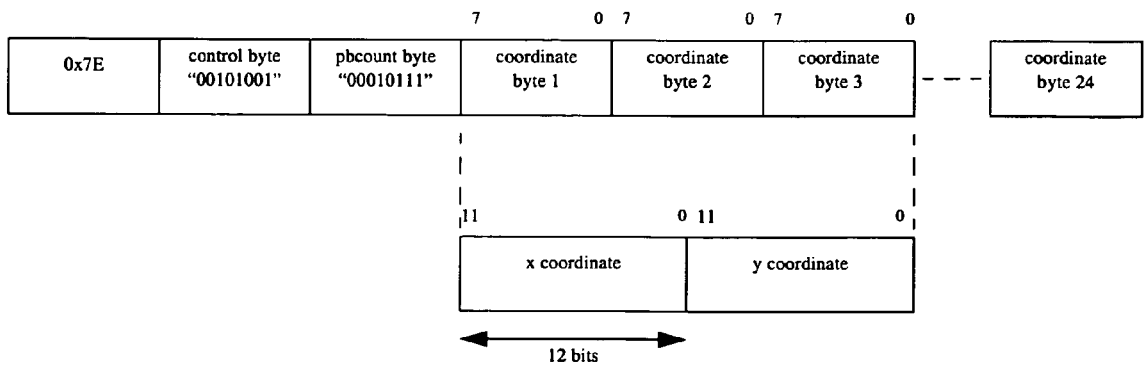

This command is identical to the processed image read command except that the processed image in this case has not had dynamic range expansion and thresholding performed. This means that the pixels returned are 8 bit values. Everything else about this command is the same. FIGS. 60*a* and 60*b* show two example formats for this command.

Different forms of sub-sampled image read command

| Has Parameters | Control Byte Value | Comments |
| --- | --- | --- |
| No | b'00010001 | Size and TopLeft arguments taken from Callisto register. |
| Yes | b'00110001 | Size and TopLeft arguments supplied with command. |

Sub-pixel Read

This command tells Callisto to calculate the sub-pixel values at the specified sub-pixel coordinates. This command has only one form and its arguments must always be supplied in the command message. This command has one pbcount byte following the control byte which indicates how many coordinate bytes are contained in the message. pbcount defines the number of coordinate bytes less one—i.e two (b'00000010) means 3 bytes—and must represent a number of bytes that is divisible by 3. FIG. 61 shows the format for a sub-pixel read command with 8 sub-pixel coordinates.

Different forms of sub-pixel read command

| Has Parameters | Control Byte Value | Comments |
| --- | --- | --- |
| No | b'00001001 | Illegal form of command. Must have arguments supplied. |
| Yes | b'00101001 | Valid form of command. |

Callisto Command Processing

The commands processed by Callisto are embedded in messages input using the serial interface. In normal circumstances Callisto processes commands immediately upon receipt using whatever image data is in its frame store buffer at the time. There are however some boundary conditions that cause Callisto to not follow this "normal" behaviour.

These conditions occur at frame boundaries.

Figure 62:
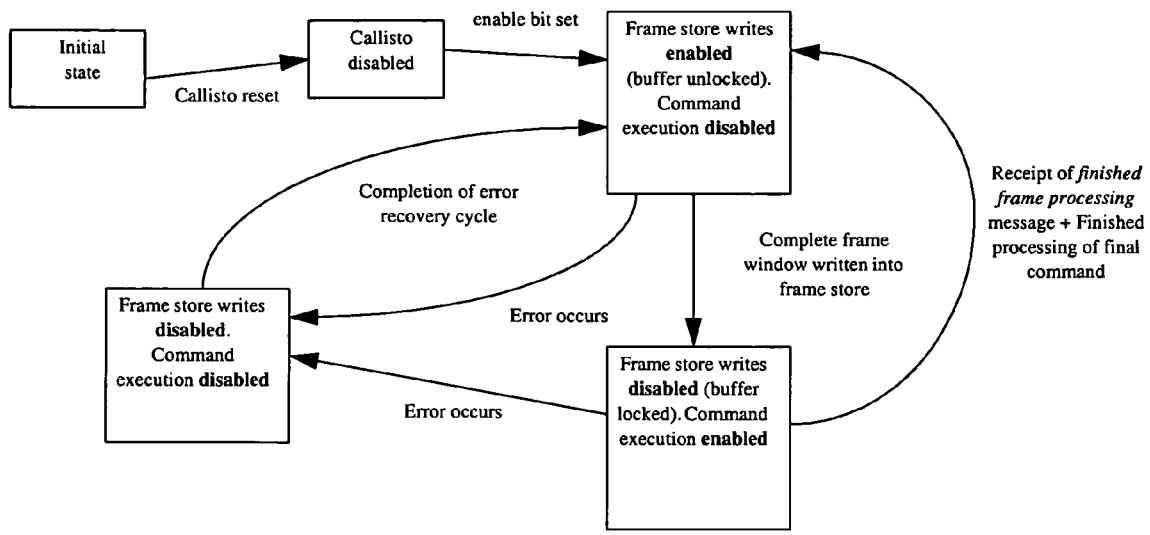

Initially, after reset, the frame store buffer will be empty, and Callisto will be disabled and will not process received commands. Once Callisto is enabled, and when the frame store buffer contains a complete frame, command execution begins and further writing to the frame store buffer is disabled. This condition continues until Callisto receives a finished frame processing message. This indicates that processing of the current frame has finished. At this point the frame store buffer is unlocked, and command execution locked until the next frame window is written into the buffer. FIG. 62 shows the state transitions and states for command execution and frame store writing.

Frame Store Buffer

Figure 63:
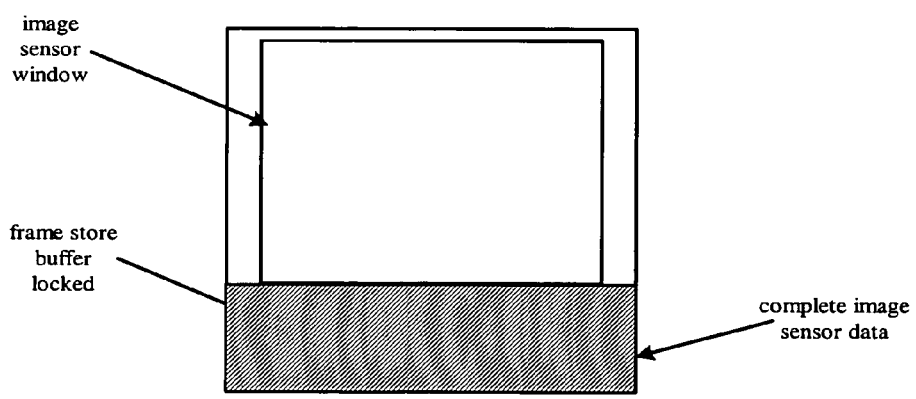

The frame store buffer is where image data from the sensor is stored while Callisto is performing image processing operations on that data. The frame store buffer is considered to be either "locked" or "unlocked". In its unlocked state, the frame store buffer is able to accept image data from the image sensor, while in its locked state it is not (see FIG. 62 above). The frame store buffer becomes locked when the currently defined sensor window is completely written into the buffer, and not when all the data from the image sensor has been received. FIG. 63 shows when the buffer is locked.

Issuing Callisto Requests

For requests that return data, i.e. Callisto commands, register reads and ready to receive a new frame, the processor may only have a single request outstanding at any one time; the processor must wait until it has received the data output of the current request before issuing a new request.

For requests that do not return any data, e.g. register writes, the processor does not have to wait and may issue these requests at whatever rate it wishes.

Callisto is unable to honour a command request if its frame store buffer is not full, as this will result in an image data underflow error. Callisto can process register access requests and frame synchronisation requests when the buffer is not full.

Command Execution Performance

Output Data Rates

For all commands except sub-pixel read, the output data as a result of executing a command is produced without interruption at the full serial interface rate. In the case of the sub-pixel read command, the sub-pixel values returned as a result of command execution is produced without interruption at one third the full serial interface rate. The reason for this is that the calculation of each sub-pixel byte value requires a three-byte coordinate value; Callisto must wait for the full coordinate to be received before it can calculate the single-byte result.

The exception to the above is the case of a processed image and sub-sampled image read commands when the regions used are small. In this case the output data rate falls below 100% of the full serial interface data rate. Table shows the output data rate for region widths less than 10 pixels, and heights less than 8 pixels. expressed as a percentage of the full serial data rate.

Data output rates for small region sizes

| Region Width | Region Height | Output Data Rate |
| --- | --- | --- |
| 0-9 | 8+ | 50%-60% |
| 10+ | 0-7 | 45%-50% |
| 0-9 | 0-7 | 20% |

Latency

The table below shows execution latencies for each command expressed in number of serial clock cycles. Latency times are measured from the receipt of the start bit for the first byte of the message that contains the command, to the transmission of the start bit for the first byte of the message that contains the command response.

Command latencies

| Command | Execution Latency |
| --- | --- |
| Image read (without parameters) | 30-40 clocks |
| Image read (with parameters) | 50-70 clocks |
| Register read | 30-40 clocks |
| Receive new frame | 25-30 clocks |

Error Detection and Recovery

Figure 64:
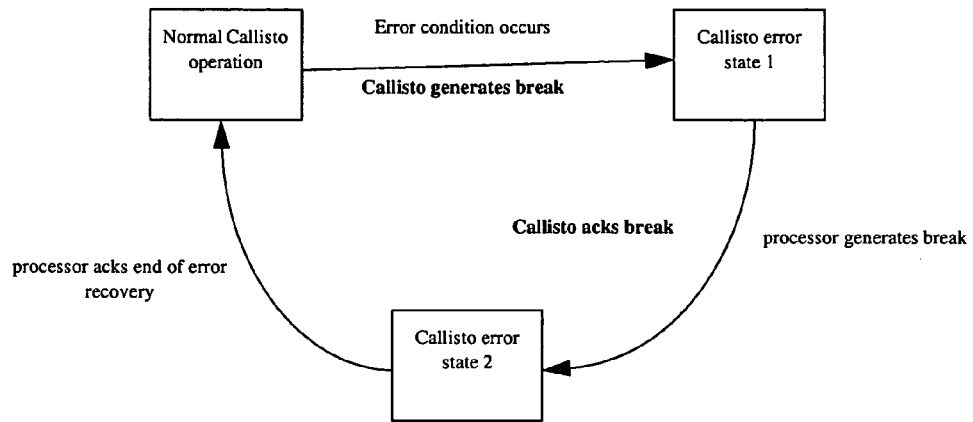

When Callisto is active, and executing commands, there are several events that it will consider to be errors. If any of these events occur, Callisto ceases command execution, initiate a break condition on the serial interface to indicate to the processor that an error has occurred, and will not be able to resume normal operation until the error recovery cycle is complete. FIG. 64 shows the error recovery cycle. The events that put Callisto into an error state are shown in the following table:

Callisto error conditions

| Error Condition | Comments |
| --- | --- |
| Message out of sync | This condition occurs when Callisto is no longer able to determine where messages begin and end. |
| Malformed message | When a Callisto command is malformed. An example of this may be when Callisto is expecting command arguments and none were supplied. Definition of malformed messages: 1. All messages: (a) illegal message type. 2. Register Access Messages: (a) a read access and num_write_bytes /= "00". (b) not_used field /= '0'. (c) illegal internal register address value. (d) illegal external register address value. (d) internal access, num_write_bytes inconsistent with address 3. Image Command Messages: (a) not_used field /= "00". (b) unprocessed read with P /= '1'. (c) subpixel read with P /= '1'. (d) subpixel read where (pbcount+1) not divisible by 3. 4. Frame Sync Messages: (a) illegal control byte type. (b) interrupt bit /= '0'. (c) not_used field /= "00". 5. Frame Store Write Messages: (a) not_used field /= "000" |
| Malformed byte | Occurs when a stop bit is not found in the correct position. |
| Command overflow | This condition occurs when Callisto is busy processing a message which produces a response and receives a new message requiring a response. |
| Image data underflow | Callisto receives a command but the frame store buffer doesn't contain a complete frame, i.e. isn't locked. |

Image Sensor Interface

Data Interface

The interface to the image sensor relies on external control of image sensor timing, i.e. Callisto does not control the image sensor timing or sequencing. Callisto relies on the image sensor interface telling it when there is a new frame to be read from the sensor, and then relies on the interface telling it when there is valid pixel data. See the "Interfaces" chapter for timing details.

Two parameters affect how the image sensor interface behaves: the Image Sensor Window setting, and the Image Sensor Size setting. Both these parameters are located in Callisto registers.

The Image Sensor Window setting controls which part of the total image data Callisto is to write to its frame store buffer. Data outside this window is ignored by Callisto, i.e. not written to the frame store buffer.

The Image Sensor Size setting tells Callisto the size of the image sensor array, and so how much data to expect in a frame. This parameter is needed in conjunction with the window setting in order to work out what data to save and which data to ignore.

Timing Interface

Callisto provides two signals, and possibly a third to control the image sensor to which it is connected and an external flash. The two output signals are expose and flash. A third signal, capture, can either be generated by Callisto and used internally or provided as an input. The timings of expose and flash are defined relative to capture and are defined by the delay from the rising edge of capture as well as how long each signal is asserted. The timings of these two signals may be defined independently of each other.

All of Callisto's image sensor timing signals are inactive whenever Callisto is inactive, i.e. when the Enable bit is the configuration register is set to '0'.

When Callisto is configured to generate the timing for the capture signal internally, the user defines the period of the capture signal, defining the length of time between pulses. The first capture pulse is generated immediately after the enable bit is set in the configuration register.

External Register Interface

Callisto may be used to control the reading from, and writing to registers in other devices. To this end Callisto provides a generic register read/write bus that allows it to gain access to registers in other devices. Register access commands used on Callisto's serial interface allow the user to specify whether a register operation is "internal" or "external." Internal register accesses are used to access Callisto registers, and external accesses are used to gain access to registers in the external device, and initiate transactions on the external register interface.

This interface is asynchronous and expects the external device to observe a handshaking protocol.

Power Management

Callisto has a low power mode where the serial interface and external image sensor timing signals remain active. In this mode the user is able to access Callisto registers. This low power mode can be entered in one of two ways. The first is to set the LowPower bit in the configuration register. When this occurs Callisto will remain in low power mode until the LowPower bit is cleared.

The second way Callisto enters its low power mode occurs when the AutoSleep bit in the configuration register is set. In this case low power mode will be entered when Callisto becomes inactive, and will leave this state when there is some activity for it to perform.

The "inactive" state is entered when Callisto has finished processing the current frame, which corresponds to having received the "finished frame processing" message.

The "active" state is entered when Callisto has received indication, from the image sensor, that a new frame is available. This occurs when the isync signal is asserted.

Callisto Interfaces

Pinout

The following table shows all input and output signals on Callisto.

| Signal name | Width | Description | Direction |
|---|---|---|---|
| General control interface signals: | | | |
| resetb | 1 | Asynchronous system reset. | input |
| ten | 1 | Test enable. | input |
| tmode | 1 | Test mode | input |
| sen | 1 | Scan enable. | input |
| sclk | 1 | Serial clock. | input |
| txd/sout | 1 | Serial output data or scan output data. | output |
| rxd/sin | 1 | Serial inout data or scan input data. | input |
| iclk | 1 | Image sensor clock. | input |
| isync | 1 | Image sensor frame synch. | input |
| ivalid | 1 | Image sensor pixel valid. | input |
| idata | 8 | Image sensor pixel data. | input |
| capture | 1 | Input version of image sensor capture/flash timing refernce signal. This signal may also be (optionally) internally generated. | input |
| flash | 1 | External flash control signal | output |
| expose | 1 | Image sensor exposure control signal | output |
| rvalid | 1 | Register interface valid. | output |
| rwr | 1 | Register interface write. | output |
| raddr | 8 | Register interface address. | output |
| rdatai | 32 | Register interface input data. | input |
| rdatao | 32 | Register interface output data. | output |
| rack | 1 | Register interface acknowledgment | input |
| rnak | 1 | Register interface negative acknowledgment | input |
| TOTAL | 96 | | |

General Control and Test Interface

| Signal name | Description | Direction |
|---|---|---|
| General control and test interface signals | | |
| resetb | System reset. Active when driven low. Asynchronous to main system clock sclk. | input |
| ten | Test enable. When driven high enables image data to serial data testing. | input |
| tmode | Test mode. When driven high puts Callisto into test mode, specifically for scan testing and BIST. | input |
| sen | Scan enable. When driven high scan testing is enabled. In this mode the serial interface data signals txd and rxd become scan data signals. In this mode sclk is used as the scan clock. | input |
| sin | Scan input data. Multiplexed with the serial data input signal rxd when sen = '1'. | input |
| sout | Scan output data. Multiplexed with the serial data output signal txd when sen = '1'. | output |

Figure 65:
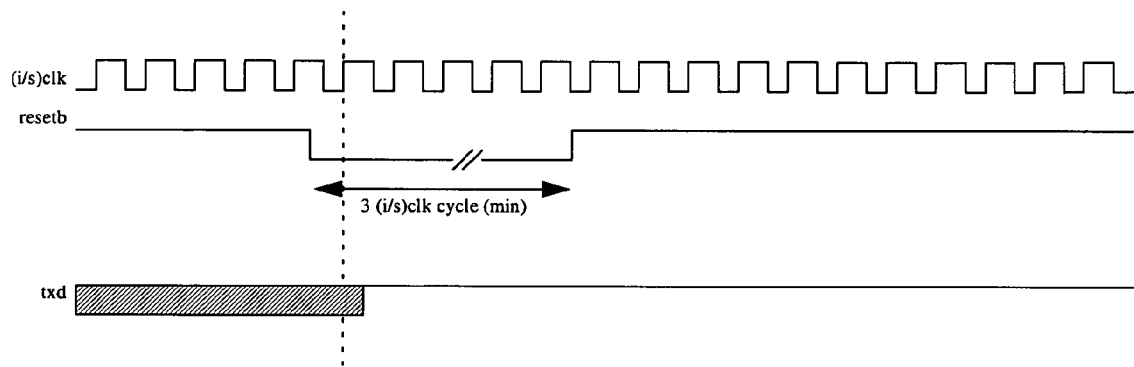

FIG. 65 shows Callisto's reset timing. resetb must be held low for at least 3 cycles of the slowest of the two clocks, sclk and iclk.

Test Mode Definitions ten—Test enable. When asserted:

Forces idata to be serialized and output from txd (see section 3.4).

Ignore all commands/accesses except for register writes.

sen—Scan enable. When asserted:

Forces every flip-flop in the design into one large shift register tmode—Test mode. When asserted:

Forces all derived clocks to be sourced from sclk.

Forces an xor-based bypass of RAM I/O. Outputs of RAMs are wired to the RAM inputs through an xor structure so that RAM outputs can be controlled during scan.

Forces async reset trees to be controlled via reset pin (i.e. bypassing synchronization). Reset is synchronised to target clock domain during normal operation, but this must be disabled during scan as these reset sync flip-flops are also in the scan chain. If this bypassing didn't occur the global synchronised reset signals may accidentally be triggered during scan.

Test pin settings

| Device Mode | sen | tmode | ten |
|---|---|---|---|
| Functional | 0 | 0 | 0 |
| Image data to serial | 0 | 0 | 1 |
| Scan testing | 0/1 | 1 | 0 |
| BIST testing | 0 | 1 | 0 |

Image Sensor Data Interface

Image sensor interface signals

| Signal name | Description | Direction |
|---|---|---|
| iclk | Image sensor interface clock. Maximum frequency is 50 MHz. Note: iclk must always be running. | input |
| isync | Image sensor sync. Indicates the image sensor has captured a new frame. | input |
| ivalid | Image sensor data valid. When high, indicates valid data in idata bus. Goes high after isync is asserted. | input |
| idata[7:0] | Image sensor data. Byte-wise data from image sensor. Valid when ivalid is asserted. | input |

Figure 66:
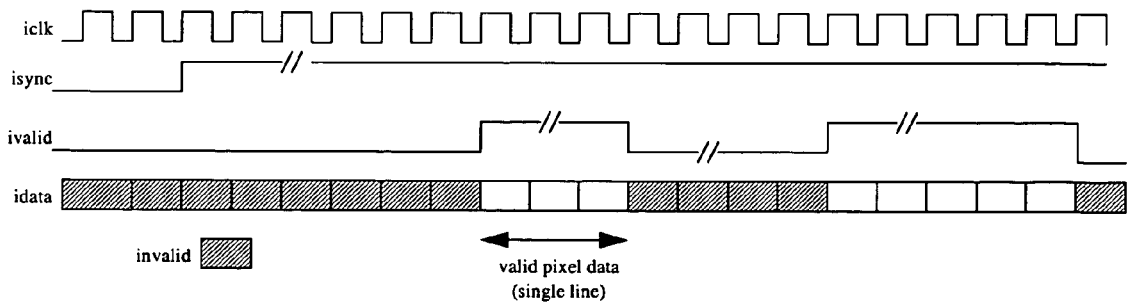

FIG. 66 shows the timing for the image sensor interface. isync is asserted to indicate that the image sensor has captured a new frame. ivalid is asserted to indicate that valid pixel data is now available on idata. ivalid is asserted for each iclk cycle during which there is valid pixel data on idata. isync must be high for at least one clock cycle and may stay high for the entire frame transfer.

Image Sensor Timing Interface

Image sensor interface signals

| Signal name | Description | Direction |
|---|---|---|
| capture | Image sensor capture and flash timing reference signal. | input |

-continued

Image sensor interface signals

| Signal name | Description | Direction |
|---|---|---|
| flash | Control the flash. | output |
| expose | Controls frame capture for the image sensor. | output |

Figure 67:
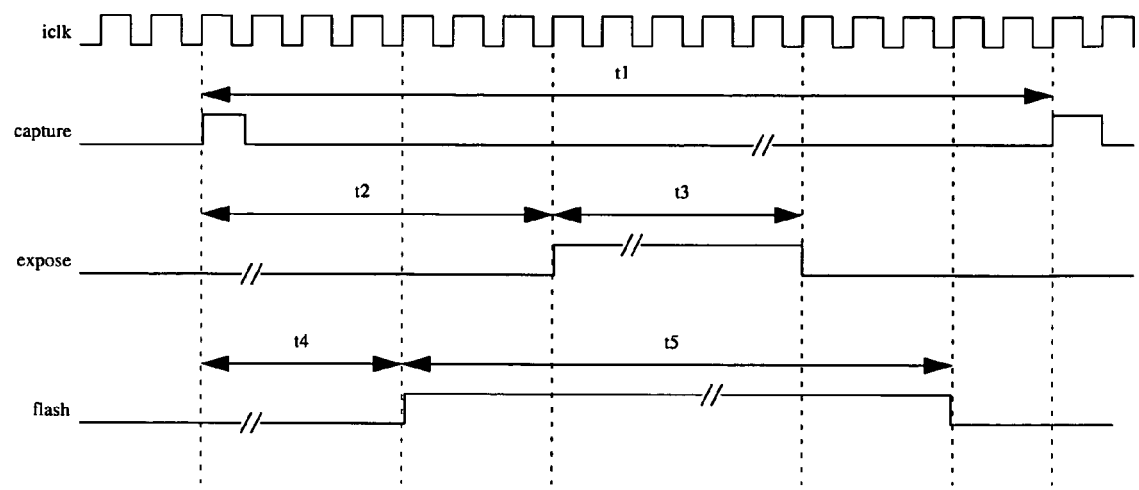

FIG. 67 shows the timings for image sensor control signals. All of the time parameters are in units of iclk clock cycles, and are defined by setting their values in the appropriate Callisto register. The parameter t1 is only definable when capture is an internal signal. The capture signal is synchronous to iclk and has a pulse width of 1 iclk period.

Figure 68:
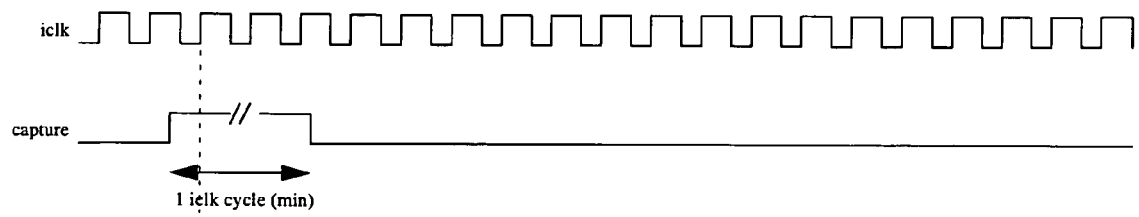

FIG. 68 shows the timing for the external capture signal, which must be asserted for at least 1 iclk cycle when active.

Serial Interface

Serial interface signals

| Signal name | Description | Direction |
|---|---|---|
| sclk | Serial clock. Maximum frequency is 40 MHz. | input |
| txd | Transmit data | output |
| rxd | Receive data | input |

Figure 69:
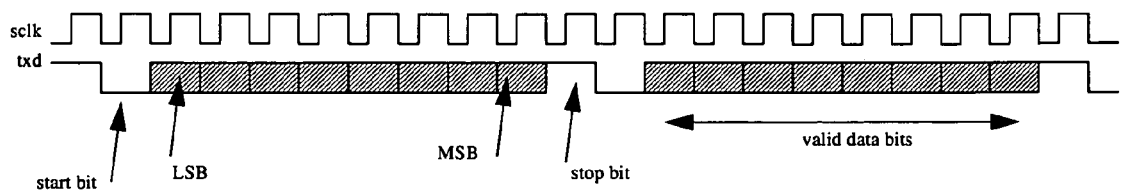
Figure 70:
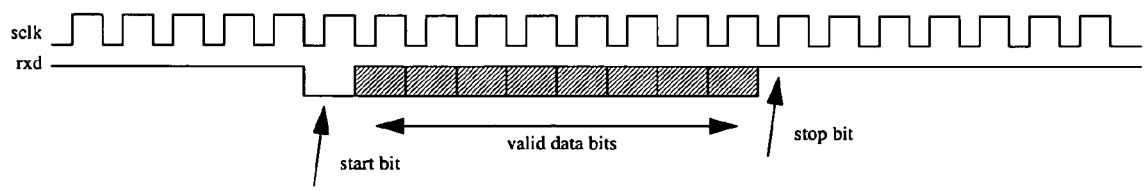

FIGS. 69 and 70 show the operation of the serial interface in synchronous mode. Shown here is a back-to-back transfer of 2 bytes from Callisto to the microprocessor on txd using a single stop bit. Also shown is the transfer of a byte from the microprocessor to Callisto on rxd, also using a single stop bit.

Error Recovery Timing Using Break

Figure 71:
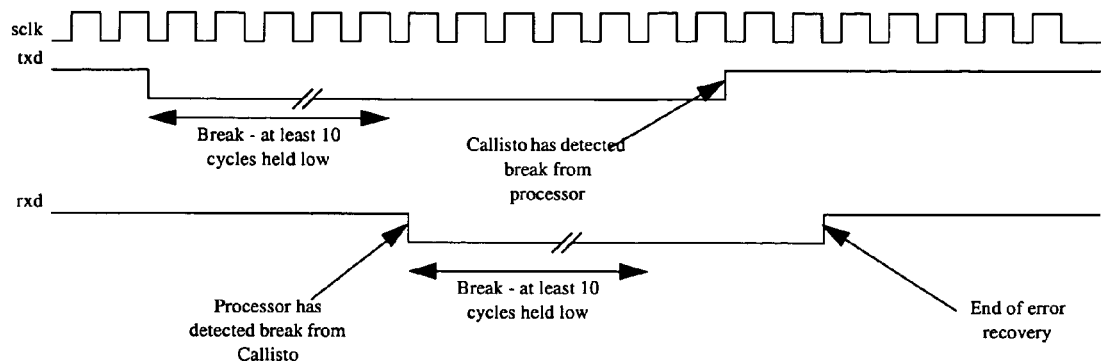

FIG. 71 shows the timing for error recovery. When Callisto encounters an error, it signals this condition by holding the txd signal low (for at least 10 sclk cycles). This will violate the '0' start bit, '1' stop bit requirement and will raise a microprocessor interrupt. This is the break condition. Once the microprocessor detects the break it will then also generate a break condition on rxd. Callisto acknowledges this by driving txd high, and the process is completed by the microprocessor driving rxd high.

External Register Interface

External register interface signals

| Signal name | Description | Direction |
|---|---|---|
| rvalid | Register bus valid. High whenever a read or write operation is occurring. Validates raddr and rdatao. | output |
| rwr | Register bus write. When high indicates the current operation is a register write. | output |
| rack | Register bus ack. Signals to Callisto end of register access cycle. | input |
| rnak | Register bus negative ack. Has same behavior as rack in that it is a handshaking signal to end a transaction. It is asserted instead of rack to indicate that an error has occurred during the transaction, and that it could not be carried out, | input |

-continued

| Signal name | Description | Direction |
|---|---|---|
| raddr[7:0] | Register bus address. Indicates the address of the register being accessed. | output |
| rdatai[31:0] | Register bus data in. Data bus driven by slave device. Used for register reads. | input |
| rdatao[31:0] | Register bus data out. Data to be written to a register during a write, when rwr is high. | output |

External register interface signals

Figure 72:
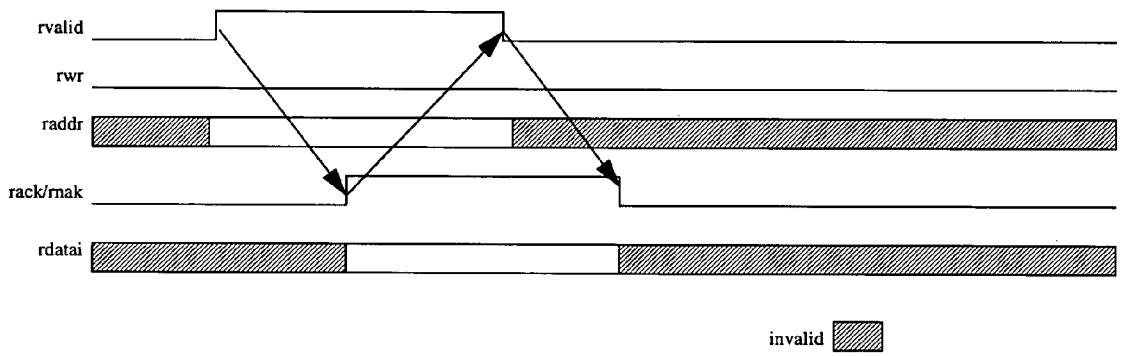

FIG. 72 shows the timing for a read cycle on the external register interface. The read cycle begins by validating the address (raddr) by driving rvalid high, together with driving rwr low. The target device acknowledges that is has put the addressed data onto rdatai by driving rack high. rack then remains high until Callisto drives rvalid low again. This signals the end of the transaction.

Figure 73:
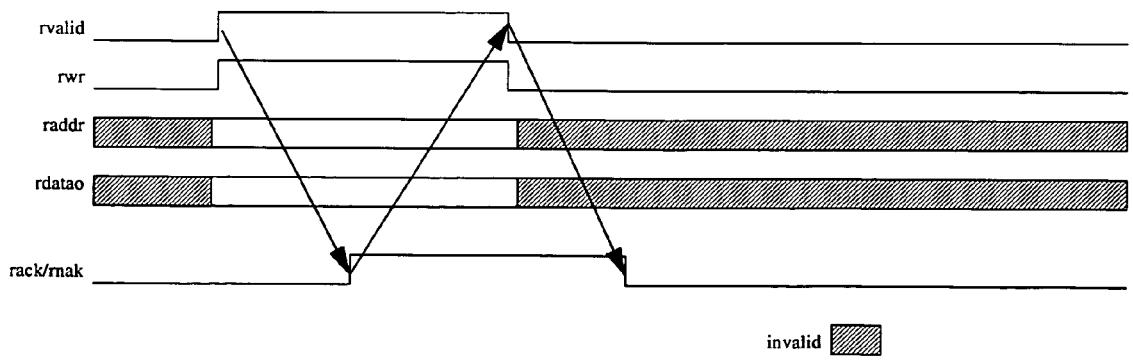

FIG. 73 shows the timing for an external register write. Callisto signals the start of the cycle by validating the address and data to be written (raddr and rdatao) by driving rvalid high, together with driving rwr high. The target device acknowledges the write by driving rack high. rack then remains high until Callisto drives rvalid low again. This signals the end of the transaction. If the rnak signal is asserted to complete a transaction that means there was an error in the external device and the transaction could not be completed successfully.

Note that either rack or rnak should be asserted, and not both simultaneously.

Operation

Registers

This section describes Callisto's registers.

Configuration Register

This is a general Callisto configuration register.

Configuration Register - 8 bit

| Field | Width | Bits | Reset Value | Description |
|---|---|---|---|---|
| Enable | 1 | 0 | b'0 | Enable. Setting this bit to '1' enables Callisto operation. Callisto will perform no command processing or frame store writing while this bit is set to '0', but will still respond to register accesses. |
| ComExRst | 1 | 1 | b'0 | Command Execution Restart. When set to '1' causes Callisto to immediately stop command processing and return to its inital processing state. This bit is self clearing. |
| PadBit | 1 | 2 | b'0 | Padding Bit. Value to use when padding bytes as a result of reading a full processed image. The padding is used to align the start of image lines with byte boundaries. |
| BistStart | 1 | 3 | b'0 | BIST Start. Instructs Callisto to perform BIST testing of its RAMs. This bit is self clearing. |
| CaptureIn | 1 | 4 | b'0 | Capture Input. When set to '1' the capture signal is supplied externally, otherwise it is internally generated. |
| LowPower | 1 | 5 | b'0 | Low Power Mode. When this bit is set to '1' Callisto enters its low power state. |
| AutoSleep | 1 | 6 | b'0 | Auto Sleep and Wakeup. When this bit is set to '1' Callisto will automatically enter its low power state when inactive, and return to its normal state when active again. |
| WriteFrame | 1 | 7 | b'0 | Write Frame. Setting this bit to '1' enables direct writing to the frame store buffer. |

Status Register

Callisto status register. This register is clear on read (COR).

Status Register - 16 bit

| Field | Type | Width | Bits | Reset Value | Description |
|---|---|---|---|---|---|
| ErrCond | COR | 3 | 2:0 | b'000 | Last Error Condition. Indicates the error that occurred that put Callisto into an error state. "000" - No error "001" - Message out of sync "010" - Malformed message "011" - Malformed byte "100" - Command overflow "101" - Image data underflow |
| FrameMiss | COR | 2 | 4:3 | b'00 | Missed Frames. Indicates that new frames were available to be written into the frame store buffer but Callisto was unable to do so because was in the command execution state. "00" - No frames missed "01" - One frame missed "10" - Two frames missed "11" - Three or more frames missed. |

-continued

Status Register - 16 bit

| Field | Type | Width | Bits | Reset Value | Description |
|---|---|---|---|---|---|
| BistFail | COR | 6 | 10:5 | 0x0 | BIST Failure. Result of running built in self test on 4 internal RAMs.<br>'0' - BIST passed<br>'1' - BIST failed<br>Bit allocation:<br>0 - Frame Store Buffer 1<br>1 - Frame Store Buffer 2<br>2 - Sub-sample Buffer 1, RAM 1<br>3 - Sub-sample Buffer 1, RAM2<br>4 - Sub-sample Buffer 2, RAM 1<br>5 - Sub-sample Buffer 2, RAM 2 |
| BistComplete | COR | 1 | 11 | b'0 | Bist Complete. When '1' indicates that BIST has completed. |
| AutoSleepStat |  | 1 | 12 | b'0 | Auto Sleep Status. When '1' indicates that Callisto is in its low power state. |
| N/A |  | 3 | 15:13 |  | Not Used. |

Threshold Register - 8 bit

| Field | Width | Bits | Reset Value | Description |
|---|---|---|---|---|
| Threshold | 8 | 7:0 | 0x00 | Threshold value used in dynamic range expansion and thresholding process. Expressed as t/255 where t is the desired threshold level. Represented as a 0.8 fixed-point value. |

Unprocessed Image Size Register

This register is used to defined the size of the region used in the unprocessed image read command.

Unprocessed Image Region Register - 16 bit

| Field | Width | Bits | Reset Value | Description |
|---|---|---|---|---|
| SizeX | 8 | 7:0 | 0x00 | Size - 1 of region in X direction. |
| SizeY | 8 | 15:8 | 0x00 | Size - 1 of region in Y direction. |

Processed Image Region Register

Defines the rectangular region to be used in the full processed image read command, and the sub-sampled image read command.

Image Region Size Register - 32 bit

| Field | Width | Bits | Reset Value | Description |
|---|---|---|---|---|
| TopLeftX | 8 | 7:0 | 0x00 | X coordinate of top left hand corner of region. |
| TopLeftY | 8 | 15:8 | 0x00 | Y coordinate of top left hand corner of region. |
| SizeX | 8 | 23:16 | 0x00 | Size - 1 of region in X direction. |
| SizeY | 8 | 31:24 | 0x00 | Size - 1 of region in Y direction. |

Image Sensor Window Register

This register defines the window used across the image sensor interface. Data outside of the defined window is "dropped," and not written into the frame store buffer.

Image Sensor Window Register - 32 bit

| Field | Width | Bits | Reset Value | Description |
|---|---|---|---|---|
| TopLeftX | 8 | 7:0 | 0x00 | X coordinate of top left hand corner of window. |
| TopLeftY | 8 | 15:8 | 0x00 | Y coordinate of top left hand corner of window. |
| SizeX | 8 | 23:16 | 0x00 | Size - 1 of window in X direction. |
| SizeY | 8 | 31:24 | 0x00 | Size - 1 of window in Y direction. |

Image Sensor Size Register - 16 bit

| Field | Width | Bits | Reset Value | Description |
|---|---|---|---|---|
| SizeX | 8 | 7:0 | 0x00 | Size - 1 of image sensor in X direction. |
| SizeY | 8 | 15:8 | 0x00 | Size - 1 of image sensor in Y direction. |

Capture Period Register - 24 bit

| Field | Width | Bits | Reset Value | Description |
|---|---|---|---|---|
| CapturePeriod | 24 | 23:0 | 0x00 | Defines the period of the capture signal in number of iclk cycles (t1). If set to zero then capture cycle is disabled. |

Expose Timing Register - 32 bit

| Field | Width | Bits | Reset Value | Description |
|---|---|---|---|---|
| Delay | 16 | 15:0 | 0x00 | Defines the delay (minus one) after capture before expose signal is asserted, in number of iclk cycles (t2). |
| HighTime | 16 | 31:16 | 0x00 | Defines how long (minus one) expose is asserted, in iclk cycles (t3). |

Flash Timing Register - 32 bit

| Field | Width | Bits | Reset Value | Description |
|---|---|---|---|---|
| Delay | 16 | 15:0 | 0x00 | Defines the delay (minus one) after capture before flash signal is asserted, in number of iclk cycles (t4). |
| HighTime | 16 | 31:16 | 0x00 | Defines how long (minus one) flash is asserted, in iclk cycles (t5). |

Chip ID Register - 8 bit

| Field | Width | Bits | Reset Value | Description |
|---|---|---|---|---|
| RamWidth | 8 | 7:0 | TBD1 | RAM Width. Identifies the width (minus 1, in bytes) of the frame store buffer. |
| BuffMode | 1 | 8 | TBD2 | Buffering Mode. This bit indicates whether the design uses single or double buffering:<br>0 - Single Buffering<br>1 - Double Buffering |
| Id | 7 | 15:9 | 0x00 | Chip Identifier. Identifies the design. Calliso's value is 0x00. |

1 RamWidth value is defined when the chip is manufactured, as is readable on reset.
2 BuffMode value is defined when the chip is manufactured, as is readable on reset.

Initialisation

After reset, Callisto is in a state where all of its configuration registers contain their reset values defined above; Callisto is disabled, making it unable to perform any image processing. It is not until the Enable bit in the configuration register is set to '1' after reset, by a register write, that Callisto begins performing any of its functions.

Before enabling Callisto by setting the Enable bit, any other fixed parameters should be set also.

While Callisto is disabled, i.e. Enable is set to '0', Callisto does not process any commands or write image sensor data into its frame store, and only responds to register access messages.

Normal Operation

During normal operation Callisto is notified of new frames captured by the image sensor. These frames are written into Callisto's frame store buffer. The timing and triggering of image capture by the sensor is outside of Callisto's control. It is simply told when new frames are available.

Once a captured image has been written to the frame store buffer, the user may ask Callisto to perform commands. This is done by sending Callisto a command message. Parameters for commands may be supplied with the command, in the message, or may be taken from a command-specific register. This second option saves the user having to keep defining parameters when they are issuing multiple commands with the same arguments. When parameters are sent with the command they are not persistently stored, i.e. they do not get written into the command-specific registers. Only an explicit register write can do this.

For commands that have long sequences of parameters, like the sub-pixel read command, the arguments are used as they arrive. Results are generated immediately, meaning that the results of a sub-pixel read command may start appearing on the serial interface before all the parameters (sub-pixel coordinates) have been received.

Frame Processing

The following pseudo code fragment highlights the steps involved in processing each frame. This code would be executed on the processor at the other end of the serial interface.

```
while TRUE loop
    sendMsg(readyForNewFrame);
    waitMsg(receivedNewFrame);
    processImage(frame);
    sendMsg(finishedProcessingFrame);
end loop;
```

Message Abutment

Commands that do not return any data immediately, such as register writes, may be positioned immediately after another command without the need for that command to have finished execution. Any command may be positioned immediately after another command which doesn't return any data. This section contains some pseudo-code segments to demonstrate this.

Normally, a command must finish execution before the next command can be sent:

```
sendMsg(unprocessedImageRead);
// must wait for command execution to finish
waitMsg(unprocessedImageReadData);
registerRead.address = 0x01;
sendMsg(registerRead);
```

In this example, the code waits for the response of the unprocessedImageRead command before sending a request to execute a registerRead command.

Register Writes

Register writes take effect immediately after the message is received by Callisto so care must be taken to ensure that the write does not adversely affect any command in progress.

If a register write immediately follows another command there is no need to wait for its response:

```
sendMsg(unprocessedImageRead);
// no need to wait for command execution to finish
registerWrite.address = 0x03;
registerWrite.data = 0xff
registerWrite.length = 1;
sendMsg(registerWrite);
```

Frame Synchronisation

The FinishedFrameProcessing message does not generate a response so can be abutted against another command, typically the final command in processing a frame.

```
subPixelRead.xCoord[0] = 1.5;
subPixelRead.yCoord[0] = 2.75;
subPixelRead.xCoord[1] = 3.75;
subPixelRead.yCoord[1] = 3.5;
subPixelRead.xCoord[2] = 12.25;
subPixelRead.yCoord[2] = 27.75;
subPixelRead.numCoords = 3;
sendMsg(subPixelRead); // last processing command for current frame
// No need to wait
sendMsg(finishedFrameProcessing);
// Now must wait for sub-pixel data before ready for a new frame
waitMsg(subPixelReadData);
// Signal that we are ready to process a new frame
sendMsg(readyForNewFrame);
waitMsg(receivedNewFrame);
// Processing new frame can now begin
.
.
.
```

Writing Directly to Frame Store Buffer

During normal operation, data going into the frame store buffer comes from an image sensor on the image sensor interface. Callisto has a mode which allows the user to write directly to the frame store buffer. The example below shows writing two 10×10 frames into the frame store buffer.

When switching to direct frame store writing mode it is recommended that the following sequence of operations be used:

```
configRegister = 0x00;
registerWrite.address = configRegister;
registerWrite.data[8] = 1; // set WriteFrame bit
sendMsg(registerWrite);
frameStoreWriteMsg.first = 1; // This is the first write of a frame
frameStoreWriteMsg.data = data[0];
sendMsg(frameStoreWriteMsg);
// Wait for the response
waitMsg(frameStoreWriteResp);
frameStoreWriteMsg.first = 0; // This is NOT the first write of a frame
frameStoreWriteMsg.data = data[1];
sendMsg(frameStoreWriteMsg);
// Wait for the response
waitMsg(frameStoreWriteResp);
frameStoreWriteMsg.data = data[2];
sendMsg(frameStoreWriteMsg);
```

-continued

```
// Wait for the response
waitMsg(frameStoreWriteResp);
.
.
.
// last word of the frame
frameStoreWriteMsg.data = data[24];
sendMsg(frameStoreWriteMsg);
// Wait for the response
waitMsg(frameStoreWriteResp);
.
.
.
// Write a new frame into frame store buffer
frameStoreWriteMsg.first = 1; // This is the first write of a frame
frameStoreWriteMsg.data = data[0];
sendMsg(frameStoreWriteMsg);
// Wait for the response
waitMsg(frameStoreWriteResp);
frameStoreWriteMsg.first = 0; // This is NOT the first write of a frame
frameStoreWriteMsg.data = data[1];
sendMsg(frameStoreWriteMsg);
// Wait for the response
waitMsg(frameStoreWriteResp);
frameStoreWriteMsg.data = data[2];
sendMsg(frameStoreWriteMsg);
// Wait for the response
waitMsg(frameStoreWriteResp);
.
.
.
// last word of the frame
frameStoreWriteMsg.data = data[24];
sendMsg(frameStoreWriteMsg);
// Wait for the response
waitMsg(frameStoreWriteResp);
```

Callisto Design

Architectural Overview

Figure 74:
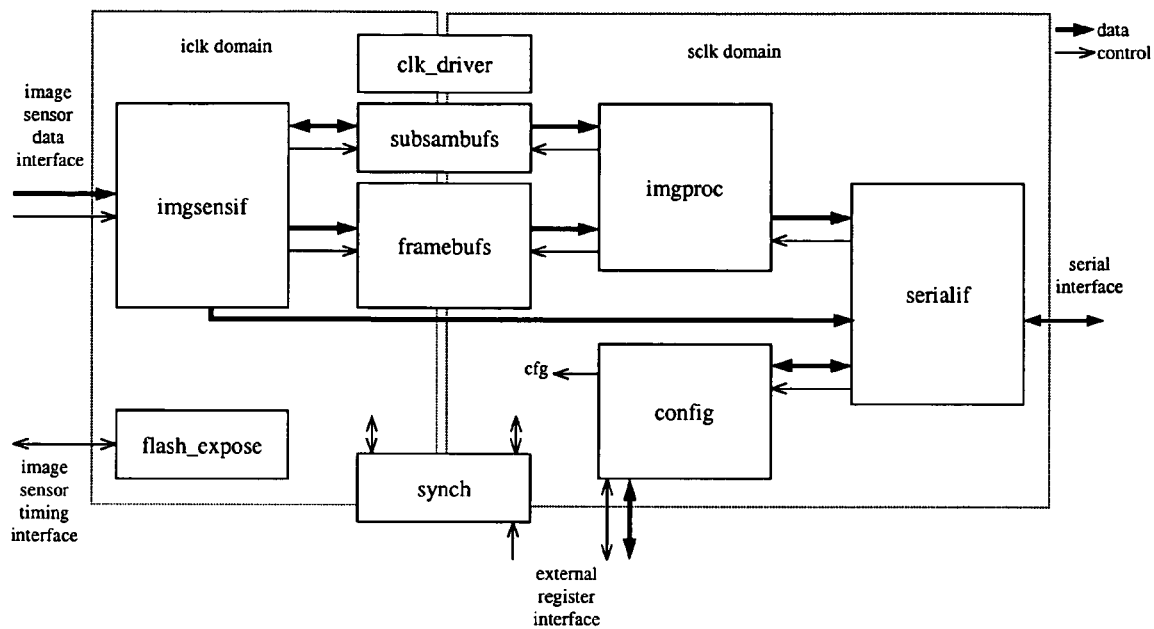

The architectural partitioning of the Callisto design is illustrated in FIG. 74.

Callisto Top-Level Partitioning

The serialif block performs all message reception, interpretation and transmission. Image command and register accesses received from the user are translated into single command instructions which are sent to the improc and config blocks. Subpixel image commands become a series of instructions, one for each coordinate pair. When a message is received that requires a response (image read or register read) the serial interface starts transmitting the message header. The improc and config blocks wait before outputting data to the serial interface to ensure the successful transmission of returning message header.

The config block contains all the configuration registers and the interface to the external registers. Register instructions are received from the serialif block and read data is returned as a rate adapted (at the serial interface bandwidth) byte stream.

The improc block controls the image reading functions. It receives a command instruction from the serialif block and performs SRAM reads from either the subsambufs or framebufs blocks. For subpixel and processed read commands, this data is processed before being passed to the serialif block. For unprocessed and subsampled reads, the raw RAM data is sent to the serialif block. The output data is a rate adapted byte stream.

The framebufs block provides double buffered storage for the raw image data. Bytes are written into the frame store buffer from the imgsensif block, and bytes are read by the imgproc block.

The subsambufs block provides double buffered storage for the subsampled image data, which is derived from the incoming image sensor interface. The loading of subsampled data by the imgsensif block involves a read-modify-write operation. This is due not only to the subsambuf word size (70 bits), but also the subsampled value calculation sequence. The wide word size is required to maximize txd utilization during a processed image read. The imgproc block reads from the subsambufs block whilst executing either a subsampled image read or processed image read.

The imgsensif block receives data from the image sensor interface and controls the writing into both the framebufs and subsambufs blocks. It manages the double-buffering swapping mechanism, image windowing and the image data sub-sampling calculations. Rate adapted image sensor data is passed directly to the serialif during test mode (ten).

The clk_driver block controls the generation of all internal clocks. s_clk and i_clk are the persistent clocks for the serial and image domains respectively. sq_clk and iq_clk are their low-power equivalents and are disabled whenever possible. For the double buffered design, rq_clk[1:0] are the clocks controlling the two swapping SRAM buffers and are also disabled whenever possible. The single buffered design has a single rq_clk[0].

The synch block synchronizes signals crossing the iclk/sclk boundary.

The flash_expose block generates the image sensor timing interface signals flash and expose.

Hierarchical Description

The Callisto design hierarchies for the two different buffering schemes (single and double) are shown below. Each element in the hierarchy is described in the form:

```
callisto_sb: callisto
    core_0: core(struct)
        clk_driver_0: clk_driver(rtl)
        config_0: config(rtl)
        flash_expose_0: flash_expose(rtl)
        framebufs_0: framebufs(rtl)
            framebuf_0: framebuf(rtl)
                fs_ram_bist_0: fs_ram_bist(struct)
                    fs_ram_0: fs_ram(struct)
                        fs_asic_ram_0: fs_asic_ram(behav)
                    rambist_0: rambist(struct)
                        bist_pattern0: bist_pattern(struct)
                            bist_cmp0: bist_cmp(rtl)
                            bist_fifo0: bist_fifo(struct)
                            bist_fifow0: bist_fifow(rtl)
                            cfgfifo0: cfgfifo(rtl)
                        bist_seq0: bist_seq(rtl)
        imgproc_0: imgproc(struct)
            imgproc_fs_0: imgproc_fs(fsm)
            imgproc_sertim_0: imgproc_sertim(fsm)
            imgproc_ss_0: imgproc_ss(struct_rtl)
        imgsensif_0: imgsensif(struct)
            sens_ctrl_0: sens_ctrl(onebuf)
            sens_fs_0: sens_fs(rtl)
            sens_mux_0: sens_mux(struct_rtl)
            sens_ss_0: sens_ss(rtl)
        serialif_0: serialif(struct)
            sif_errhand_0: sif_errhand(rtl)
            sif_msghand_0: sif_msghand(rtl)
            sif_msghdrgen_0: sif_msghdrgen(rtl)
            sif_msgsync_0: sif_msgsync(rtl)
            sif_par2ser_0: sif_par2ser(rtl)
            sif_ser2par_0: sif_ser2par(rtl)
        subsambufs_0: subsambufs(rtl)
            subsambuf_0: subsambuf(rtl)
                ss_ram_bist_lo: ss_ram_bist(struct)
                    rambist_0: rambist(struct)
                        bist_pattern0: bist_pattern(struct)
```

-continued

```
                            bist_cmp0: bist_cmp(rtl)
                            bist_fifo0: bist_fifo(struct)
                            bist_fifow0: bist_fifow(rtl)
                            cfgfifo0: cfgfifo(rtl)
                        bist_seq0: bist_seq(rtl)
                    ss_ram_0: ss_ram(struct)
                        ss_asic_ram_0: ss_asic_ram(behav)
                ss_ram_bist_hi: ss_ram_bist(struct)
                    rambist_0: rambist(struct)
                        bist_pattern0: bist_pattern(struct)
                            bist_cmp0: bist_cmp(rtl)
                            bist_fifo0: bist_fifo(struct)
                            bist_fifow0: bist_fifow(rtl)
                            cfgfifo0: cfgfifo(rtl)
                        bist_seq0: bist_seq(rtl)
                    ss_ram_0: ss_ram(struct)
                        ss_asic_ram_0: ss_asic_ram(behav)
        synch_0: synch(struct)
            reset_sync_s1: reset_sync(rtl)
            reset_sync_i1: reset_sync(rtl)
            sig_pulse_sync_new_frame: sig_pulse_sync(rtl)
            sig_pulse_sync_frame_missed: sig_pulse_sync(rtl)
            sig_pulse_fin_frm_proc: sig_pulse_sync(rtl)
            sig_pulse_fsw_ack: sig_pulse_sync(rtl)
            sig_pulse_img_cmd_fs_wr: sig_pulse_sync(rtl)
            synchronizer_auto_lo_pwr_status: synchronizer(rtl)
            synchronizer_rack: synchronizer(rtl)
            synchronizer_rnack: synchronizer(rtl)
            synchronizer_img_en: synchronizer(rtl)
            synchronizer_auto_sleep: synchronizer(rtl)
callisto_db: callisto
    core_0: core(struct)
        clk_driver_0: clk_driver(rtl)
        config_0: config(rtl)
        flash_expose_0: flash_expose(rtl)
        framebufs_0: framebufs(rtl)
            framebuf_0: framebuf(rtl)
                fs_ram_bist_0: fs_ram_bist(struct)
                    fs_ram_0: fs_ram(struct)
                        fs_asic_ram_0: fs_asic_ram(behav)
                    rambist_0: rambist(struct)
                        bist_pattern0: bist_pattern(struct)
                            bist_cmp0: bist_cmp(rtl)
                            bist_fifo0: bist_fifo(struct)
                            bist_fifow0: bist_fifow(rtl)
                            cfgfifo0: cfgfifo(rtl)
                        bist_seq0: bist_seq(rtl)
            framebuf_1: framebuf(rtl)
                fs_ram_bist_0: fs_ram_bist(struct)
                    fs_ram_0: fs_ram(struct)
                        fs_asic_ram_0: fs_asic_ram(behav)
                    rambist_0: rambist(struct)
                        bist_pattern0: bist_pattern(struct)
                            bist_cmp0: bist_cmp(rtl)
                            bist_fifo0: bist_fifo(struct)
                            bist_fifow0: bist_fifow(rtl)
                            cfgfifo0: cfgfifo(rtl)
                        bist_seq0: bist_seq(rtl)
        imgproc_0: imgproc(struct)
            imgproc_fs_0: imgproc_fs(fsm)
            imgproc_sertim_0: imgproc_sertim(fsm)
            imgproc_ss_0: imgproc_ss(struct_rtl)
        imgsensif_0: imgsensif(struct)
            sens_ctrl_0: sens_ctrl(fsm)
            sens_fs_0: sens_fs(rtl)
            sens_mux_0: sens_mux(struct_rtl)
            sens_ss_0: sens_ss(rtl)
        serialif_0: serialif(struct)
            sif_errhand_0: sif_errhand(rtl)
            sif_msghand_0: sif_msghand(rtl)
            sif_msghdrgen_0: sif_msghdrgen(rtl)
            sif_msgsync_0: sif_msgsync(rtl)
            sif_par2ser_0: sif_par2ser(rtl)
            sif_ser2par_0: sif_ser2par(rtl)
        subsambufs_0: subsambufs(rtl)
            subsambuf_0: subsambuf(rtl)
                ss_ram_bist_lo: ss_ram_bist(struct)
                    rambist_0: rambist(struct)
                        bist_pattern0: bist_pattern(struct)
```

-continued

```
                    bist_cmp0: bist_cmp(rtl)
                    bist_fifo0: bist_fifo(struct)
                    bist_fifow0: bist_fifow(rtl)
                    cfgfifo0: cfgfifo(rtl)
                bist_seq0: bist_seq(rtl)
            ss_ram_0: ss_ram(struct)
                ss_asic_ram_0: ss_asic_ram(behav)
        ss_ram_bist_hi: ss_ram_bist(struct)
            rambist_0: rambist(struct)
                bist_pattern0: bist_pattern(struct)
                    bist_cmp0: bist_cmp(rtl)
                    bist_fifo0: bist_fifo(struct)
                    bist_fifow0: bist_fifow(rtl)
                    cfgfifo0: cfgfifo(rtl)
                bist_seq0: bist_seq(rtl)
            ss_ram_0: ss_ram(struct)
                ss_asic_ram_0: ss_asic_ram(behav)
    subsambuf_1: subsambuf(rtl)
        ss_ram_bist_lo: ss_ram_bist(struct)
            rambist_0: rambist(struct)
                bist_pattern0: bist_pattern(struct)
                    bist_cmp0: bist_cmp(rtl)
                    bist_fifo0: bist_fifo(struct)
                    bist_fifow0: bist_fifow(rtl)
                    cfgfifo0: cfgfifo(rtl)
                bist_seq0: bist_seq(rtl)
            ss_ram_0: ss_ram(struct)
                ss_asic_ram_0: ss_asic_ram(behav)
        ss_ram_bist_hi: ss_ram_bist(struct)
            rambist_0: rambist(struct)
                bist_pattern0: bist_pattern(struct)
                    bist_cmp0: bist_cmp(rtl)
                    bist_fifo0: bist_fifo(struct)
                    bist_fifow0: bist_fifow(rtl)
                    cfgfifo0: cfgfifo(rtl)
                bist_seq0: bist_seq(rtl)
            ss_ram_0: ss_ram(struct)
                ss_asic_ram_0: ss_asic_ram(behav)
synch_0: synch(struct)
    reset_sync_s1: reset_sync(rtl)
    reset_sync_i1: reset_sync(rtl)
    sig_pulse_sync_new_frame: sig_pulse_sync(rtl)
    sig_pulse_sync_frame_missed: sig_pulse_sync(rtl)
    sig_pulse_fin_frm_proc: sig_pulse_sync(rtl)
    sig_pulse_fsw_ack: sig_pulse_sync(rtl)
    sig_pulse_img_cmd_fs_wr: sig_pulse_sync(rtl)
    synchronizer_auto_lo_pwr_status: synchronizer(rtl)
    synchronizer_rack: synchronizer(rtl)
    synchronizer_rnack: synchronizer(rtl)
    synchronizer_img_en: synchronizer(rtl)
    synchronizer_auto_sleep: synchronizer(rtl)
``` clk_driver

Figure 75:
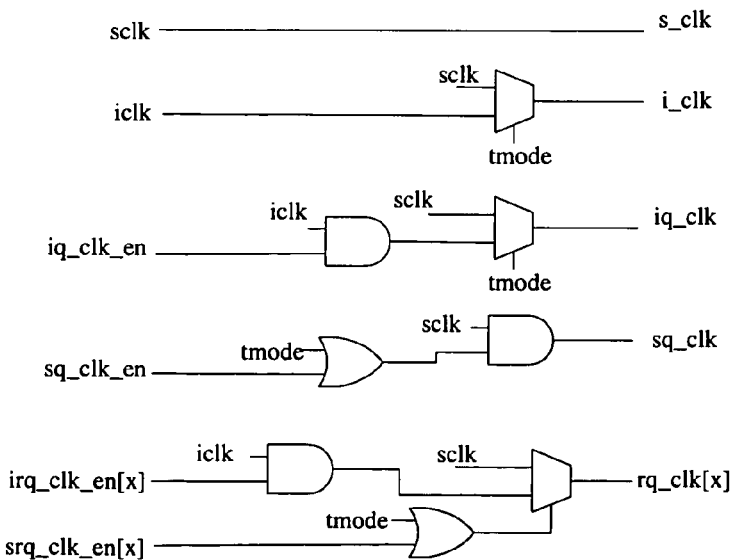

The clk_driver block drives all the internal clocks used in Callisto. Clock muxing and disabling is performed in this block for the iq_clk, sq_clk and rq_clk[1:0] clocks. Clock enable signals (generated in the serial interface and image sensor circuits) are sampled on the negative edge of their driving clock to avoid glitching during disabling/swapover. When the test mode signal (tmode) is asserted all gated clocks are sourced from sclk to enable successful scan and RAM BIST testing. For architectural details regarding clocking strategy see Section. The clock generation logic is illustrated in FIG. 75.

config

The config block contains the configuration registers and drives/receives the signals of the external register interface.

The configuration registers are stored in a single hierarchial type, indexed via the register address. The cfg signal which is output from this block is a flattened type, allowing for easier use. The status register, due to its clear-on-read nature is a special case. At the start of a status register read operation, a snapshot of the register is taken. At the same time the register is cleared and then immediately updated with any events from the current clock cycle. This sequence ensures that no events are missed during the read-clear operation. The snapshot value is then used as the read value.

Figure 76:
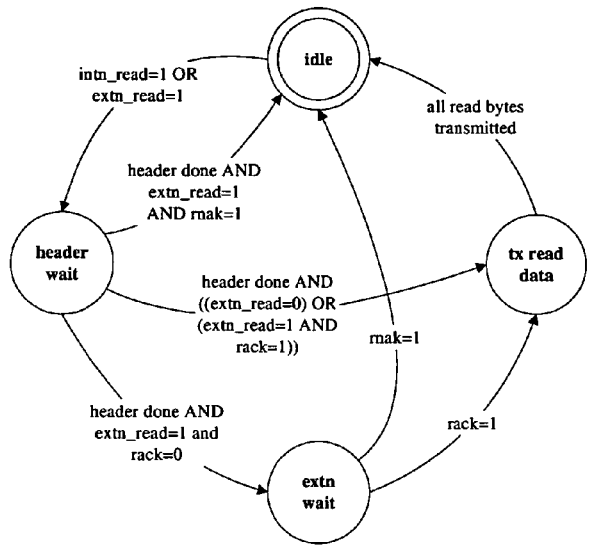

The register_read state machine and associated counter control the read data output. This state machine manages: message header delay; external/internal read delays; variable number of output bytes; the serial interface byte timing; and the reg_read_done output signal. This state machine is illustrated in FIG. 76.

Figure 76A:
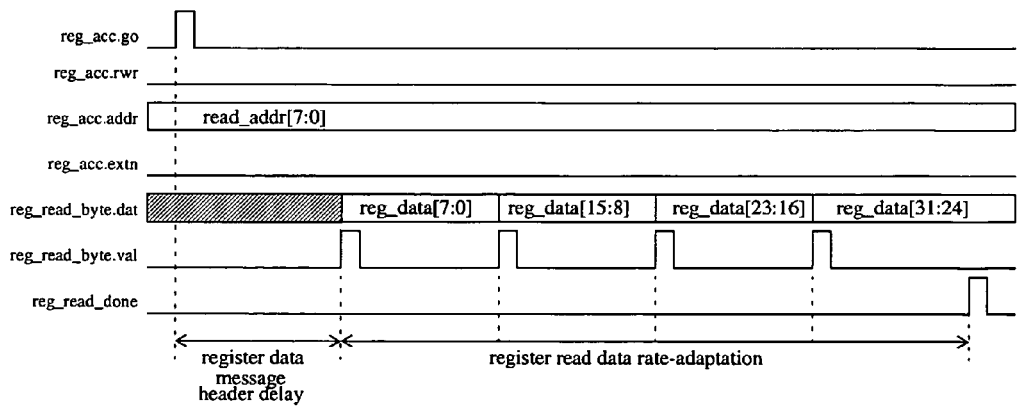

Read data bytes are output from the config block with a fixed cadence of 1 valid byte every ten clocks to match the serial interface data rate. This concept is illustrated with a four byte register read operation in FIG. 76a.

All external register interface outputs are registered before being output. The (already synchronized) s_rack and s_rnak signals are used to validate the external register interface inputs. The detection of s_rnak asserted is interpreted as an illegal external address error.

serialif

Figure 77:
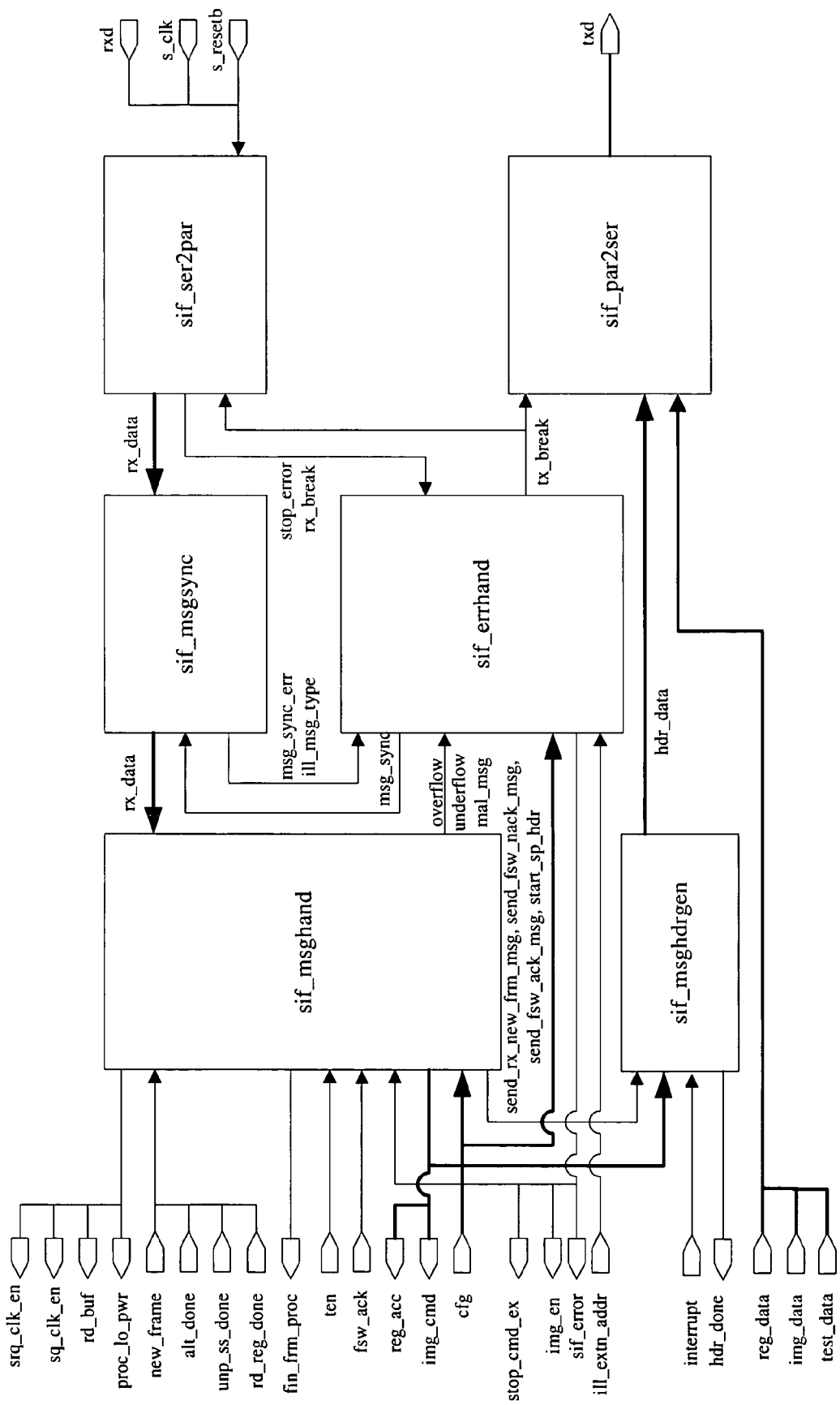

The serialif is a structural block that performs serial interface message reception and transmission. The basic structure of this block is illustrated in FIG. 77.

The serial data received is first converted into bytes by the sif_ser2par block. This byte is then delineated into messages by the sif_msgsync block. The messages are then interpreted by the sif_msghand block. The sif_msghdrgen generates the headers for transmitted frames. The sif_par2ser block converts the byte streams from the sif_msghdrgen, config and imgproc blocks into a serial bit stream. The sif_errhand block collects and collates all the error messages received by the various serial interface blocks, and controls the serial interface error recovery process.

sif_ser2par

Figure 78:
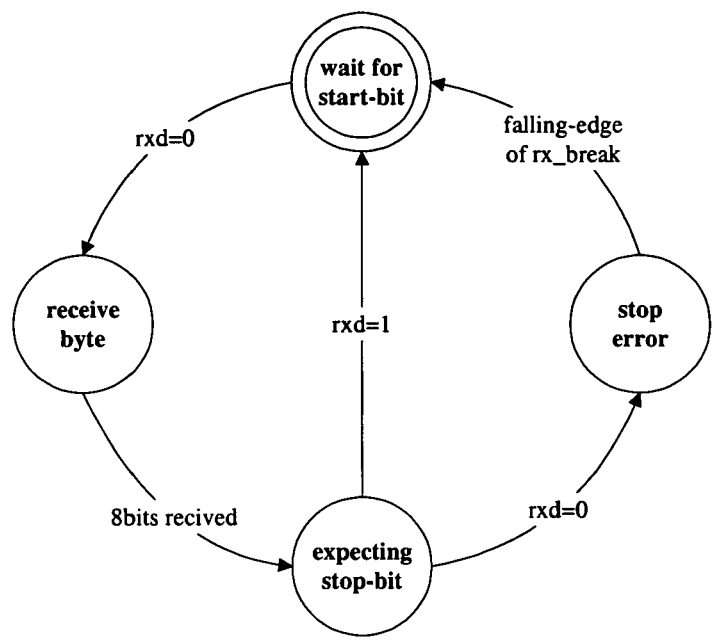

The sif_ser2par block receives the serial bit stream and delineates each byte based on the start and stop bits. On successful delineation the byte is output with an associated valid flag asserted for a single cycle. If rxd is detected to be held low for 10 consecutive cycles (whilst tx_break is asserted) the rx_break_status signal is asserted. This signal is negated when rxd is asserted. If a stop-bit is not found where expected, the start_stop_error signal is asserted. FIG. 78 illustrates the ser2par state machine used to control the serial to parallel conversion.

sif_msgsync

Figure 79:
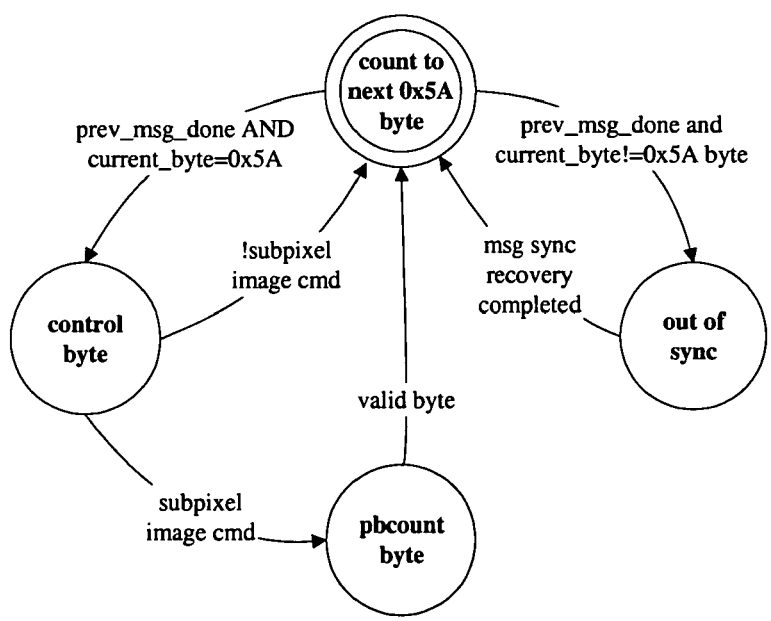

The sif_msgsync block performs message delineation. The message marker byte (0x5A) is used to obtain and check delineation. The message control byte and subsequent argument bytes are used to determine the message length. The msg_sync state machine and associated byte counter is used to control and track the delineation state. This state machine is illustrated in FIG. 79.

The output data is simply a registered version of the input data, with the addition of a control byte flag bit. The message_sync_error output signal is a single-cycle pulse that is asserted when delineation is lost.

sif_msghand

Figure 80:
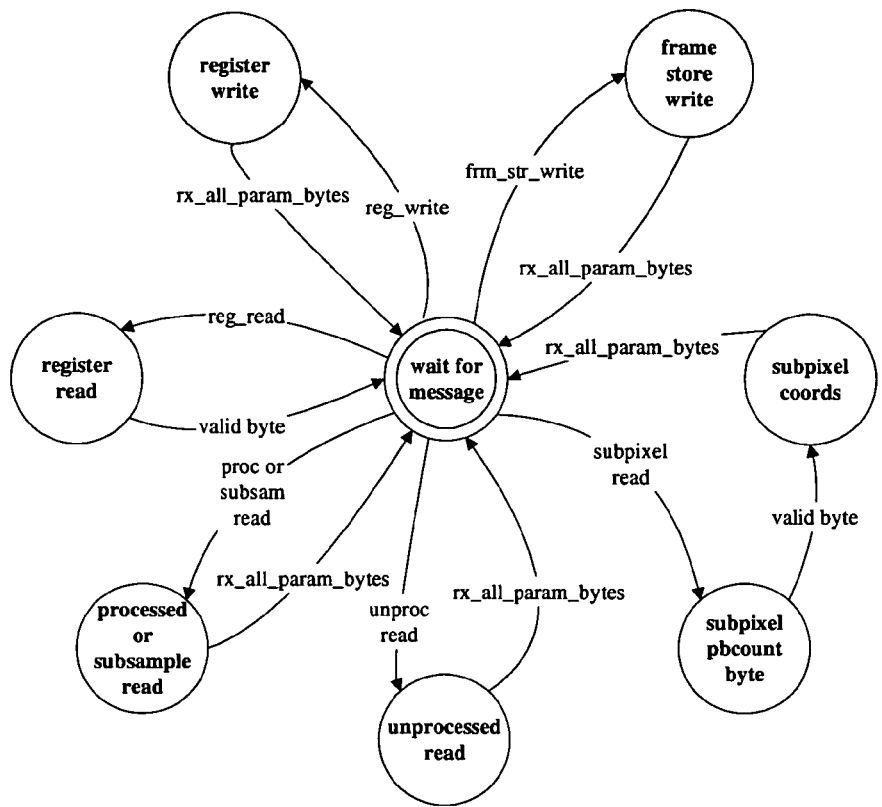

The sif_msghand block performs received message handling. It interprets the message control byte and any subsequent argument bytes. Malformed messages are deleted and an error signal generated (used by the config block). Valid messages are converted into command words. The msg_hand state machine and associated counters control this operation and this state machine is illustrated in FIG. 80.

Figure 81:
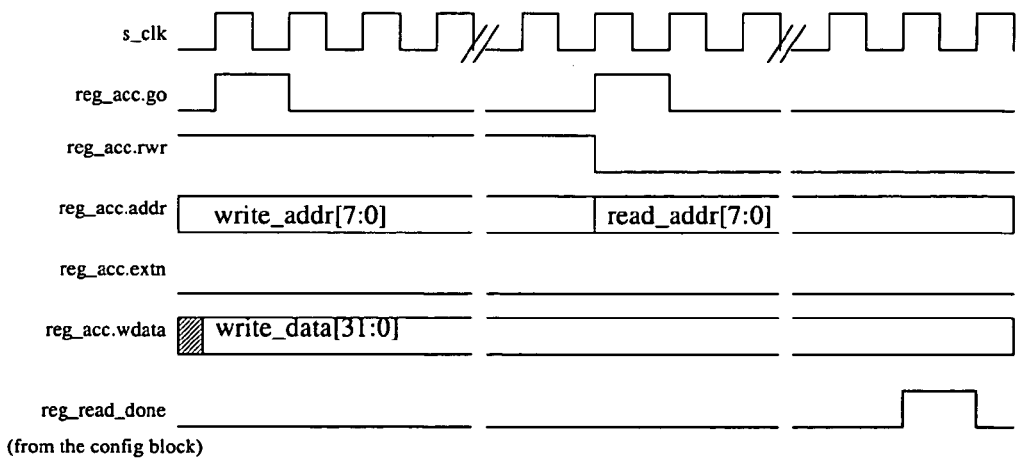

Each register access is translated into a single command word on the reg_acc bus. In addition to the rwr, addr, extn and wdata signals the reg_acc bus has a go signal which indicates the start of a valid access. For register read accesses the reg_read_done signal is returned by the config block indicating that all the read data has been sent to the par2ser block, this enables command overflow error detection. A register write followed by a register read operation is illustrated in FIG. 81.

Figure 82:
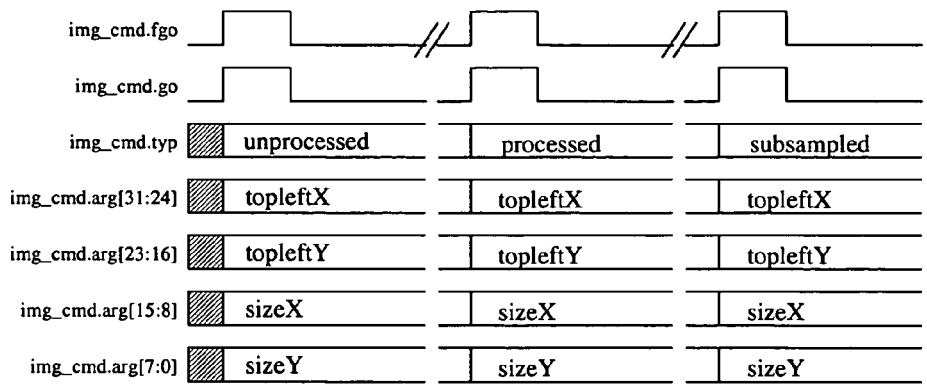
Figure 83:
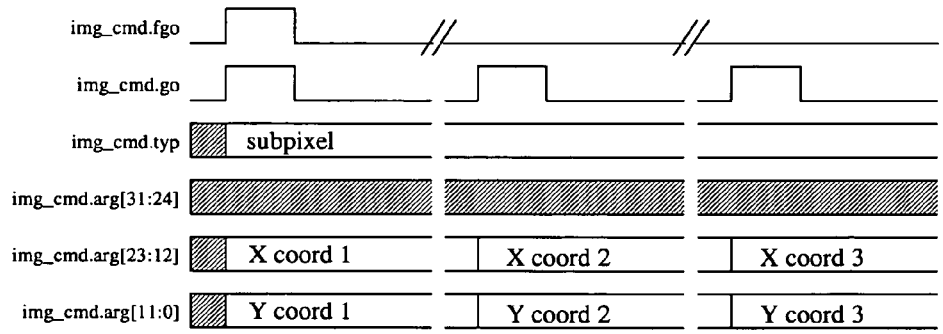
Figure 84:
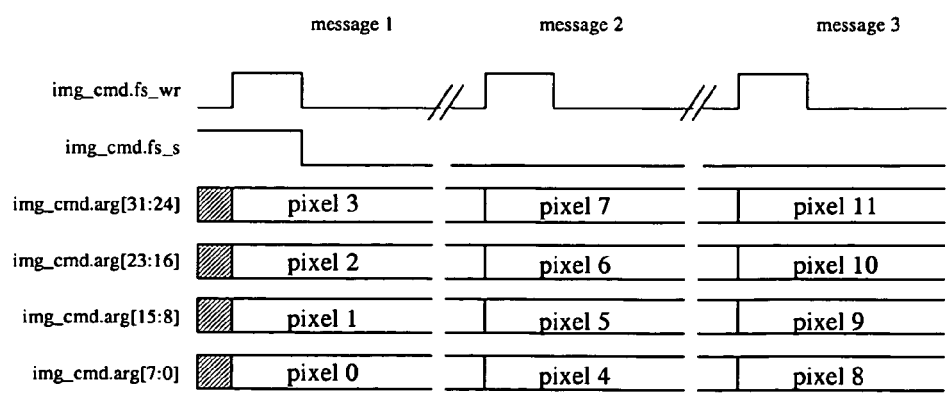

Each image command is translated into a single command word on the img_cmd bus. The subpixel command is the only exception; this command is translated into a series of command words, one for each sub-pixel coordinate (x,y pair). The img_cmd bus consists of six different fields: typ, arg, fgo, go, fs_s and fs_wr. The typ field indicates the image command type. The arg field is a 32-bit bus which carries all the parameter information (topleftX, etc.), this field is loaded with the configuration register values on reception of the message control byte, and then over-written with any message parameters. For non-subpixel image read commands the go and fgo bits are identical and indicate the previously mentioned typ and arg fields of the img_cmd bus are valid and an image read can start. For subpixel image commands the fgo bit flags the first coordinate pair of a command and the go bit indicates the first and subsequent coordinate a pairs for that command. The fs_wr bit (active for a single-cycle) indicates the current data in the arg field part of a direct frame store write. The fs_s bit indicates the start of a frame store write sequence. A sequence of unprocessed, process and subsampled image reads is illustrated in FIG. 82. A subpixel image read command is shown in FIG. 83. FIG. 84 illustrates a direct frame store write sequence.

Figure 85:
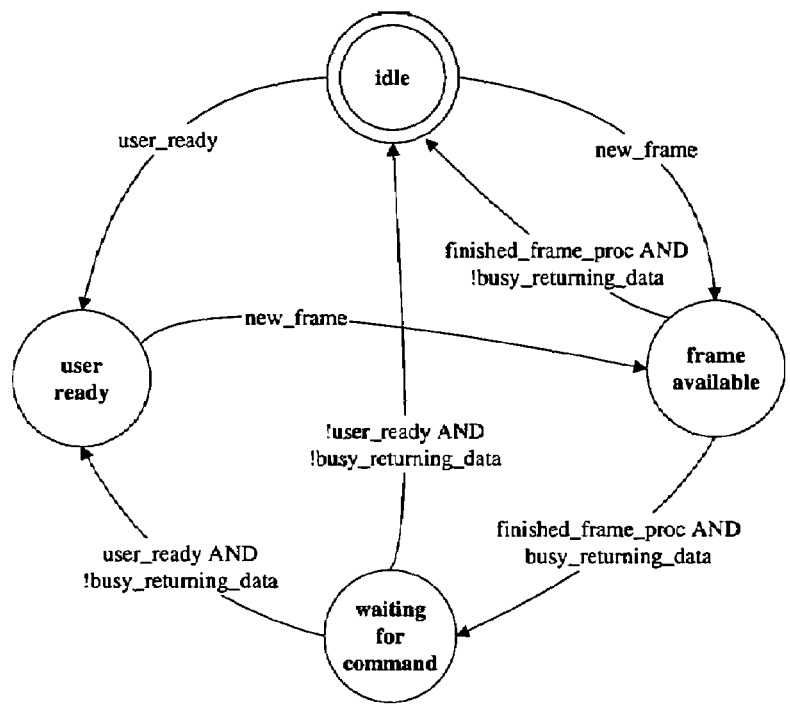

Frame handshaking is also performed by the sif_msghand block. This mechanism controls the generation of the send_rx_new_frm_msg signal (used by the sif_msghdrgen block), the fin_frm_proc pulse (used by the sens_ctrl block) and the clock enables for sq_clk and rq_clk[1:0]. The frame_handshaking state machine which is illustrated in FIG. 85.

In addition the sif_msghand block also detects and flags the following message related errors: malformed_msg, cmd_overflow, img_dat_underflow, fsw_nack.

sif_msghdrgen

The sif_msghdrgen block generates the transmitted message header bytes for image read commands, register read commands, frame_sync and frame_store_write_ack messages. This is done by monitoring the commands issued by the sif_msghand block and generating the appropriate message header when it detects either an image read or register read.

The sif_msghdrgen block also generates complete frame-sync and frame-store-write-ack messages based on the send_rx_new_frm_msg, send_fsw_ack_msg and send_fsw_nack_msg signals respectively. The hdr_done signal is generated and used by within the imgproc block to indicate that the message header has been sent and image data is able to be transmitted.

Figure 86:
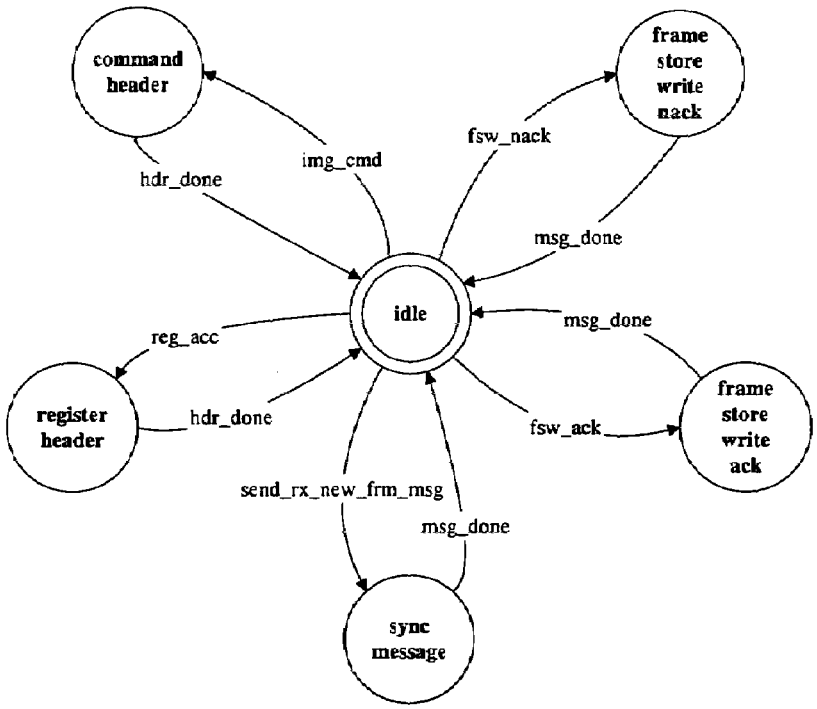

The header_generation state machine and associated counters control the generation of the message headers. This state machine is illustrated in FIG. 86.

For image data messages a two-byte message data byte count field is calculated. For image commands, the number of returned image data bytes is calculated using the command arguments (parameters). This involves a size_x by sizes_y multiplication for the image pixel read commands, and a division by 3 for the subpixel read command. The number of data bytes returned in a register read message is determined via a lookup based on address and whether the register is internal or external.

Message header bytes are output from this block with a fixed cadence of 1 valid byte every 10 clock periods to match the serial interface data rate.

sif_par2ser

Figure 87:
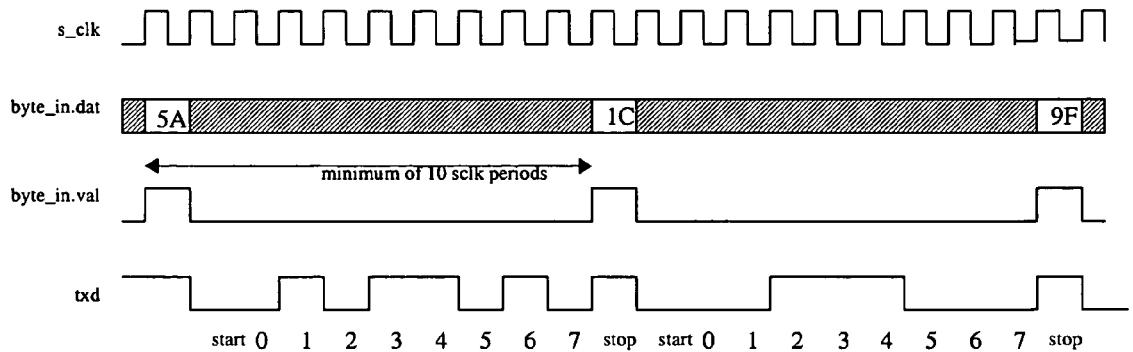

The sif_par2ser block accepts message header, register, stored image and direct image sensor data bytes and converts them to a serial bit stream. When the tx_break input is asserted, normal operation is overridden and the txd output held at logic zero. When tx_break is negated txd is held high until the first valid byte is received, at which point normal operation resumes. It is assumed that only one of the four data sources: message header, register read data, stored image data and direct image sensor data is active at any one time, and that the arriving byte streams are rate-adapted at the serial interface rate of one valid byte every ten sclk periods. This is illustrated in FIG. 87.

Figure 88:
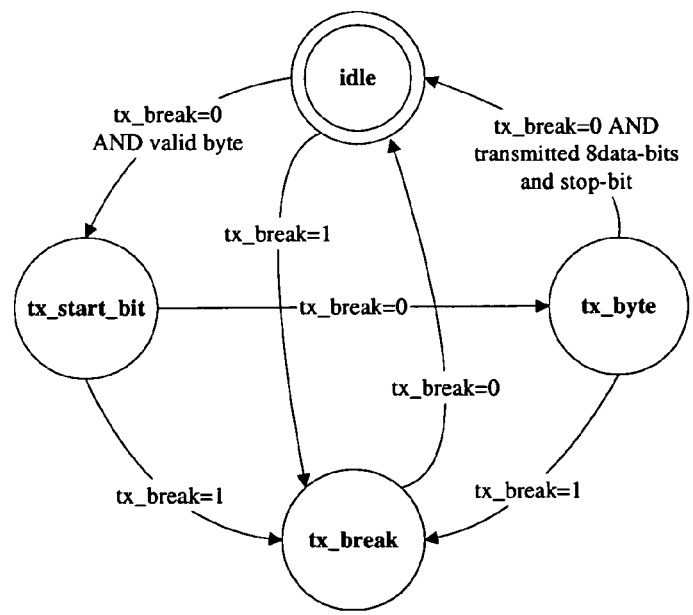

The sif_par2ser samples a valid byte, and the par2ser state_machine and associated counter is used to control generation of the txd sequence: start-bit, serial-bit stream, stop-bit, and any possible tx_break conditions. This state machine is illustrated in FIG. 88.

sif_errhand

Figure 89:
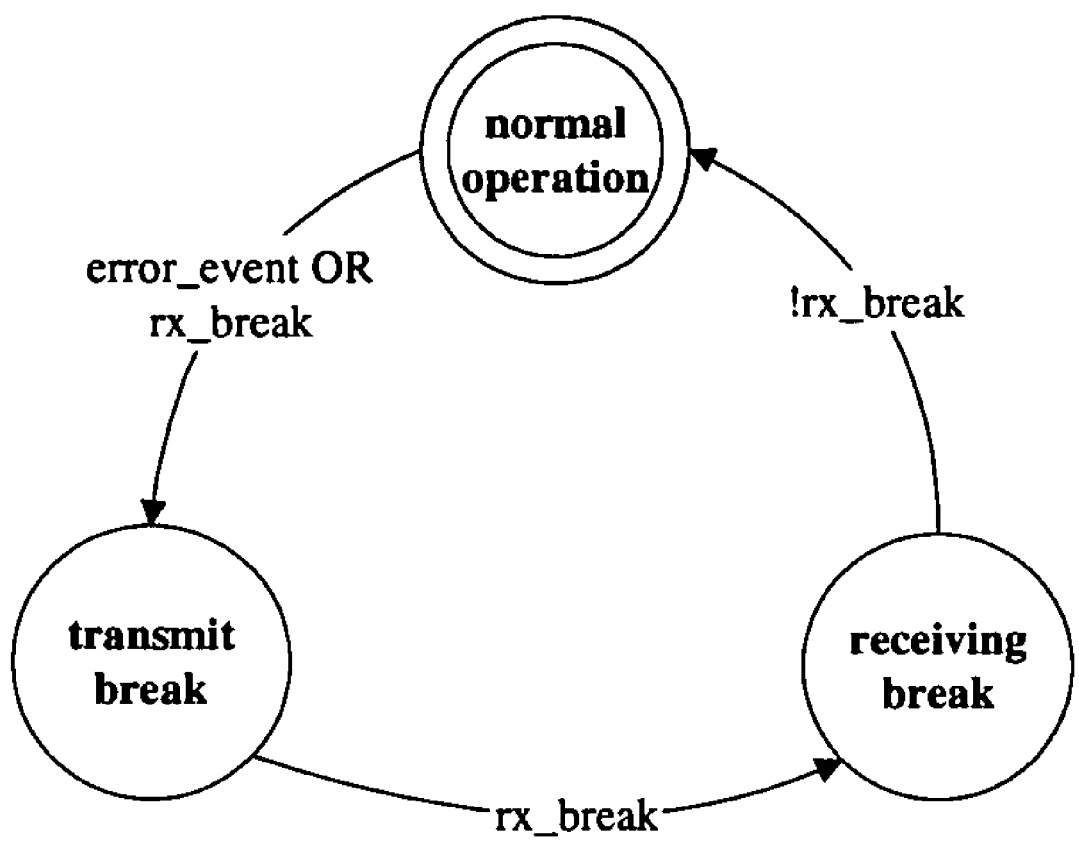

The sif_errhand block performs the error protocol management for the serial interface. The error_handler state machine controls the error recovery process. This state machine is illustrated in FIG. 89.

All serial interface errors are input to the sif_errhand block and collated into the sif_error output signal which is then passed to the config block.

Several error related output signals are generated. The stop_cmd_exec signal is a pulse used by the image processing blocks to abort all command processing. The msg_sync_status signal indicates whether the serial interface is in message synchronization. The tx_break signal indicates that the serial interface should transmit the break sequence.

imgproc

Figure 90:
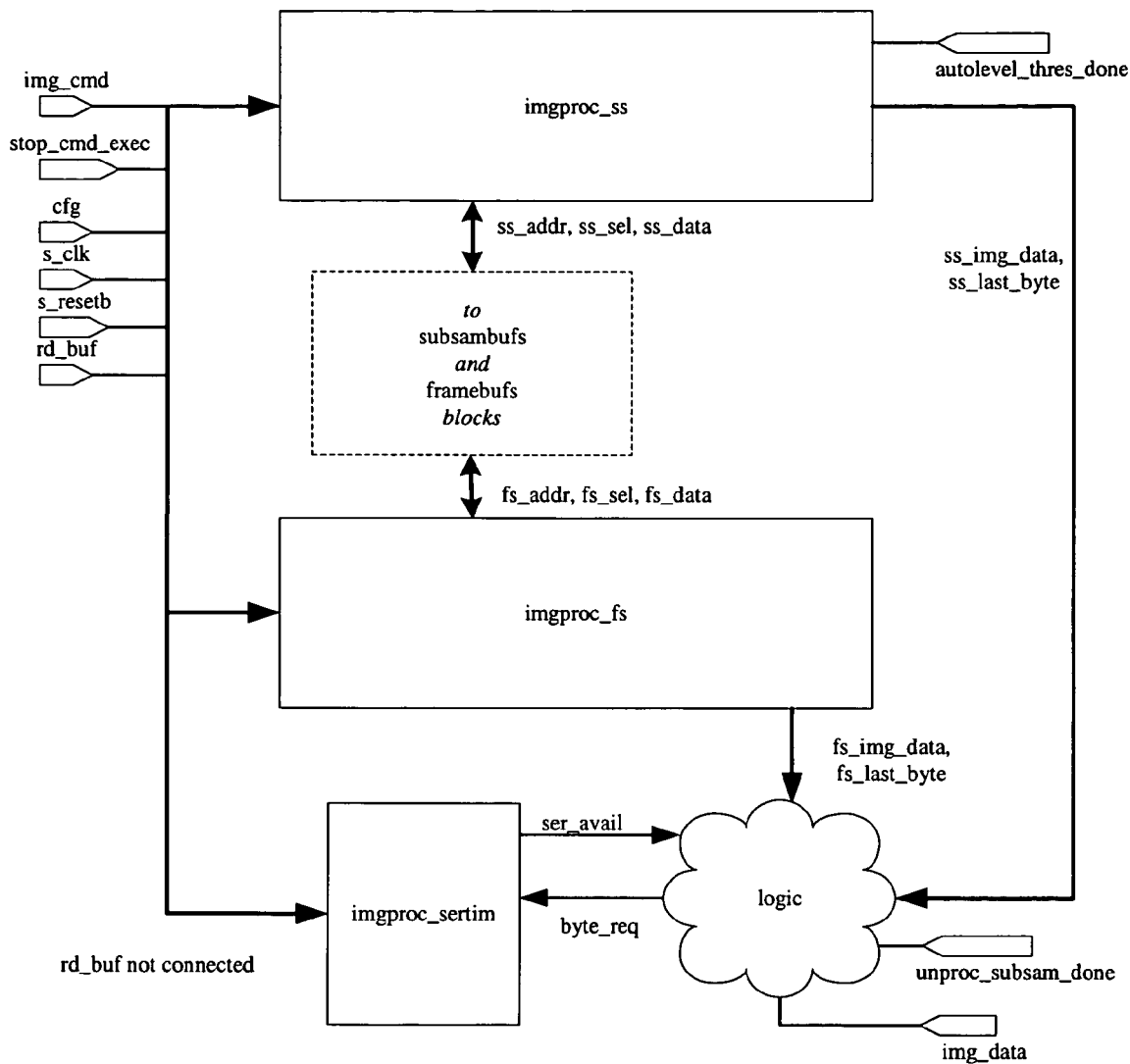

FIG. 90 shows a structural block containing the four image processing functions.

Note that the block 78 is not internal to the imgproc block: it is shown here only to indicate the connectivity to the subsambufs and framebufs blocks.

imgproc_fs

Provides the 'Unprocessed Image Read' function and the 'Sub-pixel Read' function.

The 'Unprocessed Image Read' function scans the region provided in the img_cmd—returning one byte for each pixel in the region.

Figure 91:
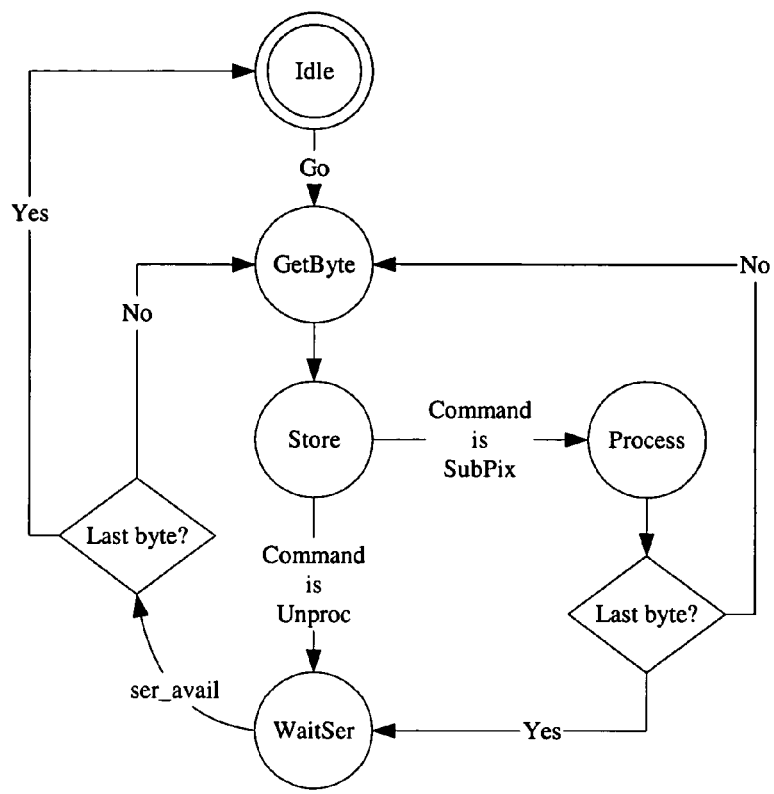

The 'Sub-pixel Read' function re-uses some of the same code—it gets the four pixels required by scaning a 2-by-2 region in the same way as 'unprocessed image read' scans a region, except that it manipulates and accumulates the data on the way and returns only one byte per "region". Its state machine is shown in FIG. 91.

Unprocessed Image Read (function)

For the Unprocessed Image Read function, the Go indication loads counters to produce (x,y) coordinates for the region. The GetByte state is transient and generates an address to the frame buffer. In the Store state, the resulting pixel is stored and the WaitSer state entered. When ser_avail goes active, a byte request, along with the byte, is immediately output. If we are at the end of the region, we return to the Idle state. Otherwise, we update all the counters, moving to the next row if required, and go back to the GetByte state.

Sub-Pixel Read (function)

For the Sub-Pixel Read function, the Go indication loads counters to produce (x,y) coordinates for the 2×2 region with the top left of the supplied coordinate.

The GetByte state is transient and generates an address to the frame buffer.

The Store state is also transient—storing the pixel locally for further processing in the Process state, which performs the weighting function on each pixel as it arrives.

After the Process state, if the last pixel has been processed, the resulting sub-pixel value is stored and the WaitSer state entered. When ser_avail goes active, the byte is sent to the serialif block and the Idle state is entered, because we only ever send out one result per region—the Last Byte status is remembered from the Process-to-WaitSer transition.

imgproc_ss

Provides the 'Sub-sampled Image Read' function and the 'Processed Image Read' function.

Sub-sampled Image Read (function)

The 'Sub-sampled Image Read' is highly similar to the 'Unprocessed Image Read' function, except some multiplexing is required to get the single byte of data out of the 8-bytes returned from the sub-sample buffer.

Processed Image Read (function)

The 'Processed Image Read' function is the most complicated of all the functions.

The required output is a stream of 1-bit pixel values for a specified region. The pixel order is row-by-row, and left to right within each row, with each row's pixels padded out into an integer number of bytes.

Figure 92:
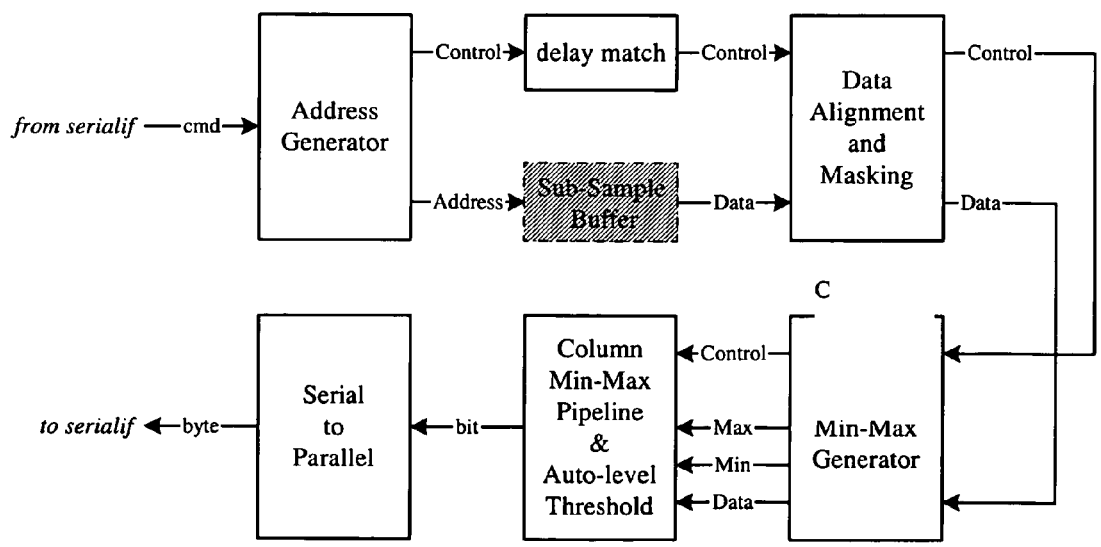

FIG. 92 below shows the sub-functions of the function. Note that the Sub-Sample Buffer is shown here only to show the cadence of the data.

Address Generator Sub-function

The algorithm for producing a stream of range-expanded and thresholded pixels in this order involves scanning across each row of the requested region, starting each row from 2 columns before the LHS of the region and ending 2 columns past the RHS of the region. The two rows above and two below are automatically returned for each address generated, so there is no need for these extra rows to be explicitly addressed.

Control info is passed ahead that indicates; which five bytes to use from the eight returned; whether to pad this bit; whether this column is valid; whether or not the first two rows are valid; whether or not to generate a bit for this pixel; and when to send a full byte.

Delay Match Sub-function

Since the Sub-Sample Buffer returns data in the next cycle, the control info that matches the data must be delayed by one cycle.

Data Alignment and Masking Sub-function

Takes the 8 bytes from the Sub-Sample Buffer and selects the appropriate 5 rows. Also invalidates bytes that are not wanted in the min-max calculation.

Column Min-Max Generator Sub-function

Figure 93:
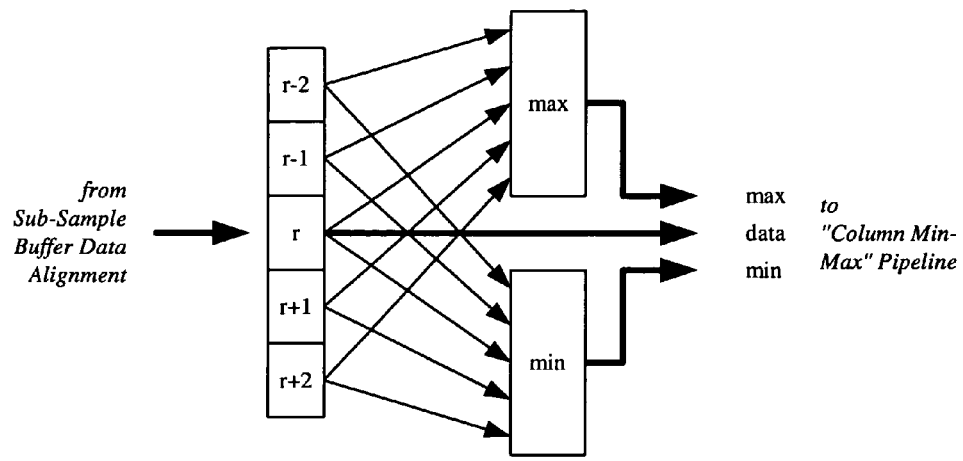

At each column, the pixel data and the two bytes above and below are processed to give the min and max values over that 5-byte column—this is shown in FIG. 93.

Column Min-Max Pipeline and Range-Expand and Threshold Sub-function

These min, max and pixel values are pushed together into a pipeline with the four previous min-max-pixel values.

Figure 94:
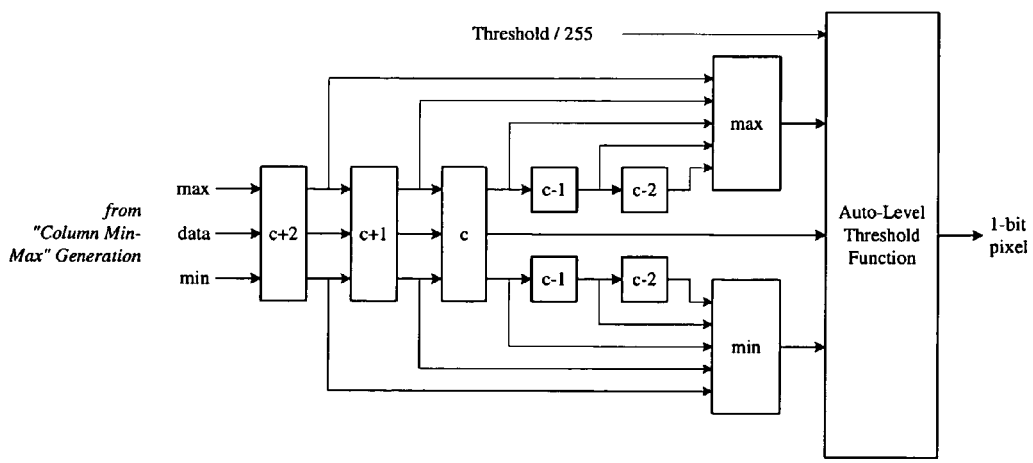

These five pipelined values are then min-maxed to find the min and max over the 5-by-5 region centred around the pixel in the middle of the pipeline—this is shown in FIG. 94.

Because we can read all five bytes for a column in a single cycle, once the pipeline is full, we can produce one auto-level-threshold pixel value per cycle for every cycle after that.

Serial-to-parallel Sub-function

Bits are just shifted into an 8-bit shift register and the resulting byte sent to the serialif when requested by the address generator—remembering that the address generator controls the cadence for the entire block; including the output byte stream to the serialif.

Handing Out-of-bounds Pixels

When parts of the 5×5 threshold region fall outside the window, these parts need to be excluded from the min-max calculation. This is all controlled at the Address Generator.

a. Top Side

When the row being thresholded is either row 0 or 1, then the two byte rows above the thresholded row in the return value are individually masked as required.

b. Bottom Side

As each row is written from the image sensor side, all the byte lanes lower than the actual one being written are also written with that same value. This means that the last row is duplicated at least two extra times, and these duplicated rows can be used in the min-max calculation without affecting the min-max result.

c. Left Side

The final decision is not made yet—one possibility is to allow negative X values and mask the entire 5-byte result from the min-max calculations if X<0. Another would also allow negative X values, but overwrite the X value in the address calculation to zero if X<0.

d. Right Side

The X coordinate of the current read will be checked against the window width and the resulting 5-bytes masked if it is outside the window.

Padding the Output Byte

When the width of the region is not divisible by 8, padding bits are added at the end of the byte. The process that sweeps across the row actually acts as if the width was divisible by 8, but supplies an extra bit into the pipeline to tell the final stage of the range-expand and threshold function to use the configured padding bit instead.

Achieving 100% throughput

Due to the requirement to pad the output stream to 8-bits at the end of each row, I will only talk here in terms of possible utilization of the output serial bus, and not the throughput in terms of true, useable data.

The output serial bus will only be less than 100% utilized when the region width is 8 pixels or less.

To achieve 100% throughput across the serial interface, the range-expand and threshold function needs to output (on average) 8 bits every 10 clocks.

During the bulk of long rows, this is not a problem. Once the pipeline has been filled, the range-expand and threshold function can output one bit per cycle. In fact, we have to slow it down to produce only eight bits every ten cycles.

On the other hand, there are two dead cycles at the start of and at the end of each row—so between rows there are four dead cycles.

Figure 95:
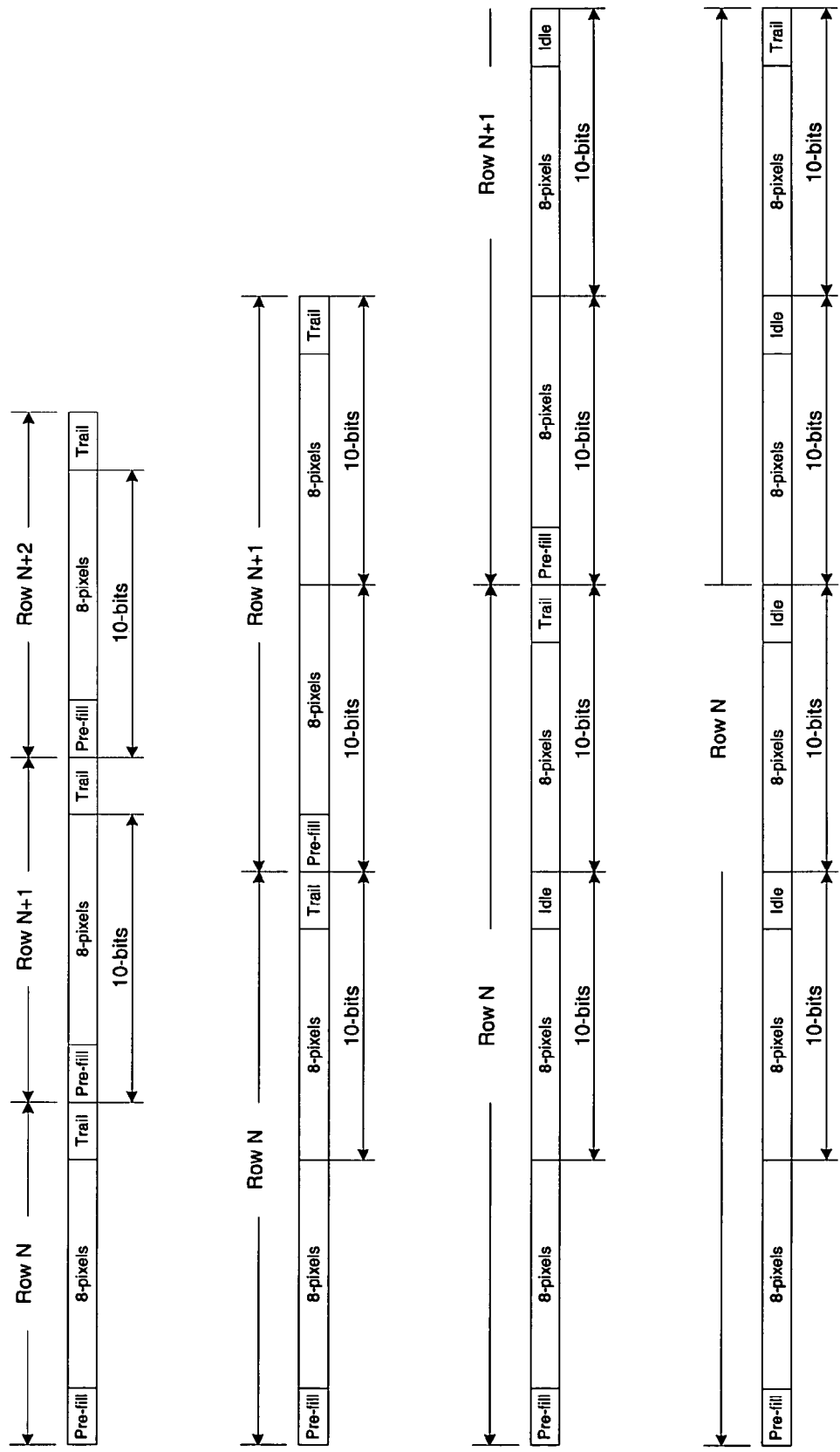

Noting from before that the address generator always produces a row bit-stream that is divisible by 8, we see how the output bitstream progresses for region widths of 8, 16, 24 and 40 pixels. See FIG. 95.

This figure shows the cadence of the bytes arriving at the centre of the pipeline (see FIG. 94), and the 10-bit output cadence each 8-bit block.

The 2-cycle Pre-Fill state indicates the pipeline receiving the max-min values of the two columns to the left of the first pixel in the region. Similarly, the 2-cycle Trail state indicates the two columns to the right of the last pixel in the row passing through the centre point as the pipeline is flushed. Note that the Trail state is followed immediately by a new Pre-fill state: the data for the next row follows right behind the previous row.

The 2-cycle idle state is used periodically to stop the input data rate exceeding the output rate.

The blocks of 10-bits show how the 8-bit data just collected is output to the serial port. Because the serialif block takes data in 8-bit chunks in a single cycle, then serializes it over 10 cycles, there is no need for a FIFO as such, just a shift register. The address generator ensures that the shift register will never overflow.

imgproc_sertim

The imgproc_sertim block provides the serial timing for the output byte stream, independent of the serialif. It is used by the imgproc_fs and imgproc_ss blocks.

This block thus must be 'tuned' to the operating parameters of the serialif block. It basically provides an initial hold-off time at the start of each 'fgo' (first-go) for the serialif to send the response pre-amble, then allows one byte out every 10 cycles.

The imgproc_sertim state machine is shown in FIG. 96. Notes for the state machine are as follows:
1. FirstGo—This is the 'fgo' field of the image command from the serial_if. This basically says: "Wait for the serial_if to end out a command header before you start".
2. When stop_img_cmd='1', this acts as a global reset and overrides other transitions.
3. The ser_avail output is '1' only during the ProcByte state. The ByteRequest may come immediately (in the same cycle), so this state may only last for one cycle.
5. The HdrWait state will last for 30 cycles. The WaitSer state will last for 9 cycles, and when added to the minimum one ProcByte state, we get the required 10 cycles for every byte.

framebufs

Structural block that instantiates either one or two framebuf blocks, depending on the buffering generic passed to it.

It makes sure the correct buffer is accessed by the imgsensif and imgproc blocks.

The two rq_clks are each directed to their respective buffers.

The two blocks (imgsensif and imgproc) accessing the frame buffers each provide two memory enable (sens_me(1:0) and user_me(1:0)) signals, one for each buffer. The framebufs block just directs each enable signal to each individual framebuf block, while all other inputs are simply connected to both blocks. For example, sens_me(1) is connected to the sens_me port of framebuf_1.

This block also multiplexes the two sens_dout output buses from each buffer onto the higher level sens_dout. It does likewise for user_dout.

Each block ensures that only one of its' enable signals is set at a time, and the higher layer protocol ensures that the two blocks don't clash with each other.

At this point the fs_width generic is used to calculate the size of each framestore buffer RAM (in bytes). This value is passed down as a new generic mem_size.

framebuf

Structural block that instantiates the RAM required for a single frame buffer. Provides write only access for the imgsensif block and read only access to the imgproc block.

fs_ram_bist

This block provides an fs_ram and a BIST block to test it.

RAM bypass is also provided here—the din, addr, en and we signals are concatenated, zero extended to the next 8 bit boundary, chopped into 8 bit chunks and XORed to provide a final 8-bit value. This value is muxed onto the dout port when tmode is active.

Note that two are required per subsambuf block, to provide 70-bit wide access.

fs_ram

This block provides a wrapper around the fs_asic_ram.

It is assumed that the fs_asic_ram is 32 bits wide, with 4 individually writable byte lanes.

This block converts to the 8-bit accesses of the main design to 32-bit RAM accesses, and back again. It also converts the VHDL unsigned types of the main design with the std_logic_vector types of the fs_asic_ram.

This block may need to be recoded depending on the final RAM implementation.

fs_asic_ram

This is the component that must be replaced with the actual silicon RAM.

It is assumed to be single-port, synchronous and 32-bits wide with four independently writeable byte lanes. It's size (in bytes) should be at least fs_width**2, where fs_width is the Callisto top level generic.

subsambufs

Structural block that instantiates either one or two subsambuf blocks, depending on the buffering generic passed to it.

The two rq_clks are each directed to their respective buffers.

The two blocks (imgsensif and imgproc) accessing the subsample buffers each provide two memory enable (sens_me(1:0) and user_me(1:0)) signals, one for each buffer. The subsambufs block just directs each enable signal to each individual subsambuf block, while all other inputs are simply connected to both blocks. For example, sens_me(1) is connected to the sens_me port of subsambuf_1.

This block also multiplexes the two sens_dout output buses from each buffer onto the higher level sens_dout. It does likewise for user_dout.

Each block ensures that only one of its' enable signals is set at a time, and the higher layer protocol ensures that the two blocks don't clash with each other.

subsambuf

A structural block that instantiates the RAM required for a single sub-sample buffer. It provides read/write access for the imgsensif block and read only access to the imgproc block.

The address manipulation and data multiplexing is provided at this level.

ss_ram_bist

This block provides an ss_ram and a BIST block to test it.

RAM bypass is also provided here—the din, addr, en and we signals are concatenated, zero extended to the next 35 bit boundary, chopped into 35 bit chunks and XORed to provide a final 35-bit value. This value is muxed onto the dout port when tmode is active Note that two are required per subsambuf block, to provide 70-bit wide access.

ss_ram

This block provides a wrapper around the ss_asic_ram. It provides no other function than to convert the VHDL unsigned types of the main design with the std_logic_vector types of the ss_asic_ram.

This block may need to be recoded depending on the final RAM implementation.

ss_asic_ram

This is the component that must be replaced with the actual silicon RAM.

It is single-port, synchronous and 35-bit wide. It's minimum size is determined by the Callisto top level generic fs_width, and is calculated as follows:

ss_width=int((fs_width−1)/3)+1 ss_height=int((ss_width+4−1)/8)+1 ss_mem_size(min)=ss_width*ss_height where int(x) is the integer part of a real number x.

See the ss_mem_size_f( ) function in the imgsensproc VHDL package.

imgsensif

Figure 97:
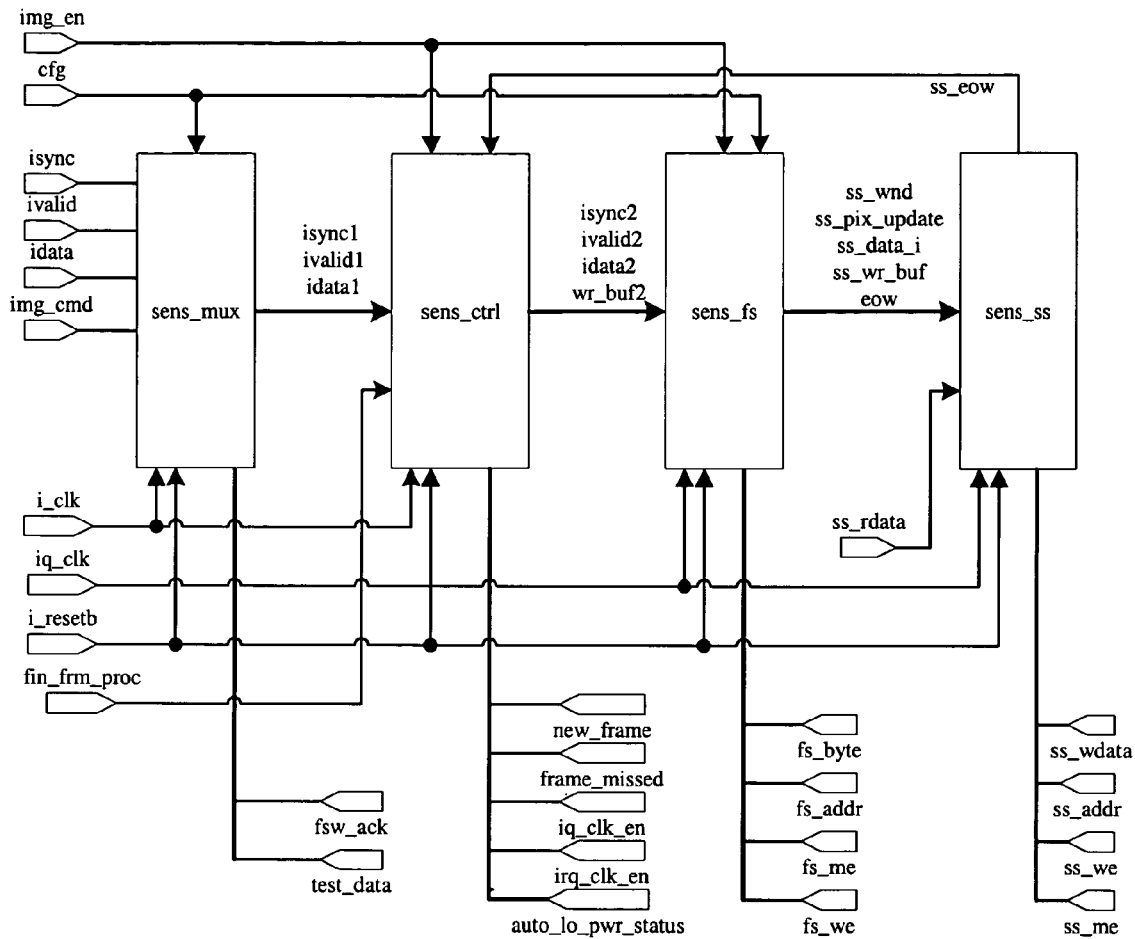

As shown in FIG. 97, imgsensif is a structural block that pushes data from the sensor to the frame and sub-sampled buffers.

sens_mux

Enables either the sensor interface or the serial interface to write frame data. Always clocked—see also section Clocking.

It detects the rising edge of isync and generates a single pulse on the outgoing isync1. In test mode, this block will also present every tenth value of the sensor interface to the serialif block via the test_data signal.

sens_ctrl

Controls which buffer a frame will go into, and controls the sensor side clocks.

If a buffer is available, sens_ctrl passes data through to the next available buffer and waits for 'EOW' from sens_ss. 'EOW' marks a buffer as full and causes sens_ctrl to generate 'new_frame' to the serialif. 'fin_frm_proc' from the serialif frees the oldest buffer. If no buffer is available at the start of a frame, the frame is dropped and a 'frame_missed' pulse is generated.

Figure 99:
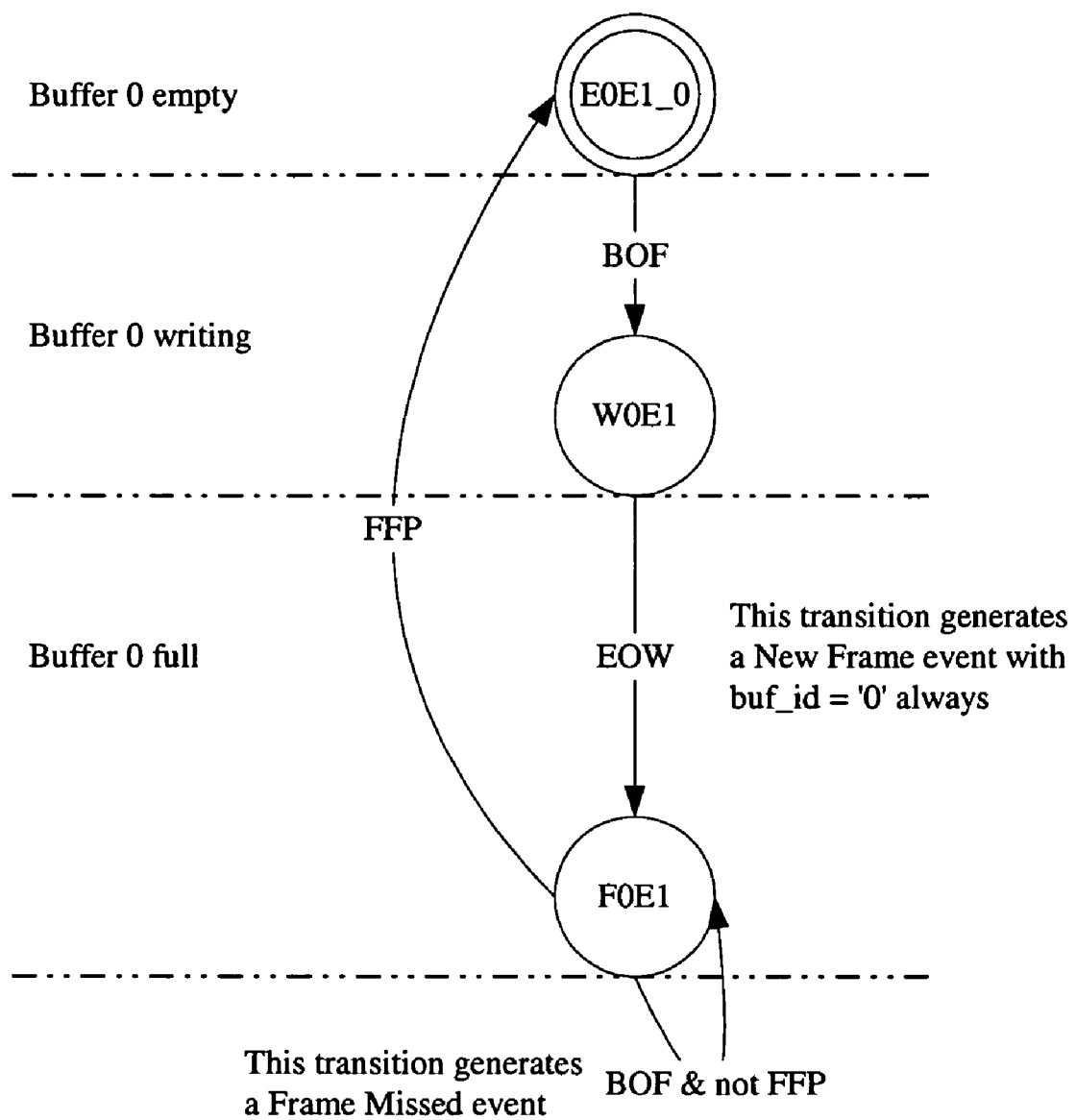

Two VHDL architectures are provided in the design—the fsm architecture is a double-buffered version (FIG. 98), while the onebuf architecture is a single buffered version (FIG. 99).

sens_fs sens_fs performs the windowing function and writes all data inside the window into the frame store buffer.

It also calculates sub-sample pixel sub-row values (performing pixel replication where required) and passes theme to the sens_ss block.

These sub-sample pixel sub-row values are the sum of the three pixels in the same row of a sub-sample pixel. Thus, over three rows of frame pixels, three sub-row values are sent for each sub-sample pixel. When pixel replication is performed on the bottom edge, fewer than three sub-row values are sent.

Sub-sample pixel replication is performed at the right and lower edges of the window. First, the end frame pixel is replicated to the right if required—producing an intermediate sum with any unreplicated pixels in the same row. Then, only during the last row of the window, this intermediate sum is also multiplied by 1 plus the number of rows that need to be filled—either 1 or 2. This is the final sub-row value that is passed to the sens_ss block.

sens_ss sens_ss takes the sub-sample row value and updates the sub-sample buffer.

The subsample buffer is capable of accumulating 11-bits per pixel for an entire row of subsample pixels at a time.

When the first sub-row value for a sub-sample pixel arrives, it overwrites the value in the subsample buffer. When the second or third sub-row value arrives, it is added to the value in the sub-sample buffer. When the last sub-row value arrives (and this may also be the first, second or third sub-row value depending on bottom edge pixel replication) the result is divided by 9 before being written to the sub-sample buffer.

flash_expose

The flash_expose block generates the flash and expose image sensor timing output signals. The timing of these signals is based on either the internally or externally generated capture timing signal, and the flash and expose delay and high-time configuration values. A 24-bit counter is used to either generate or track the capture signal depending on the state of the CaptureIn configuration bit. Two 16-bit counters are used to generate the flash and expose signals. These counters (one for flash, one for expose) are loaded with the delay value when the capture signal is pulsed. They countdown and are subsequently loaded with the high-time value when the count is zero, at which point the timing signal (flash or expose) is asserted. When the high-time count reaches zero, the timing signal is negated and the counter remains inactive until the capture pulse is detected.

The flash_expose block accepts the variant generic which disables the generation of the fval signal, which is used only on the Europa design.

synch

A structural block containing synchronizers for data transfers between the sclk and iclk domains. Three types of signal synchronization are used: level, reset and pulse.

synchronizer

Figure 100:
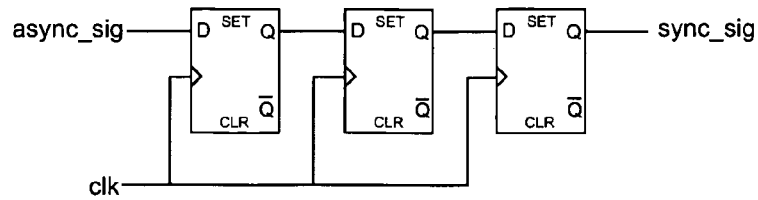

Synchronizes a signal using a standard n-stage synchronizer with the number of stages defined by the num_sync_stages_nc constant (3). The synchronizer design is illustrated in FIG. 100.

reset_sync

Figure 101:
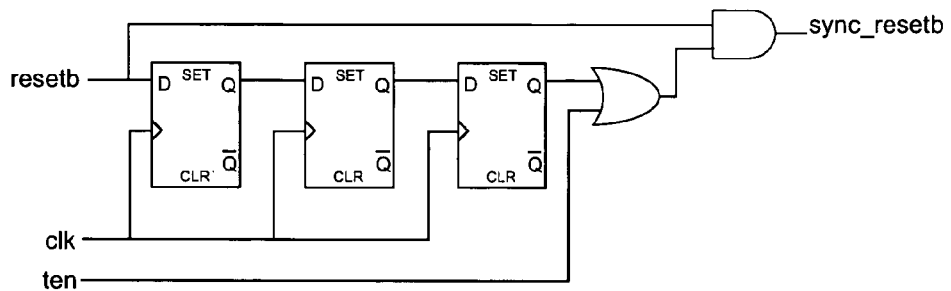

The reset_sync block synchronizes an active-low reset signal and produces an asynchronous assert (falling edge) and synchronous negate (rising edge). The number of synchronizer stages is defined by the num_sync_stages_nc constant (3). This synchronizer uses flipflops that are not reset. The test mode input (tmode) enables the output reset signal to be fully controllable during scan testing. The reset_sync design is illustrated in FIG. 101.

sig_pulse_sync

Figure 102:
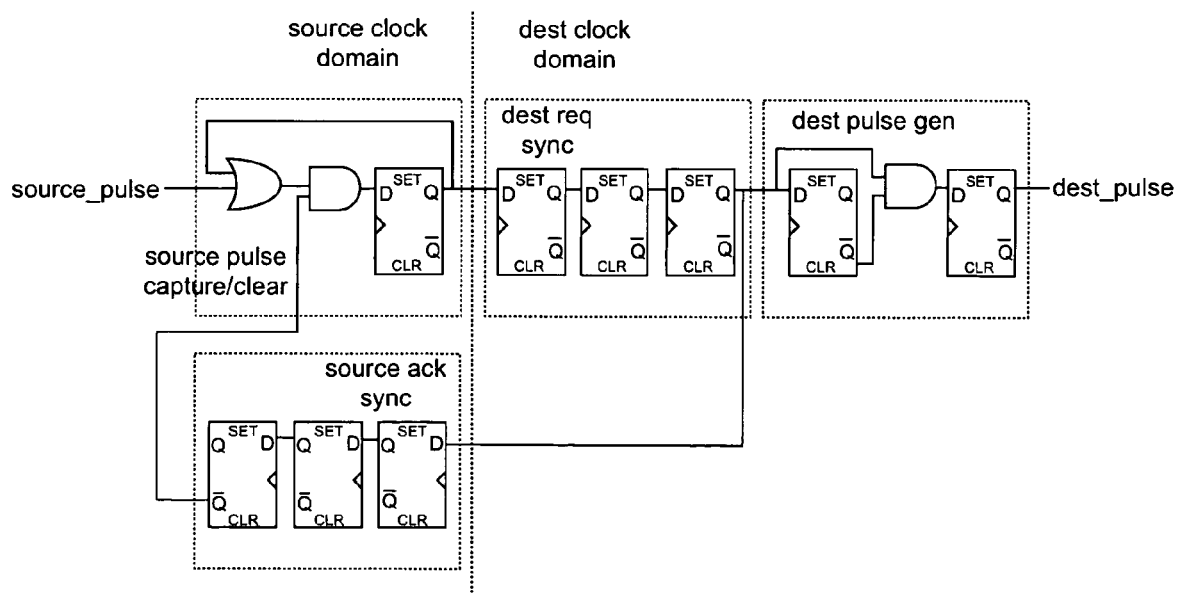

The sig_pulse_sync block synchronizes a pulse from one timing domain to another. Due to scan-test restrictions, this is implemented using flipflops (instead of latches). The operation is as follows: the rising edge of the source pulse asserts the req signal. This req signal is then synchronized by the destination clock and the rising edge of the synchronized req signal used to generate a pulse in the destination clock domain. Meanwhile, the synchronized req signal is fed back to the source domain, where is it acts as an acknowledge. It is synchronized and used to reset the original req flipflop. The sig_pulse_sync design is illustrated in FIG. 102.

VHDL Generics

There are three independent generics used in the design.

The variant generic takes on the values v_europa or v_callisto. This is set on the instantiation of the core block, and is spread throughout the design where required. It is used mostly to optimise the subsample buffer address equation, but also in the sif_msghand block.

The buffering generic takes on the values b_single or b_double. It is also set on the instantiation of the core and spread where needed. It is used to conditionally instantiate the second of the double buffers. It is picked up by the config block to be reflected in the BufferingMode field of the Chip ID register.

The fs_width generic is set on the callisto entity at the very top of the design. It defines the width and height of the framestore buffer—each framestore buffer must hold at least fs_width*fs_width bytes—and it can take on values 1 to 256. This value is used to calculate the framestore buffer RAM address from the (x,y) coordinates and the subsample buffer RAM address as described above under the Architectural Overview.

The framebufs and subsambufs blocks use the fs_width generic to calculate the ss_asic_ram and fs_asic_ram memory sizes, which are passed down as the mem_size generic. This mem_size generic is used by the BIST circuitry to calculate the number of RAM addresses to test, and by the ss_asic_ram and fs_asic_ram behavioural models—which assume that the final Callisto implementation actually uses the minimum required memory sizes for a given fs_width. If more memory is actually used than is defined by fs_width, it will be used, but will not be tested by BIST.

The three generics always appear on component entities with default values of v_europa, b_double and 128 respectively. These defaults are purposely set to the values required to synthesize Europa.

Buffering

The design of the entire core is such that single and double buffering can be handled with relative ease.

The double-buffering scheme is fundamentally controlled inside the sens_ctrl block. It controls its own writes to the buffers, and when a new buffer is received, the new_frame event it sends to the serialif contains the number of the buffer that was written. It is this value that the serialif subsequently includes with all its image commands to the imgproc block, and uses to enable the sclk onto the appropriate rq_clk.

Figure 103:
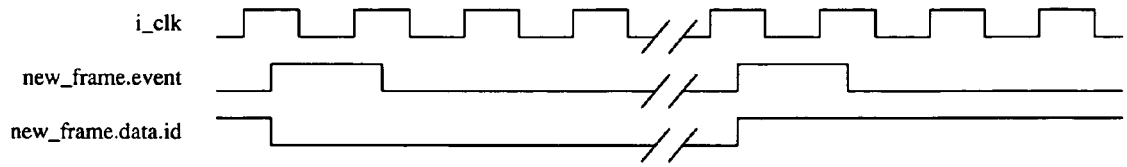

The single buffered architecture (onebuf) of the sens_ctrl block will only allow one buffer, and will only ever set new_frame.data.id to '0'. FIG. 103 shows new frame events in a double buffering environment.

Single Buffering

Figure 104:
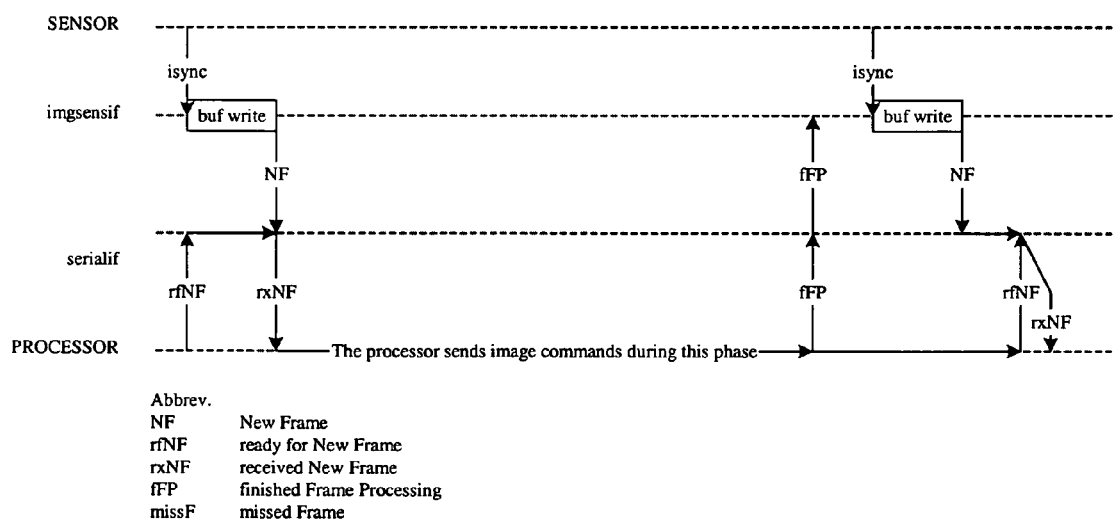
Figure 105:
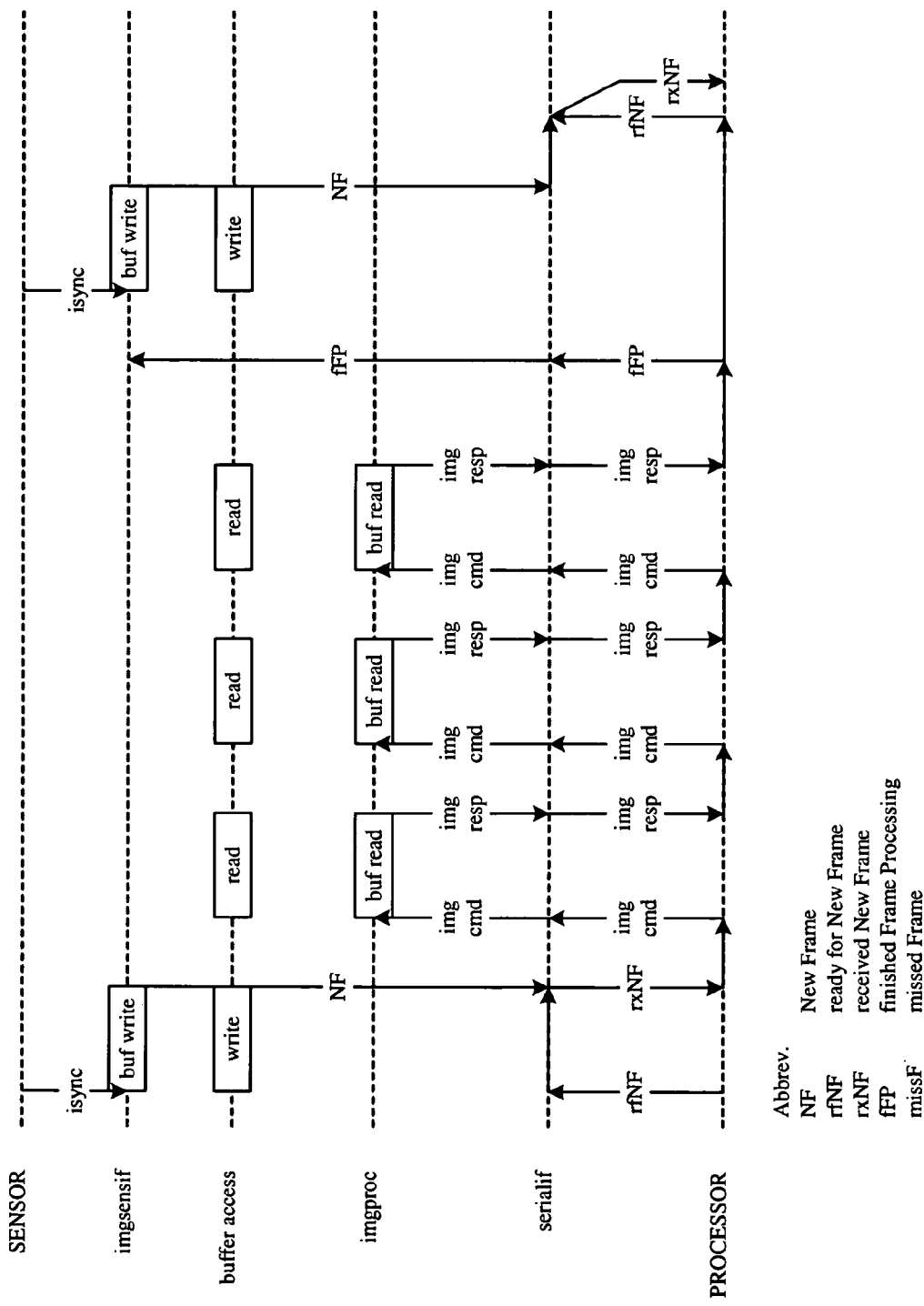

The basic cycle under normal operation, i.e. no missed frames, is shown in FIG. 104. FIG. 105 shows normal operation, including all commands.

Single Buffer—Normal Operation

Figure 106:
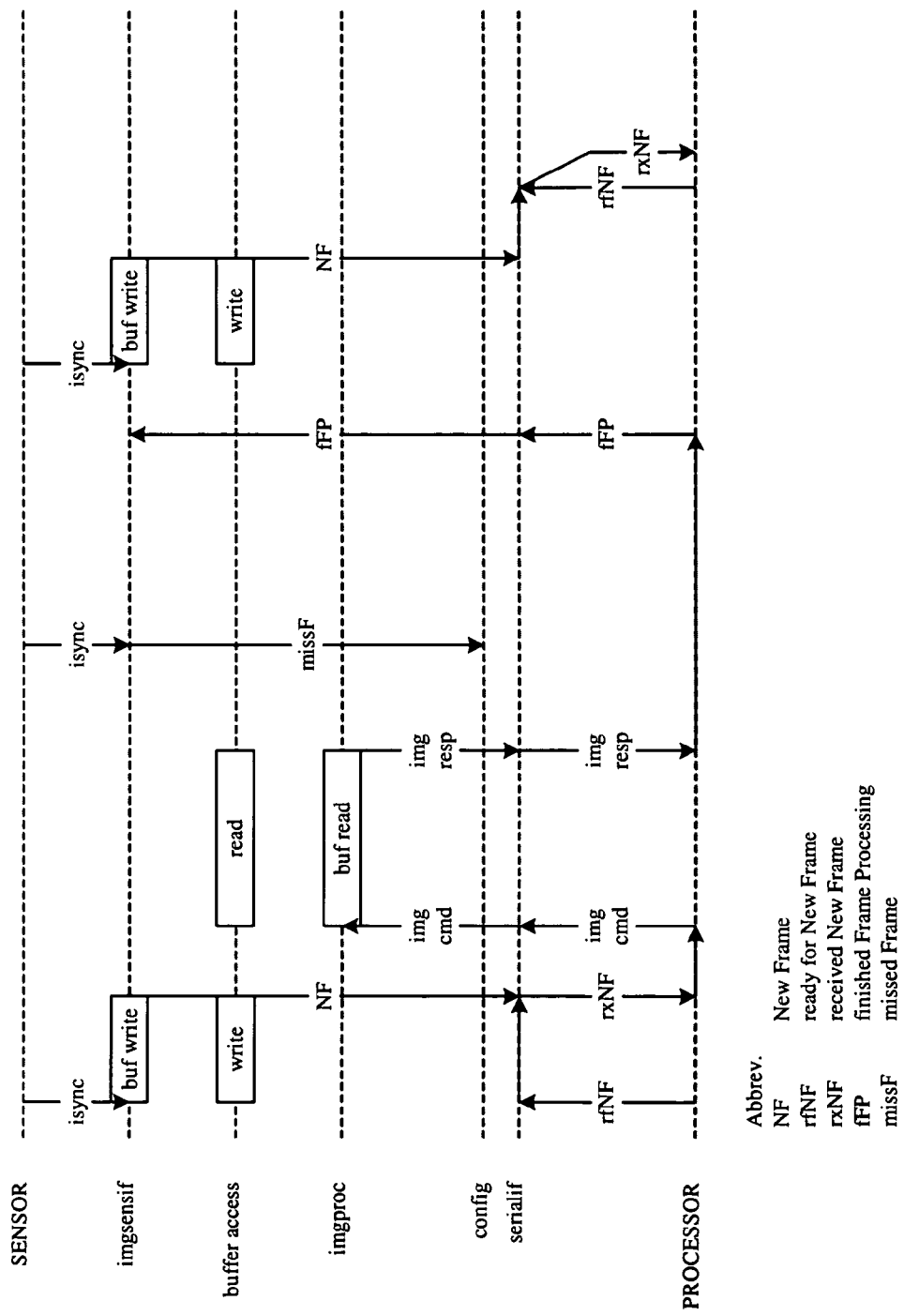

FIG. 106 shows a frame arriving at the imgsensif before the "Finished Frame Processing" event arrives from the processor. We see that the "New Frame" only comes in response to isync after "Finished Frame Processing".

Double Buffering

Figure 107:
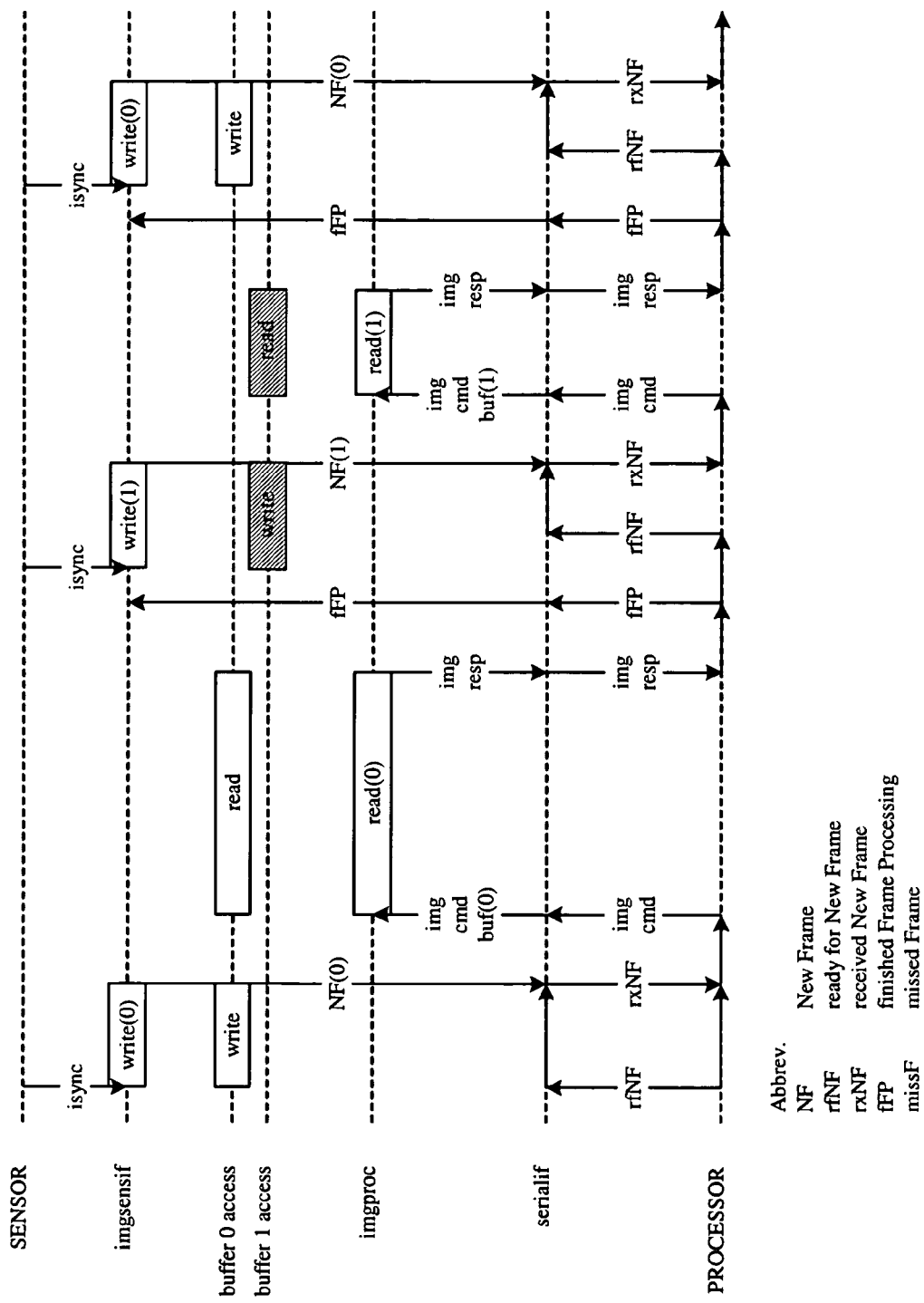
Figure 108:
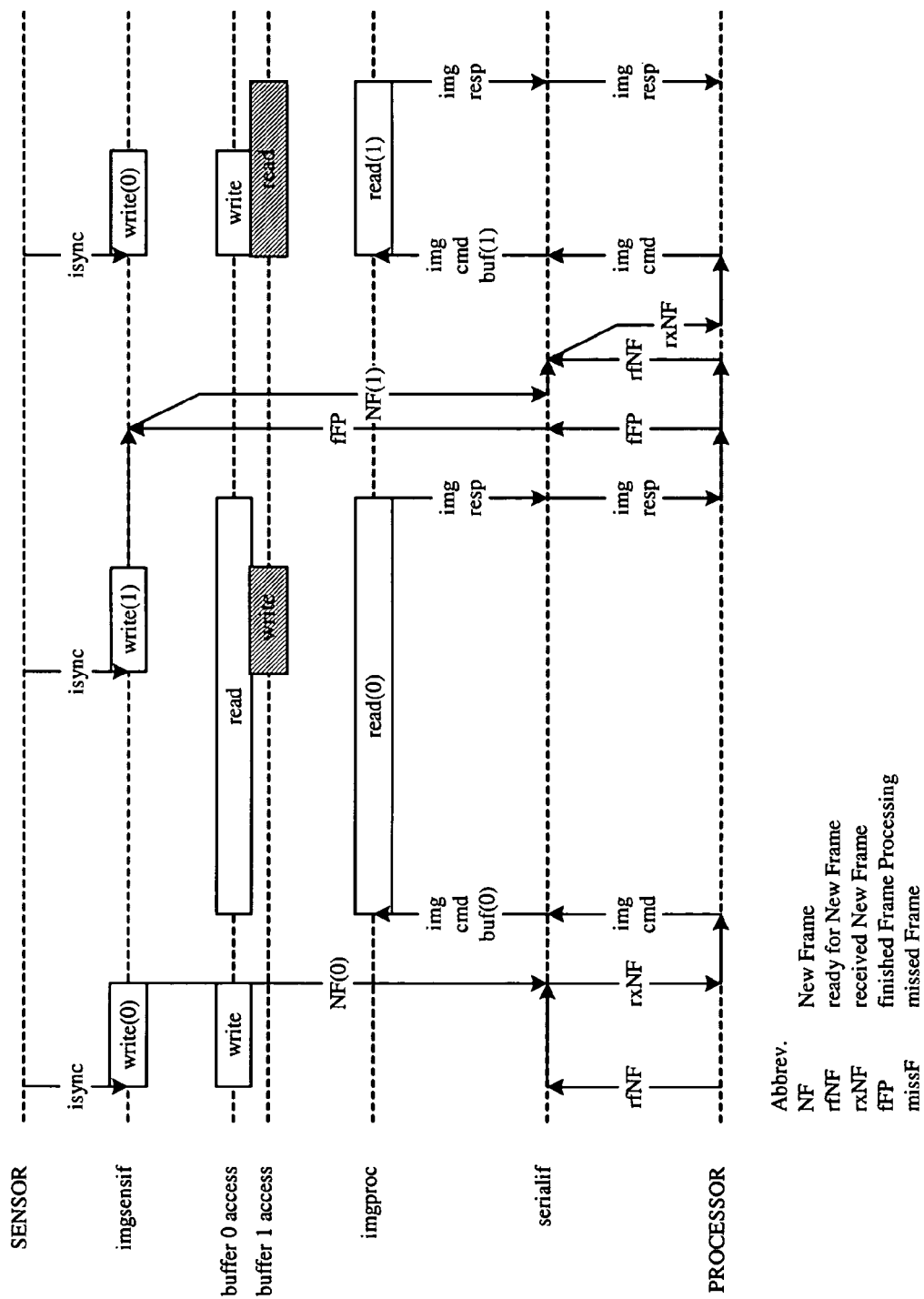
Figure 109:
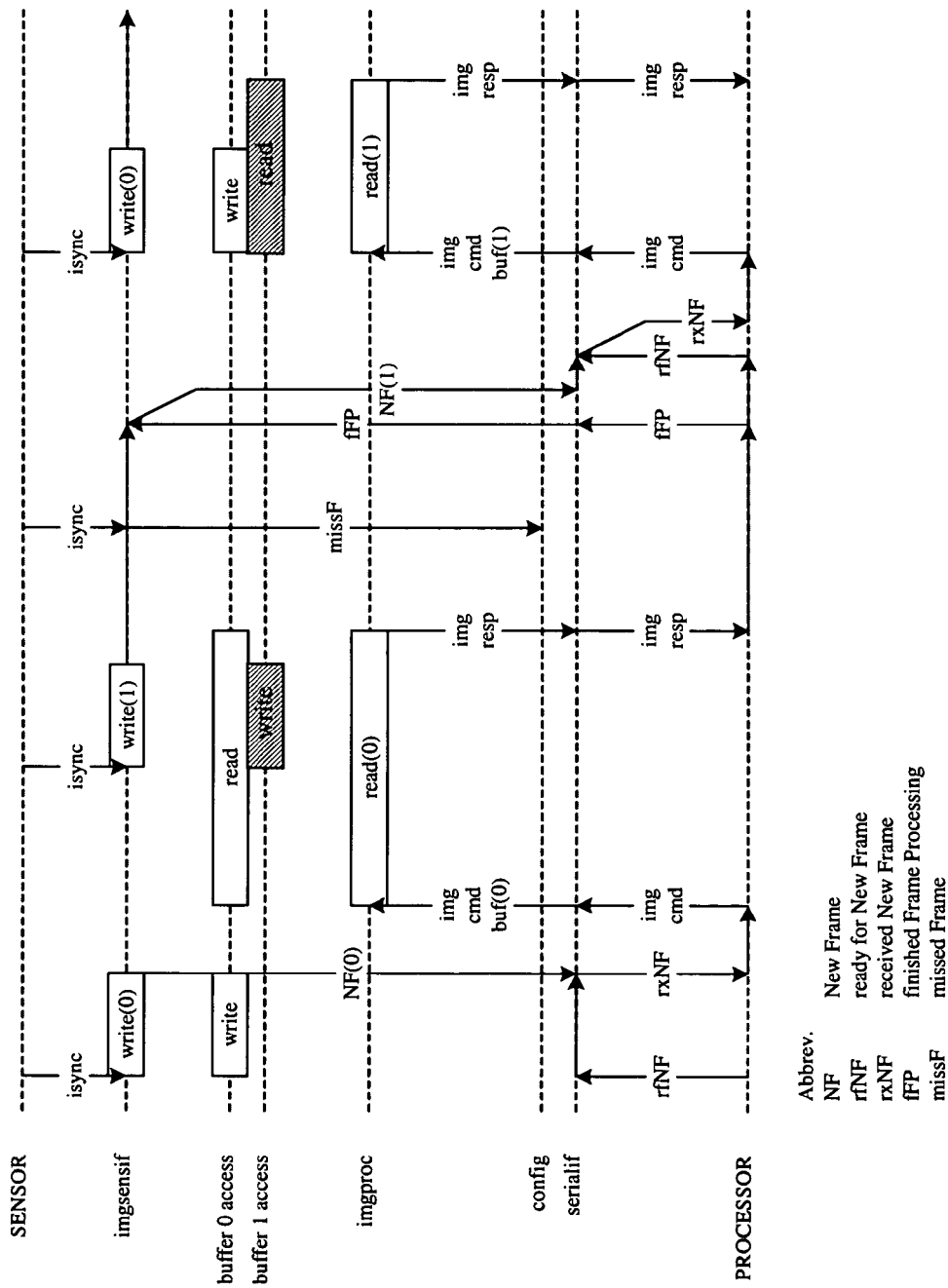

FIGS. 107, 108 and 109 respectively show double buffering with:

Same cadence as normal operation for single buffer

No missed frames, simultaneous read and write

One missed frame

Clock Circuits

There are three main aspects to the clocking of registers;

Separate input clocks for serial and sensor timing

Buffer access by circuits in these two clock domains

Low power operation

The following clocks are derived from the two input clocks:

s_clk: always active—straight from sclk i_clk: always active—straight from iclk sq_clk: sourced from sclk. Active from when a frame becomes available and disabled in low power mode iq_clk: sourced from iclk. Active only when the sensor is writing to the buffers and disabled when in low power mode rq_clk(0): active when buffer 0 is being accessed rq_clk(1): active when buffer 1 is being accessed (double buffered incarnation only)

Fundamental to the clocking strategy is the assumption that interaction between clocks within the two clocking families ('i' and 's') does not require any special circuitry. Synthesis using appropriately defined inter-clockskew, followed by corresponding clocktree skew balancing during layout, allows this to be realised.

Each of the two rq_clks drives one of the two buffers in the double buffering scheme.

Each rq_clk can be sourced from either s_clk or i_clk (or neither), depending on what function is accessing the buffer—the internal protocol ensures only one side will access a buffer at any one time.

Each of the sclk and iclk domains controls its own drive to the rq_clks. The internal protocol for swapping clocks requires each domain to simultaneously turn off its drive to an rq_clk and to send an indication to the other clock domain through a synchronizer. It is the latency provided by the synchronizer that guarantees only one domain will be driving an rq_clk.

Image Processing Arithmetic Precision

There are three places where precision is a factor:

Range-Expansion and Thresholding

Sub-pixel Generation

Image Subsampling

Range-Expansion and Thresholding

Referring to Section 3.3.5, there are no special requirements for maintaining precision in the following equation:

$$v{>}=((t/255)*(max-min))+min$$

The t/255 value is presented as an 0.8 fixed-point binary number: it is not actually calculated in the device.

At all stages, full precision is maintained by increasing the number of bits where necessary.

Sub-pixel Generation

All operations are fixed point binary. At all stages, full precision is maintained by increasing the number of bits where necessary.

Rounding is performed by starting with a constant value of b0.1 (binary 1/2) in the accumulator, and simply truncating at the end.

Image Subsampling

The sub-sampling process basically requires nine 8-bit values to be summed, then divided by 9 and rounded to produce an 8-bit result.

The precision of the design is operationally equivalent to floating point precision—i.e. the result for all possible input values gives a result that is indistinguishable from a floating point processor.

This is achieved in two ways.

The summation process only requires that the number of bits of storage at all stages is sufficient to hold the full range of values that could be possible at that stage. The result of this process is a 12-bit unsigned number, which is adequate to store all numbers from 0 to 255*9.

The 'divide by 9 and round' process is more complex.

We were able to use a Taylor expansion to get the desired result using only a subtractor, two adders and some shifting.

We 'lucked in' here because the binary value of 9 is b1001, which can also be represented as b1000*b1.001. Thus we have:

result=int(b0.1+acc/(b1000*b1.001))

The (acc/b000) term is trivial—it is just a fixed point shift, which costs nothing in terms of gates.

So we are left with the interesting problem:

acc/b1.001

The constant b1.001 can be rewritten as (1+x) where x is b0.001

Using the Taylor expansion, we get $$acc(1+x) = acc^*(1 - x + x2 - x3 + \dots )$$
$$= acc^*(1-x)^*(1 + x2 + x4 \dots )$$

or more specifically, for x=b0.001, $$acc/(1+b0.001)=acc^*(1-b0.001)^*(1+b0.000001+b0.000000000001+\dots)$$

This still involves an infinite series, but the task here is to find out how many of the increasingly smaller terms is required to give the desired accuracy.

The solution was to use a brute force method to check the result of all possible input values (0 to 255*9). The final function used only the (1+x2) terms; however a small constant value was added to the final result to approximate the x4 term over the input range. We did it this way because we had to add a constant b0.1 at the end for rounding anyway—so we just added a slightly bigger constant.

Integrated Memory

All RAMs are synchronous single-port with separate read and write data ports.

Figure 110:
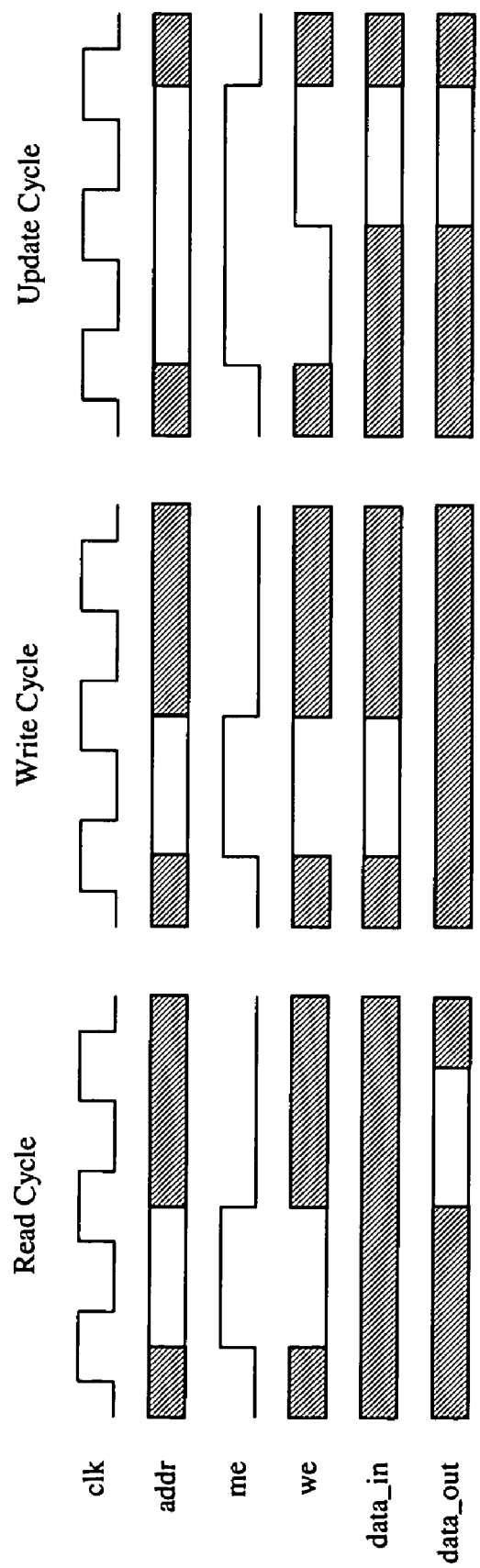

The general access methods are shown in FIG. 110. The update cycle is just a read followed by write.

Frame Buffers

Each frame buffer is a simple, linearly addressed, byte-wide, single-port synchronous SRAM. By design, only one of the two addressing ports will access the RAM at a time. A generic, fs_width, defining the maximum row width is used to generate the linear address from the (x,y) coordinates:

Address=x+(y*fs_width)

Sub-sample Buffers

The sub-sample buffers are designed to allow single cycle access to the pixels of 8 contiguous rows from the same column, but with the added feature of addressing on any 4-row boundary. This provides single cycle access to any pixel, and the two pixels above and the two pixels below, for the auto-level-threshold algorithm.

Figure 111:
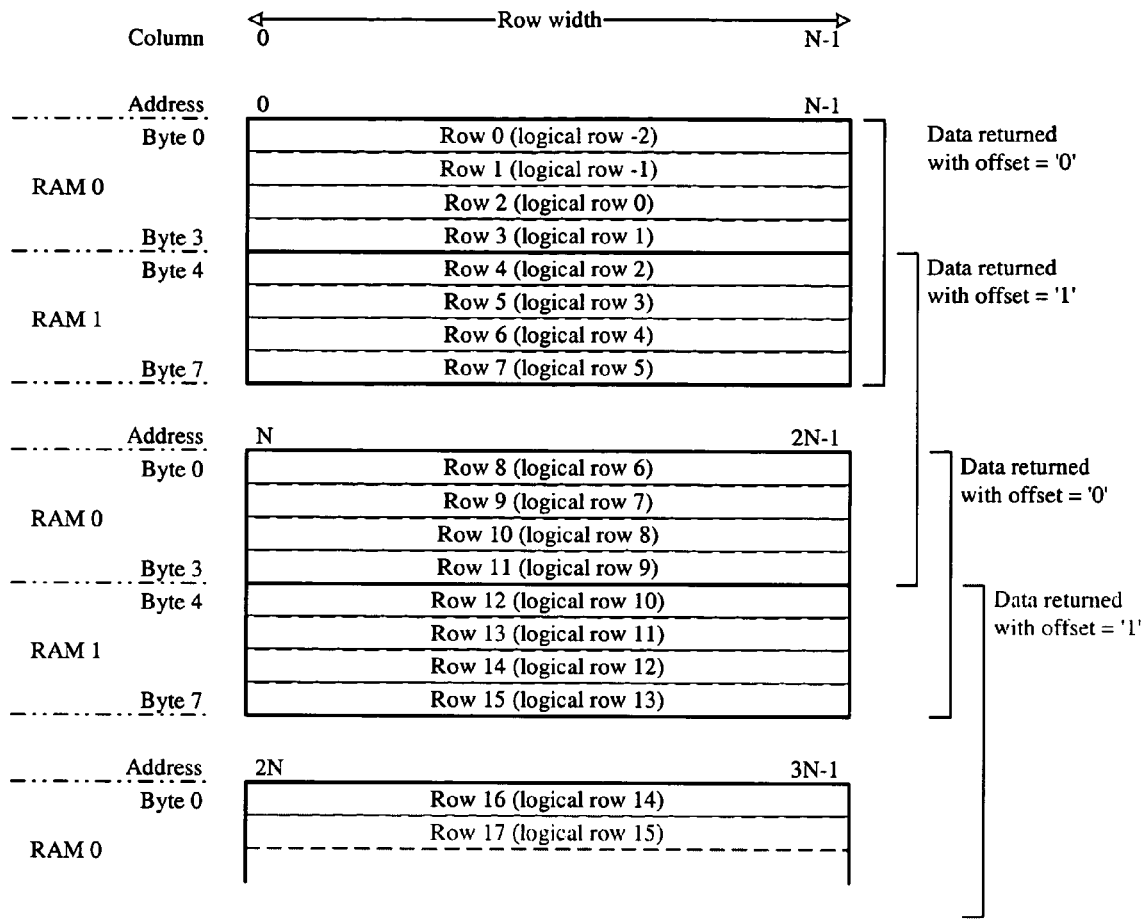

As shown in FIG. 111, each buffer is implemented with two 4-byte wide RAMs, some on-the-fly addressing and some re-ordering of the output data. Each RAM is cut into slices—each slice is the length of the maximum row width, and thus each slice contains four contiguous rows side by side. Slices from each RAM are alternated to provide all the required rows.

The two RAMs (RAM0 and RAM1) are addressed separately. If the address is supplied without an offset, both RAMs are given the same address. The resulting 8-byte data word gets it's four LSBs from RAM0 and it's four MSBs from RAM1. If the address is supplied with an offset, RAM1 gets the address as normal, but the RAM0 address is offset by the maximum row length (N)—thus retrieving data from the same column, but for the four rows below, rather than above. The resulting 8-byte data word is formed with it's four LSBs from RAM1 and it's four MSBs from RAM0 i.e the 4-byte words are swapped inside the result.

The fs_width generic is used to calculate the maximum subsample row width ss_width, which is used to generate the linear sub-sample address from the logical (x,y) subsample array coordinates:

Address=x+ss_width*(y/8)

where the division function "/" is the standard VHDL definition of "/".

An extra bit—the offset—is supplied with the address. It indicates whether or not to offset the addressing of RAM0. This is calculated as:

Offset='1' when (y mod 8)>=4

```
Example 1: X = 0, Y = 0 => Address = 0, Offset = 0
RAM0__addr = 0           => data out is Column 0, rows 0 to 3
RAM1__addr = 0           => data out is Column 0, rows 4 to 7
final result is (LSB first) Column 0, rows 0 to 3, Column 0,
rows 4 to 7
         = Column 0, rows 0 to 7
Example 2: X = N-1, Y = 4 => Address = N-1, Offset = 1
RAM0__addr = N-1 + N (the extra + N due to Offset = = 1)
         = 2N-1           => data out is Column N-1, rows 8 to 11
RAM1__addr = N-1          => data out is Column N-1, rows 4 to 7
final result is (LSB first) Column N-1, rows 4 to 7,
Column N-1 rows 8 to 11
         = Column N-1, rows 4 to 11
```

A layer of logical addressing sits over the physical addressing—the logical byte rows, which actually start at −2, are mapped to the physical rows starting at 0. This is done so that the 8-bytes accessed by the physical sub-sample address always contains the 5 bytes required for one column of the auto-levelling window centred around the pixel at the (x,y) coordinate.

This means that the first two byte rows in RAM0 are wasted, but this helps to simplify the design of the auto-level-threshold. The simplification comes from the fact that you can just use the Y coordinate of the row being auto-level-thresholded and you always get the two-rows above and the two-rows below.

The last two byte rows are also effectively wasted. However, they will contain copies of the last row of the window—see Section on page 97.

Each RAM will actually be 35-bits wide rather than 32-bits wide. The extra three bits will be used by the sensor side to provide the required precision for the sub-sample accumulation, and will be ignored otherwise.

The reason for the extra three bits is that the maximum intermediate value that needs to be stored is the sum of two rows of three columns of maximum pixels i.e. 6*255, which requires 11 bits total. These extra three bits will be re-used by each row in the slice of four, since the storage for the extra precision is not required once a sub-sample row is complete, and we only store the final 8-bit value.

System Test Circuits

Direct Frame Store Writing

Direct frame store writing feature is intended to be a system-level testing feature, allowing Callisto to be tested without an image sensor. Frame data is loaded into the frame store by a series of image commands, each containing four pixels worth of data. The serial interface block sif_msghand interprets frame store write messages and generates command words. When the WriteFrame configuration bit is set the sens_mux block ignores the external image sensor data and drives the internal image data signals with the data received from the serial interface command words.

To allow all possible iclk/sclk frequency relationships a high-level flow control mechanism is used whereby the sens_mux block triggers the transmission of the frame_store_write_ack message when the current command is processed.

Image Sensor Data to Serial Interface

When the test enable input (ten) is asserted Callisto pushes data received on from image sensor data directly out of the serial interface. This operation is intended to assist manufacturing testing of the image sensor on the Jupiter device. Due to the bandwidth mismatch, Callisto samples every tenth byte received from the image sensor, and if this byte is valid it is sent to the serial interface for serialization and transmission on txd.

Device Test Circuits

Scan

Figure 112:
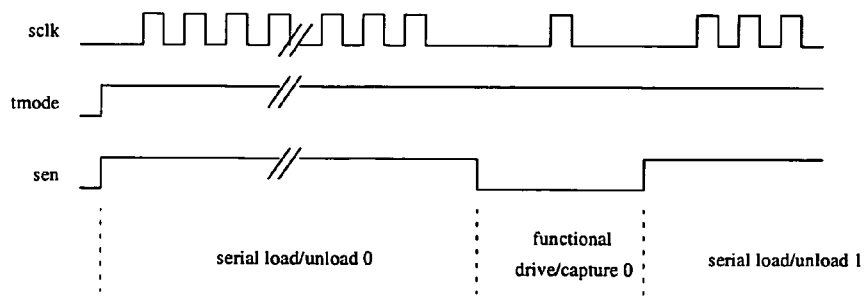

A single scan chain is to used for Callisto. Scan testing will be performed using sclk only, and will therefore require the tmode input to force mux sclk onto all clock nets. In addition, the assertion of the tmode input will be used to disable any non scan testable logic. The control of the tmode and sen inputs during scan testing is illustrated in FIG. 112. Due to the multiple clock domains and the use of negatively edge-triggered flipflops, careful attention must be paid to the scan chain ordering. Lock-up latches between different clock trees may be necessary. The SRAM cores may be put in a bypass or transparent mode to increase coverage of signals going to and from these cores.

Ram Bist

Each of the four instantiated SRAMs has associated BIST logic. This circuitry is used for ASIC manufacturing test of the RAM cores and runs a 13n MOVI RAM test pattern sequence. The BIST operation is controlled and monitored via the configuration registers. The test enable input signal (tmode) must be asserted during BIST testing to ensure the RAM clocks are driven by sclk.

Section F—Filtering and Subsampling

This section considers hardware implementations of low-pass filtering and subsampling (or decimation).

FIR filters are computationally intensive and in general, for real time video applications, require dedicated hardware which can exploit parallelism to increase throughput. To achieve linear phase, the FIR will have symmetric coefficients and with square pixels can apply the same filtering in X and Y dimensions which simplifies the hardware. When the filter output is to be decimated, further savings can be made as only input samples required to produce an output are taken into account. Usually, the 2D filter can be decomposed into an X filter and Y filter in cascade. For example, a 5 tap symmetric filter has 3 coefficient values so that 2 pre-adds can be used requiring only 3 multiplications per output sample. Since 2 filters in cascade are needed, 6 multiplications per sample are required. The process could be pipelined depending on the acceptable latency so up to 10 ms could be used at the cost of extra memory. At the other extreme, the filter could process directly data from the image array as it is read out or read it from the fieldstore at a lower speed.

Figure 113:
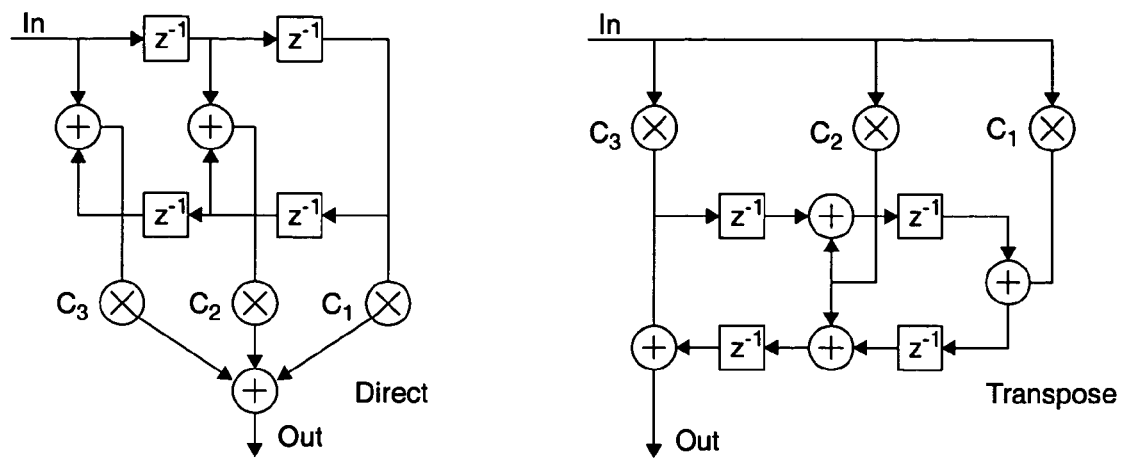
Figure 114:
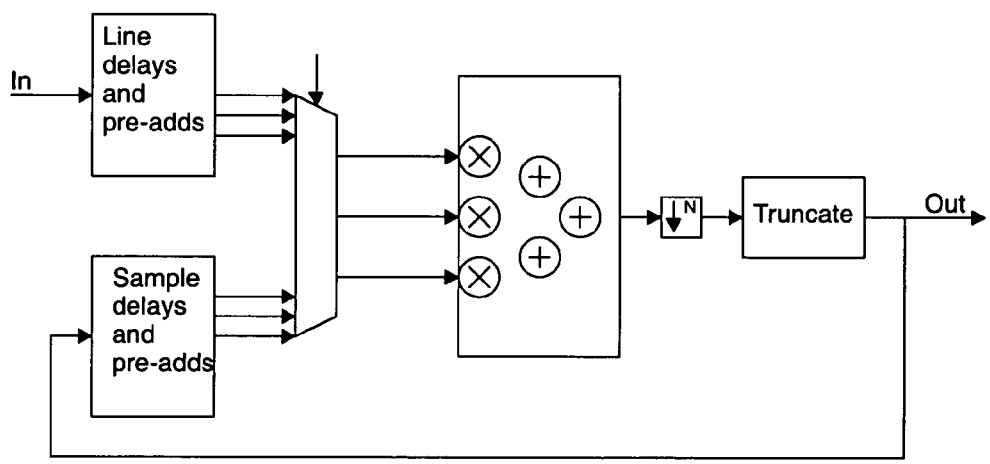

Direct 80 and Transpose 82 forms of symmetric FIR filters are shown in FIG. 113. In some implementations, the transpose form 82 may have some advantage over the direct form 80. The combinatorial paths are shorter giving a faster design, but a disadvantage it that the delays no longer form a shift register and cannot be used to store elements of the original input data.

If a low-pass characteristic that is skew-symmetric is used, even coefficients will be zero except for the central one which reduces the computational effort. This implies odd length filters of order (4M+3). Maximally flat filters:

M=0, coefficients 1 2 1

M=1, coefficients −1 0 9 16 9 0 −1

Coefficients are of the form:

$$h = n/2^k$$

where n and k are integers which makes exact implementation easy. Only decimation by a factor of 2 is possible in one stage.

The partitioning and addressing of the fieldstore can be arranged such that neighbouring pixels are concurrently available, allowing 2D filtering on the fly without extra memory. This allows the processor to obtain the sub-sampled image pixels and store them for segmentation. A histogram can also be built on the fly.

Figure 115:
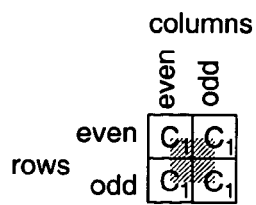

The example shown in FIG. 115 partitions the memory into 4 blocks, which is particularly simple for addressing (being a power of 2). However, due to symmetry requirements, all coefficients must be equal so only a simple sinc response can be obtained. Furthermore, such a filter has a delay of half a pixel which is difficult to compensate for if the segmented image is used directly to estimate the centres of tag targets.

Decimation by 2 in both X and Y directions is inferred unless a slightly modified addressing scheme is used which allows odd and even samples from adjacent blocks to be read at the same time.

Clearly more coefficients are needed and preferably should be an odd number so that the image is delayed by an integer number of pixels.

As shown in FIG. 116, the number of memory blocks increases as the square of the number of filter taps in X or Y so this approach rapidly becomes impractical. Also, as mentioned above, the decimation factor is tied to the filter order unless a more complex addressing scheme and coefficient switching are used (which prevents constant coefficient multipliers being used).

It is preferable to partition the framestore to provide concurrent line access only and add additional pixel delays to make the X filter. Then, to allow a decimation factor which is not equal to the filter order, a slightly more complex addressing scheme is used and multiplexers added to route the samples to the adders and multipliers allowing the use of fixed coefficients.

In the example shown in FIG. 117, a 5th order FIR filter is assumed. Image lines are written sequentially to 5 memory blocks so that 5 lines may be read concurrently. Since data cannot be shifted from one memory block to another, a virtual shift register is formed with multiplexors. It may be that some paths are not required depending on the filter order and decimation factor N. Some sharing of the adders and multipliers (ROMs) is also possible depending on N.

The cost of adding a few linestores is small compared to the fieldstore. If decimation is required, the X filter benefits from the lower input rate. If separate linestores are used with decimation, the X filter is performed first and decimated, thus reducing the storage and speed requirements of the linestores.

It will be appreciated that multiplier-less filters can be implemented using shift and add functions. Canonical signed digit or other redundant binary arithmetic scheme (−1, 0, 1) can also be used.

Section G—Tag Sensing Algorithms

As described extensively in many of the cross-referenced documents, the preferred Netpage system relies on knowing the identity of the page with which the Netpage pen nib is in contact and the absolute position of the nib on the page. Knowledge of the pen orientation relative to the page is also required. In addition, various regions of the page may be given special properties that need to be known by the pen without referring back to some external server, i.e. they must be determined directly from the page with which it is in contact.

This requirement is achieved by printing tags on the page. The tags encode the data required by the system. These are the page identity, the tag location within the page and the properties of the region of the page containing the tag. The orientation of the pen relative to the page and the position of the pen nib with respect to the tag location can be determined from the location of the tag image in the pen's field of view and from the perspective distortion of the image of the tag. The tags are printed using infrared absorptive ink so that they will be invisible to the naked eye.

Two sample tag designs are shown in FIGS. 119 to 122, which are described in detail below. The present description assumes the tag structure of FIGS. 119 and 120, although very little depends on the exact form of the tags. Many aspects of the tag sensing and decoding, especially the determination of the pen orientation and relative position, are described in detail in PCT Application PCT/AU00/00568.

The main focus of this report is on the image processing required to determine the tag location and perspective distortion and to sense the tag data. This task is made challenging by the requirements that the image consist of as few pixels as possible, by the effects of defocus blur and perspective distortion due to pen tilt, by motion blur, by shadows due to ambient illumination and by imperfections due to the printing process and damage to the page. Further, this processing must typically be performed by a battery-powered device at a rate of 100 times per second or more.

The Structure of Netpage Tags

The tags considered in this report consist of two components: targets and macrodots. The tag information is encoded in an array of macrodots. These consist of small solid circles about 130 µm in diameter. The presence of a macrodot indicates a bit value of 1, its absence a value of 0. The data is encoded with a forward error correcting code. The tags described in PCT Application No. PCT/AU00/01111 use a (15,7) Reed-Solomon code in GF(16) (which is described in more detail below). The targets are solid circles just over 300 µm in diameter. The targets delineate the different tags on a page and provide reference points from which the locations of the macrodots, which encode the individual tag data bits, can be found.

The macrodots do not abut one another, thereby avoiding the formation of dark regions that appear similar to the targets and there is a white border around the targets of at least 150 µm. Hence, the targets are always clearly visible. The exact numbers of targets or macrodots are not important to the design of the algorithm, other than that there needs to be at least four targets to allow the determination of the perspective transform. For convenience, we will always assume there are four targets. The dimensions are chosen to ensure the targets are clearly distinguishable.

Tag Sensing and Decoding

The algorithms proceeds through a number of stages to extract the required information from images of the tags. Generally, there are six steps after image acquisition:
1. Create a list of target candidates;
2. Select four candidates as the tag targets;
3. Determine the page-to-sensor transform;
4. Determine the tag bit pattern;
5. Decode the tag region identity and position code and any flags;
6. Determine the location of the pen nib and the pen orientation from the perspective transform and the location of the tag centre.

Steps 1 and 2 can be merged, but it is simpler to keep them distinct. Steps 4 and 5 can be performed concurrently, as the data is often extracted a word at a time. Further there are a number of alternative options for performing each of these steps. Of all these steps it is steps 1 and 2 that present the most challenges, although, in the presence of severe shadowing, step 4 can also be difficult.

The page-to-sensor transform of step 3 is straight-forward. There are well-known procedures for deriving the perspective transform given the mapping of one quadrilateral into another (for example, see Section 3.4.2, pp. 53-56, of Wolberg, G., *Digital Image Warping*, IEEE Computer Society Press, 1990). The algorithm for step 6, determining the pen orientation and displacement, is fully described in PCT Application PCT/AU00/00568. Hence these two steps are not described in this document.

Tag Sensing and Decoding Algorithm

Overview of the Image Processing

Figure 119:
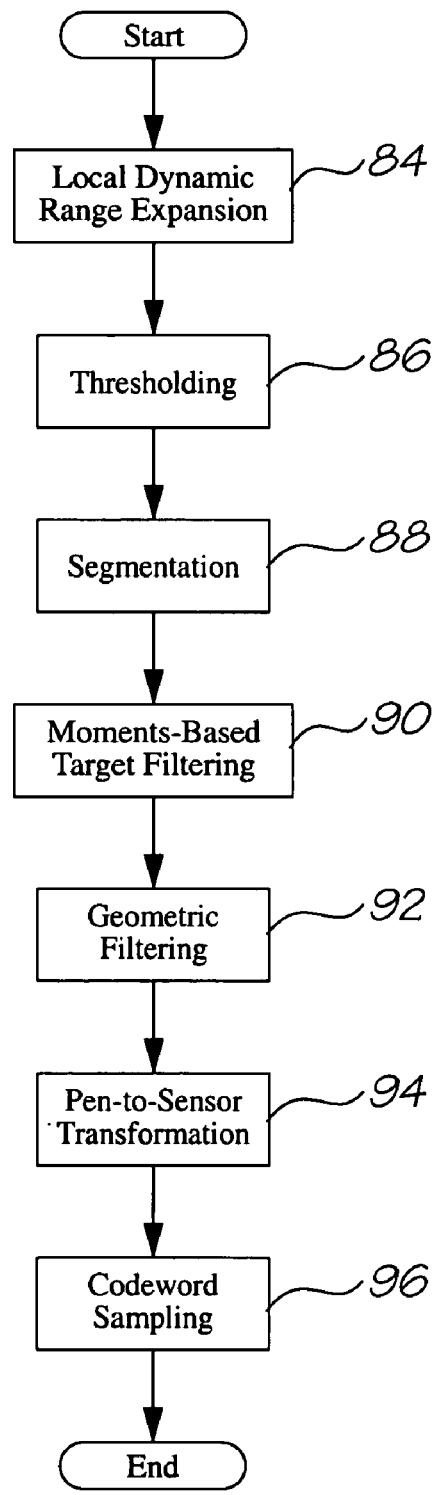

FIG. 119 shows the tag image processing chain. The first two steps condition the image for segmentation. The local dynamic range expansion operation 84 corrects for the effects of varying illumination, in particular when shadows are present. This is followed by thresholding 86, in preparation for segmentation 88. Moments-based criteria are then used to extract 90 a list of candidate targets from the segmented image. These first four steps correspond to step 1 in the preceding paragraphs. Geometric filtering 92 is used to select a set of targets. This is step 2 described above. The pen-to-sensor transform is determined 94 using the target locations (step 3) and finally, the macrodots are sampled 96 to obtain the codewords (step 4).

Tag Image Processing Chain

Finding the Tags

The targets are used to delineate the different tags on a page and provide reference points from which the locations of the macrodots, which encode the individual tag data bits, can be found. Once a suitable set of four targets delineating a single tag have been found, a perspective transform can be used to begin decoding of the tag. The identification of a set of targets proceeds in two stages. First, a collection of target candidates are found, and then four of these are selected to be the final set of targets. The search for the target candidates is performed directly on the image acquired by the pen and is the most costly and difficult step in terms of computation and algorithm development.

Creating the List of Candidate Targets

The preferred algorithm to create the list of candidate targets consists of a number of steps:
1. Local dynamic range expansion;
2. Thresholding;
3. Segmentation;
4. Target filtering using moments.

Step 1 preprocesses the image for conversion into a binary image (step 2), which is then segmented. The thresholding (step 2) can be carried out as the segmentation (step 3) is performed. It is more efficient, however, to incorporate it into the local dynamic range expansion operation, as will be shown below. The list of image segments is then searched for target-like objects. Since the targets are solid circles, the search is for perspective-distorted solid circles.

From the point of view of computation time and memory requirements, finding the candidate targets is the most expensive portion of the algorithm. This is because in all phases of this process, the algorithm is working on the full set of pixels.

Local Dynamic Range Expansion

The local dynamic range expansion algorithm goes much of the way to removing the effects of shadows and general variations in illumination across the field of view. In particular, it allows thresholding to be performed using a fixed threshold.

For each pixel, a histogram of the pixels in a window of specified radius about the current pixel is constructed. Then the value which a specified fraction of the pixels are less than, is determined. This becomes the black level. Next the value which a specified fraction of the pixels are greater than, is also found. This becomes the white level. Finally the current pixel value is mapped to a new value as follows. If its original value is less than the black level, it is mapped to 0, the minimum pixel value. If its value is greater than the white level, it is mapped to 255, the maximum pixel value. Values between the black and white levels are mapped linearly into the range 0-255.

Since the local dynamic range expansion operation must access all the pixels in a window around each pixel, it is the most expensive step in the processing chain. It is controlled by three parameters: the window radius, the black level percentile and the white level percentile. The values of these parameters used to find the targets in this work are 2, 2% and 2%, respectively. It is also convenient to perform thresholding simultaneously with dynamic range expansion. The threshold value for the range-expanded image is fixed at 128.

The values of the local dynamic range expansion parameters are such as to allow considerable optimisation of the local dynamic range expansion algorithm. In particular, a radius 2 window becomes a rectangular window containing 25 pixels. 2% of 25 is 0.5, hence to determine the black and white levels, it suffices to determine the minimum and maximum pixels in the window. The pixel mapping operation can be eliminated by calculating the local threshold for the unmapped pixel value directly using the equation $$((\text{black level})+(\text{white level}))/2$$

which approximates the exact value given by $$(\text{black level})+[128 ((\text{white level})-(\text{black level}))]/255$$

Given that the number of pixels in the window is much less than the number of bins in the histogram (there are 256), and that it is sufficient to find only the maximum and minimum pixels in the window, it is more efficient to find these values directly by examining all the pixels in the local window of each pixel. The maxima and minima for the local window are best calculated from the maxima and minima of the columns making up the window. This way, as each pixel on a row is processed, the subresults from the previous pixel can be reused.

With these considerations in mind, the cost per pixel of the local dynamic range expansion operation is shown in the following table. The divide by 2 can be implemented as an arithmetic shift right. The count for the register copies is a worst case count, on average there would be 9 register copies per pixel. All these operations can be performed using 16-bit integers. From the following table, the total operations count per pixel is 65. The only significant memory required is for the thresholded output image. If this is stored as a bit image, the original image size is required for storage, at the expense of extra processing to create the bit image. Otherwise, an amount of memory the same as the original image size is required.

The Local Dynamic Range Expansion Per-Pixel Operations Count

| Operation | Count |
| --- | --- |
| Fetch | 14 |
| Store | 1 |
| Register copy | 16 |
| Compare | 17 |
| Increment | 15 |
| Add | 1 |
| Divide (by2) | 1 |

Segmentation

The segmentation algorithm takes as its input the binary thresholded image and produces a list of shapes. A shape is represented by a point list, a list of the coordinates of the pixels in the shape. The original binary image is cleared as each pixel is visited.

The segmentation algorithm proceeds by examining each pixel in the field of view. If the value of the pixel is below the threshold or if the pixel has already been assigned to an object, it proceeds to the next pixel. Otherwise, it uses the object seed fill algorithm described in Heckbert, P. S., A Seed Fill Algorithm, Graphics Gems, pp. 275-277 and 721-722, ed. Glassner A. S. (Academic Press, 1990) to determine the extent of the object. This algorithm visits each pixel a little more than twice.

The principle of the seed fill algorithm is as follows. Given a pixel in the image, the seed pixel, it finds all pixels connected to the seed pixel by progressively moving through all connected pixels in the shape. Two pixels are connected if they are horizontally or vertically adjacent. Diagonal adjacency is not considered. A pixel is in a shape if its value is above a nominated threshold. Visited pixels are set to zero so that they will be ignored if encountered again. (Note, this assumes the tag images are inverted, so that they are white on a black background.)

Starting from the seed pixel, or the first pixel it encounters in a row, it scans along the row until it finds the first pixels to either side that are not in the object, placing pixel coordinates in the point list as it proceeds. Then, for each pixel in the row segment, it examines the two vertically connected pixels. If these are in the object and have not already been visited, it first stores information on its current state, the segment details, and repeats this procedure recursively for each of these adjacent pixels.

The nature of this algorithm means it is particularly difficult to estimate its running time and memory requirements.

The memory requirements can be limited by applying the target filtering to each shape as it is segmented, thus avoiding the need to store the points list of more than one shape at a time. Also, there is a maximum number of pixels that a valid target can occupy. Once this is reached, there is no need to continue storing points in the point list. Despite this, the fill procedure for each object still uses a stack with 4 bytes per entry, and this can grow to a depth of the order of half the image size, requiring roughly twice the image size in actual memory. In this extreme case, where the shape has a serpentine form occupying the entire image, each pixel is visited close to three times. As a rough estimate, the order of 10-20 operations per pixel are required.

Target Filtering

The target filtering step searches the shape list for shapes of suitable size and shape. A moments-based approach is used. The shape list is first culled of candidates that contain too many or too few pixels. Then the moments of each shape are calculated and if all the moments are within the specified ranges, the shape's position is placed in the candidate list. The positions are determined by calculating the centroid of the binary image of the shape, i.e. only the pixel positions are used.

The moments filtering consists of rejecting any shapes whose binary moment do not lie in certain specified ranges. (For a detailed description of moments, see Chapter 8 of Masters, T., Signal and Image Processing with Neural Networks, John Wiley and Sons, 1994) The parameters considered are the aspect ratio, which must lie within a certain range and the (3,0), (0,3) and (1,1) moments, all of which must be less than suitably specified maximum values. For a perfect disc, the aspect ratio is 1 and the moments are all 0, a result of the symmetry of this shape. From symmetry considerations, the minimum aspect ratio should be the reciprocal of the maximum aspect ratio. The perspective transform causes the moments and aspect ratios to vary from the ideal values. The limits on the allowed pen tilt limit these variations and so determine the permitted ranges of these parameters.

The computational cost of this step depends on the number of pixels in each shape and the number of shapes. For each shape it is necessary to first calculate the centroid, as central moments are used throughout. The operation counts for a shape are shown in Table. There are also eight divisions per shape. The results of six of these divisions are only used in comparison tests, and so can be replaced by multiplications of the other side of the comparison. The remaining two of these divisions are required to calculate the centroid. These are divisions by N, the number of points in the shape, which can be replaced by multiplications by 1/N. The restricted range of allowed pixel counts in a shape means that 1/N can be determined from a look-up table. Because we must calculate the central moments, i.e. relative to the centroid which is non-integral, these operations must be performed using fixed point arithmetic. A worst case is when the target candidates cover the entire image, in which case, we can consider the total number of points in all the targets to be a significant fraction of the total number of pixels. However, in the cases where this occurs, it is unlikely that a valid set of targets will be found and so the search would be abandoned anyway.

The Moments-Based Target Filtering Operations Count (N is the Number of Points in the Target Candidate)

| Operation | Count |
| --- | --- |
| Add | 9/N |
| Multiply | 5/N |

An alternative to using moments is to use caliper measurements (discussed in more detail below). These require much less calculation, but are more sensitive to segmentation noise, as one pixel more or less in an object can have a significant effect. Despite this, using these measurements can produce results of comparable accuracy to those obtained using moments. However, because the target position must be known to sub-pixel accuracy, the target centroid must still be calculated.

Selecting the Targets

Given a list of target candidates, four suitable candidates must be selected as targets. A simple approach is to select the four candidates closest to the centre. Better performance is achieved by enforcing various geometric constraints on the four targets. In principle, any arrangement of four targets is feasible, but the restricted field of view and the allowable tilt range constrains the distances and angles between the targets. The procedure used is to:

1. Find the candidate closest to the centre;
2. Find the candidate closest to a specified distance from the first candidate;
3. Find the candidate closest to a point the specified distance from the first target along a line through the first target and perpendicular to the line between the first two targets;
4. Find the candidate closest to the point completing the parallelogram formed by the first three points.

At each of steps 2 to 4, the distance of the selected target from the previously selected targets must be within certain limits. If this is not the case, then a fallback procedure is used, in which the previously selected candidates are rejected and the next best candidate selected. This continues until an acceptable set of four targets has been found or the list of possible target combinations is exhausted, in which case the tag sensing fails.

The main calculations performed in the above procedure are distance calculations. To deal with the fallback, the distances should be saved as the list of candidate targets is searched. In most cases, no fallback occurs and so the operation count is as shown in the following table. The most expensive operation is the distance calculation, which requires 2 subtractions, 2 multiplications and an addition. It is sufficient to perform the calculation using the target pixel locations, which are integers, rather than the centroid locations, which are reals, and so the calculation can be performed using integer arithmetic.

The Target Selection Operations Count (N is the Number of Target Candidates. It is Assumed no Fallback Occurs)

| Operation | Count |
| --- | --- |
| Store | 8N |
| Compare | 7N |
| Add | 12N |
| Multiply | 8N |

Sampling the Data Bits

To determine the bit values in the tag image, the intensity value at the predicted position of a macrodot is compared with the values at its four diagonal interstitial points. The central value is ranked against the interstitial values and the corresponding data bit assigned a value of 1 if the rank of the pixel value is large enough. Experiments indicate that a suitable minimum rank is one, i.e. if the macrodot pixel value is greater than any of the interstitial pixel values, the bit is set to one.

The predicted macrodot location is determined using the perspective transform determined from the target positions. This position is specified to sub-pixel accuracy and the corresponding intensity value is determined using bilinear interpolation.

Figure 120:
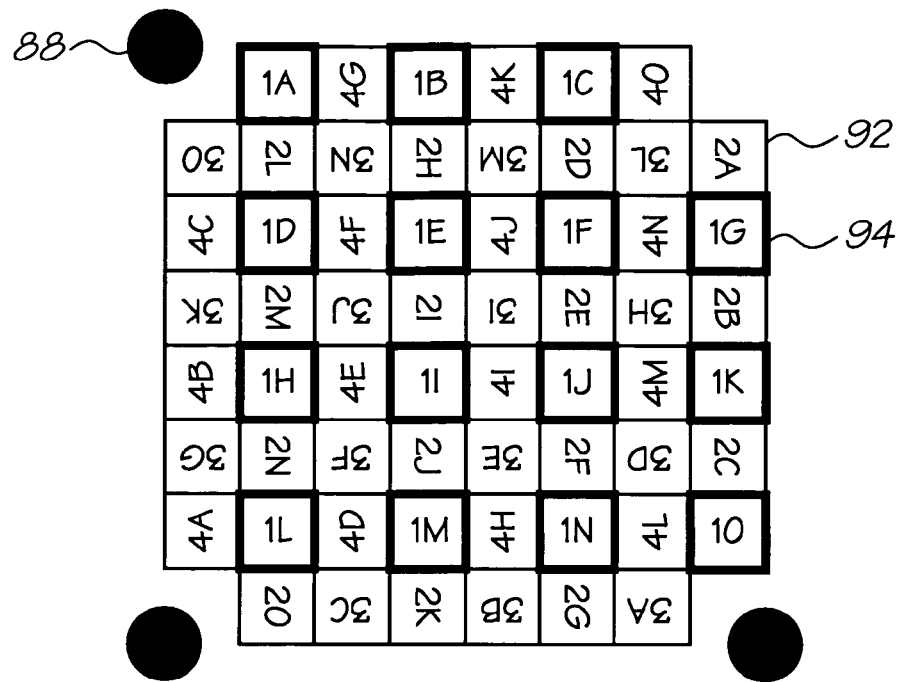
Figure 121:
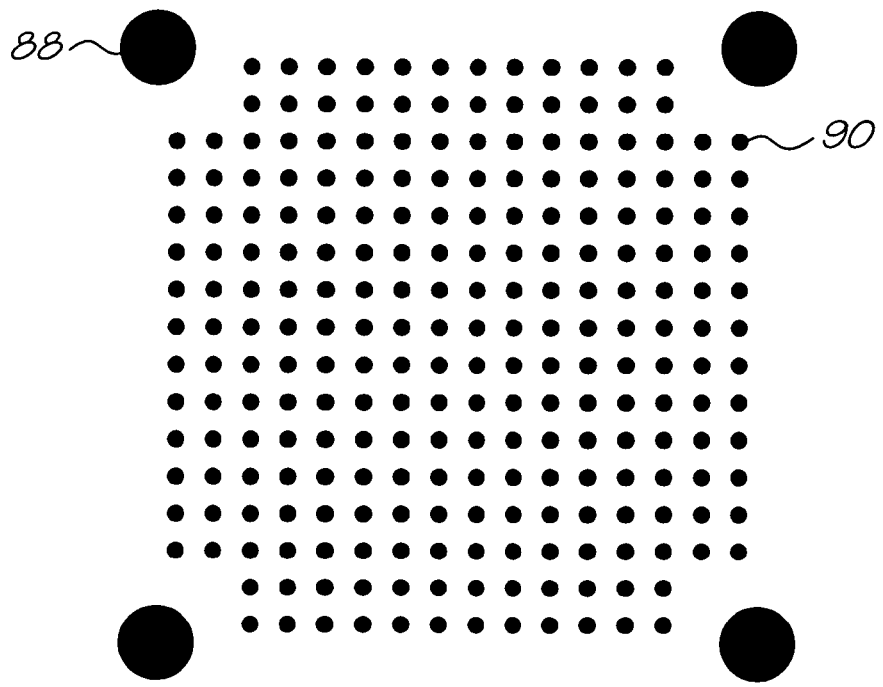
Figure 122:
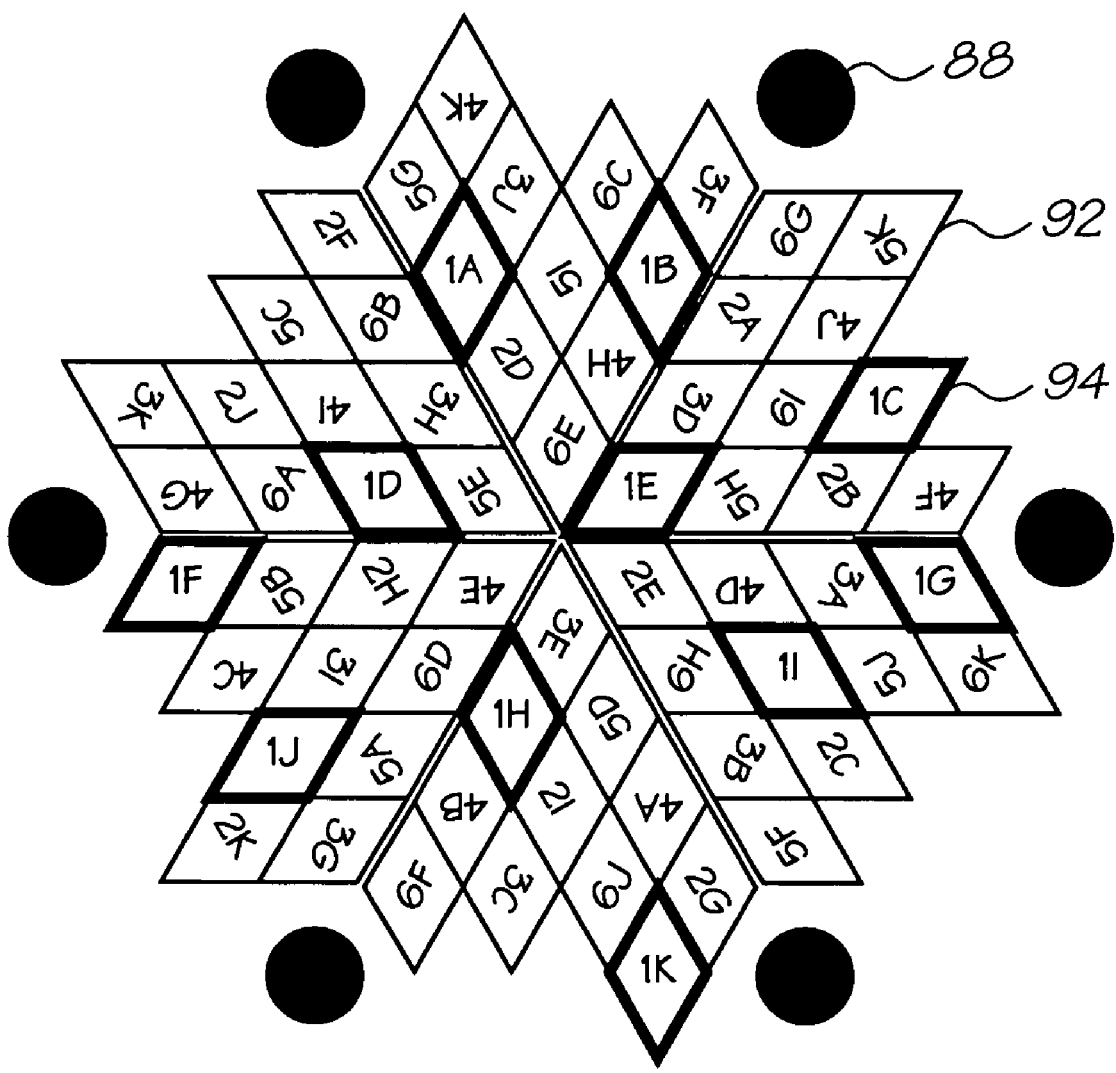
Figure 123:
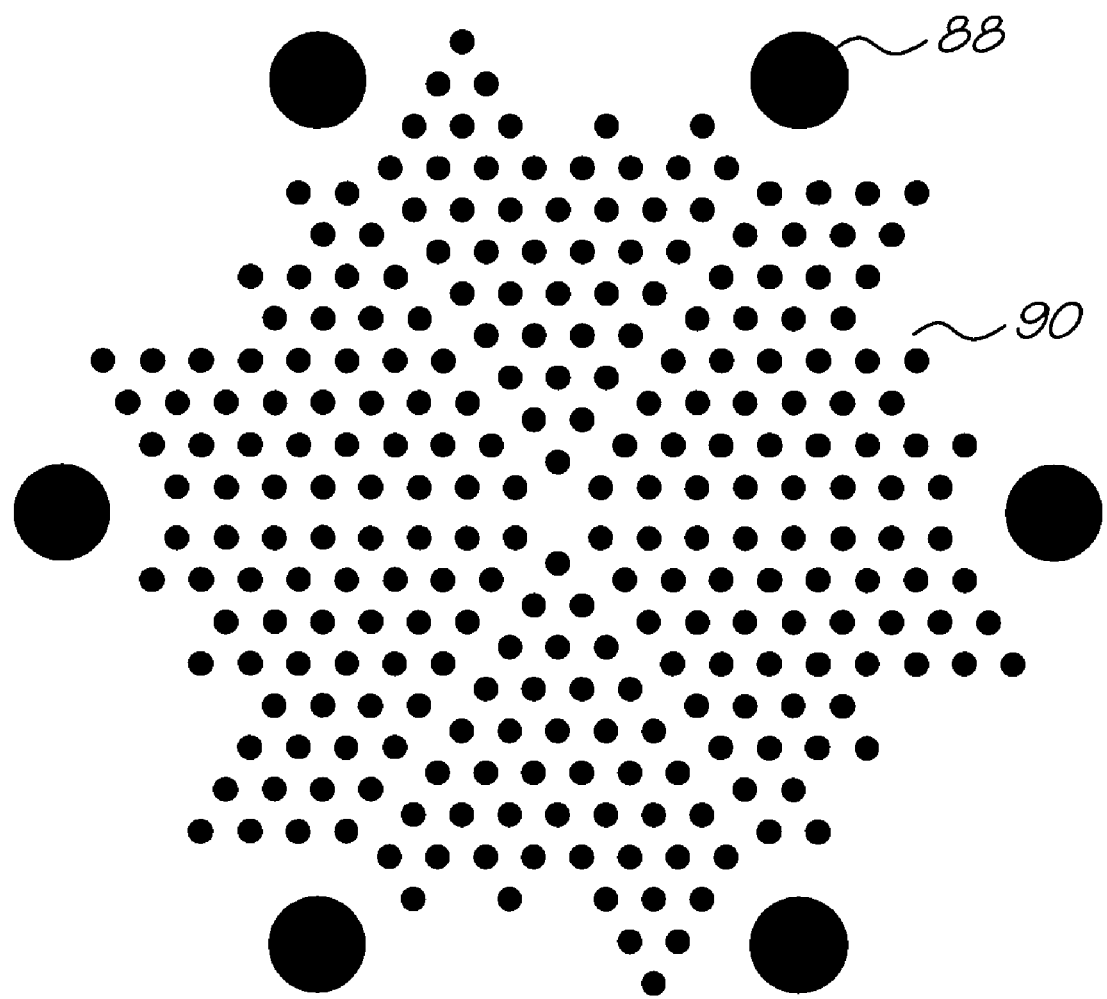

The square tag design described in PCT Patent Application PCT/AU00/01111 and illustrated in FIGS. 120 and 121 has 240 macrodots and 304 interstitial positions. Thus, 544 perspective transforms and bilinear interpolations are required. The following table shows the operation counts for this process. All these operations are fixed point operations. Given the number of intensity values that must be sampled and their compactness in the image domain, it may be worthwhile to transform the image values into the tag coordinate domain using the approaches described in Section 7.6, pp. 240-260, of Wolberg, G., Digital Image Warping, IEEE Computer Society Press, 1990.

The Data Bit Sampling Operations Count (N is the Required Number of Intensity Samples)

| Operation | Count |
| --- | --- |
| Fetch | 4N |
| Add | 14N |
| Multiply | 11N |
| Reciprocal | N |

Decoding the Tag Data

In the square tag design described in PCT application PCT/AU00/01111 and illustrated in FIGS. 120 and 121, the tag data is encoded using a (15,7) Reed-Solomon code in GF(16). There are four codewords, each containing fifteen 4-bit symbols 92 that are distributed across the tag area. In FIG. 120, one of the four codewords is indicated by bold outlines 94 around each of its symbols. The decoding procedure uses Euclid's algorithm, as described in Section 9.2.3, pp. 224-227, of Wicker, B. W., Error Control Systems for Digital Communication and Storage, Prentice Hall, 1995. This is unlikely to require much in the way of computation or memory to implement. A slightly more efficient algorithm, the Berlekamp-Massey algorithm (Section 9.2.2, pp. 217-224, of Wicker, B. W., ibid), can also be used.

Determining the Pen Position and Orientation

Given the perspective transform, as determined from the target positions in the image, together with the geometry of the pen, one can determine the pen position and orientation using the direct procedure described in PCT Application PCT/AU00/00568, or the iterative least-squares procedure described in US Patent Application filed 4 Dec. 2002 with U.S. patent application Ser. No. 10/309,358.

Performance and Running Time of the Algorithm

From the point of view of computation and memory, the most expensive processing steps are the local dynamic range expansion preprocessing and the subsequent segmentation, as these two steps are applied to the full-resolution image. The memory requirements for these two steps are roughly three times the size of the image in pixels, assuming that the range-expanded image is thresholded as it is formed, and so requires ⅛ the amount of memory as the input image. If the thresholded image is stored in unpacked form, i.e. one byte per binary pixel, then a total of four times the image size will be required. This factor includes the storage of the original image in memory which must be preserved for the latter macrodot sampling. The local dynamic range expansion step requires of the order 65 operations per pixel.

Considering a circular image field of diameter 128 pixels (corresponding to 12 900 pixels), adequate for decoding the macrodots, acquired at 100 frames per second, and a processor with a clock frequency of 70 MHz such as the ARM7, then there are 55 clock cycles per pixel. This is insufficient for performing the initial dynamic range expansion step, let alone the segmentation. 40 000 bytes of memory are required for the two initial steps, which becomes 52 000 bytes if the thresholded image is stored in unpacked form. Clearly, the only way the algorithm can be used as described is to use a faster processor or alternatively, to provide hardware support for the local dynamic range expansion step. The expensive local dynamic range expansion step is used to allow some tolerance of shadowing and general variations in illumination within the captured image. Even using local dynamic range expansion, shadows may still be a problem, depending on the relative intensities of controlled light source illumination and uncontrolled ambient illumination. Generally errors occur where a shadow boundary intersects a target.

After local dynamic range expansion, the segmentation operation still remains. This requires from 10-20 operations per pixel. Since a large proportion of the algorithm involves memory access, this translates to 20-40 processor cycles with our example ARM7 processor. In the worst case, the moments calculation requires roughly 13 operations per pixel, requiring 25 processor cycles. Hence, using these rough estimates, these two operations alone consume all of the 55 available processor cycles, leaving nothing for the remaining steps or for other processor tasks.

Summary and Conclusion

In this section the problem of sensing and decoding Netpage tags in the presence of shadowing has been examined. A relatively simple approach to dealing with shadows in the image has been described and analysed. It is clear that the processing resources required for even this simple approach probably require special-purpose hardware support.

If the controlled pen illumination is sufficiently intense compared with uncontrolled ambient illumination, then shadows are less of a problem, and a simple global threshold may be used, remembering that the main purpose of the dynamic range expansion step is to determine a threshold for the subsequent segmentation step. The required global threshold can be determined by constructing a cumulative histogram of the image as described below. Experiments show that in the absence of shadows, such an algorithm gives a tag sensing error rate close to zero. If required, hardware support for this would be relatively simple to provide, involving little more than memory access and incrementing. Even without hardware support, this operation would require only 6 operations per pixel to construct the initial histogram. For the ARM7 this translates to 10 cycles per pixel.

Even with this increased illumination, it is still difficult to perform the required processing in the available time, motivating a modified approach. The problem is that the early processing operations all have a running time of the order of the number of pixels in the image. For the example above, there are 12 900 pixels. The number of pixels required is determined by the need to be able to resolve the macrodots which carry the data. The tag targets are roughly twice the size of the macrodot spacing, and can still be resolved with half the pixel spacing. Hence an image of 3 200 pixels should be adequate for finding the targets. Techniques for finding the targets using low-resolution images are discussed in the following section.

Finding the Targets Using Low-Resolution Images

In this approach, a lower resolution images is used to determine the regions of most interest in an image, which are then examined at higher resolution. While we should be able to find the targets using a half-resolution image, to determine the tag macrodot bit values we need the target positions to sub-pixel accuracy at the full image resolution. As a result, the modified search procedure consists of first finding target candidates using a low-resolution image and then using the full-resolution image to make the final target selection and to determine their positions to the desired precision.

With this in mind, this section describes algorithms for finding the targets using half-resolution and third-resolution images. The process of finding the targets is largely identical to that described above and so we only examine the steps in the algorithm which differ. The main challenge it to determine the target positions accurately from the high-resolution images, using the results of the low-resolution steps, in a manner which does not squander the savings gained from using a low-resolution image in the first place.

Unlike the algorithm described above, the algorithms described here are not designed for images with strong shadows. In practice, this means we are assuming the controlled illumination is sufficient to swamp the ambient illumination, and hence suppress shadows due to ambient illumination.

Down-Sampling

In general, down-sampling involves forming a weighted sum of the high-resolution pixels in some window about the location of the down-sampled pixel, corresponding to low-pass filtering followed by re-sampling. Since the aim of down-sampling is to reduce the computational burden, we should use the simplest scheme possible. This is to down-sample by an integral factor, which only requires averaging the pixels in a square window of a suitable size.

This scheme can easily be implemented in hardware. By suitable organisation of the frame buffer, the low-resolution image can be stored in a virtual frame buffer where the pixel values are accessed as notional memory locations within a few processor clock cycles. The pixel values are calculated as required.

Table shows the operations count for down-sampling as a function of the number of pixels in the full-resolution image and of the down-sampling factor. Assuming an ARM7 processor, this comes out as $5N+5N/k^2$ cycles overall, where N is the number of pixels in the image and k is the down-sampling factor.

The Down Sampling Operations Count Per Down-Sampled Pixel (N is the Number of Pixels in the Full-resolution Image and k is the Down-sampling Factor)

| Operation | Count |
| --- | --- |
| Fetch | N |
| Store | $N/k^2$ |
| Add | $2IN + N/k^2$ |
| Compare | $N/k^2$ |
| Multiply | $N/k^2$ |

Finding the Targets

Introduction

The approach to finding the targets at low-resolution is essentially the same as that used previously with two changes. First global dynamic range expansion is tried, rather than local dynamic range expansion, as we are relying on. artificial illumination sufficient to substantially eliminate shadows. Second, caliper measurements are used to filter the targets, rather than the moments-based filtering described above.

Global Dynamic Range Expansion

The global dynamic range expansion process is similar to the local dynamic range expansion process described above. The difference is that a histogram of the entire area of interest is taken and it is from this histogram that the transfer function is determined. This single transfer function is then used for the entire area of interest.

As with local dynamic range expansion, since we are only interested in the thresholded image, we can use the inverse transfer function to determine a threshold level. This single threshold level is then applied to the entire area of interest.

As there are generally far more pixels in the area of interest than in the 5 by 5 window used for local dynamic range expansion as described above, the entire histogram must normally be constructed. The computational cost of global dynamic range expansion is quite low, as each pixel is only visited twice: once to construct the histogram and a second time to apply the threshold. The following table summarises the operations count for global dynamic range expansion.

The Global Dynamic Range Expansion Operations Count. N is the Number of Pixels.

| Operation | Count |
| --- | --- |
| Fetch | 2N |
| Store | N |
| Increment | 2N |
| Compare | N |
| Add | N |

This adds up to roughly 12 cycles per pixel on the ARM7 processor.

Caliper Based Target Filtering

At the resolutions considered here, i.e. roughly the macrodot spacing, a target is only two to three pixels in diameter, depending on the pen tilt and its position in the field of view. The segmented images of a target can vary by the addition or deletion of a single pixel, and at lower resolutions this can make it difficult to set useful limits for the moments. For example, at these resolutions, a segmented target can consist of three pixels in an L-shaped configuration. To deal with this problem, rather than use moments, we use caliper measurements for the target filtering.

Caliper filtering consists of examining the maximum extent of the shape in various directions. The parameters of the shape that are considered are its width, its height and its area, i.e. the number of pixels it contains. The tests are:

1. that the number of pixels in the shape is in a specified range;
2. that the width and height are in a specified range;
3. that the width to the height ratio is within a specified range;
4. that the fill factor is large enough.

As for moments-based filtering, we first test for the number of pixels in the shape. The tests for the width to height ratios are $$(\text{width}-1) \leq (\text{maximum aspect ratio}) \times (\text{height}+1)$$

and $$(\text{height}-1) \leq (\text{maximum aspect ratio}) \times (\text{height}+1)$$

The additions and subtractions of 1 are to compensate for the spurious inclusion or exclusion of pixels into or out of the shape. For the fill factor the test is $$\text{Area} \geq (\text{minimum fill factor}) \times (\text{width}-1) \times (\text{height}-1)$$

where again, we have subtracted 1 from the width and height to avoid the effects of the spurious inclusion of pixels into the shape.

The following table gives the operation count for finding the height and width of a candidate target.

The Operations Count to Find the Height and Width of a Candidate Target (N is the Number of Points in the Object)

| Operation | Count |
|---|---|
| Fetch | 2N |
| Register Copy | N |
| Compare | 3N |
| Add | 3N |

For the ARM 7, this works out as 13 cycles per point in the segmented object. There may be up to 15 points per object in a half-resolution image.

The following table shows the operations count for calculation of the calipers features.

The Operations Count to Calculate the Caliper Features

| Operation | Count |
|---|---|
| Compare | 3 |
| Add | 4 |
| Multiply | 4 |

Determining the Target Positions

To determine the precise centre of the targets we calculate the grey-scale centroid in the high resolution image, as opposed to the binary centroid used above. The centroid is calculated in a circular window about the target position determined from the low-resolution image.

The size of the circular window is chosen so as to guarantee including the entire target while excluding any nearby macrodots. This is a minor weakness of this technique. The combination of the low resolution and the noisiness of the low-resolution segmented image means that the target position, as determined from the low-resolution image, can be quite inaccurate. If the window is to be large enough to encompass the entire target, taking into account any inaccuracy in the positioning of its centre, then it will inevitably include some of the surrounding macrodots.

Improved Target Location

A simple approach to improving the estimates of the target locations is to use the same algorithm as used for high-resolution images, except that it is applied only in a small window around the target positions in the full-resolution image. The window positions are determined from the low-resolution images.

The histogram of a small circular region around a candidate target is taken and used to set a threshold, as described above, i.e. we use global dynamic range expansion within the window. An additional form of target filtering is then applied before the segmentation. Remembering that the targets are black, if the intensity of the pixel at the centre of the window is higher than the threshold for the window, the candidate is rejected and segmentation is not performed. Otherwise, the image within the window is segmented.

This segmentation starts at the centre of the window. Unlike the general segmentation applied to the entire image, it is sufficient to extract the single shape at the centre of the window. The position of the target is then given by the binary centroid of the extracted shape.

As pointed out in above, most of the errors of the simple low-resolution algorithm are due to poor location of the targets. However, a significant number of errors is due to target misidentification. To ameliorate this, the segmented high-resolution shape is subjected to further filtering using moments. Only targets that pass the moments criteria are considered for the final target selection process which, as before, is based on geometric constraints.

Performance of the Improved Low-Resolution Algorithm

Similar performance is obtained using third-resolution images with 1/9 the number of pixels. Quarter-resolution images are not so successful, since at this resolution the targets are reduced to single pixels. Improved performance at quarter resolution might be obtained by higher-quality filtering before down-sampling. However, this filtering would have to be performed in hardware for this approach to be practical, as the filter templates are likely to be of the order of 8 by 8 pixels in size. Even taking into account the gains due to down-sampling, this would require excessive processing resources from a general-purpose processor such as the ARM7.

Examining the numbers of candidate targets that pass each of the filtering steps provides some interesting insights. First, at low-resolution, the calipers tests play no part in reducing the number of target candidates. Any reduction in the number of candidates is due to selecting only candidates with suitable sizes. By size, we mean the number of pixels covered by the candidate. By contrast, many target candidates are eliminated because the intensity of their centre pixel in the full-resolution image is too great (remembering that the targets are black).

Applying Local Dynamic Range Expansion to the Low-Resolution Image

The algorithm described so far can be further improved. Pen-controlled illumination is still typically subject to variation within the field of view due to such factors as pen tilt. To overcome the effects of non-uniform illumination, local dynamic range expansion is applied to the low-resolution images rather than the global dynamic range expansion described above. The local dynamic range expansion is exactly as described above. The same parameters are used, noting that the dynamic range expansion radius is in terms of the low-resolution pixels. The cost of local dynamic range expansion is acceptable here because of the greatly reduced number of pixels in the low-resolution image.

The invention claimed is:

1. A monolithic image sensing device, including:
    an image sensor for sensing image data, the image sensor comprising a plurality of photodetecting circuits, each photodetecting circuit comprising:
    a photodetector for generating a signal in response to incident light;
    a storage node having first and second node terminals, the second node terminal being connected to a compensation signal a read period of the photodetection circuit; and
    a transfer transistor, disposed intermediate the first node terminal of the storage node and the photodetector, for electrically connecting the first node terminal and the photodetector during an integration period upon receiving a transfer signal to a gate of the transfer transistor, allowing charge stored in the storage node to change based on the signal of the photodetector;

a reset transistor having a control node for receiving a reset signal, a first terminal for receiving a reset voltage, and a second terminal electrically connected to the first node terminal, such that the reset voltage is supplied to the first node terminal when the reset signal is asserted at a gate of the reset transistor; and an output circuit for generating an output signal during the read period of the photodetecting circuit, the output signal being at least partially based on a voltage at the first terminal;

timing circuitry for generating:
at least one internal timing signal, the image sensor being responsive to at least one of the internal timing signals to at least commence sensing of the image data; and
at least one external timing signal; and
at least one external pin for supplying the at least one external timing signal to at least one peripheral device,
wherein the compensation signal being a logically negated version of the transfer signal.

2. A monolithic image sensing device according to claim 1, wherein the at least one internal timing signal includes a frame exposure signal.

3. A monolithic image sensing device according to claim 1, wherein timing of at least one of the external timing signals is programmable relative to at least one of the internal timing signals.

4. A monolithic image sensing device according to claim 3, wherein the timing is programmable by way of modifying a value stored in a register accessible by the timing circuitry.

5. A monolithic image sensing device according to claim 1, wherein a duration of at least one of the external timing signals is programmable.

6. A monolithic image sensing device according to claim 5, wherein the duration is programmable by way of modifying a value stored in a register accessible by the timing circuitry.

7. A monolithic image sensing device according to any one of claims 4 to 6, wherein the at least one external signal includes a light source control signal.

8. A monolithic image sensing device according to claim 7, wherein timing of the light source control signal is programmed to cause actuation of a light source prior to the internal timing signal causing the image sensor to commence sensing of the image data.

9. A monolithic image sensing device according to claim 1, further including:
an image processor for processing the image data; and
a synchronous interface for outputting the image data serially to a host processor in reliance on a synchronising signal therefrom;
wherein the image processor operates according to a system clock signal that is based on the synchronising signal.

10. A monolithic image sensing device according to claim 9, wherein the image sensor and the image processor operate asynchronously with respect to each other.

11. A monolithic image sensing device according to claim 9 or 10, wherein the image sensor is driven by an image sensor clock, the image sensor clock being derived from the system clock signal.

12. A monolithic image sensing device according to claim 1, the monolithic image sensing device further including:
at least one analog to digital converter for converting analog signals corresponding to the image information into digital image data; and
a first frame store for storing frames of the digital image data.

13. A monolithic image sensing device according to claim 1, the monolithic image sensing device further including:
at least one analog to digital converter for converting analog signals corresponding to the image information into digital image data; and
an image processor, the image processor including a low-pass filter for filtering the image data, thereby to generate filtered image data.

14. A monolithic image sensing device according to claim 1, the monolithic image sensing device further including:
at least one analog to digital converter for converting analog signals corresponding to the image information into digital image data; and
an image processor, the image processor including a range expansion circuit for range expanding the digital image data.

15. A monolithic image sensing device according to claim 1, wherein each photodetecting circuit is configured to:
receive the reset signal;
integrate charge in the storage node during the integration period following receipt of the reset signal; and
receive the compensation signal at the second terminal of the storage node at least during the read period, the compensation signal increasing the voltage at the first terminal whilst the output circuit generates the output signal.

16. A monolithic image sensing device according to claim 1, the monolithic image sensing device including an image processor configured to make each of a series of frames of image data available to a host processor, the image processor being configured to:
receive a first message from the host processor indicative of the host processor not requiring further access to the image data prior to a subsequent frame synchronisation signal;
in response to the first message, causing at least part of the integrated circuit to enter a low power mode; and
in response to a frame synchronisation signal, cause the part of the integrated circuit in the low power mode to exit the low power mode.

17. A monolithic image sensing device according to claim 1, the monolithic image sensing device including an image processor, the integrated circuit being configured to operate in a system having a host processor, the image processor being configured to:
receive, from the host processor, a request for access to a next available frame of image data from a framestore;
in the event the frame of image data is available, sending a message to the host processor indicative of the image data's availability; and
in the event the frame of image data is not available, waiting until image data is available and then sending a message to the host processor indicative of the image data's availability.

18. A monolithic image sensing device according to claim 1, the monolithic image sensing device being configured for use in a system having a host processor, the image sensing device including:
at least one input pin for receiving command data from the host processor;
at least one output pin for transmitting processed image data to the host processor in response to the command data; and
an image processor configured to generate the processed image data by performing an image-processing function on image data captured by an image sensor.

* * * * *